(12) United States Patent
Ensworth et al.

(10) Patent No.: US 12,041,889 B2
(45) Date of Patent: Jul. 23, 2024

(54) PRESSURE COMPENSATION MEMBERS, EMITTERS, DRIP LINE AND METHODS RELATING TO SAME

(71) Applicant: Rain Bird Corporation, Azusa, CA (US)

(72) Inventors: Mark Murphy Ensworth, Orange, CA (US); Mark Richard Edris, Glendora, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/339,536

(22) Filed: Jun. 4, 2021

(65) Prior Publication Data

US 2021/0289722 A1    Sep. 23, 2021

Related U.S. Application Data

(62) Division of application No. 15/881,285, filed on Jan. 26, 2018, now Pat. No. 11,051,466.

(60) Provisional application No. 62/510,458, filed on May 24, 2017, provisional application No. 62/451,541, filed on Jan. 27, 2017.

(51) Int. Cl.
*A01G 25/02*    (2006.01)

(52) U.S. Cl.
CPC ............ *A01G 25/023* (2013.01); *Y02A 40/22* (2018.01)

(58) Field of Classification Search
CPC .............................. A01G 25/023; Y02A 40/22
See application file for complete search history.

(56) References Cited

U.S. PATENT DOCUMENTS

| | | | |
|---|---|---|---|
| 1,329,559 | A | 2/1920 | Tesla |
| 2,174,515 | A | 10/1939 | Hughes |
| 2,449,731 | A | 9/1948 | Therrien |
| 2,508,403 | A | 5/1950 | Knauss |
| 2,625,429 | A | 1/1953 | Coles |

(Continued)

FOREIGN PATENT DOCUMENTS

| | | |
|---|---|---|
| AU | 511876 | 10/1978 |
| AU | 2004208646 | 3/2006 |

(Continued)

OTHER PUBLICATIONS

U.S. Appl. No. 16/436,467; Non-Final Rejection mailed Dec. 27, 2021; (pp. 1-10).

(Continued)

*Primary Examiner* — Qingzhang Zhou
(74) *Attorney, Agent, or Firm* — Fitch, Even, Tabin & Flannery, LLP

(57) ABSTRACT

A pressure compensation member, an irrigation drip emitter, drip lines and methods relating to same, are provided for delivering irrigation water from a supply tube to an emitter outlet at a reduced and relatively constant flow rate. The pressure compensation member being suitable for use in conventional emitters or alternate emitters being provided having either a uniform elastomeric emitter body configuration or a poly-material emitter body utilizing an elastomeric pressure compensation member. Various methods are also disclosed herein relating to the pressure compensation member, emitters and/or drip line using such pressure compensating members and/or emitters.

20 Claims, 71 Drawing Sheets

(56) References Cited

U.S. PATENT DOCUMENTS

| | | |
|---|---|---|
| 2,639,194 A | 5/1953 | Wahlin |
| 2,683,061 A | 7/1954 | Tuttle, Jr. |
| 2,762,397 A | 9/1956 | Miller |
| 2,794,321 A | 6/1957 | Warner |
| 2,873,030 A | 2/1959 | Ashton |
| 2,970,923 A | 2/1961 | Sparmann |
| 3,004,330 A | 10/1961 | Wilkins |
| 3,155,612 A | 11/1964 | Weber |
| 3,182,916 A | 5/1965 | Schulz |
| 3,199,901 A | 8/1965 | Jeppsson |
| 3,302,450 A | 2/1967 | Wakar |
| 3,323,550 A | 6/1967 | Lee, II |
| 3,361,359 A | 1/1968 | Chapin |
| 3,420,064 A | 1/1969 | Blass |
| 3,426,544 A | 2/1969 | Curtis |
| 3,434,500 A | 3/1969 | Burrows |
| 3,467,142 A | 9/1969 | Boyle |
| 3,586,291 A | 6/1971 | Malec |
| 3,672,571 A | 6/1972 | Goodricke |
| 3,693,888 A | 9/1972 | Rondas |
| 3,697,002 A | 10/1972 | Parkison |
| 3,698,195 A | 10/1972 | Chapin |
| 3,719,327 A | 3/1973 | McMahan |
| 3,727,635 A | 4/1973 | Todd |
| 3,729,142 A | 4/1973 | Rangel-Garza |
| 3,753,527 A | 8/1973 | Galbraith |
| 3,777,980 A | 12/1973 | Allport |
| 3,777,987 A | 12/1973 | Allport |
| 3,779,468 A | 12/1973 | Spencer |
| 3,780,946 A | 12/1973 | Smith |
| 3,791,587 A | 2/1974 | Drori |
| 3,792,588 A | 2/1974 | Gilaad |
| 3,797,741 A | 3/1974 | Spencer |
| 3,804,334 A | 4/1974 | Curry |
| 3,807,430 A | 4/1974 | Keller |
| 3,814,377 A | 6/1974 | Todd |
| 3,815,636 A | 6/1974 | Menzel |
| RE28,095 E | 7/1974 | Chapin |
| 3,830,067 A | 8/1974 | Osborn |
| 3,833,019 A | 9/1974 | Diggs |
| 3,851,896 A | 12/1974 | Olson |
| 3,856,333 A | 12/1974 | Cox |
| 3,863,845 A | 2/1975 | Bumpstead |
| 3,866,833 A | 2/1975 | Shibata |
| 3,870,236 A | 3/1975 | Sahagun-Barragan |
| 3,873,030 A | 3/1975 | Barragan |
| 3,874,598 A | 4/1975 | Havens |
| 3,882,892 A | 5/1975 | Menzel |
| 3,885,743 A | 5/1975 | Wake |
| 3,895,085 A | 7/1975 | Suzuki |
| 3,896,999 A | 7/1975 | Barragan |
| 3,897,009 A | 7/1975 | Rangel-Garza |
| 3,903,929 A | 9/1975 | Mock |
| 3,929,258 A | 12/1975 | Stephens |
| 3,939,875 A | 2/1976 | Osborn |
| 3,940,066 A | 2/1976 | Hunter |
| 3,948,285 A | 4/1976 | Flynn |
| 3,954,223 A | 5/1976 | Wichman |
| 3,957,292 A | 5/1976 | Diggs |
| 3,966,233 A | 6/1976 | Diggs |
| 3,970,251 A | 7/1976 | Harmony |
| 3,973,732 A | 8/1976 | Diggs |
| 3,981,452 A | 9/1976 | Eckstein |
| 3,993,248 A | 11/1976 | Harmony |
| 3,995,436 A | 12/1976 | Diggs |
| 3,998,244 A | 12/1976 | Bentley |
| 3,998,391 A | 12/1976 | Lemelshtrich |
| 3,998,427 A | 12/1976 | Bentley |
| 4,008,853 A | 2/1977 | Tregillus |
| 4,017,958 A | 4/1977 | Diggs |
| 4,022,384 A | 5/1977 | Hoyle |
| 4,036,435 A | 7/1977 | Pecaro |
| 4,037,791 A | 7/1977 | Mullett |
| 4,047,995 A | 9/1977 | Leal-Diaz |
| 4,054,152 A | 10/1977 | Ito |
| 4,058,257 A | 11/1977 | Spencer |
| 4,059,228 A | 11/1977 | Werner |
| 4,077,570 A | 3/1978 | Harmony |
| 4,077,571 A | 3/1978 | Harmony |
| 4,084,749 A | 4/1978 | Drori |
| 4,092,002 A | 5/1978 | Grosse |
| 4,095,750 A | 6/1978 | Gilead |
| 4,105,162 A | 8/1978 | Drori |
| 4,121,771 A | 10/1978 | Hendrickson |
| 4,122,590 A | 10/1978 | Spencer |
| 4,128,918 A | 12/1978 | Wenk |
| 4,132,364 A | 1/1979 | Harmony |
| 4,134,550 A | 1/1979 | Bright |
| 4,143,820 A | 3/1979 | Bright |
| 4,147,307 A | 4/1979 | Christy |
| 4,160,323 A | 7/1979 | Tracy |
| 4,161,291 A | 7/1979 | Bentley |
| 4,177,946 A | 12/1979 | Sahagun-Barragan |
| 4,177,947 A | 12/1979 | Menzel |
| 4,196,753 A | 4/1980 | Hammarstedt |
| 4,196,853 A | 4/1980 | Delmer |
| 4,209,133 A | 6/1980 | Mehoudar |
| 4,210,287 A | 7/1980 | Mehoudar |
| 4,215,822 A | 8/1980 | Mehoudar |
| 4,223,838 A | 9/1980 | Maria-Vittorio-Torrisi |
| 4,225,307 A | 9/1980 | Magera |
| 4,226,368 A | 10/1980 | Hunter |
| 4,235,380 A | 11/1980 | Delmer |
| 4,247,051 A | 1/1981 | Allport |
| 4,250,915 A | 2/1981 | Rikuta |
| 4,273,286 A | 6/1981 | Menzel |
| 4,274,597 A | 6/1981 | Dobos |
| 4,281,798 A | 8/1981 | Lemelstrich |
| 4,307,841 A | 12/1981 | Mehoudar |
| 4,331,293 A | 5/1982 | Rangel-Garza |
| 4,344,576 A | 8/1982 | Smith |
| 4,354,639 A | 10/1982 | Delmer |
| 4,366,926 A | 1/1983 | Mehoudar |
| 4,369,923 A | 1/1983 | Bron |
| 4,384,680 A | 5/1983 | Mehoudar |
| 4,385,727 A | 5/1983 | Spencer |
| 4,385,757 A | 5/1983 | Muller |
| 4,392,616 A | 7/1983 | Olson |
| 4,413,786 A | 11/1983 | Mehoudar |
| 4,413,787 A | 11/1983 | Gilead |
| 4,423,838 A | 1/1984 | Dinur |
| 4,424,936 A | 1/1984 | Marc |
| 4,430,020 A | 2/1984 | Robbins |
| 4,460,129 A | 7/1984 | Olson |
| 4,473,191 A | 9/1984 | Chapin |
| 4,473,525 A | 9/1984 | Drori |
| 4,502,631 A | 3/1985 | Christen |
| 4,508,140 A | 4/1985 | Harrison |
| 4,513,777 A | 4/1985 | Wright |
| 4,519,546 A | 5/1985 | Gorney |
| 4,522,339 A | 6/1985 | Costa |
| 4,533,083 A | 8/1985 | Tucker |
| 4,534,515 A | 8/1985 | Chapin |
| 4,545,784 A | 10/1985 | Sanderson |
| 4,550,878 A | 11/1985 | Rosenberg |
| 4,572,756 A | 2/1986 | Chapin |
| 4,573,640 A | 3/1986 | Mehoudar |
| 4,593,857 A | 6/1986 | Raz |
| 4,613,080 A | 9/1986 | Benson |
| 4,626,130 A | 12/1986 | Chapin |
| 4,627,903 A | 12/1986 | Chapman |
| 4,642,152 A | 2/1987 | Chapin |
| 4,653,695 A | 3/1987 | Eckstein |
| 4,687,143 A | 8/1987 | Gorney |
| 4,702,787 A | 10/1987 | Ruskin |
| 4,718,608 A | 1/1988 | Mehoudar |
| 4,722,481 A | 2/1988 | Lemkin |
| 4,722,759 A | 2/1988 | Roberts |
| 4,726,520 A | 2/1988 | Brown |
| 4,726,527 A | 2/1988 | Mendenhall |
| 4,728,042 A | 3/1988 | Gorney |
| 4,735,363 A | 4/1988 | Shfaram |
| 4,749,130 A | 6/1988 | Utzinger |
| 4,753,394 A | 6/1988 | Goodman |

(56) References Cited

U.S. PATENT DOCUMENTS

| | | |
|---|---|---|
| 4,756,339 A | 7/1988 | Buluschek |
| 4,765,541 A | 8/1988 | Mangels |
| 4,775,046 A | 10/1988 | Gramarossa |
| 4,781,217 A | 11/1988 | Rosenberg |
| 4,789,005 A | 12/1988 | Griffiths |
| 4,796,660 A | 1/1989 | Bron |
| 4,807,668 A | 2/1989 | Roberts |
| 4,817,875 A | 4/1989 | Karmeli |
| 4,824,019 A | 4/1989 | Lew |
| 4,824,025 A | 4/1989 | Miller |
| 4,850,531 A | 7/1989 | Littleton |
| 4,854,158 A | 8/1989 | Gates |
| 4,856,552 A | 8/1989 | Hiemstra |
| 4,859,264 A | 8/1989 | Buluschek |
| 4,862,731 A | 9/1989 | Gates |
| 4,874,132 A | 10/1989 | Gilead |
| 4,880,167 A | 11/1989 | Langa |
| 4,900,437 A | 2/1990 | Savall |
| 4,909,411 A | 3/1990 | Uchida |
| 4,935,992 A | 6/1990 | Due |
| 4,948,295 A | 8/1990 | Pramsoler |
| 4,984,739 A | 1/1991 | Allport |
| 4,990,256 A | 2/1991 | Schmidt |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,106,021 A | 4/1992 | Gilead |
| 5,111,995 A | 5/1992 | Dumitrascu |
| 5,111,996 A | 5/1992 | Eckstein |
| 5,116,414 A | 5/1992 | Burton |
| 5,118,042 A | 6/1992 | Delmer |
| 5,118,215 A | 6/1992 | Freier |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,216,784 A | 6/1993 | Dyer |
| 5,232,159 A | 8/1993 | Abbate |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney |
| 5,279,462 A | 1/1994 | Mehoudar |
| 5,282,578 A | 2/1994 | De Frank |
| 5,282,916 A | 2/1994 | Bloom |
| 5,283,916 A | 2/1994 | Haro |
| 5,294,058 A | 3/1994 | Einav |
| 5,294,212 A | 3/1994 | Mehoudar |
| 5,310,438 A | 5/1994 | Ruskin |
| 5,314,116 A | 5/1994 | Krauth |
| 5,316,220 A | 5/1994 | Dinur |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A | 7/1994 | Karathanos |
| 5,332,160 A | 7/1994 | Ruskin |
| 5,333,793 A | 8/1994 | DeFrank |
| 5,337,597 A | 8/1994 | Peake |
| 5,340,027 A | 8/1994 | Yu |
| 5,353,993 A | 10/1994 | Rosenberg |
| 5,364,032 A | 11/1994 | De Frank |
| 5,399,160 A | 3/1995 | Dunberger |
| 5,400,967 A | 3/1995 | Yu |
| 5,400,973 A | 3/1995 | Cohen |
| 5,413,282 A | 5/1995 | Boswell |
| 5,423,501 A | 6/1995 | Yu |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,458,712 A | 10/1995 | DeFrank |
| 5,465,905 A | 11/1995 | Elder |
| 5,522,551 A | 6/1996 | DeFrank |
| 5,531,381 A | 7/1996 | Ruttenberg |
| 5,535,778 A | 7/1996 | Zakai |
| 5,584,952 A | 12/1996 | Rubenstein |
| 5,586,727 A | 12/1996 | Shekalim |
| 5,591,293 A | 1/1997 | Miller |
| 5,601,381 A | 2/1997 | Hadar |
| 5,609,303 A | 3/1997 | Cohen |
| 5,615,833 A | 4/1997 | Robillard |
| 5,615,838 A | 4/1997 | Eckstein |
| 5,620,143 A | 4/1997 | Delmer |
| 5,628,462 A | 5/1997 | Miller |
| 5,634,594 A | 6/1997 | Cohen |
| 5,636,797 A | 6/1997 | Cohen |
| 5,641,113 A | 6/1997 | Somaki |
| 5,651,999 A | 7/1997 | Armentrout |
| 5,673,852 A | 10/1997 | Roberts |
| 5,676,897 A | 10/1997 | Dermitzakis |
| 5,688,072 A | 11/1997 | Meyer |
| 5,695,127 A | 12/1997 | Delmer |
| 5,711,482 A | 1/1998 | Yu |
| 5,722,601 A | 3/1998 | DeFrank |
| 5,727,733 A | 3/1998 | Ruttenberg |
| 5,732,887 A | 3/1998 | Roberts |
| 5,744,423 A | 4/1998 | Van Voris |
| 5,744,779 A | 4/1998 | Buluschek |
| RE35,857 E | 7/1998 | Mehoudar |
| 5,785,785 A | 7/1998 | Delmer |
| 5,813,603 A | 9/1998 | Kurtz |
| 5,820,028 A | 10/1998 | Dinur |
| 5,820,029 A | 10/1998 | Marans |
| 5,829,685 A | 11/1998 | Cohen |
| 5,829,686 A | 11/1998 | Cohen |
| 5,855,324 A | 1/1999 | DeFrank |
| 5,865,377 A | 2/1999 | DeFrank |
| 5,871,325 A | 2/1999 | Schmidt |
| 5,875,815 A | 3/1999 | Ungerecht |
| 5,881,796 A | 3/1999 | Brown |
| 5,887,640 A | 3/1999 | Brown |
| 5,893,404 A | 4/1999 | Mendez |
| 5,898,019 A | 4/1999 | Van Voris |
| 5,944,260 A | 8/1999 | Wang |
| 5,957,391 A | 9/1999 | DeFrank |
| 5,972,375 A | 10/1999 | Truter |
| 5,988,211 A | 11/1999 | Cornell |
| 5,996,909 A | 12/1999 | Lin |
| 6,015,102 A * | 1/2000 | Daigle ............... A01G 25/023 |
| | | 239/533.13 |
| 6,026,850 A | 2/2000 | Newton |
| 6,027,048 A | 2/2000 | Mehoudar |
| 6,039,270 A | 3/2000 | Dermitzakis |
| 6,062,245 A | 5/2000 | Berglind |
| 6,085,986 A | 7/2000 | Yu |
| 6,095,185 A | 8/2000 | Rosenberg |
| 6,109,296 A | 8/2000 | Austin |
| 6,116,523 A * | 9/2000 | Cabahug ............... B29C 53/52 |
| | | 138/42 |
| 6,120,634 A | 9/2000 | Harrold |
| 6,164,605 A | 12/2000 | Drake |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 * | 6/2001 | Cohen ............... A01G 25/023 |
| | | 239/533.1 |
| 6,280,554 B1 | 8/2001 | Lambert |
| 6,302,338 B1 | 10/2001 | Cohen |
| 6,305,617 B1 | 10/2001 | Yu |
| 6,308,768 B1 | 10/2001 | Rice |

(56) References Cited

U.S. PATENT DOCUMENTS

| | | |
|---|---|---|
| 6,308,902 B1 | 10/2001 | Huntley |
| D450,550 S | 11/2001 | Roberts |
| 6,334,958 B1 | 1/2002 | Ruskin |
| 6,343,616 B1 | 2/2002 | Houtchens |
| D455,055 S | 4/2002 | Roberts |
| 6,371,390 B1 | 4/2002 | Cohen |
| 6,382,530 B1 | 5/2002 | Perkins |
| 6,394,412 B2 | 5/2002 | Zakai |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz |
| 6,464,152 B1 | 10/2002 | Bolinis |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |
| 6,557,819 B2 | 5/2003 | Austin |
| 6,561,443 B2 | 5/2003 | Delmer |
| 6,568,607 B2 | 5/2003 | Boswell |
| 6,581,262 B1 | 6/2003 | Myers |
| 6,581,854 B2 | 6/2003 | Eckstein |
| 6,581,902 B2 | 6/2003 | Michau |
| 6,620,278 B1 | 9/2003 | Harrold |
| 6,622,427 B2 | 9/2003 | Breitner |
| 6,622,946 B2 | 9/2003 | Held |
| 6,640,879 B2 | 11/2003 | Richard |
| 6,691,739 B2 | 2/2004 | Rosenberg |
| 6,736,337 B2 | 5/2004 | Vildibill |
| 6,750,760 B2 | 6/2004 | Albritton |
| 6,764,029 B2 | 7/2004 | Rosenberg |
| 6,817,548 B2 | 11/2004 | Krauth |
| 6,821,928 B2 | 11/2004 | Ruskin |
| 6,827,298 B2 | 12/2004 | Sacks |
| 6,830,203 B2 | 12/2004 | Neyestani |
| 6,866,067 B2 | 3/2005 | Lim |
| 6,875,491 B2 | 4/2005 | Miyamoto |
| 6,886,761 B2 | 5/2005 | Cohen |
| 6,894,250 B2 | 5/2005 | Kertscher |
| 6,896,758 B1 | 5/2005 | Giuffre' |
| 6,920,907 B2 | 7/2005 | Harrold |
| 6,933,337 B2 | 8/2005 | Lang |
| 6,936,126 B2 | 8/2005 | DeFrank |
| 6,945,476 B2 | 9/2005 | Giuffre |
| 6,996,932 B2 | 2/2006 | Kruer |
| 6,997,402 B2 | 2/2006 | Kruer |
| 7,007,916 B2 | 3/2006 | Lee |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,284,302 B2 | 10/2007 | Lares |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,506,658 B2 | 3/2009 | Guest |
| 7,530,382 B2 | 5/2009 | Kertscher |
| 7,648,085 B2 | 1/2010 | Mavrakis |
| 7,681,805 B2 | 3/2010 | Belford |
| 7,681,810 B2 | 3/2010 | Keren |
| 7,695,587 B2 | 4/2010 | Kertscher |
| 7,712,253 B2 | 5/2010 | Gesser |
| 7,735,758 B2 | 6/2010 | Cohen |
| 7,748,930 B2 | 7/2010 | Gesser |
| 7,775,237 B2 | 8/2010 | Keren |
| 7,802,592 B2 | 9/2010 | McCarty |
| 7,887,664 B1 | 2/2011 | Mata |
| 7,900,656 B2 | 3/2011 | Masarwa |
| 7,913,935 B2 | 3/2011 | Einav |
| 7,954,732 B2 | 6/2011 | Shekalim |
| 7,988,076 B2 | 8/2011 | Mamo |
| 7,989,076 B2 | 8/2011 | Li |
| 8,002,496 B2 | 8/2011 | Giuffre |
| 8,011,852 B2 | 9/2011 | Gesser |
| 8,033,300 B2 | 10/2011 | McCarty |
| D648,191 S | 11/2011 | Thayer |
| 8,051,871 B2 | 11/2011 | Shani |
| 8,079,385 B2 | 12/2011 | Hatton |
| 8,091,276 B2 | 1/2012 | Gesser |
| 8,091,800 B2 | 1/2012 | Retter |
| 8,096,491 B2 | 1/2012 | Lutzki |
| 8,136,246 B2 | 3/2012 | So |
| 8,141,589 B2 | 3/2012 | Socolsky |
| D657,638 S | 4/2012 | Einav |
| 8,157,941 B2 | 4/2012 | Voigtmann |
| 8,167,002 B2 | 5/2012 | Kuhne |
| 8,220,727 B2 | 7/2012 | Lee |
| 8,267,115 B2 | 9/2012 | Giuffre' |
| 8,286,667 B2 | 10/2012 | Ruskin |
| 8,302,887 B2 | 11/2012 | Park |
| 8,317,111 B2 | 11/2012 | Cohen |
| 8,348,182 B2 | 1/2013 | Keren |
| 8,372,326 B2 | 2/2013 | Mamo |
| 8,381,437 B2 | 2/2013 | Ciudaj |
| 8,439,282 B2 | 5/2013 | Allen |
| 8,454,786 B2 | 6/2013 | Guichard |
| 8,469,294 B2 | 6/2013 | Mata |
| 8,475,617 B2 | 7/2013 | Kertscher |
| 8,496,193 B2 | 7/2013 | Rosenberg |
| 8,511,585 B2 | 8/2013 | Keren |
| 8,511,586 B2 | 8/2013 | Einav |
| 8,579,215 B2 | 11/2013 | Zavoli |
| 8,584,398 B2 | 11/2013 | Gesser |
| 8,628,032 B2 | 1/2014 | Feith |
| 8,663,525 B2 | 3/2014 | Mamo |
| 8,689,484 B2 | 4/2014 | Ruskin |
| 8,714,181 B2 | 5/2014 | Shani |
| 8,714,205 B2 | 5/2014 | Loebinger |
| 8,763,934 B2 | 7/2014 | Patel |
| 8,770,888 B2 | 7/2014 | Helbig |
| 8,870,098 B2 | 10/2014 | Lutzki |
| 8,882,004 B2 | 11/2014 | Gorney |
| 8,893,987 B2 | 11/2014 | Lerner |
| 8,998,112 B2 | 4/2015 | Cohen |
| 8,998,113 B2 | 4/2015 | Keren |
| 9,022,059 B2 | 5/2015 | Cohen |
| 9,022,764 B2 | 5/2015 | Wisler |
| 9,027,856 B2 | 5/2015 | DeFrank |
| D740,940 S | 10/2015 | Fregoso |
| 9,192,108 B2 | 11/2015 | Kertscher |
| 9,253,950 B1 | 2/2016 | Clark |
| 9,253,951 B2 | 2/2016 | Herrera |
| 9,258,949 B2 | 2/2016 | Nourian |
| 9,258,950 B2 | 2/2016 | Kidachi |
| 9,291,276 B2 | 3/2016 | Keren |
| 9,307,705 B2 | 4/2016 | Akritanakis |
| 9,345,205 B2 | 5/2016 | Kidachi |
| 9,380,749 B2 | 7/2016 | Akritanakis |
| 9,386,752 B2 | 7/2016 | Einav |
| 9,433,157 B2 | 9/2016 | Dermitzakis |
| 9,439,366 B2 | 9/2016 | Kidachi |
| 9,485,923 B2 | 11/2016 | Ensworth |
| D781,115 S | 3/2017 | Einav |
| 9,695,965 B2 | 7/2017 | Hadas |
| 9,743,595 B2 | 8/2017 | Mavrakis |
| 9,807,948 B2 | 11/2017 | Loebinger |
| 9,814,189 B1 | 11/2017 | Clark |
| 9,872,444 B2 | 1/2018 | Turk |
| 9,877,440 B2 | 1/2018 | Ensworth |
| 9,877,441 B2 | 1/2018 | Ensworth |
| 9,877,442 B2 | 1/2018 | Kim |
| D811,179 S | 2/2018 | Ensworth |
| 9,894,850 B2 | 2/2018 | Kidachi |
| 9,894,851 B2 | 2/2018 | Desarzens |
| 9,938,680 B2 | 4/2018 | Smith |
| 9,949,448 B2 | 4/2018 | Cohen |
| D816,438 S | 5/2018 | Beutler |
| D816,439 S | 5/2018 | Crook |

(56) References Cited

U.S. PATENT DOCUMENTS

| | | |
|---|---|---|
| 10,010,030 B2 | 7/2018 | Motha |
| 10,034,439 B2 | 7/2018 | Kidachi |
| D826,662 S | 8/2018 | Ensworth |
| 10,070,595 B2 | 9/2018 | Loebinger |
| 10,085,391 B2 | 10/2018 | Haub |
| 10,107,707 B2 | 10/2018 | DeFrank |
| 10,172,302 B2 | 1/2019 | Keren |
| 10,212,896 B2 | 2/2019 | Kidachi |
| 10,219,452 B2 | 3/2019 | Kidachi |
| 10,271,484 B2 | 4/2019 | Einav |
| 10,299,444 B2 | 5/2019 | Cohen |
| 10,327,396 B2 | 6/2019 | Kidachi |
| 10,349,587 B2 | 7/2019 | Einav |
| 10,356,989 B2 | 7/2019 | Kidachi |
| 10,362,740 B2 | 7/2019 | Kidachi |
| 10,375,904 B2 | 8/2019 | Ensworth |
| 10,383,290 B2 | 8/2019 | Kidachi |
| 10,440,904 B2 | 10/2019 | Wui |
| 10,455,780 B2 | 10/2019 | Cohen |
| 10,462,983 B2 | 11/2019 | Socolsky |
| 10,517,236 B2 | 12/2019 | Keren |
| 10,542,683 B2 | 1/2020 | Morikoshi |
| 10,588,274 B2 | 3/2020 | Noguchi |
| 10,595,476 B2 | 3/2020 | Morikoshi |
| 10,609,876 B2 | 4/2020 | Morikoshi |
| D883,048 S | 5/2020 | Ensworth |
| 10,716,268 B2 | 7/2020 | Loebinger |
| 10,736,278 B2 | 8/2020 | Daios |
| 10,772,266 B2 | 9/2020 | Socolsky |
| 10,834,878 B2 | 11/2020 | Morikoshi |
| 10,842,090 B2 | 11/2020 | Mavrakis |
| 11,116,152 B2 | 9/2021 | Yanagisawa |
| 11,252,879 B2 | 2/2022 | Socolsky |
| 11,452,269 B2 | 9/2022 | Taylor, Jr. |
| 11,793,127 B2 | 10/2023 | Socolsky |
| 2002/0064935 A1 | 5/2002 | Honda |
| 2002/0070297 A1 | 6/2002 | Bolinis |
| 2002/0074434 A1 | 6/2002 | Delmer |
| 2002/0088877 A1 | 7/2002 | Bertolotti |
| 2002/0104902 A1 | 8/2002 | Eckstein |
| 2002/0104903 A1 | 8/2002 | Eckstein |
| 2002/0113147 A1 | 8/2002 | Huntley |
| 2003/0029937 A1 | 2/2003 | Dermitzakis |
| 2003/0042335 A1 | 3/2003 | Krauth |
| 2003/0050372 A1 | 3/2003 | Stanhope |
| 2003/0057301 A1 | 3/2003 | Cohen |
| 2003/0089409 A1 | 5/2003 | Morimoto |
| 2003/0089803 A1 | 5/2003 | Huntley |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber |
| 2004/0018263 A1 | 1/2004 | Hashimshony |
| 2004/0164185 A1 | 8/2004 | Giuffre |
| 2005/0029231 A1 | 2/2005 | Kertscher |
| 2005/0077396 A1 | 4/2005 | Rabinowitz |
| 2005/0103409 A1 | 5/2005 | Weber |
| 2005/0133613 A1 | 6/2005 | Mayer |
| 2005/0224607 A1 | 10/2005 | Dinur |
| 2005/0224962 A1 | 10/2005 | Akamatsu |
| 2005/0258278 A1 | 11/2005 | Cohen |
| 2005/0258279 A1 | 11/2005 | Harrold |
| 2005/0279856 A1 | 12/2005 | Nalbandian |
| 2005/0279866 A1 | 12/2005 | Belford |
| 2005/0284966 A1 | 12/2005 | Defrank |
| 2006/0032949 A1 | 2/2006 | Lo |
| 2006/0043219 A1 | 3/2006 | Raanan |
| 2006/0144965 A1 | 7/2006 | Keren |
| 2006/0163388 A1 | 7/2006 | Mari |
| 2006/0169805 A1 | 8/2006 | Dabir |
| 2006/0186228 A1 | 8/2006 | Belford |
| 2006/0202381 A1 | 9/2006 | Bach |
| 2006/0237561 A1 | 10/2006 | Park |
| 2006/0255186 A1 | 11/2006 | Ruskin |
| 2006/0272201 A1 | 12/2006 | Pellenc |
| 2007/0095950 A1 | 5/2007 | Kim |
| 2007/0108318 A1 | 5/2007 | Mamo |
| 2007/0138323 A1 | 6/2007 | Lee |
| 2007/0175580 A1 | 8/2007 | Mata |
| 2007/0187031 A1 | 8/2007 | Kertscher |
| 2007/0194149 A1 | 8/2007 | Mavrakis |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0190256 A1 | 8/2008 | So |
| 2008/0237374 A1 | 10/2008 | Belford |
| 2008/0257991 A1 | 10/2008 | Einav |
| 2008/0265064 A1 | 10/2008 | Keren |
| 2009/0020634 A1 | 1/2009 | Schweitzer |
| 2009/0065084 A1 | 3/2009 | Masarwa |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney |
| 2009/0243146 A1 | 10/2009 | Retter |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2009/0320932 A1 | 12/2009 | Giuffre |
| 2010/0000674 A1 | 1/2010 | Voigtmann |
| 2010/0023717 A1 | 1/2010 | Jinno |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155503 A1 | 6/2010 | Dermitzakis |
| 2010/0155508 A1 | 6/2010 | Keren |
| 2010/0163651 A1 | 7/2010 | Feith |
| 2010/0175408 A1 | 7/2010 | Korda |
| 2010/0219265 A1 | 9/2010 | Feld |
| 2010/0237170 A1 | 9/2010 | Rosenberg |
| 2010/0244315 A1 | 9/2010 | Mamo |
| 2010/0252126 A1 | 10/2010 | Roes |
| 2010/0252127 A1 | 10/2010 | Gross |
| 2010/0282873 A1 | 11/2010 | Mattlin |
| 2010/0319784 A1 | 12/2010 | Kuhne |
| 2011/0186652 A1 | 8/2011 | Cohen |
| 2011/0226354 A1 | 9/2011 | Thordarson |
| 2012/0012678 A1 | 1/2012 | Gregory |
| 2012/0012682 A1 | 1/2012 | Einav |
| 2012/0074345 A1 | 3/2012 | Hatton |
| 2012/0097196 A1 | 4/2012 | Cohen |
| 2012/0097254 A1 | 4/2012 | Cohen |
| 2012/0097769 A1 | 4/2012 | Zavoli |
| 2012/0104648 A1 | 5/2012 | Yiflach |
| 2012/0126036 A1 | 5/2012 | Patel |
| 2012/0160926 A1 | 6/2012 | Lutzki |
| 2012/0180875 A1 | 7/2012 | Keller |
| 2012/0199673 A1 | 8/2012 | Cohen |
| 2012/0256017 A1 | 10/2012 | Gorney |
| 2012/0267454 A1 | 10/2012 | Einav |
| 2012/0305676 A1 | 12/2012 | Keren |
| 2013/0181066 A1 | 7/2013 | Dermitzakis |
| 2013/0248616 A1 | 9/2013 | Ensworth |
| 2013/0248622 A1 | 9/2013 | Kim |
| 2013/0340338 A1 | 12/2013 | Lin |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0246520 A1 | 9/2014 | Einav |
| 2014/0263758 A1 | 9/2014 | Turk |
| 2015/0014446 A1 | 1/2015 | Cohen |
| 2015/0041563 A1* | 2/2015 | Ensworth ............ A01G 25/023 29/890.141 |
| 2015/0041564 A1 | 2/2015 | Ensworth |
| 2015/0090815 A1 | 4/2015 | Akritanakis |
| 2015/0090816 A1 | 4/2015 | Akritanakis |
| 2015/0107777 A1 | 4/2015 | Zakarian |
| 2015/0144717 A1 | 5/2015 | Turk |

(56) References Cited

U.S. PATENT DOCUMENTS

| | | |
|---|---|---|
| 2015/0181816 A1 | 7/2015 | Desarzens |
| 2015/0181820 A1 | 7/2015 | Crook |
| 2015/0201568 A1 | 7/2015 | Einav |
| 2015/0223414 A1 | 8/2015 | Kidachi |
| 2015/0250111 A1 | 9/2015 | Kidachi |
| 2015/0296723 A1 | 10/2015 | Jain |
| 2015/0319940 A1 | 11/2015 | Kidachi |
| 2015/0351333 A1 | 12/2015 | Eberle |
| 2016/0057947 A1 | 3/2016 | Ensworth |
| 2016/0075070 A1 | 3/2016 | Verelis |
| 2016/0076965 A1 | 3/2016 | Edris |
| 2016/0088806 A1 | 3/2016 | Haub |
| 2016/0095285 A1 | 4/2016 | Loebinger |
| 2016/0143231 A2 | 5/2016 | Motha |
| 2016/0146388 A1 | 5/2016 | Smith |
| 2016/0198643 A1 | 7/2016 | Cohen |
| 2016/0219802 A1 | 8/2016 | Ensworth |
| 2016/0219803 A1 | 8/2016 | Keren |
| 2016/0223092 A1 | 8/2016 | Hadas |
| 2016/0227716 A1 | 8/2016 | Kidachi |
| 2016/0262319 A1 | 9/2016 | Defrank |
| 2016/0278311 A1 | 9/2016 | Kidachi |
| 2016/0286741 A1 | 10/2016 | Kidachi |
| 2016/0286743 A1 | 10/2016 | Einav |
| 2016/0295815 A1 | 10/2016 | Defrank |
| 2016/0309669 A1 | 10/2016 | Kidachi |
| 2016/0330917 A1 | 11/2016 | Kidachi |
| 2017/0035005 A1 | 2/2017 | Kidachi |
| 2017/0035006 A1 | 2/2017 | Kim |
| 2017/0112078 A1 | 4/2017 | Ensworth |
| 2017/0118927 A1 | 5/2017 | Loebinger |
| 2017/0142916 A1 | 5/2017 | Shamshery |
| 2017/0205013 A1 | 7/2017 | Smith |
| 2017/0290277 A1 | 10/2017 | Cohen |
| 2017/0292646 A1 | 10/2017 | Hadas |
| 2018/0014477 A1 | 1/2018 | Ensworth |
| 2018/0027756 A1 | 2/2018 | Kidachi |
| 2018/0098514 A1 | 4/2018 | Socolsky |
| 2018/0110191 A1 | 4/2018 | Keren |
| 2018/0116134 A1 | 5/2018 | Ensworth |
| 2018/0168116 A1 | 6/2018 | Morikoshi |
| 2018/0168117 A1 | 6/2018 | Noguchi |
| 2018/0177145 A1 | 6/2018 | Morikoshi |
| 2018/0199524 A1 | 7/2018 | Socolsky |
| 2018/0213732 A1 | 8/2018 | Ensworth |
| 2018/0228097 A1 | 8/2018 | Alkalay |
| 2018/0266576 A1 | 9/2018 | Balet |
| 2018/0271039 A1 | 9/2018 | Morikoshi |
| 2018/0295795 A1 | 10/2018 | Wlassich |
| 2018/0303047 A1 | 10/2018 | Wui |
| 2018/0317406 A1 | 11/2018 | Tsouri |
| 2018/0328498 A1 | 11/2018 | Rulli |
| 2018/0338434 A1 | 11/2018 | Wlassich |
| 2018/0359962 A1 | 12/2018 | Noguchi |
| 2019/0045728 A1 | 2/2019 | Daios |
| 2019/0246577 A1 | 8/2019 | Masarwa |
| 2019/0246578 A1 | 8/2019 | Einav |
| 2019/0335687 A1 | 11/2019 | Socolsky |
| 2019/0373827 A1 | 12/2019 | Ensworth |
| 2019/0388924 A1 | 12/2019 | Yanagisawa |
| 2020/0084981 A1 | 3/2020 | Yanagisawa |
| 2020/0093076 A1 | 3/2020 | Yanagisawa |
| 2020/0288653 A1 | 9/2020 | Socolsky |
| 2020/0390043 A1 | 12/2020 | Taylor, Jr. |
| 2021/0037726 A1 | 2/2021 | Yanagisawa |
| 2021/0037727 A1 | 2/2021 | Yanagisawa |
| 2021/0176928 A1 | 6/2021 | Ono |
| 2021/0204492 A1 | 7/2021 | Kidachi |
| 2021/0321582 A1 | 10/2021 | Hartranft |
| 2022/0046870 A1 | 2/2022 | Sokol |
| 2022/0117173 A1 | 4/2022 | Schweitzer |
| 2022/0132755 A1 | 5/2022 | Yankovitz |
| 2023/0200315 A1 | 6/2023 | Ana |
| 2023/0320292 A1 | 10/2023 | Geller |

FOREIGN PATENT DOCUMENTS

| | | |
|---|---|---|
| CA | 1053726 | 5/1979 |
| CN | 1627994 | 6/2005 |
| CN | 102057823 | 5/2011 |
| CN | 201821716 | 5/2011 |
| CN | 201871438 | 6/2011 |
| CN | 202617872 | 12/2012 |
| CN | 102933071 | 2/2013 |
| DE | 112706 | 5/1975 |
| DE | 3525591 | 1/1986 |
| EP | 0160299 A2 | 11/1985 |
| EP | 0344605 A2 | 12/1989 |
| EP | 0353982 | 2/1990 |
| EP | 0444425 A1 | 9/1991 |
| EP | 0480632 A2 | 4/1992 |
| EP | 0491115 A1 | 6/1992 |
| EP | 0549515 A1 | 6/1993 |
| EP | 0636309 A1 | 2/1995 |
| EP | 0709020 A1 | 5/1996 |
| EP | 0730822 A2 | 9/1996 |
| EP | 0493299 | 5/1997 |
| EP | 0872172 A1 | 10/1998 |
| EP | 1372375 | 1/2004 |
| EP | 1541013 A2 | 6/2005 |
| EP | 1701147 | 9/2006 |
| EP | 2952091 A1 | 12/2015 |
| FR | 2366790 | 5/1978 |
| GB | 1498545 | 1/1978 |
| GB | 2057960 A | 4/1981 |
| IL | 42705 A | 3/1976 |
| IL | 53463 A | 3/1983 |
| IL | 97564 A | 7/1996 |
| IL | 221089 | 5/2016 |
| IL | 212105 | 7/2016 |
| IT | 1255120 | 10/1995 |
| JP | 2000228417 | 8/2000 |
| JP | 2016220620 A | 12/2016 |
| RU | 2240682 | 1/2005 |
| RU | 2275791 | 3/2006 |
| RU | 2415565 | 4/2011 |
| WO | 9205689 A1 | 4/1992 |
| WO | 9221228 A1 | 12/1992 |
| WO | 9427728 A1 | 12/1994 |
| WO | 1995029761 | 11/1995 |
| WO | 9614939 | 5/1996 |
| WO | 9810635 A1 | 3/1998 |
| WO | 9902273 A1 | 1/1999 |
| WO | 9918771 A1 | 4/1999 |
| WO | 9955141 A1 | 11/1999 |
| WO | 0001219 A1 | 1/2000 |
| WO | 0010378 A1 | 3/2000 |
| WO | 030760 | 6/2000 |
| WO | 136106 A1 | 5/2001 |
| WO | 0156768 A1 | 8/2001 |
| WO | 2001064019 | 9/2001 |
| WO | 0204130 A1 | 1/2002 |
| WO | 2002015670 | 2/2002 |
| WO | 2003045577 A1 | 6/2003 |
| WO | 2003066228 A1 | 8/2003 |
| WO | 2004028778 A1 | 4/2004 |
| WO | 2007046105 | 10/2005 |
| WO | 2006030419 A2 | 3/2006 |
| WO | 2006038246 | 4/2006 |
| WO | 2007068523 A1 | 6/2007 |
| WO | 2010022471 | 3/2010 |
| WO | 2010048063 | 4/2010 |
| WO | 2011092557 | 8/2011 |
| WO | 2011101842 | 8/2011 |
| WO | 2012015655 A1 | 2/2012 |
| WO | 2012120317 | 9/2012 |
| WO | 2012137200 | 10/2012 |
| WO | 2012160121 | 11/2012 |
| WO | 2013148672 | 10/2013 |
| WO | 2013155173 A2 | 10/2013 |
| WO | 2013192321 | 12/2013 |
| WO | 2014016832 | 1/2014 |
| WO | 2015023624 | 2/2015 |
| WO | 2015044801 | 4/2015 |

(56) References Cited

FOREIGN PATENT DOCUMENTS

| WO | 2015052107 | 4/2015 |
|----|------------|--------|
| WO | 2015098412 | 7/2015 |
| WO | 2016156814 | 10/2016 |
| WO | 2018078521 | 5/2018 |

OTHER PUBLICATIONS

U.S. Appl. No. 16/451,871; Notice of Allowance and Fees Due (PTOL-85) mailed Dec. 8, 2021; (pp. 1-11).
U.S. Appl. No. 16/436,467; Non-Final Rejection mailed Jul. 28, 2022; (pp. 1-13).
Alam, M., et al., "Subsurface Drip Irrigation for Alfalfa," Kansas State University, 2009, pp. 1-8.
Alapati, Nanda K., Netafim Letter dated Mar. 30, 2012 with enclosure and attachments, 13 pages.
Alapati, Nanda K., Netafim Letter dated Mar. 30, 2012 with enclosure, 6 pages.
Arduini, I., et al., "Influence of Copper on Root Growth and Morphology of Pinus pinea L. and Pinus pinaster Ait. Seedlings," Tree Physiology, 15, 1995, pp. 411-415.
ASME 2015 International Design Engineering Technical Conferences & Computers and Information in Engineering Conference, K. Taylor et al, "A Mathematical Model For Pressure Compensating Emitters", Aug. 2-5, 2015, Boston, Massachusetts, USA, 10 pp.
Bernard, H., et al., "Assessment of herbicide leaching risk in two tropical soils of Reunion Island (France)," J Environ Qual 34:534-543, (2005).
Beverage, K., "Drip Irrigation for Row Crops," New Mexico State University, 2001, pp. 1-43.
Borkow, G., et al., "A Novel Anti-Influenza Copper Oxide Containing Respiratory Face Mask," PLoS One, www.plosone.org, Jun. 2010, vol. 5, Issue 6, pp. 1-8.
Borkow, G., et al., "Copper as a Biocidal Tool," Current Medicinal Chemistry, 2005, 12, 2163-2175.
Borkow, G., et al., "Endowing Textiles with Permanent Potent Biocidal Properties by Impregnating Them with Copper Oxide," ResearchGate, Jan. 2006.
Borkow, G., et al., "Putting copper into action:copperimpregnated products with potent biocidal activities," FASEB J, 18:1728-1730, (2004).
Brazilian Patent and Trademark Office, Search Report dated Nov. 19, 2018 for Brazilian Patent Application No. BR 11 2014 023843-0, 2 pages.
Brazilian Patent and Trademark Office, Technical Examination Report dated Nov. 19, 2018 for Brazilian Patent Application No. BR 11 2014 023843-0, 9 pages.
CETESB and SINDIPLAST, Environmental Guide of the Plastic Materials Recycling and Processing Industry [electronic resource], Technical elaboration: Gilmar do Amaral et al., Collaborators: Andre H.C. Botto e Souza et al., 2011. Retrieved from the Internet: <URL: http://file.sindiplast.org.br/download/guia_ambiental_internet.pdf>, 91 pages.
Coder, K., "Tree Root Growth Control Series: Root Control Barriers," The University of Georgia, Mar. 1998, pp. 1-7.
Crawford, M., "Copper-Coated Containers and Their Impact on the Environment," Spin Out, 2003, pp. 76-78.
Crawford, M., "Update On Copper Root Control," Spin Out, 1997.
DIG® Irrigation Product Catalog 2012, <www.digcorp.com>, 2012, 32 pages.
DIG® Irrigation Product Catalog 2016, <www.digcorp.com>, Nov. 9, 2016, 72 pages.
DIG® Irrigation Product Catalog 2018 , <www.digcorp.com>, Oct. 23, 2017, 72 pages.
Diver, S., et al., "Sustainable Small-Scale Nursery Production," ATTRA, Nov. 2001, pp. 1-31.
Dixieline Lumber & Home Centers Catalog, DIG Irrigation Products Drip Tubing, 2003, p. 13.
Duke, K., et al., "Sewer Line Chemical Root Control with Emphasis on Foaming Methods Using Metam-Sodium and Dichiobenil," EPA United States Environmental Protection Agency, Sep. 1995.
Eason, Audra, et al., "Integrated modeling environment for statewide assessment of groundwater vulnerability from pesticide use in agriculture," Pest Manag Sci, 60:739-745 (online:2004).
Eco iMat LLC dba ecorain® USA, iMat Solution, <www.ecorainusa.>, illustrating a product available since Nov. 25, 2015, 6 pages.
ECO Rain AG, iMat® Irrigation Mat, <http://www.ecorain.de/files/imat_irrigation_mat.pdf>, illustrating a product available since Sep. 18, 2016, 8 pp.
Ecorain USA, iMat FAQ document, illustrating a product available since 2017, 6 pp.
Encyclopaedia Britannica, Inc., "Peristalsis," Nov. 30, 2017, [online]. Retrieved from the Internet: <URL: https://www.britannica.com/print/article/452053 >, 2 pages.
EPO, Extended European Search Report issued in Application No. 13768209.2, Nov. 24, 2015 (10 pgs.).
Eurodrip U.S.A., Inc., 2009 Irrigation Products Catalog, p. 4-5, 4 pages.
Eurodrip U.S.A., Inc., Products Guide, copyright date Nov. 2007, 2 pages.
European Patent Application No. 18172143.2, Extended European Search Report, dated Oct. 15, 2018, 9 pages.
European Patent Office, Communication Pursuant to Article 94(3) EPC issued in European Application No. 13 768 209.2, Jan. 4, 2019, 5 pp.
European Patent Office, Communication Pursuant to Article 94(3) EPC issued in European Application No. 13 770 084.5, Aug. 9, 2021, 7 pp.
European Patent Office, Communication Pursuant to Article 94(3) EPC issued in European Application No. 14 836 360.9, Feb. 8, 2017, 7 pp.
European Patent Office, Communication Pursuant to Article 94(3) EPC issued in International Application No. 18 172 143.2, Apr. 29, 2020, 7 pp.
European Patent Office, Extended European Search Report for European Application No. 13770084.5 mailed Feb. 11, 2016, 7 pages.
European Patent Office, Extended European Search Report for European Application No. 17831631.1, mailed Feb. 3, 2020, 9 pp.
European Patent Office, Office Action for European Application No. 10160675.4 mailed Mar. 27, 2012, 2 pp.
European Patent Office, Search Report for European Application No. 10160675.4 mailed Aug. 6, 2010, 2 pp.
Final Office Action mailed Aug. 25, 2015; U.S. Appl. No. 13/430,308; 11 pages.
Final Office Action mailed Jul. 21, 2016; U.S. Appl. No. 13/430,308; 9 pages.
Fitch, Even, Tabin & Flannery; Letter, Apr. 23, 2008, 1 p.
Giles-Parker, C, EPA, Pesticide Fact Sheet, pp. 1-4.
http://aasystems.eu/dripper/; Advanced Automation Systems Ltd., Dec. 18, 2015, 12 pp.
http://aasystems.eu/products11.html; Advanced Automation Systems Ltd. (1 p., dated Jun. 20, 2013).
http://metzerplas.com/en-US/50/845/; Meterplas Cooperative Agricultural Organization Ltd., (2 pp., dated Jun. 20, 2013).
Hunter Industries, Drip Design Guide, Dec. 2012, 32 pages.
Intellectual Property India, the Patent Office, First Examination Report issued in Appln. No. IN201647007822, Sep. 17, 2020, 6 pp.
Irritec® On Line Drippers iDrop®, Irritec S.p.A, <www.irritec.com>, Nov. 5, 2014, 2 pages.
Irritec® Product Catalog and Price List 2016, Irritec USA Inc., <www.irritec.com>, Oct. 2, 2015, 66 pages.
Irritec™ USA iDrop™ PCDS, Irritec USA Inc., <www.irritecusa.com>, Jul. 26, 2012, 2 pages.
Jaffe, E., Netafim Ltd., Patent Dept., Letter with attached Appendices A-B, Aug. 1, 2010, 35 pages.
Jaffe, E., Netafim Ltd., Patent Dept., Letter with attached claim charts, Feb. 4, 2008, 6 pages.
Jaffe, E., Netafim Ltd., Patent Dept., Letter with attached claim charts, Jul. 12, 2009, 4 pages.

(56) References Cited

OTHER PUBLICATIONS

Jaffe, E., Netafim Ltd., Patent Dept., Letter with attachment, Feb. 4, 2008, 7 pages.
Jaffe, E., Netafim, Ltd., Patent Dept., Letter with attached invoice, May 7, 2008, 2 pages.
Jain Irrigation Inc., 2009 Product Catalog, pp. 12-13, copyright date 2009 (revised Oct. 2008), 4 pages.
Jain® Button Emitters, Jain Irrigation Inc., <www.jainsusa.com>, Jan. 5, 2015, 2 pages.
Jain® Emission Devices, Jain Irrigation Systems Ltd., <www.jainsusa.com>, Nov. 22, 2016, pp. 171-182.
Jain® Landscape Catalog, Jain Irrigation, Inc., <www.jainsusa.com>, Dec. 7, 2015, 102 pages.
Jain® Online Emitters, Jain Irrigation Systems Ltd., <www.jainsusa.com>, Mar. 12, 2015, 2pages.
Jiang, W. et al., "Effects of Copper on Root Growth, Cell Division, and Nucleolus of *Zea mays*," Biologia Plantarum, 44(1), 2001, pp. 105-109.
Kuhns, L. et al., "Copper Toxicity in Woody Ornamentals," Journal of Arboriculture, Apr. 1976. pp. 68-78.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
Mastin, B.J., et al., "Toxicity and bioavailability of copper herbicides (Clearigate, Cutrine-Plus, and copper sulfate) to freshwater animals," Arch Environ Contam Toxicol, 39:445-451, (2000).
metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
Murray-Gulde, C.L., et al., "Algicidal effectiveness of Clearigate, Cutrine-Plus, and copper sulfate and margins of safety associated with their use," Arch Environ Contam Toxicol 42:19-27, (2002).
NDS Inc., Agrifim Drip and Micro Irrigation Catalog, Jan. 2004, 3 pages.
Netafim International—Netafim USA—Internet site, 2003, 5 pages.
Netafim Ltd., Appendix A, images of Netafim's Drip Net product, 1 page.
Netafim Ltd., Appendix A, marked-up images of Netafim's Ram product, 1 page.
Netafim Ltd., Appendix B, Invoice, Jan. 31, 1991, 1 page.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim USA, Landscape & Turf Division Product Catalog, Aug. 2004, 36 pages.
Netafim USA, RAM Catalog Figures, Jan. 2000, 4 pages.
Netafim USA, Triton X Heavywall Dripperline Catalog, May 2007, 8 pages.
Netafim, RAM Pressure Compensating Dripperline brochure, Feb. 1997, 4 pages.
Netafim™ Non-Pressure Compensating Drippers, Netafim USA, <www.netafimusa.com>, Nov. 13, 2012, 2 pages.
Netafim™ Point Source Emitters, Netafim USA, <www.netafimusa.com>, Oct. 3, 2016, 4 pages.
Netafim™ Pressure Compensating (PC) Spray Stakes, Netafim USA,<www.netafimusa.com>, Feb. 26, 2013, 12 pages.
Netafim™ Pressure Compensating Drippers, Netafim USA, <www.netafimusa.com>, Jun. 1, 2018, 2 pages.
Netafim™ Pressure Compensating Drippers, Netafim USA, <www.netafimusa.com>, Apr. 2016, 2 pages.
Non-Final Office Action mailed Feb. 11, 2016; U.S. Appl. No. 13/430,308; 9 pages.
Patent Cooperation Treaty, Application No. PCT/US2013/033866, International Search Report and Written Opinion mailed Jun. 19, 2013, 38 pp.
Patent Cooperation Treaty, International Search Report issued in International Application No. PCT/US2013/046603, Sep. 19, 2013, 2 pp.
Patent Cooperation Treaty, International Searching Authority, Notification of Transmittal of the International Search Report and the Written Opinion of the International Searching Authority, or the Declaration, issued in International Application No. PCT/US/2014/054533, Dec. 25, 2014, 9 pp.
Patent Cooperation Treaty, International Searching Authority, Notification of Transmittal of the International Search Report and the Written Opinion of the International Searching Authority, or the Declaration, issued in International Application No. PCT/US2018/015516, Jun. 28, 2018, 8 pp.
Patent Cooperation Treaty, Notification of Transmittal of the International Search Report and the Written Opinion of the International Searching Authority issued in International Application No. PCT/US2013/033668, Jun. 17, 2013, 10 pp.
Patent Cooperation Treaty, Notification of Transmittal of the International Search Report and the Written Opinion of the International Searching Authority issued in International Application No. PCT/US2014/050623, Nov. 20, 2014, 17 pp.
Patent Cooperation Treaty, Notification of Transmittal of the International Search Report and the Written Opinion of the International Searching Authority, or the Declaration, Issued in International Application No. PCT/US2017042378, Oct. 26, 2017, 7 pp.
Patent Cooperation Treaty, Written Opinion of the International Searching Authority issued in International Application No. PCT/US2013/046603, Sep. 19, 2013, 4 pp.
PCT International Application No. PCT/US2013/033866 filed Mar. 26, 2013.
Photograph of DIG® Product No. PCA-003CV, Nov. 21, 2015, 1 page.
Photograph of Irritec® Product No. A6-WPC2BB, Jul. 26, 2012, 1 page.
Photograph of Irritec® Product No. A6-WPC3BB, Jul. 26, 2012, 1 page.
Photograph of Jain® Product No. CTTPC2-CNL, Jan. 5, 2015, 1 page.
Photograph of Jain® Product No. CTTPC4-CNL, Jan. 5, 2015, 1 page.
Photograph of Netafim™ Product No. SPCV10, Oct. 3, 2016, 1 page.
Photograph of Netafim™ Product No. Techflow Emitter WPC20, Nov. 13, 2012, 1 page.
Photograph of Netafim™ Product No. WPC10, Nov. 13, 2012, 1 page.
Photograph of Netafim™ Woodpecker Junior Product No. 01WPCJL4, Jan. 2012, 1 page.
Photograph of Toro® Product No. DPC08-MA-Red, Jun. 22, 2012, 1 page.
Photographs of an in-line cylindrical drip emitter on sale or publicly disclosed more than a year before the filing of the instant application, 2 pages.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Price Book, Oct. 2015, Rivulis Irrigation, Oct. 2015 (Revised Apr. 28, 2016), <rivulis.com>, 116 pages.
Rain Bird Corporation, Agriculture Irrigation Equipment 1981 Catalog, 3 pages.
Rain Bird Corporation, Drip Watering System 1994 Catalog, 1993, 16 pages.
Rain Bird Corporation, Landscape Irrigation Products 1993-1994 Catalog, Feb. 1993, 5 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, Mar. 2001, 9 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, Jun. 2004, 13 pages.

(56) References Cited

OTHER PUBLICATIONS

Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, Nursery Equipment Catalog 1986/1987, 1986, 3 pages.
Rain Bird Corporation, PC Dripline Pressure Compensating Inline Emitter Tubing Catalog, Oct. 1998, 16 pages.
Rain Bird Corporation, Rain Bird PC Dripline brochure, copyright date Nov. 2000, 12 pages.
Rain Bird Corporation, Turf Irrigation Equipment 1982 Catalog, 1982, 4 pages.
Rain Bird Corporation, Turf Irrigation Equipment 1983 Catalog, 1983, 4 pages.
Rain Bird Corporation, Turf Irrigation Equipment 1985 Catalog, 1985, 3 pages.
Rain Bird Corporation, Turf Irrigation Equipment 1985 Catalog, p. 73, 1985, 3 pages.
Rain Bird Corporation, Turf Irrigation Equipment 1987 Catalog, 1987, 6 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.
Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.
Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright date Aug. 2003, pp. 106-107.
Rain Bird® Nursery Equipment Catalog 1986-1987, D32304, copyright date 1986, p. 13.
Rain Bird® XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird@ XFD Dripline with Greater Flexiblity, D39994B, copyright date Jan. 2012, 2 pages.
Rain Bird® XFS Dripline with Copper Shield™ Technology, D39978B, copyright date Jan. 2012, 2 pages.
Rain Tape Design Guide, Rain Bird®, D35252, document was published more than a year before the filing date of the instant application, 5 pages.
RAM Invoice Jan. 31, 1991.
Schifris, Seba et al., "Inhibition of root penetration in subsurface driplines by impregnating the drippers with copper oxide particles," Irrigation Science (2015) 33:4, pp. 319-324.
Siplast/Irritec Multibar Pressure Compensated Coextruded Dripline, Jul. 22, 2005, 4 pages.
Smiley, E. T., "Root Growth Near Vertical Root Barriers," International Society of Arboriculture, 1995, pp. 150-152.
Spera, G., et al., "Subsurface drip irrigation with microencapsulated trifluralin. Trifluralin residues in soils and cultivations," Commun Agric Appl Biol Sci 71:161-170, (2006).
State Intellectual Property Office of People's Republic of China, First Office Action issued in Application No. 201480045002.0, Apr. 16, 2018, 20 pp.
State Intellectual Property Office, First Office Action issued in Chinese Application No. 201380016629.9, Nov. 4, 2015, 16 pp.
The Clean Estuary Partnership, "Copper Sources in Urban Runoff and Shoreline Activities," TDC Environmental, LLC, 2004, pp. 1-72.
The Toro Company, 2000-2001 Irrigation Products Catalog, p. 28, copyright date Oct. 1999, 3 pages.
The Toro Company, Drip In Classic Turbulent Flow Dripline brochure, Jun. 2014, 4 pages.
The Toro Company, Drip In PC Brown Dripline brochure, 2015, 2 pages.
Toro® NGE® AL Anti-Drain Pressure Compensating Emitter, The Toro Company, <www.toro.com>, Jun. 23, 2012, 2 pages.
Toro® NGE® Emitters, The Toro Company, <www.toro.com>, May 16, 2018, 2 pages.
Toro® NGE® New Generation Emitters, The Toro Company, <www.toro.com>, Feb. 21, 2013, 2 pages.
Toro® NGE® SF Self-flushing Pressure Compensating Emitter, The Toro Company, <www.toro.com>, Jun. 22, 2012, 2 pages.
Toro® Turbo-SC® Plus Pressure-compensating Emitter, The Toro Company, <www.toro.com>, May 6, 2009, 2 pages.
U.S. Appl. No. 11/359,181, filed Feb. 22, 2006, entitled "Drip Emitter," and issued on Jan. 19, 2010 as U.S. Pat. No. 7,648,085.
U.S. Appl. No. 11/394,755, filed Mar. 31, 2006, entitled "Drip Emitter."
U.S. Appl. No. 12/347,266, filed Dec. 31, 2008, entitled "Low Flow Irrigation Emitter."
U.S. Appl. No. 12/367,295, filed Feb. 6, 2009, entitled "Low Flow Irrigation Emitter."
U.S. Appl. No. 12/436,394, filed May 6, 2009, entitled "Drip Emitter and Methods of Assembly and Mounting."
U.S. Appl. No. 12/495,178, filed Jun. 30, 2009, entitled "Drip Emitter."
U.S. Appl. No. 12/495,193, filed Jun. 30, 2009, entitled "Drip Emitter," which is a continuation of U.S. Appl. No. 11/359,181.
U.S. Appl. No. 13/430,249, filed Mar. 26, 2012.
U.S. Appl. No. 13/964,903, filed Aug. 12, 2013.
U.S. Appl. No. 14/139,217, filed Dec. 23, 2013.
U.S. Appl. No. 14/036,881; Notice of Allowance mailed Aug. 24, 2017; 7 pages.
U.S. Appl. No. 13/839,726; Notice of Allowance mailed Sep. 14, 2017; 5 pages.
U.S. Appl. No. 13/964,903; Notice of Allowance mailed Apr. 5, 2018, 5 pages.
U.S. Appl. No. 13/964,903; Notice of Allowance mailed Aug. 4, 2017; 11 pages.
U.S. Appl. No. 13/964,903; Notice of Allowance mailed Sep. 18, 2017; 7 pages.
U.S. Appl. No. 14/036,881; Corrected Notice of Allowability mailed May 21, 2018, 2 pages.
U.S. Appl. No. 14/036,881; Corrected Notice of Allowability mailed May 22, 2017; 2 pages.
U.S. Appl. No. 14/036,881; Notice of Allowability mailed Nov. 29, 2017; 2 pages.
U.S. Appl. No. 14/036,881; Notice of Allowability mailed Dec. 26, 2017; 2 pages.
U.S. Appl. No. 14/036,881; Notice of Allowance mailed May 8, 2017; 9 pages.
U.S. Appl. No. 14/036,881; Notice of Allowance mailed May 9, 2018, 5 pages.
U.S. Appl. No. 14/036,881; Notice of Allowance mailed Dec. 23, 2016; 8 pages.
U.S. Appl. No. 14/036,881; Office Action mailed Aug. 2, 2016; 11 pages.
U.S. Appl. No. 14/036,881; Office Action mailed Dec. 9, 2015; 9 pages.
U.S. Appl. No. 14/385,564; Notice of Allowability mailed Nov. 29, 2017; 2 pages.
U.S. Appl. No. 14/385,564; Notice of Allowability mailed Dec. 26, 2017; 2 pages.
U.S. Appl. No. 14/385,564; Notice of Allowance mailed Aug. 22, 2017; 8 pages.
U.S. Appl. No. 14/475,435; Office Action mailed Sep. 27, 2017; 9 pages.
U.S. Appl. No. 14/518,774; Notice of Allowance mailed Jan. 4, 2018; 4 pages.
U.S. Appl. No. 14/518,774; Notice of Allowance mailed Oct. 26, 2017; 7 pages.

(56) References Cited

OTHER PUBLICATIONS

U.S. Appl. No. 14/851,545; Office Action mailed Oct. 30, 2017; 27 pages.
U.S. Appl. No. 14/910,573; Office Action mailed Feb. 13, 2018; 10 pages.
U.S. Appl. No. 15/331,407; Corrected Notice of Allowability mailed Dec. 28, 2017; 2 pages.
U.S. Appl. No. 15/331,407; Notice of Allowability mailed Nov. 30, 2017; 2 pages.
U.S. Appl. No. 15/331,407; Notice of Allowance mailed Oct. 27, 2017; 9 pages.
U.S. Appl. No. 15/331,407; Office Action mailed Apr. 27, 2017; 7 pages.
U.S. Appl. No. 15/344,843; Corrected Notice of Allowability mailed Dec. 28, 2017; 2 pages.
U.S. Appl. No. 15/344,843; Notice of Allowability mailed Nov. 30, 2017; 2 pages.
U.S. Appl. No. 15/344,843; Notice of Allowance mailed Oct. 16, 2017; 7 pages.
U.S. Appl. No. 15/650,379; Office Action mailed May 18, 2018, 8 pages.
U.S. Appl. No. 13/964,903; Notice of Allowance mailed Mar. 26, 2019; (pp. 1-5).
U.S. Appl. No. 13/964,903; Notice of Allowance mailed Sep. 26, 2018; (pp. 1-5).
U.S. Appl. No. 13/964,903; Notice of Allowance mailed Dec. 14, 2018; (pp. 1-5).
U.S. Appl. No. 14/036,881; Notice of Allowance mailed Jun. 21, 2019; (pp. 1-6).
U.S. Appl. No. 14/036,881; Notice of Allowance mailed Aug. 30, 2018; (pp. 1-6).
U.S. Appl. No. 14/851,545; Notice of Allowance mailed Apr. 17, 2019; (pp. 1-9).
U.S. Appl. No. 14/851,545; Office Action mailed Jul. 3, 2018; 29 pages.
U.S. Appl. No. 14/851,545; Office Action mailed Oct. 29, 2018; (pp. 1-32).
U.S. Appl. No. 14/910,573; Notice of Allowance mailed Feb. 26, 2020; (pp. 1-5).
U.S. Appl. No. 14/910,573; Notice of Allowance mailed Sep. 3, 2019; (pp. 1-11).
U.S. Appl. No. 14/910,573; Notice of Allowance mailed Dec. 23, 2019; (pp. 1-5).
U.S. Appl. No. 14/910,573; Office Action mailed May 6, 2019; (pp. 1-11).
U.S. Appl. No. 14/910,573; Office Action mailed Sep. 26, 2018; (pp. 1-11).
U.S. Appl. No. 15/595,427; Notice of Allowance mailed Jan. 23, 2020; (pp. 1-7).
U.S. Appl. No. 15/595,427; Notice of Allowance mailed Feb. 25, 2020; (pp. 1-7).
U.S. Appl. No. 15/595,427; Office Action mailed Apr. 4, 2019; (pp. 1-6).
U.S. Appl. No. 15/595,427; Office Action mailed Jun. 6, 2019.
U.S. Appl. No. 15/595,427; Office Action mailed Dec. 17, 2018; (pp. 1-6).
U.S. Appl. No. 15/650,379; Notice of Allowance mailed Feb. 19, 2019; (pp. 1-5).
U.S. Appl. No. 15/650,379; Notice of Allowance mailed Mar. 26, 2019; (pp. 1-5).
U.S. Appl. No. 15/650,379; Notice of Allowance mailed Oct. 24, 2018; (pp. 1-7).
U.S. Appl. No. 15/665,848; Notice of Allowance mailed Jul. 21, 2020, (pp. 1-7).
U.S. Appl. No. 15/665,848; Office Action mailed Jan. 8, 2020; (pp. 1-11).
U.S. Appl. No. 15/665,848; Office Action mailed Aug. 30, 2019; (pp. 1-12).
U.S. Appl. No. 15/853,135; Notice of Allowance mailed May 20, 2019.
U.S. Appl. No. 15/858,685; Office Action mailed Jan. 14, 2020; (pp. 1-10).
U.S. Appl. No. 15/858,685; Office Action mailed Apr. 16, 2021; (pp. 1-9).
U.S. Appl. No. 15/858,685; Office Action mailed Apr. 24, 2020, (pp. 1-9).
U.S. Appl. No. 15/858,685; Office Action mailed Dec. 9, 2020; (pp. 1-9).
U.S. Appl. No. 15/881,285; Notice of Allowance mailed Mar. 4, 2021; (pp. 1-9).
U.S. Appl. No. 15/881,285; Office Action mailed Jul. 16, 2020, (pp. 1-16).
U.S. Appl. No. 15/881,285; Office Action mailed Dec. 30, 2019; (pp. 1-12).
U.S. Appl. No. 15/952,510; Office Action mailed Apr. 16, 2020, (pp. 1-19).
U.S. Appl. No. 15/952,510; Office Action mailed Aug. 6, 2019; (pp. 1-14).
U.S. Appl. No. 15/858,685; Notice of Allowance Aug. 5, 2021; (pp. 1-8).
U.S. Appl. No. 16/451,871; Office Action Mailed Jun. 22, 2021; (pp. 1-16).
U.S. Appl. No. 16/532,006; Notice of Allowance mailed Apr. 20, 2020, (pp. 1-7).
U.S. Appl. No. 16/532,006; Office Action mailed Jan. 6, 2020; (pp. 1-10).
U.S. Appl. No. 11/394,755, Office Action mailed Aug. 14, 2008; 9 pages.
U.S. Appl. No. 11/394,755, Office Action mailed Feb. 7, 2008; 18 pages.
U.S. Appl. No. 11/394,755, Office Action mailed Jul. 17, 2007; 16 pages.
U.S. Appl. No. 11/394,755, Office Action mailed Jul. 17, 2009; 8 pages.
U.S. Appl. No. 11/394,755, Office Action mailed Mar. 31, 2009; 13 pages.
U.S. Appl. No. 11/394,755; Office Action mailed May 12, 2011; 15 pages.
U.S. Appl. No. 11/394,755; Office Action mailed Dec. 19, 2011; 10 pages.
U.S. Appl. No. 12/347,266, Office Action mailed Mar. 7, 2011; 17 pages.
U.S. Appl. No. 12/347,266, Office Action mailed Nov. 17, 2010; 15 pages.
U.S. Appl. No. 12/347,266, Office Action mailed Sep. 7, 2010; 5 pages.
U.S. Appl. No. 12/367,295, Office Action mailed Feb. 11, 2011; 14 pages.
U.S. Appl. No. 12/367,295, Office Action mailed Jul. 15, 2011; 16 pages.
U.S. Appl. No. 12/367,295; Office Action mailed Jun. 8, 2012; 21 pages.
U.S. Appl. No. 12/495,178, Office Action mailed Feb. 3, 2010; 20 pages.
U.S. Appl. No. 12/495,178; Office Action mailed Apr. 18, 2014; 12 pages.
U.S. Appl. No. 12/495,178; Office Action mailed Jun. 21, 2012; 8 pages.
U.S. Appl. No. 12/495,178; Office Action mailed Mar. 11, 2015; 6 pages.
U.S. Appl. No. 12/495,178; Office Action mailed Nov. 18, 2014; 8 pages.
U.S. Appl. No. 12/495,178; Office Action mailed Oct. 6, 2015; 8 pages.
U.S. Appl. No. 12/495,193, Office Action mailed Jan. 6, 2012; 18 pages.
U.S. Appl. No. 12/495,193, Office Action mailed May 11, 2011; 19 pages.
U.S. Appl. No. 12/495,193; Advisory Action mailed Sep. 5, 2013; 3 pages.
U.S. Appl. No. 12/495,193; Notice of Allowance mailed Feb. 10, 2017; 7 pages.

(56) References Cited

OTHER PUBLICATIONS

U.S. Appl. No. 12/495,193; Notice of Allowance mailed May 4, 2017; 7 pages.
U.S. Appl. No. 12/495,193; Notice of Allowance mailed Oct. 14, 2016; 7 pages.
U.S. Appl. No. 12/495,193; Office Action mailed Apr. 18, 2014; 23 pages.
U.S. Appl. No. 12/495,193; Office Action mailed Aug. 29, 2016; 7 pages.
U.S. Appl. No. 12/495,193; Office Action mailed Jan. 15, 2015; 11 pages.
U.S. Appl. No. 12/495,193; Office Action mailed Jun. 18, 2013; 13 pages.
U.S. Appl. No. 12/495,193; Office Action mailed Oct. 1, 2015; 9 pages.
U.S. Appl. No. 13/430,249; Notice of Allowance dated Apr. 14, 2016; 7 pages.
U.S. Appl. No. 13/430,249; Notice of Allowance mailed Sep. 19, 2016; 6 pages.
U.S. Appl. No. 13/430,249; Office Action mailed Mar. 24, 2015; 10 pages.
U.S. Appl. No. 13/430,249; Office Action mailed Oct. 26, 2015; 10 pages.
U.S. Appl. No. 13/800,354; Office Action mailed Sep. 25, 2014; 13 pages.
U.S. Appl. No. 13/839,726; Notice of Allowance mailed Aug. 15, 2016; 5 pages.
U.S. Appl. No. 13/839,726; Notice of Allowance mailed Dec. 1, 2016; 5 pages.
U.S. Appl. No. 13/839,726; Notice of Allowance mailed Dec. 31, 2015; 5 pages.
U.S. Appl. No. 13/839,726; Office Action mailed Apr. 26, 2016; 4 pages.
U.S. Appl. No. 13/839,726; Office Action mailed Mar. 20, 2017; 4 pages.
U.S. Appl. No. 13/839,726; Office Action mailed May 28, 2015; 5 pages.
U.S. Appl. No. 13/839,726; Office Action mailed May 30, 2017; 4 pages.
U.S. Appl. No. 13/964,903; Office Action mailed Jun. 3, 2015; 21 pages.
U.S. Appl. No. 13/964,903; Office Action mailed Mar. 7, 2016; 21 pages.
U.S. Appl. No. 14/047,489; Office Action mailed Jun. 29, 2015; 7 pages.
U.S. Appl. No. 14/047,489; Office Action mailed Oct. 7, 2015; 9 pages.
U.S. Appl. No. 14/139,217; Office Action mailed Apr. 8, 2015; 9 pages.
U.S. Appl. No. 14/139,217; Office Action mailed Sep. 18, 2015; 11 pages.
U.S. Appl. No. 14/385,564; Office Action mailed Aug. 10, 2016; 9 pages.
U.S. Appl. No. 14/385,564; Office Action mailed Mar. 10, 2017; 8 pages.
U.S. Appl. No. 14/475,435; Office Action mailed Jan. 26, 2017; 10 pages.
U.S. Appl. No. 14/475,435; Office Action mailed Jul. 20, 2016; 9 pages.
U.S. Appl. No. 14/518,774; Office Action mailed May 10, 2017; 8 pages.
U.S. Appl. No. 14/851,545; Office Action mailed Apr. 24, 2017; 20 pages.
U.S. Appl. No. 14/910,573; Office Action mailed Jun. 27, 2017; 10 pages.
U.S. Appl. No. 15/344,843; Office Action mailed Apr. 28, 2017; 7 pages.
U.S. Appl. No. 13/964,903; Office Action mailed Oct. 31, 2016; 22 pages.
Wagar, J. Alan, et al., "Effectiveness of Three Barrier Materials for Stopping Regenerating Roots of Established Trees," Journal of Arboriculture, 19(6), Nov. 1993, pp. 332-338.
Westgate, Philip J., "Preliminary Report on Copper Toxicity and Iron Chlorosis in Old Vegetable Fields," Florida State Horticultural Society, 1952, pp. 143-146.
DRTS, Low Flow Miniature Flat Dripper, Wayback Machine (DRTS.com), Mar. 12, 2019, accessed Nov. 25, 2022, URL: <https://web.archive.org/web/20190312142059/https://drts.com/products/nano-micro/> (Year 2019).
DRTS, Pressure Compensating Flat Dripper, Wayback Machine (DRTS.com), Aug. 8, 2020, accessed Nov. 25, 2022, URL: <https://web.archive.org/web/20200808111512/https://drts.com/products/cyclone-pc-nd-as/> (Year 2020).
U.S. Appl. No. 16/436,467; Final Rejection mailed Apr. 5, 2022; (pp. 1-12).
U.S. Appl. No. 16/451,871; Notice of Allowance and Fees Due (PTOL-85) mailed Apr. 8, 2022; (pp. 1-5).
U.S. Appl. No. 16/436,467; Final Rejection mailed Feb. 17, 2023; (pp. 1-10).
Foster, Richard, Declaration of Richard Foster dated Jun. 19, 2023, pp. 1-3.
U.S. Appl. No. 16/436,467; Non-Final Rejection mailed May 18, 2023; (pp. 1-12).
U.S. Appl. No. 16/436,467; Final Rejection mailed Oct. 2, 2023; (pp. 1-12).
U.S. Appl. No. 17/893,046; Non-Final Rejection mailed Nov. 7, 2023; (pp. 1-17).
U.S. Appl. No. 18/188,864; Final Rejection mailed Jan. 29, 2024; (pp. 1-12).

* cited by examiner

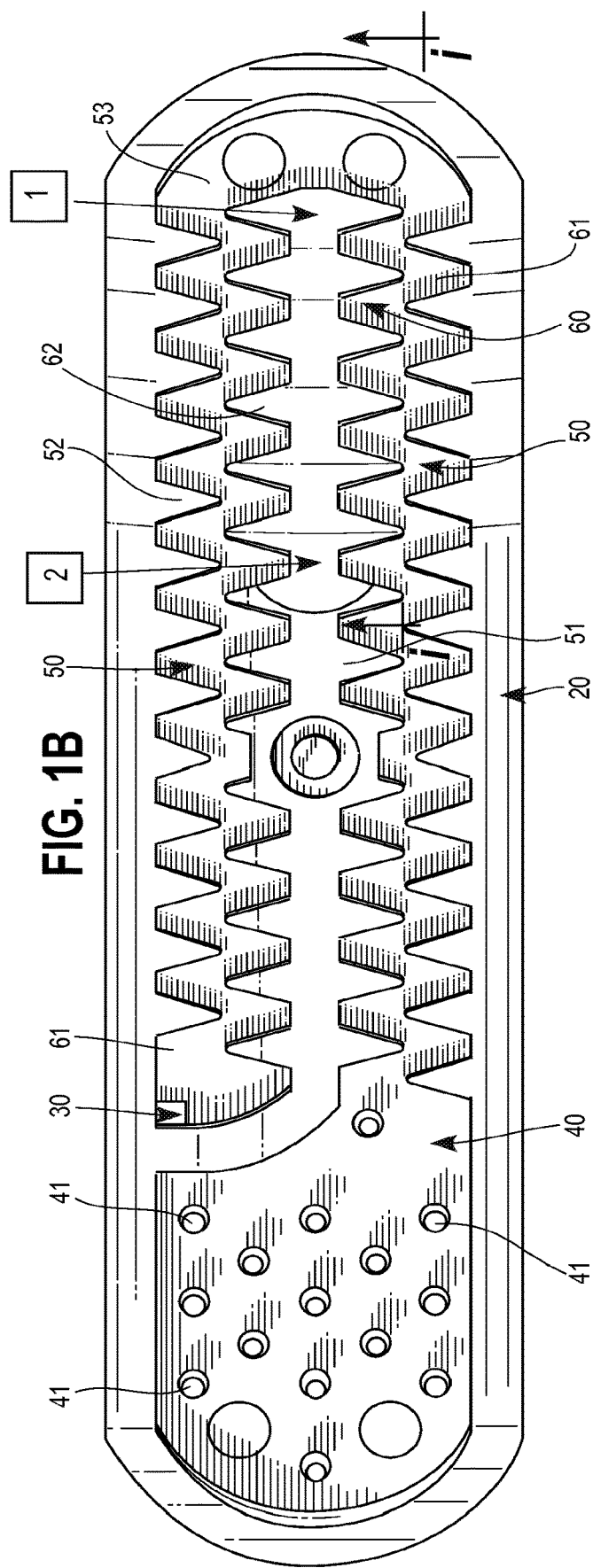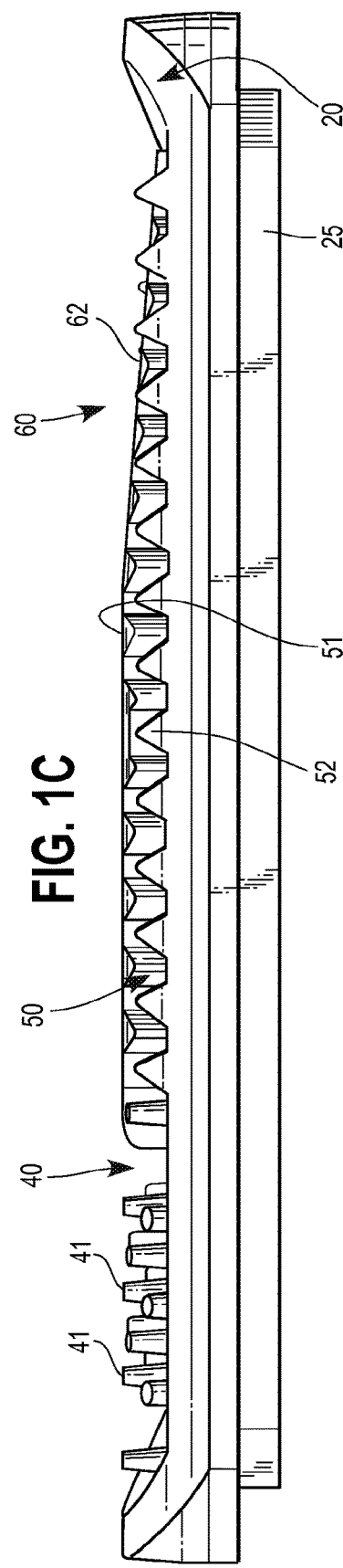

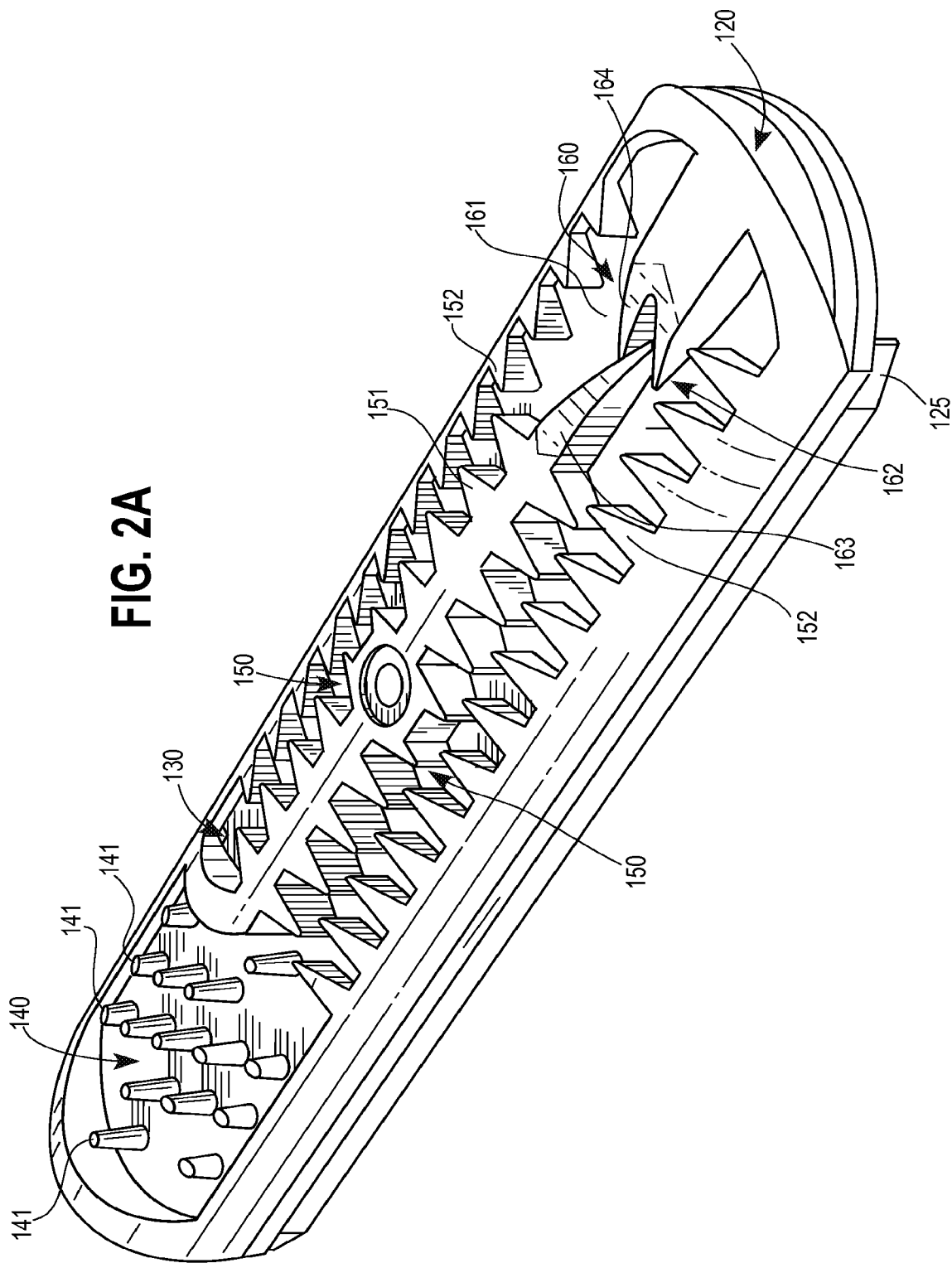

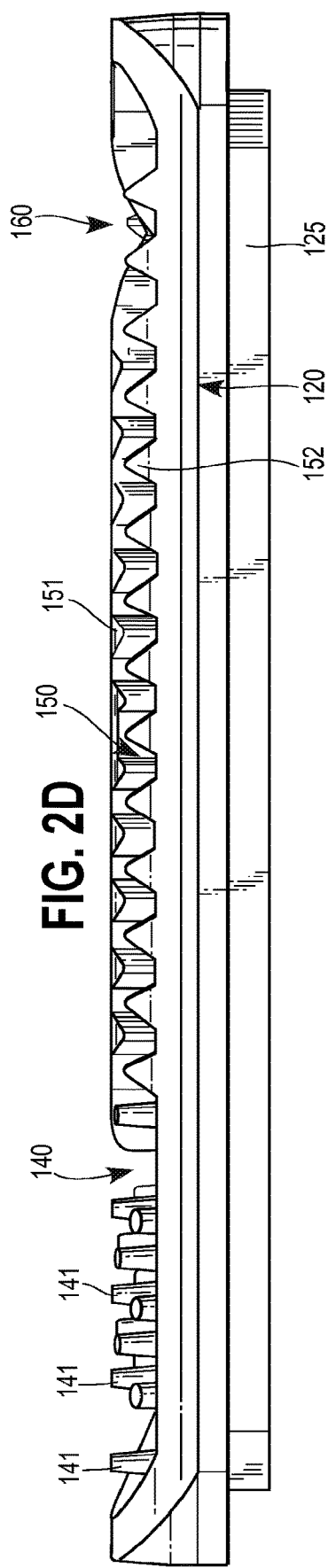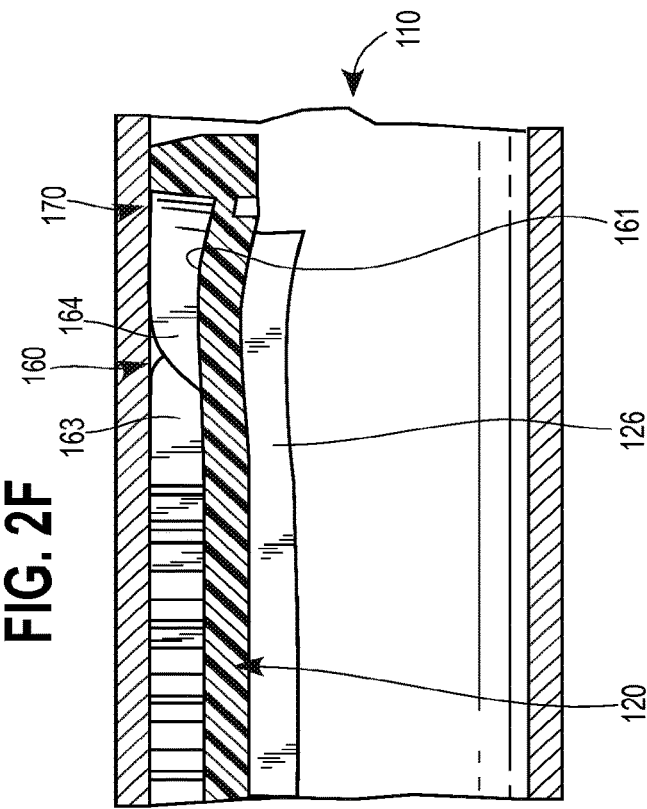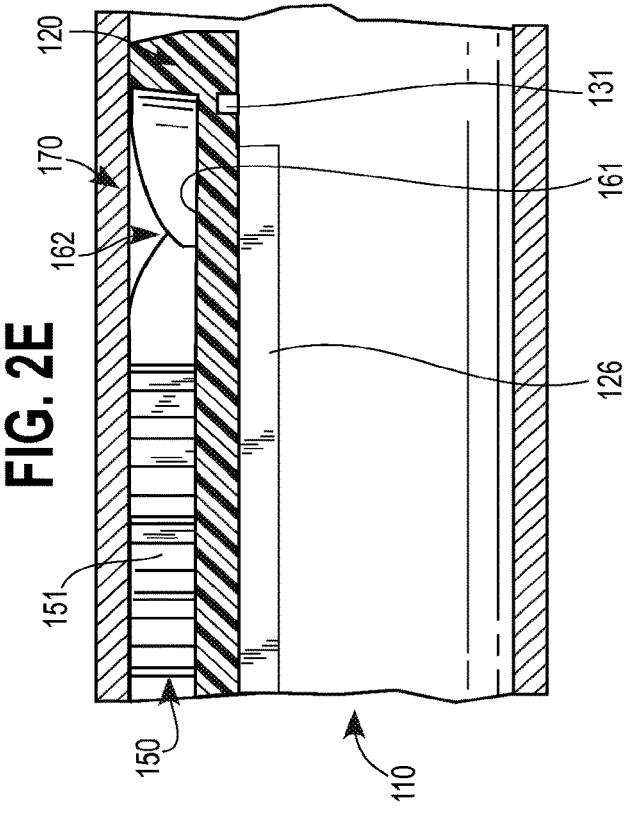

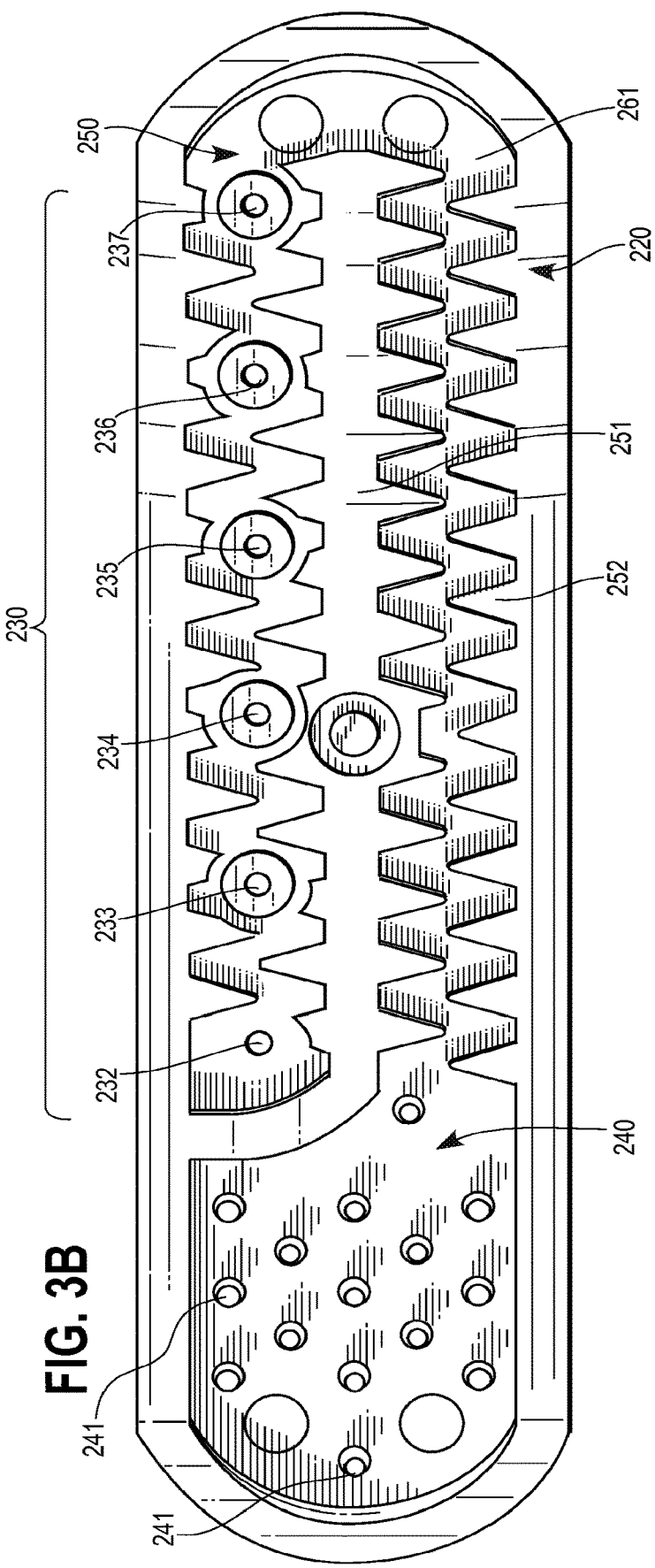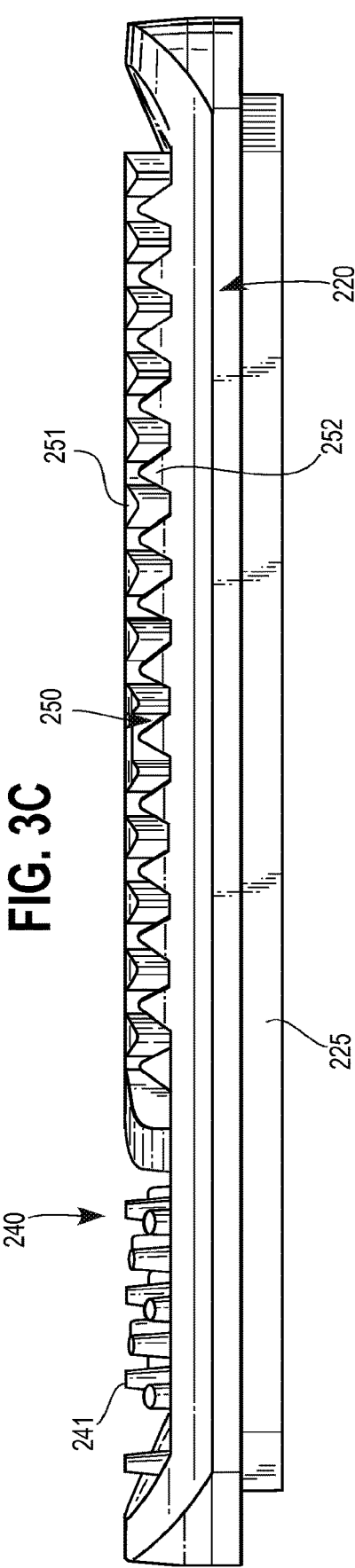

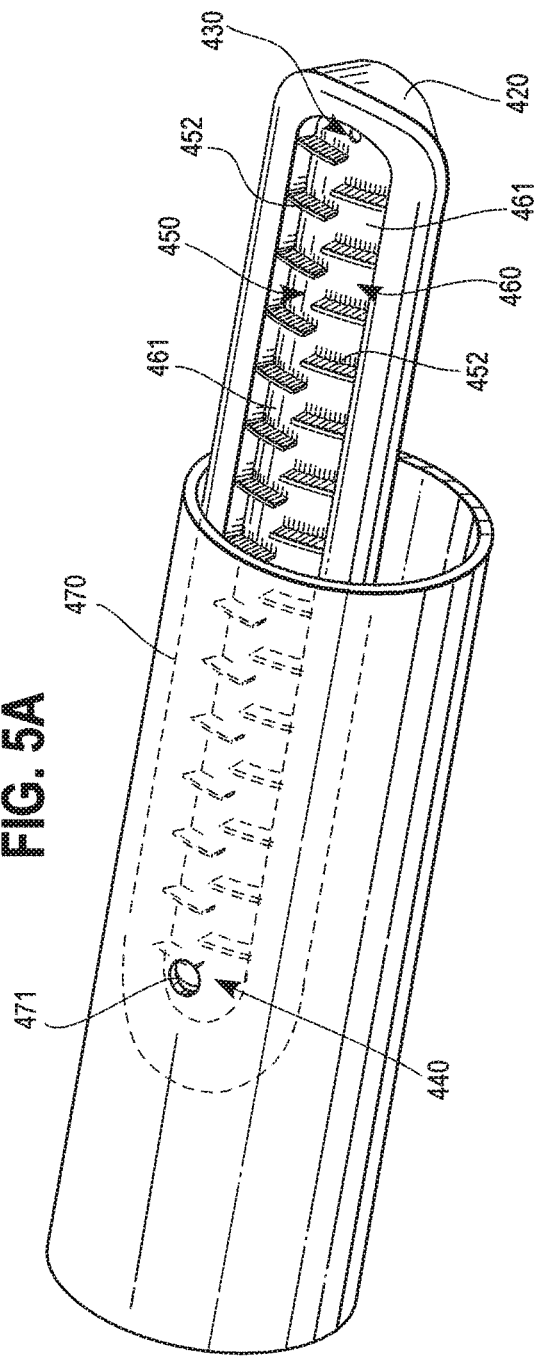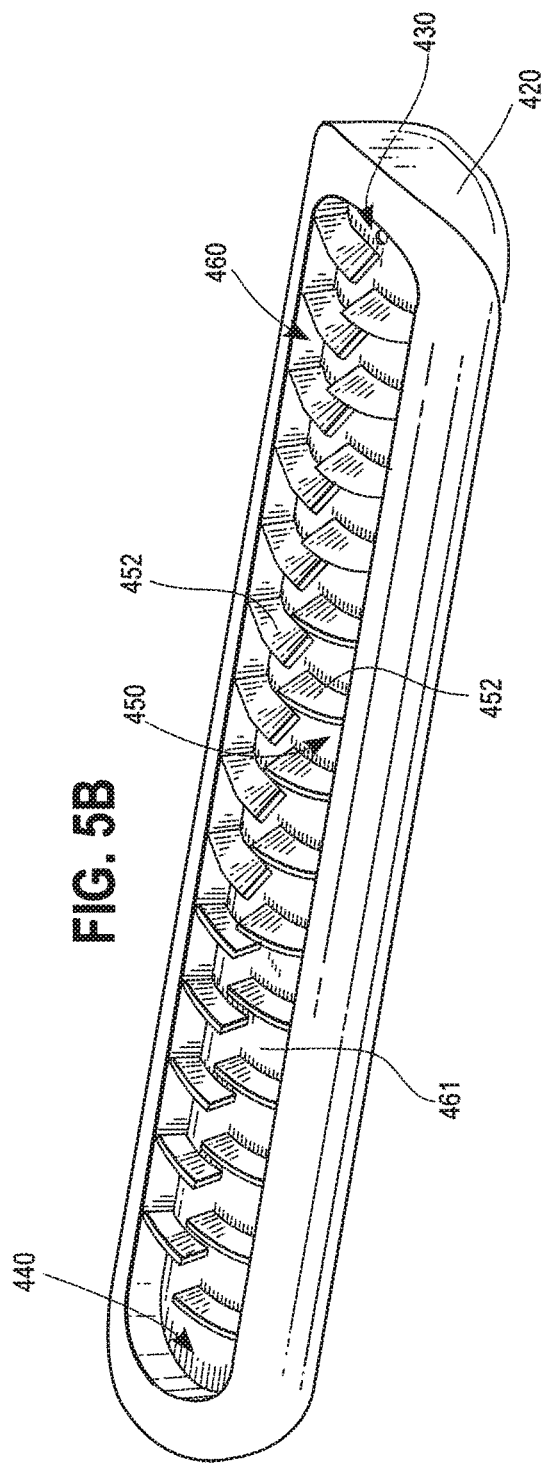

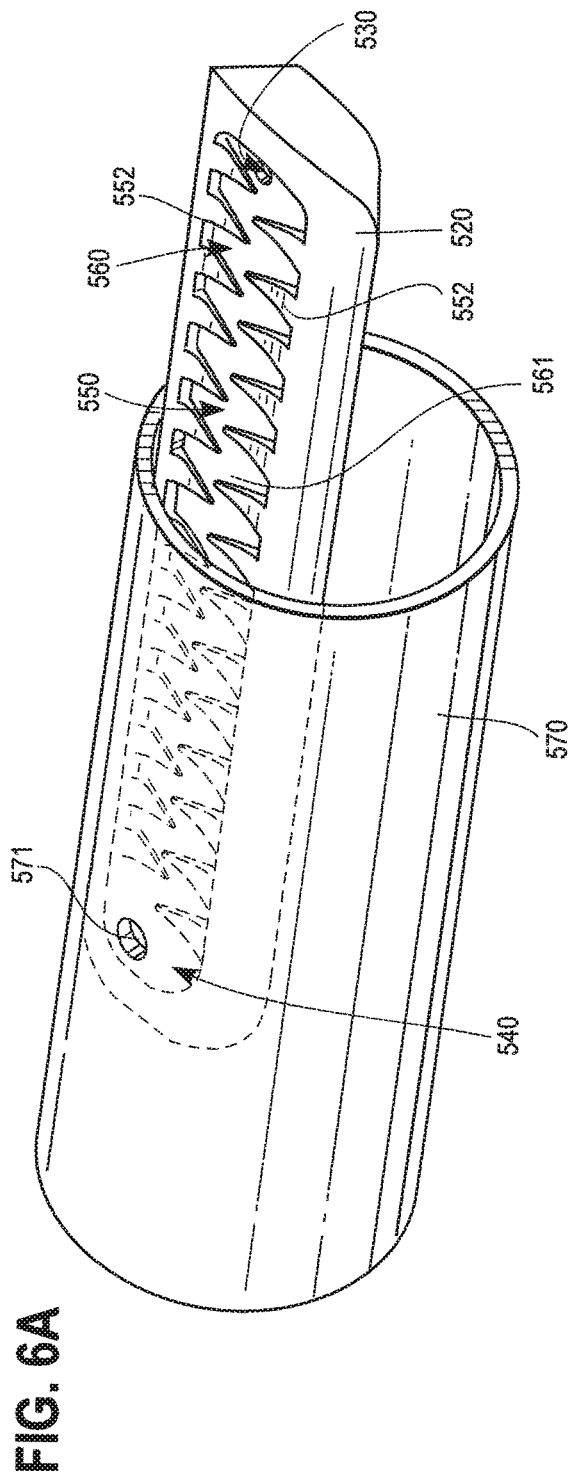
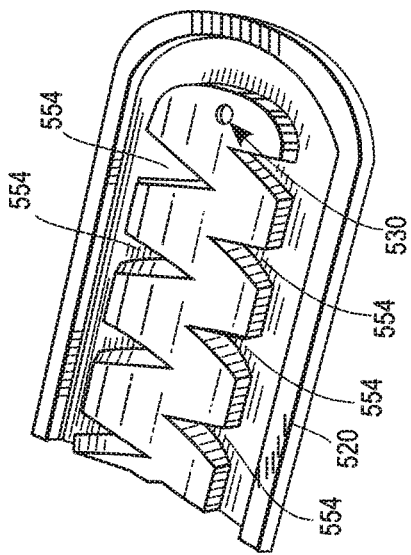
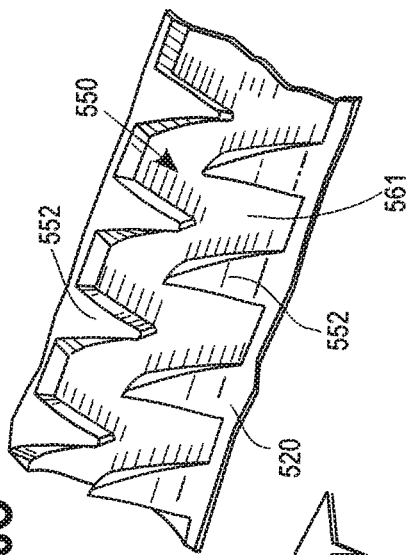
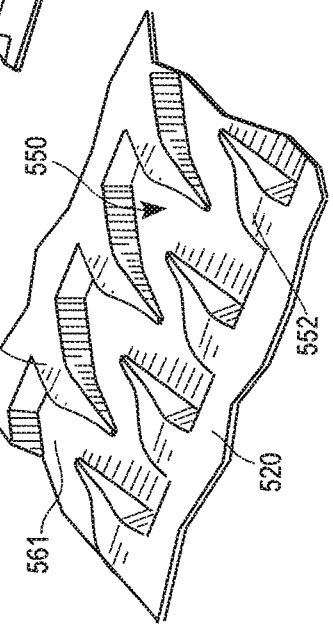

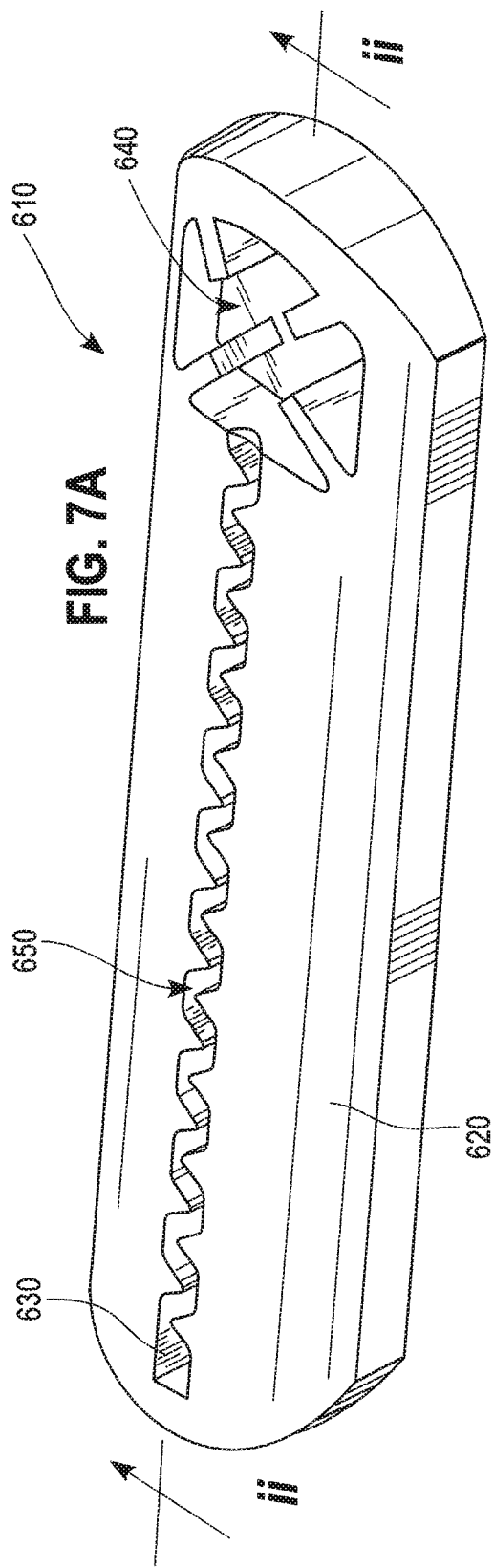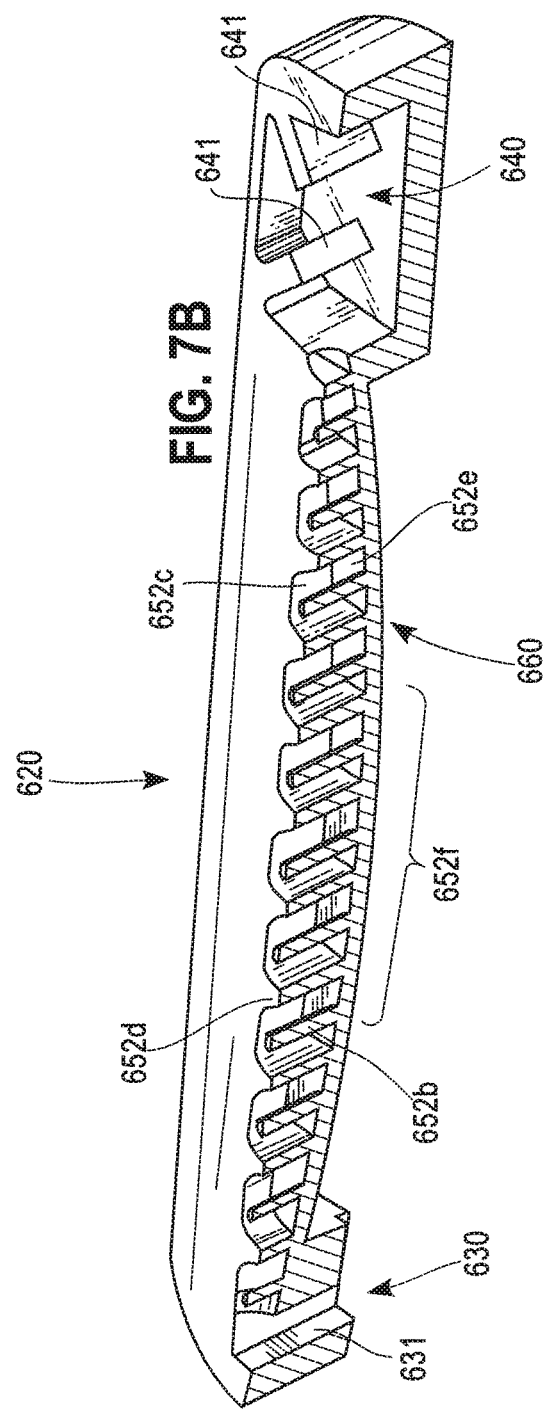

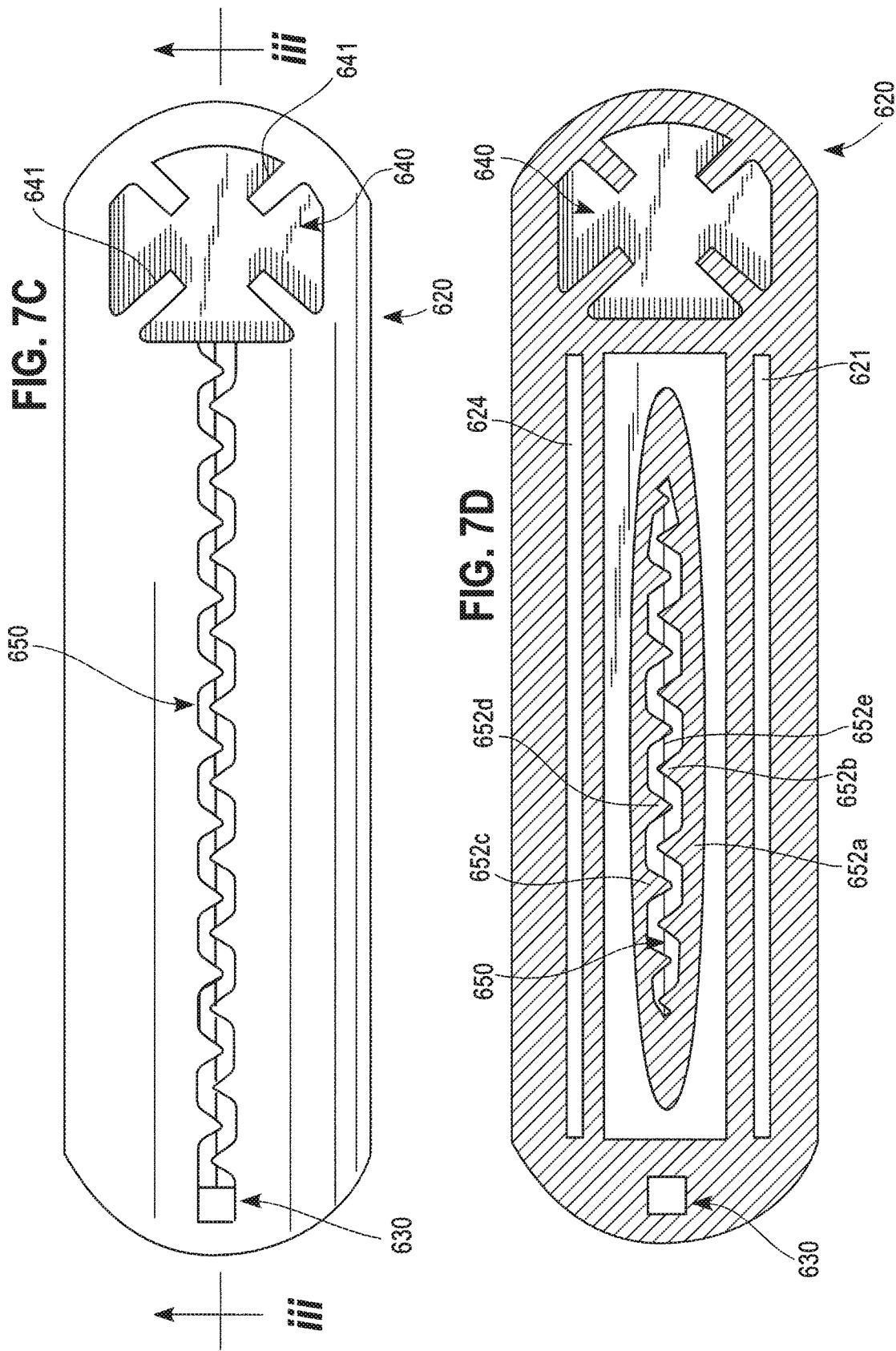

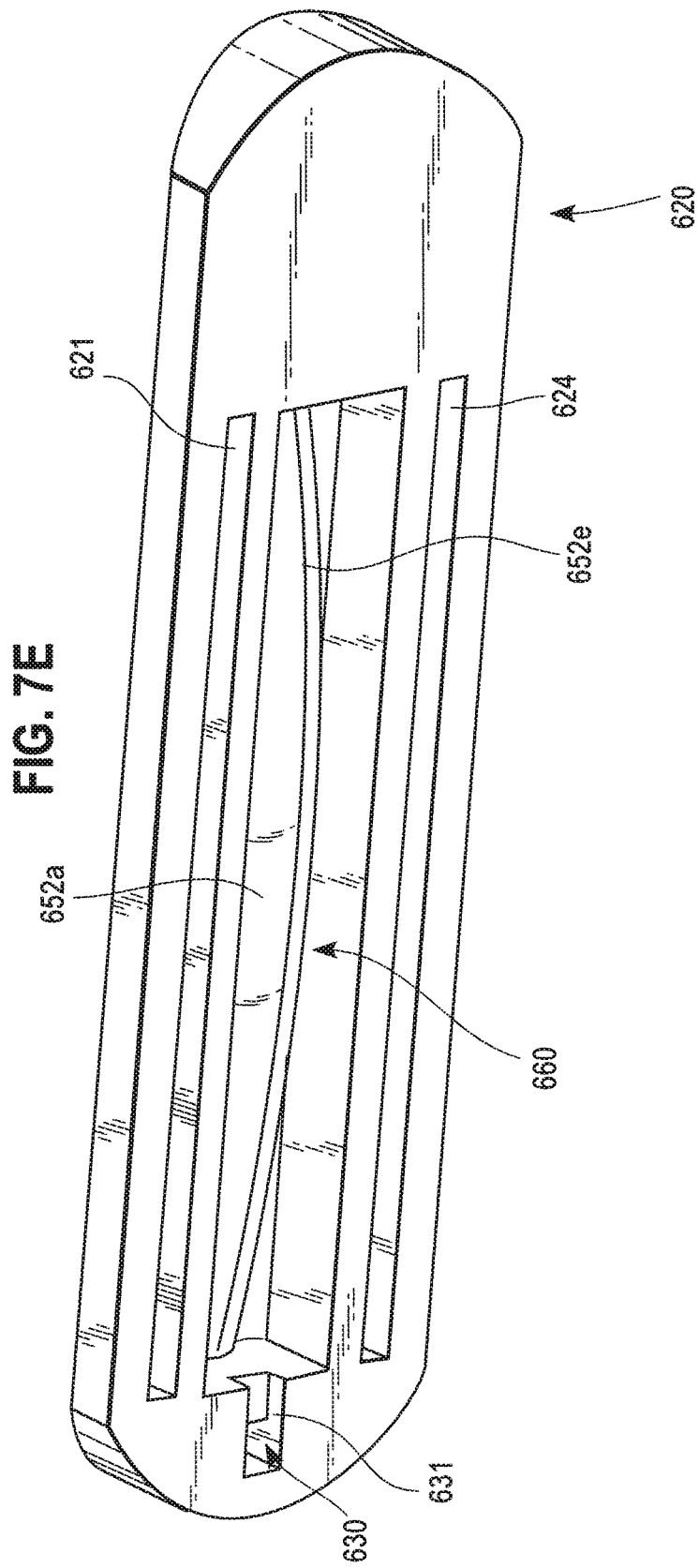

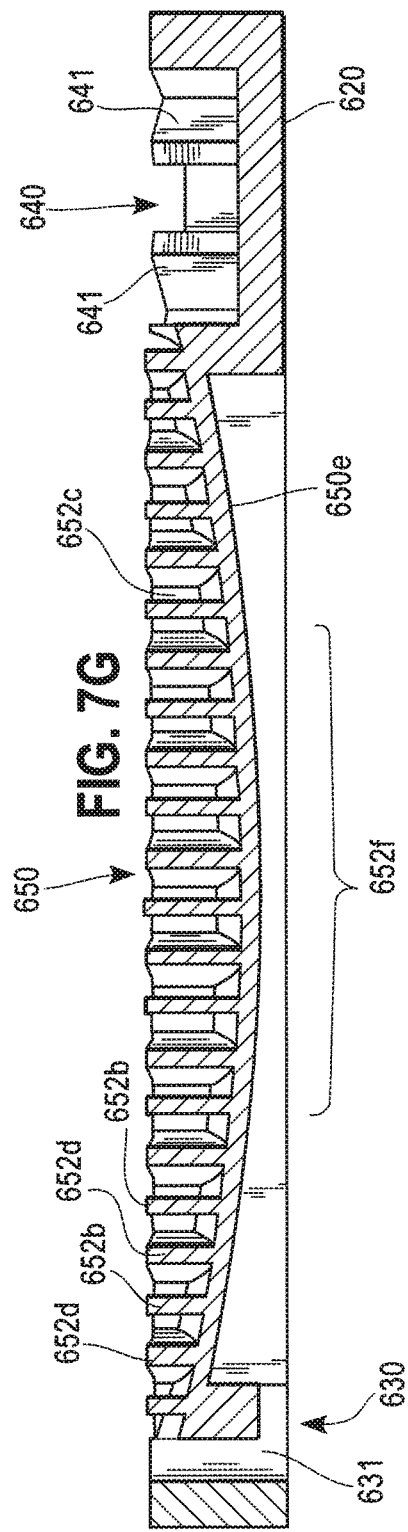

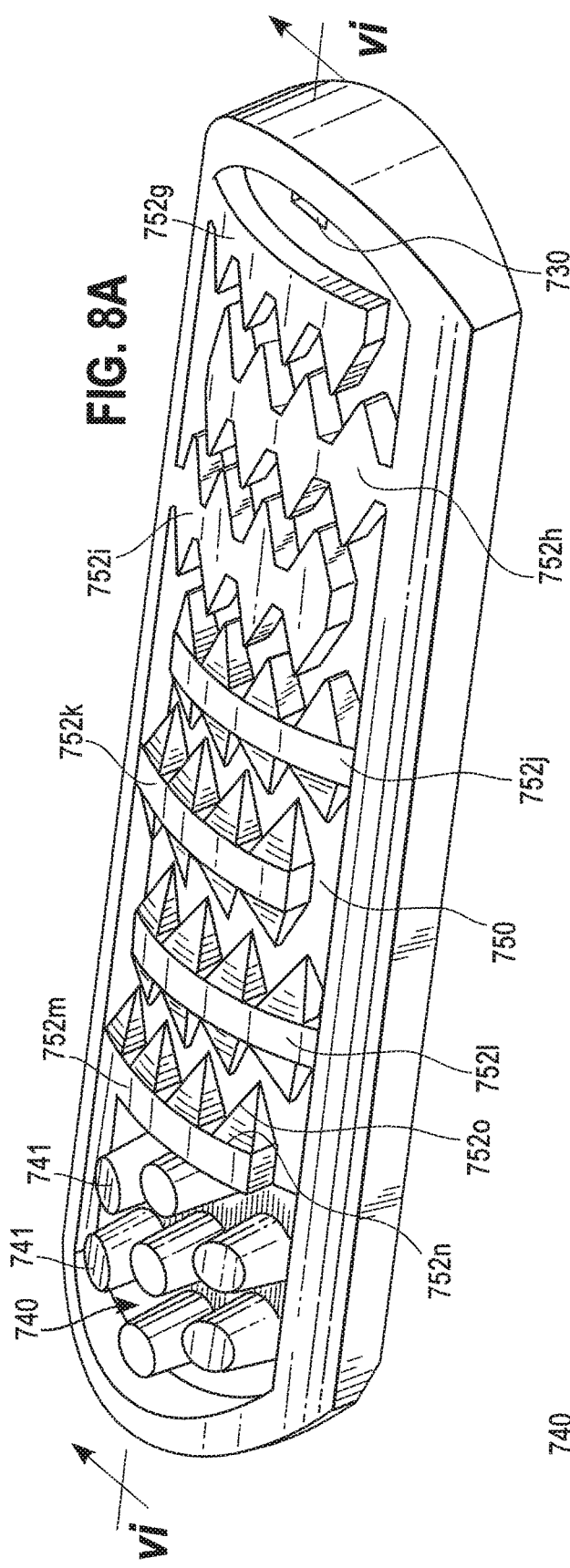
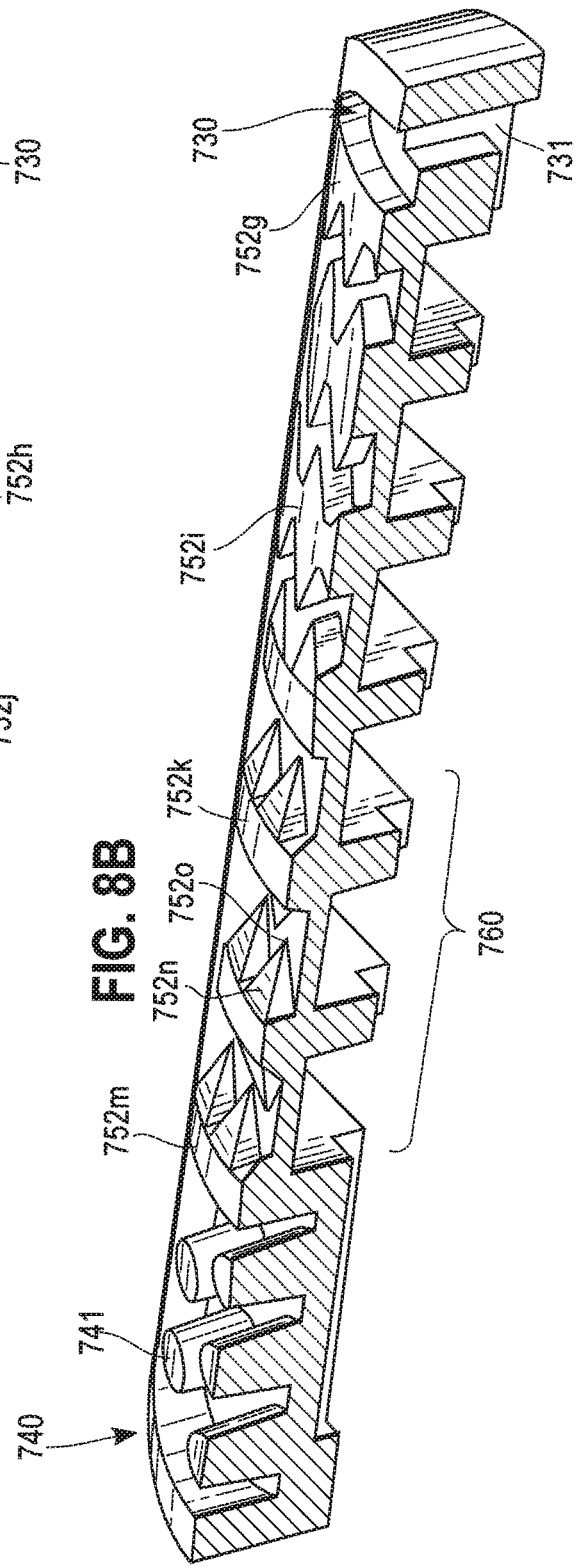

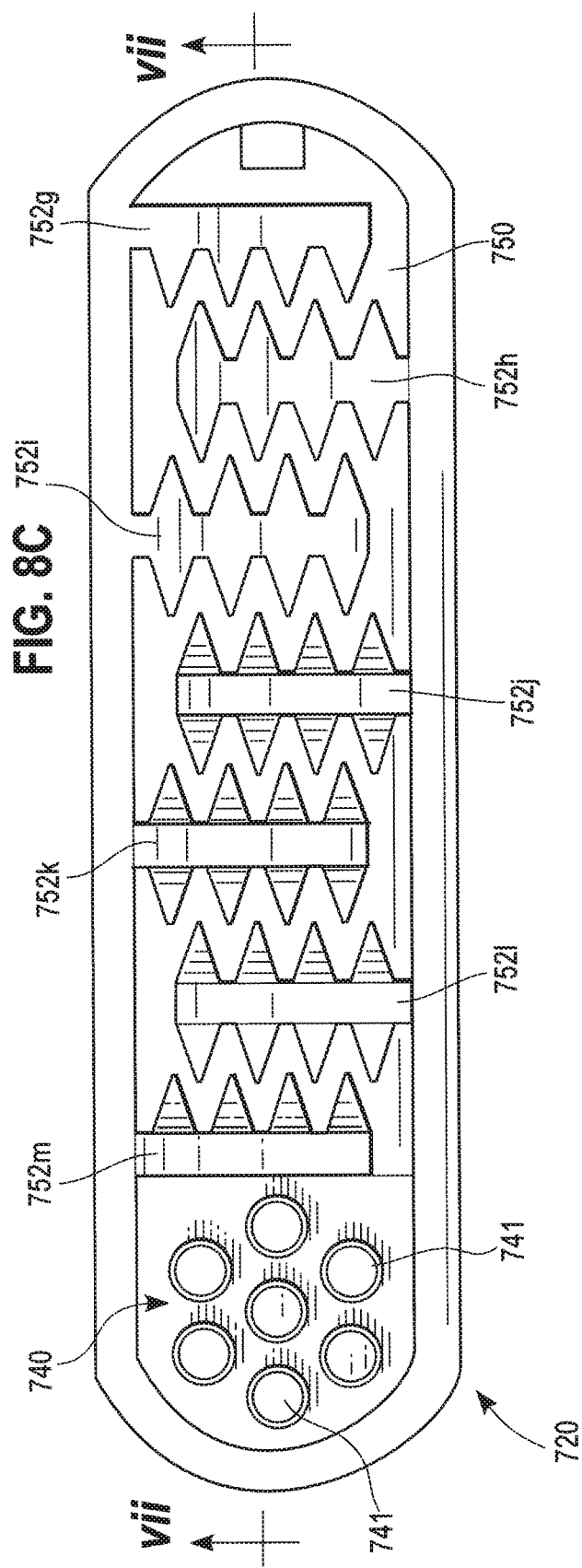
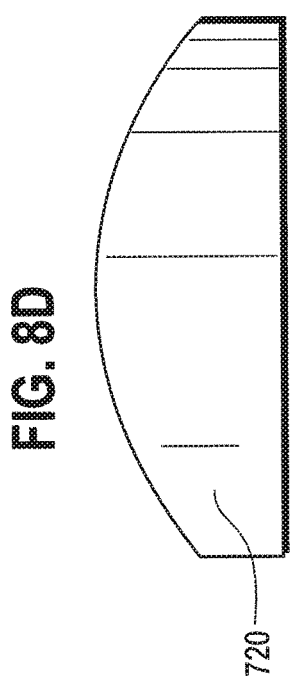

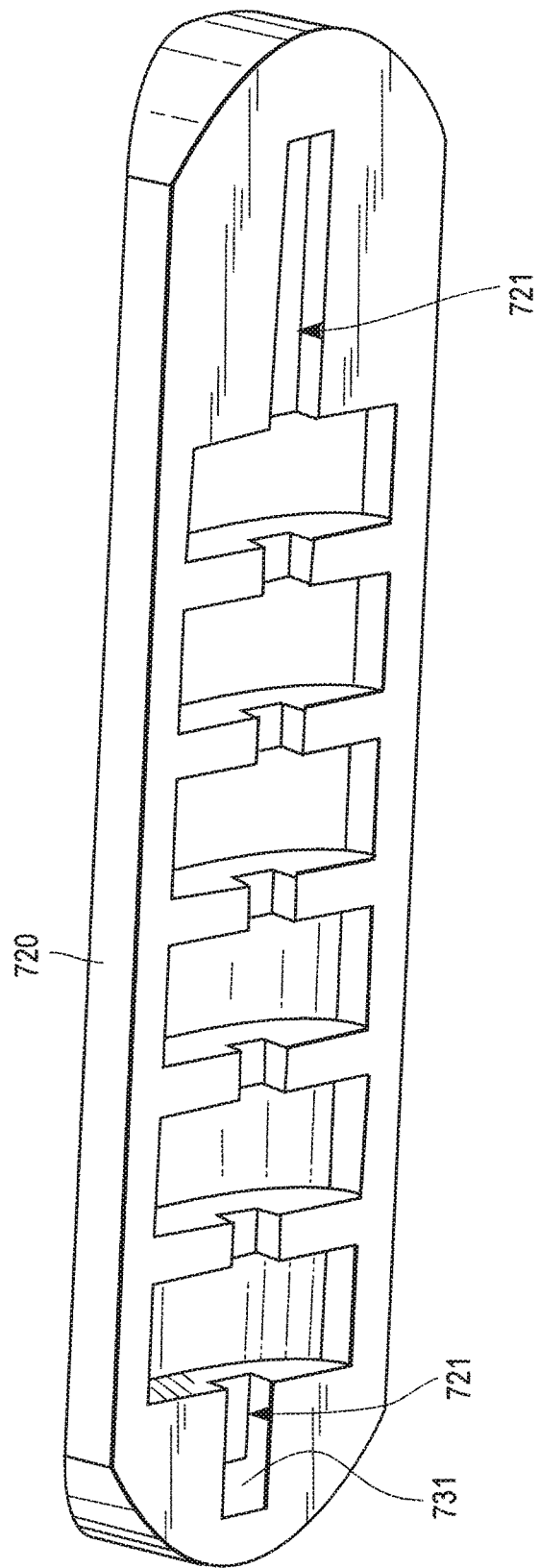

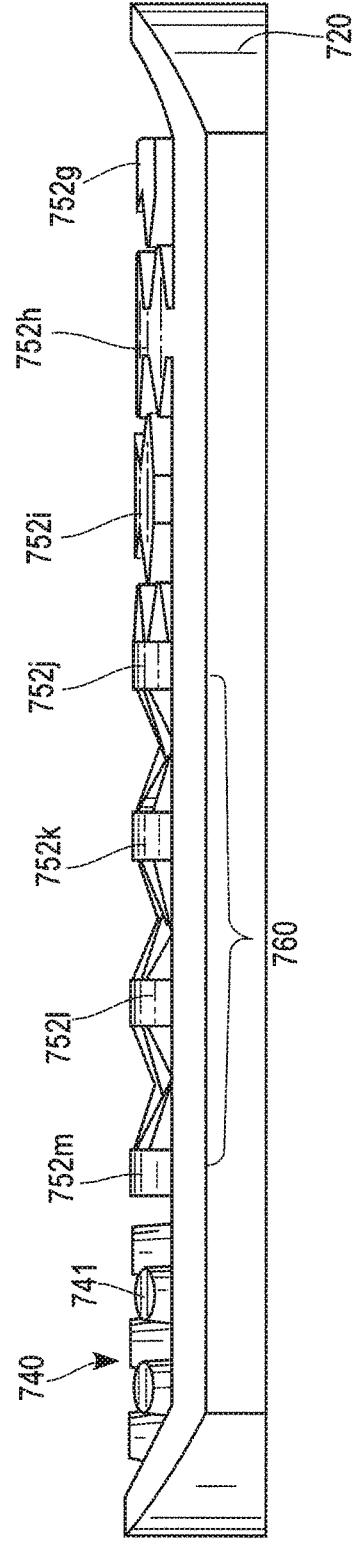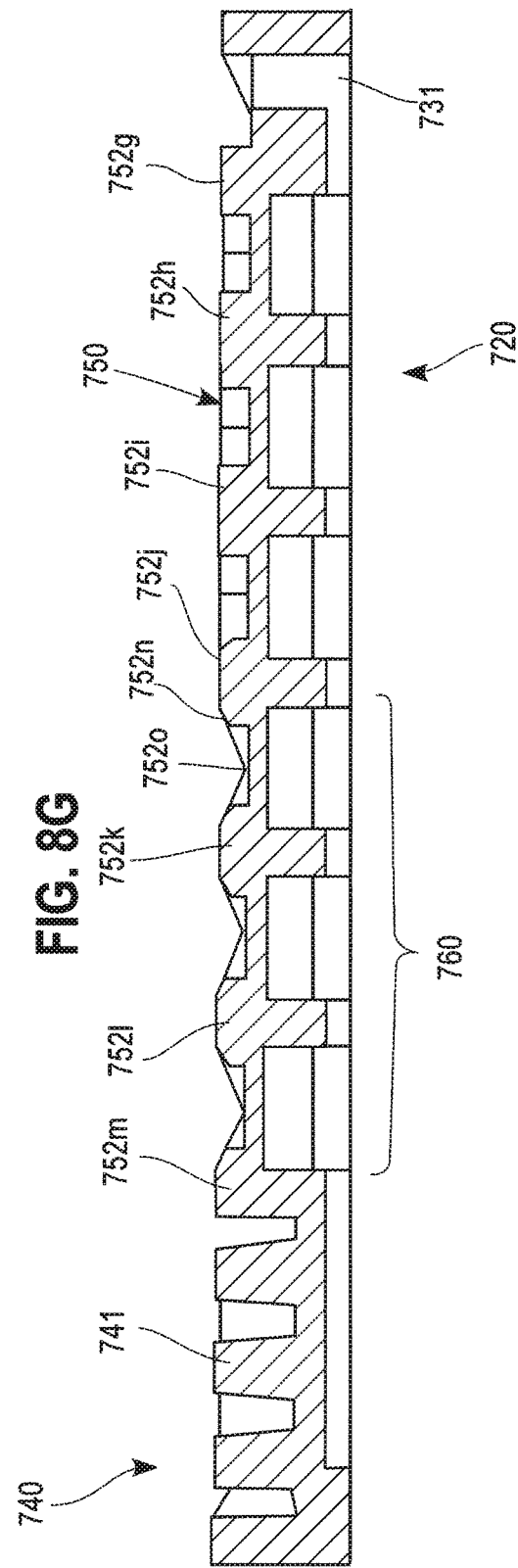

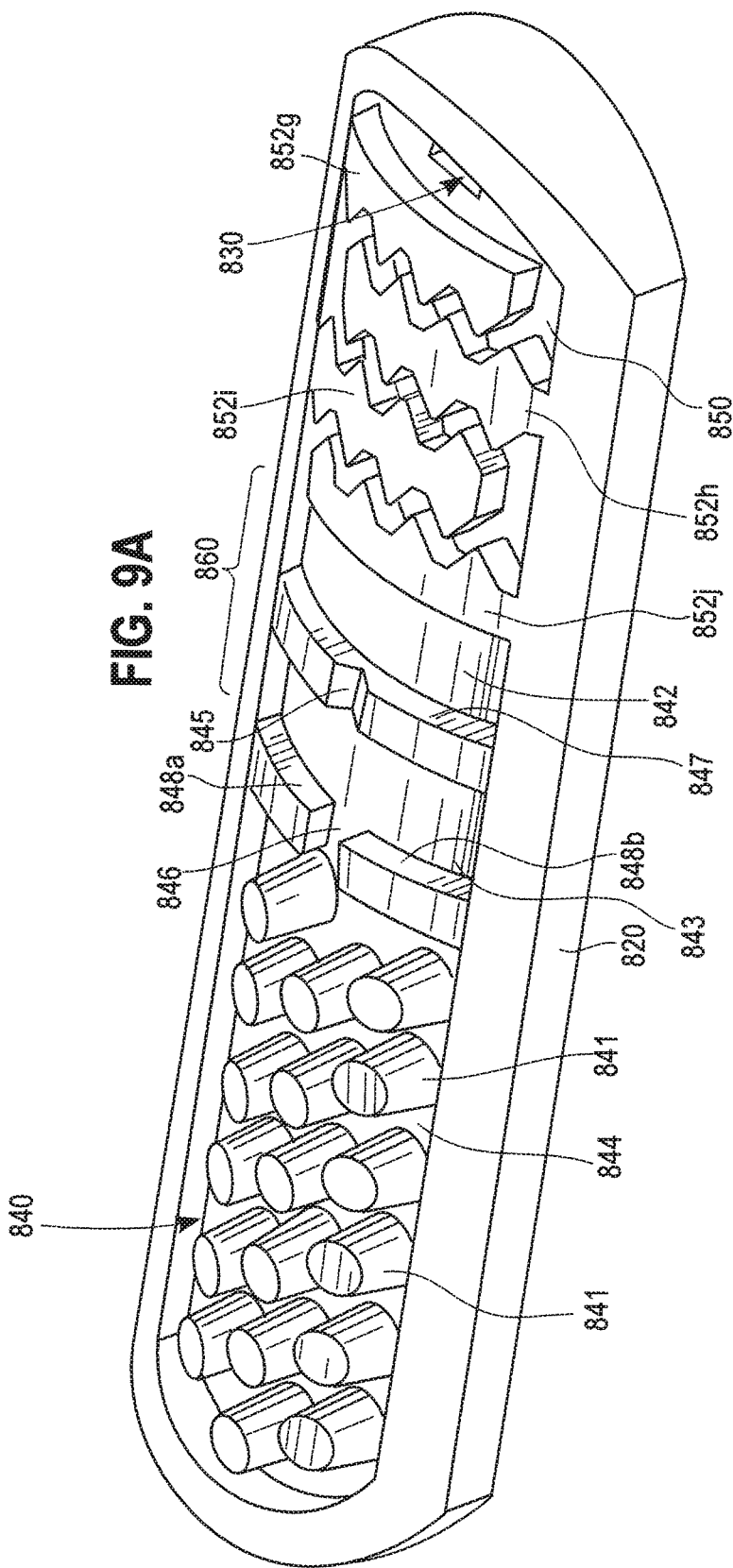

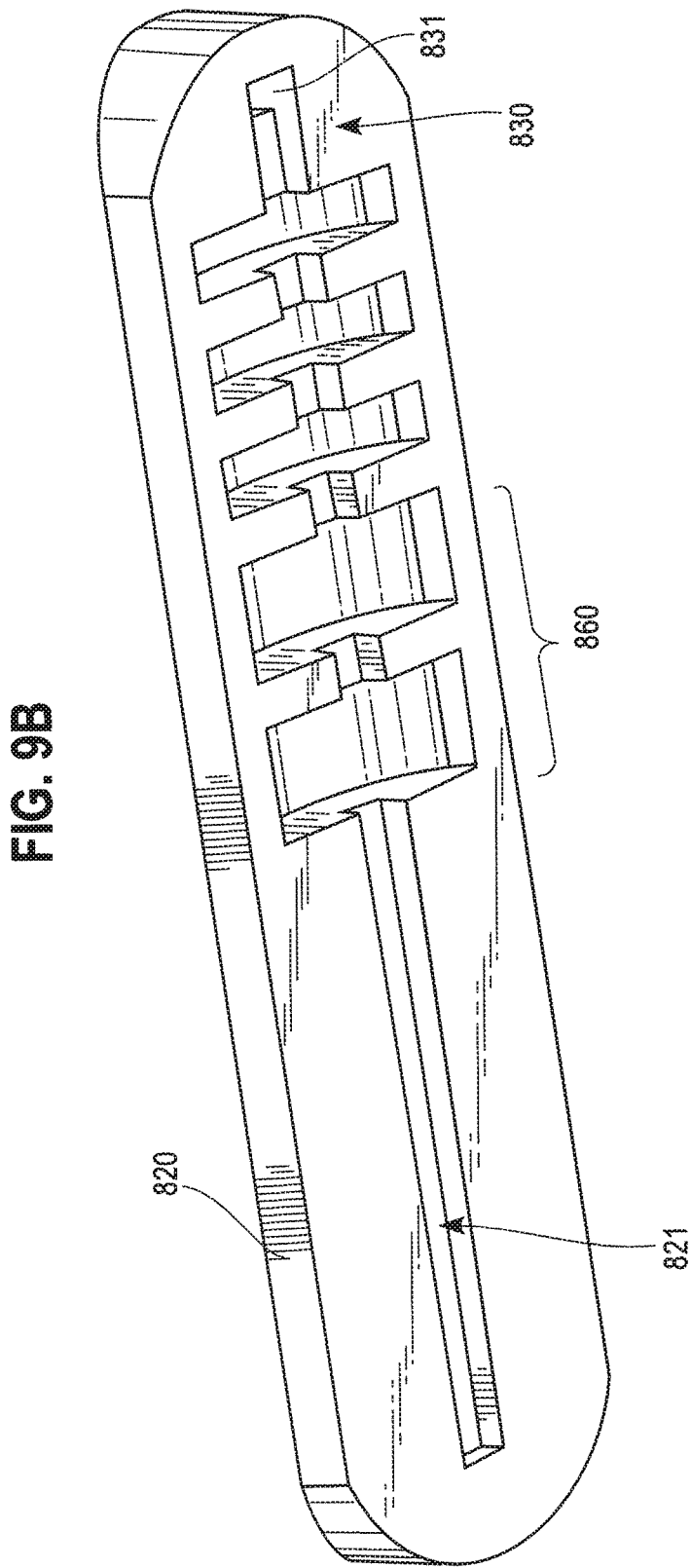

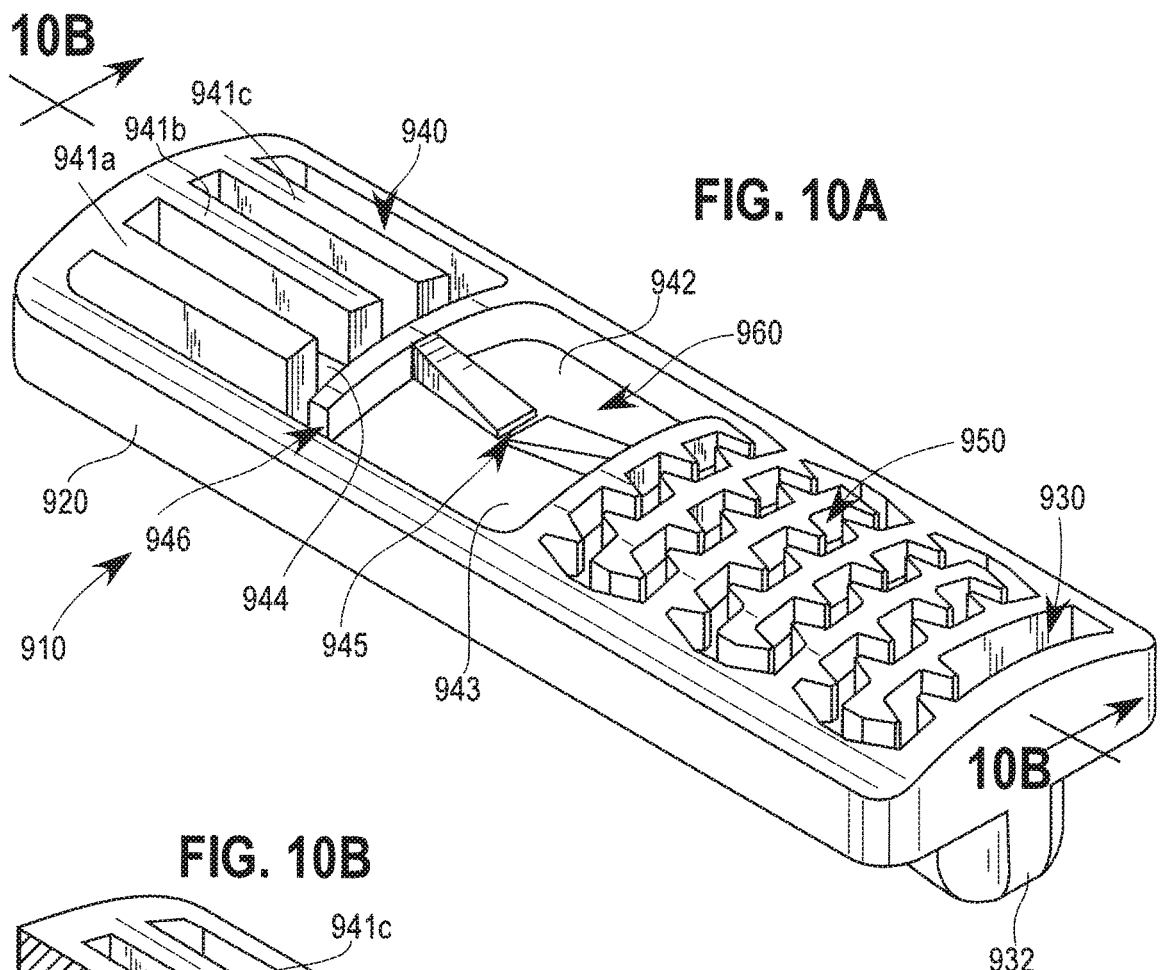
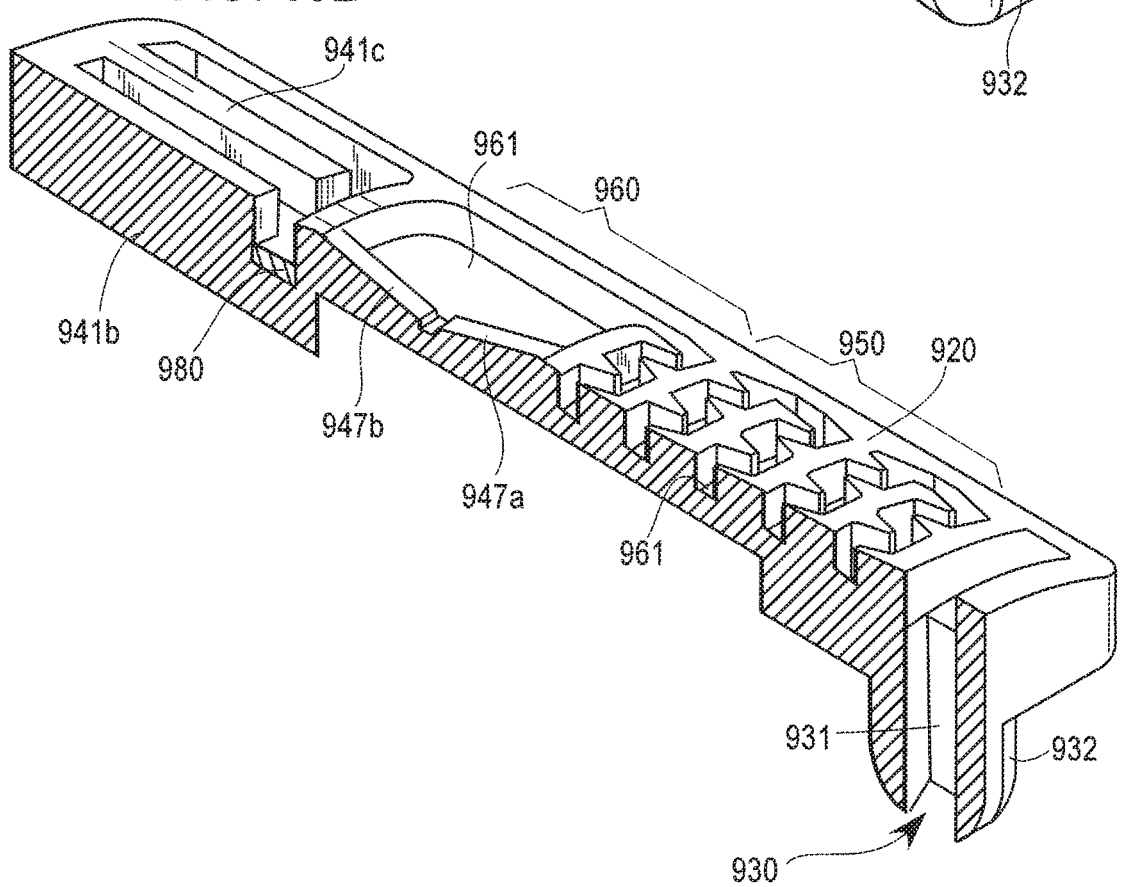

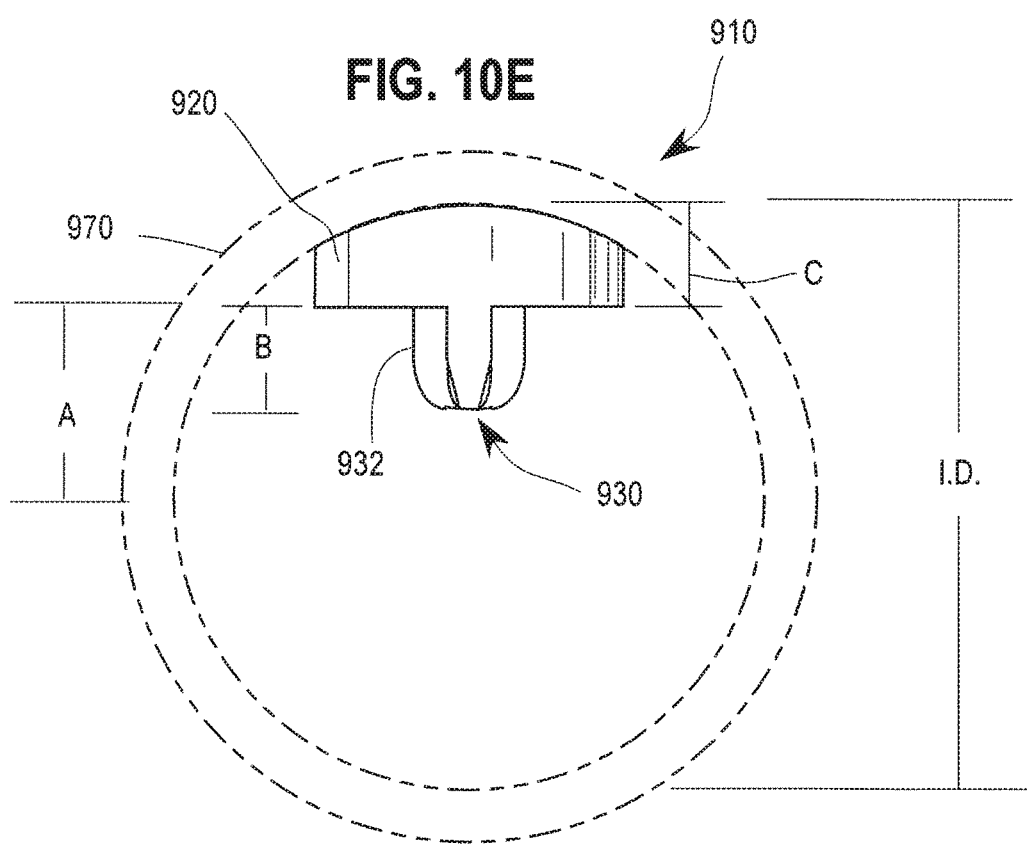

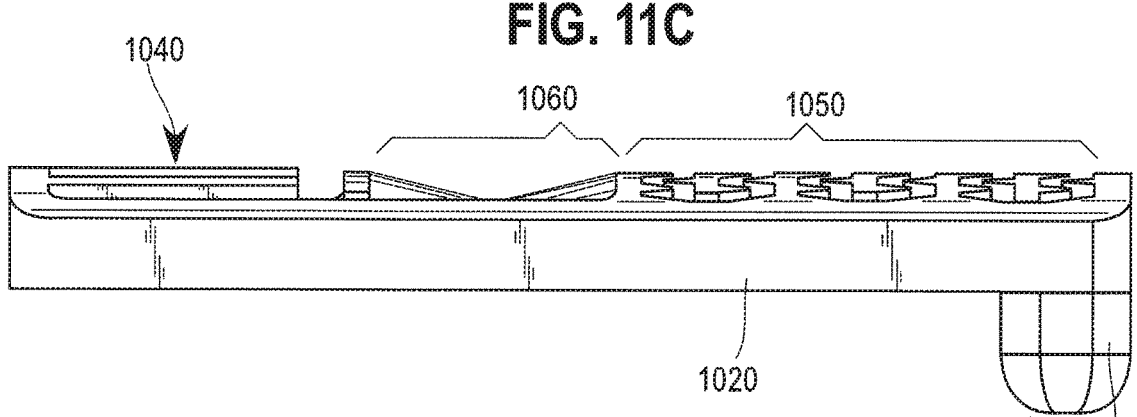
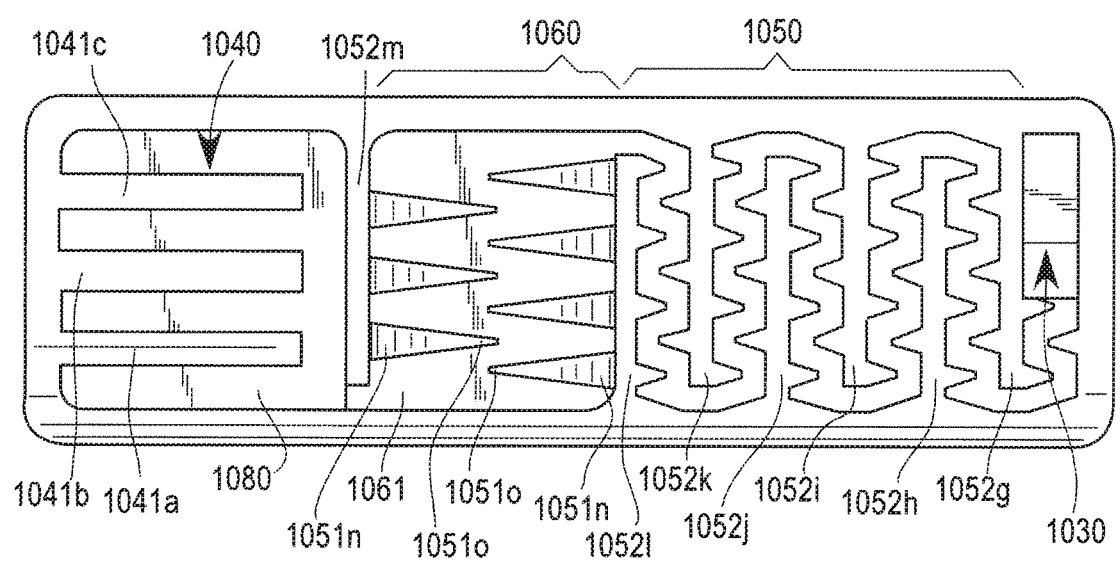
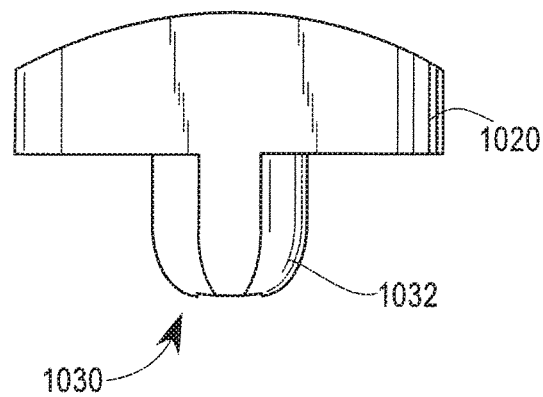

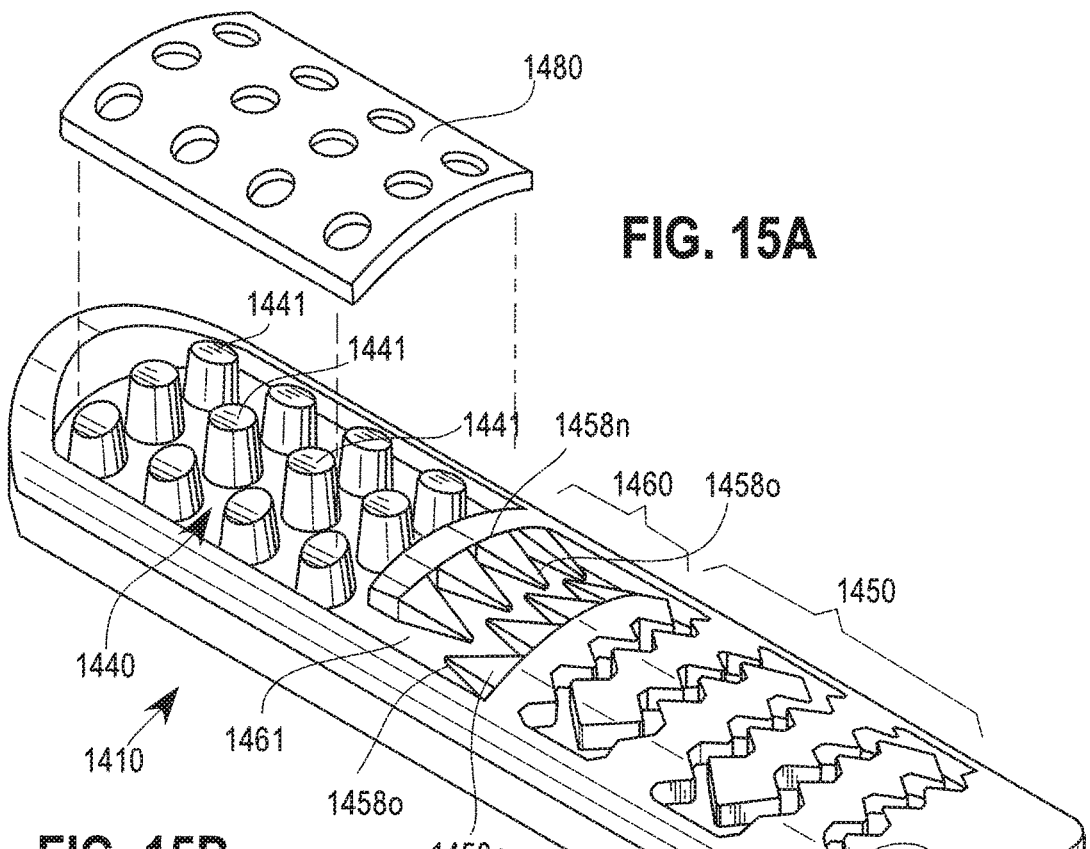
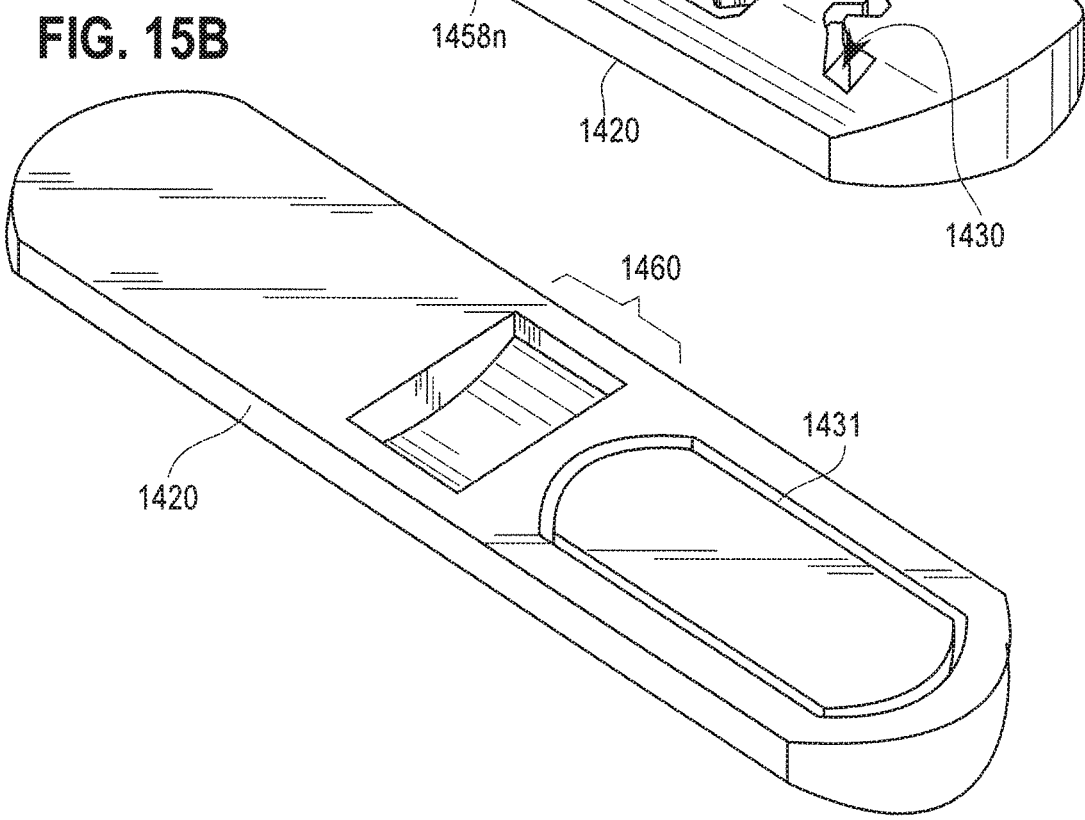

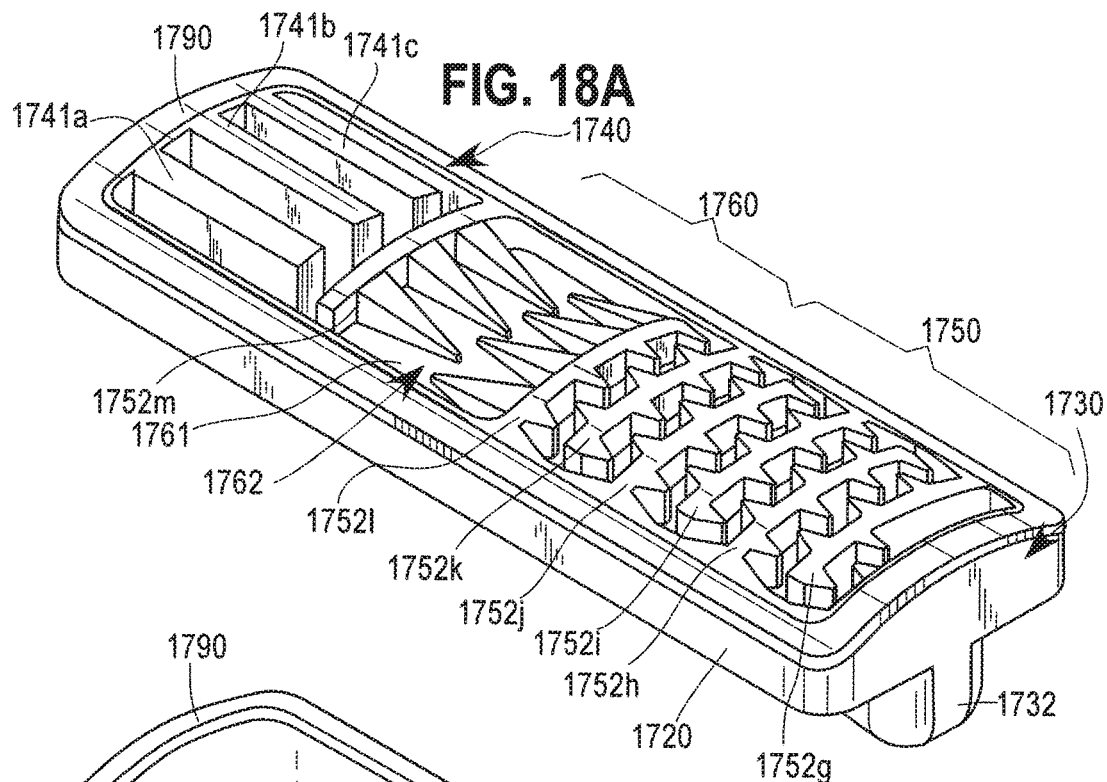
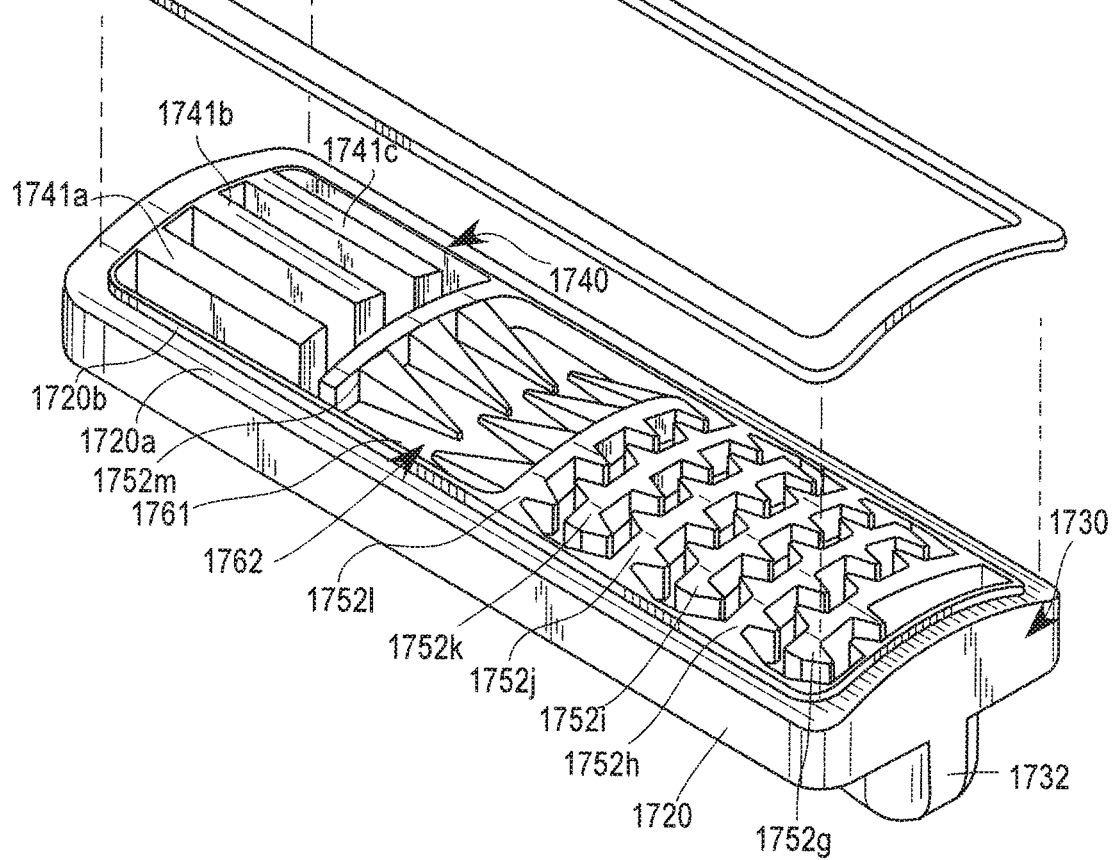

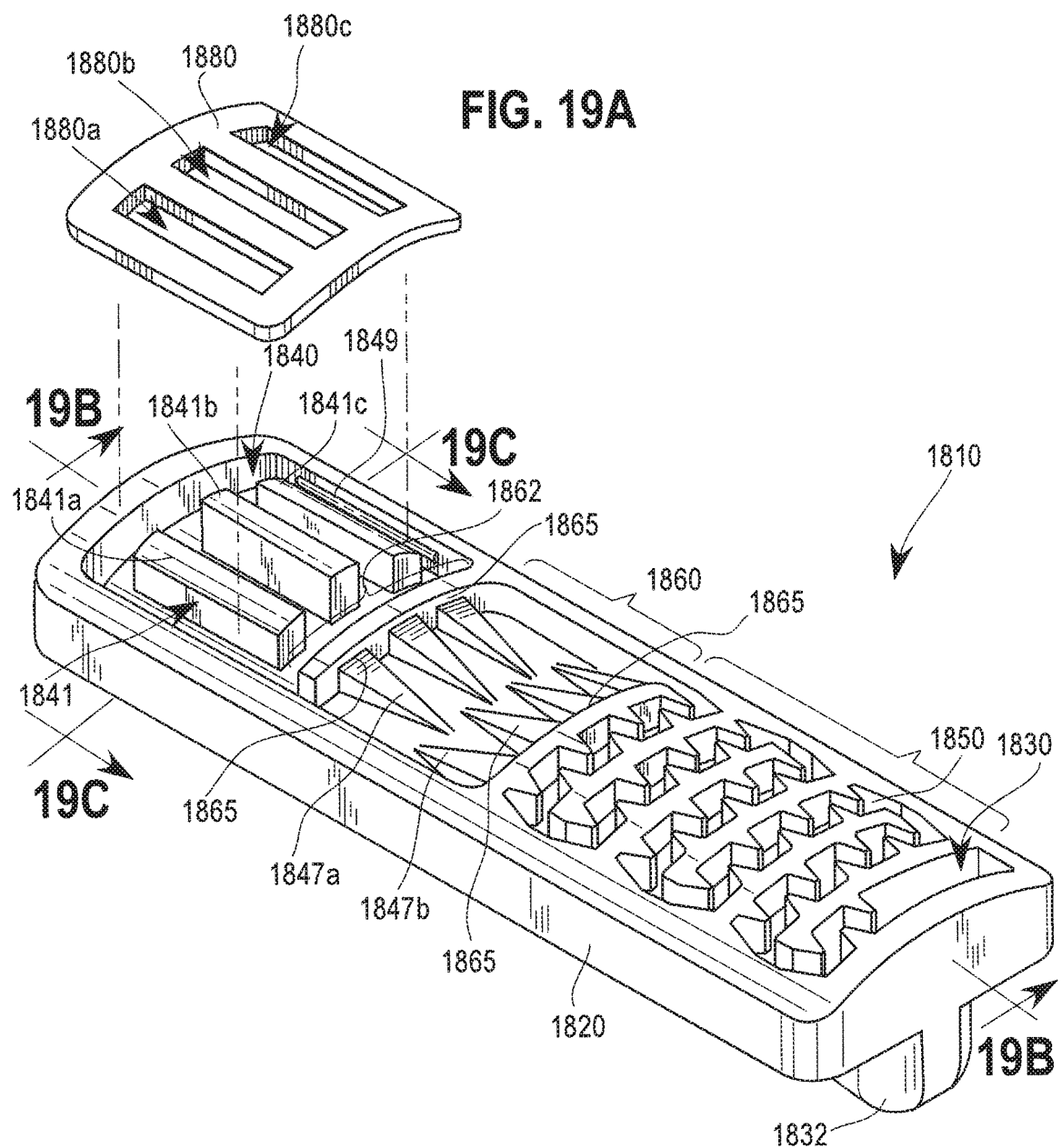

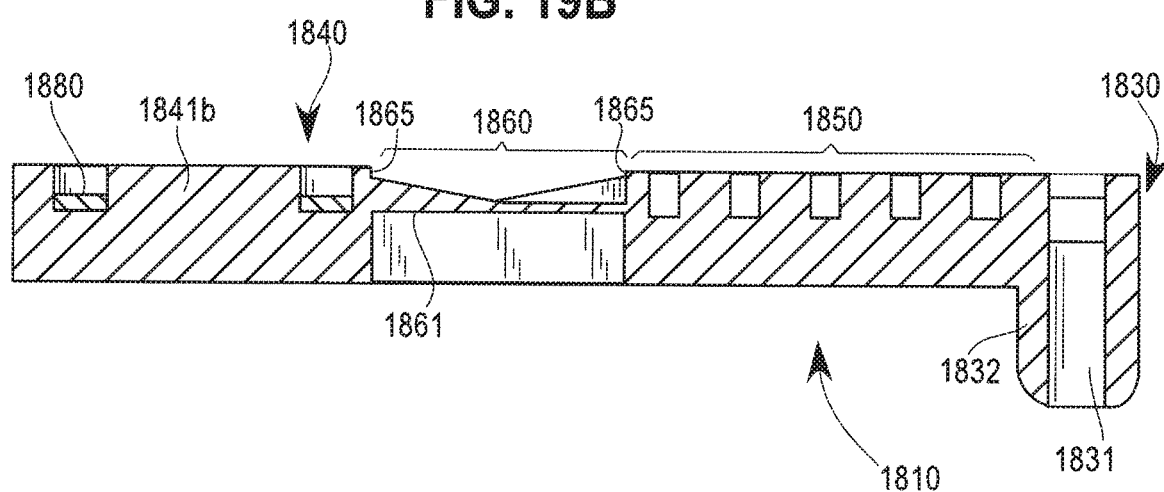
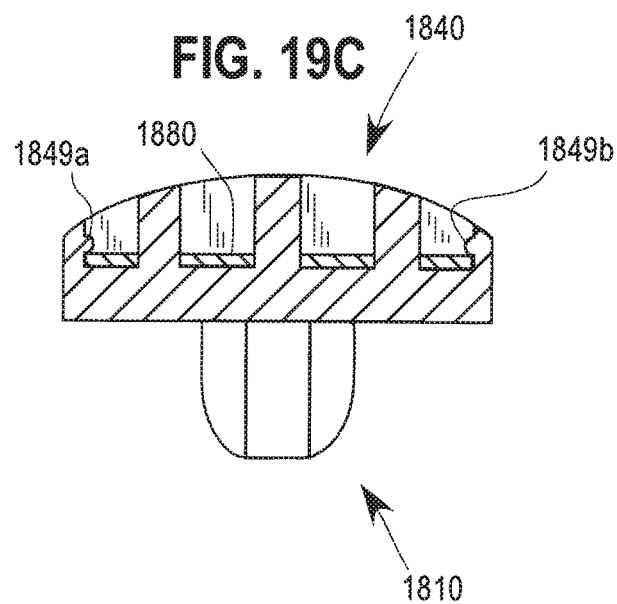

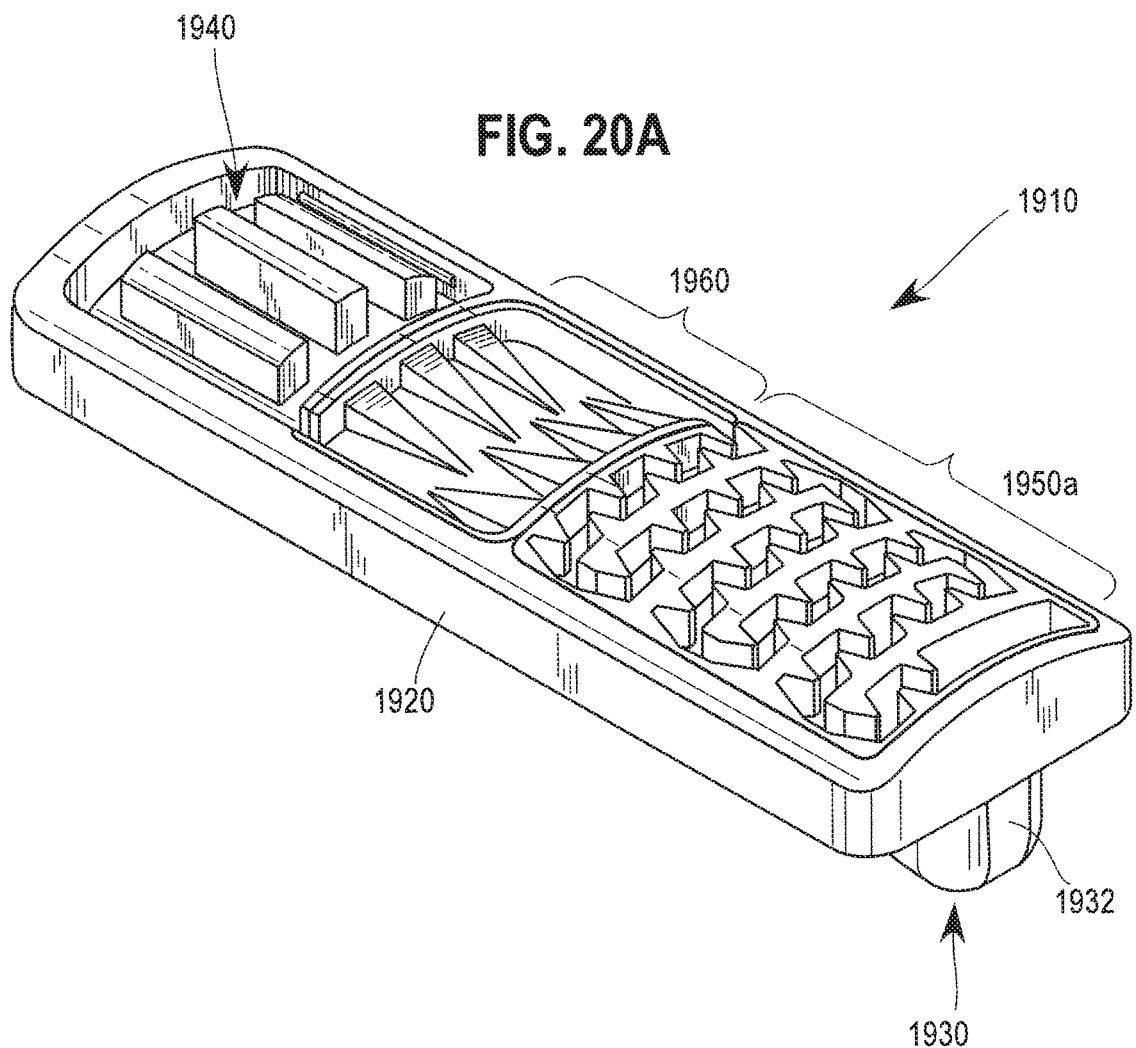

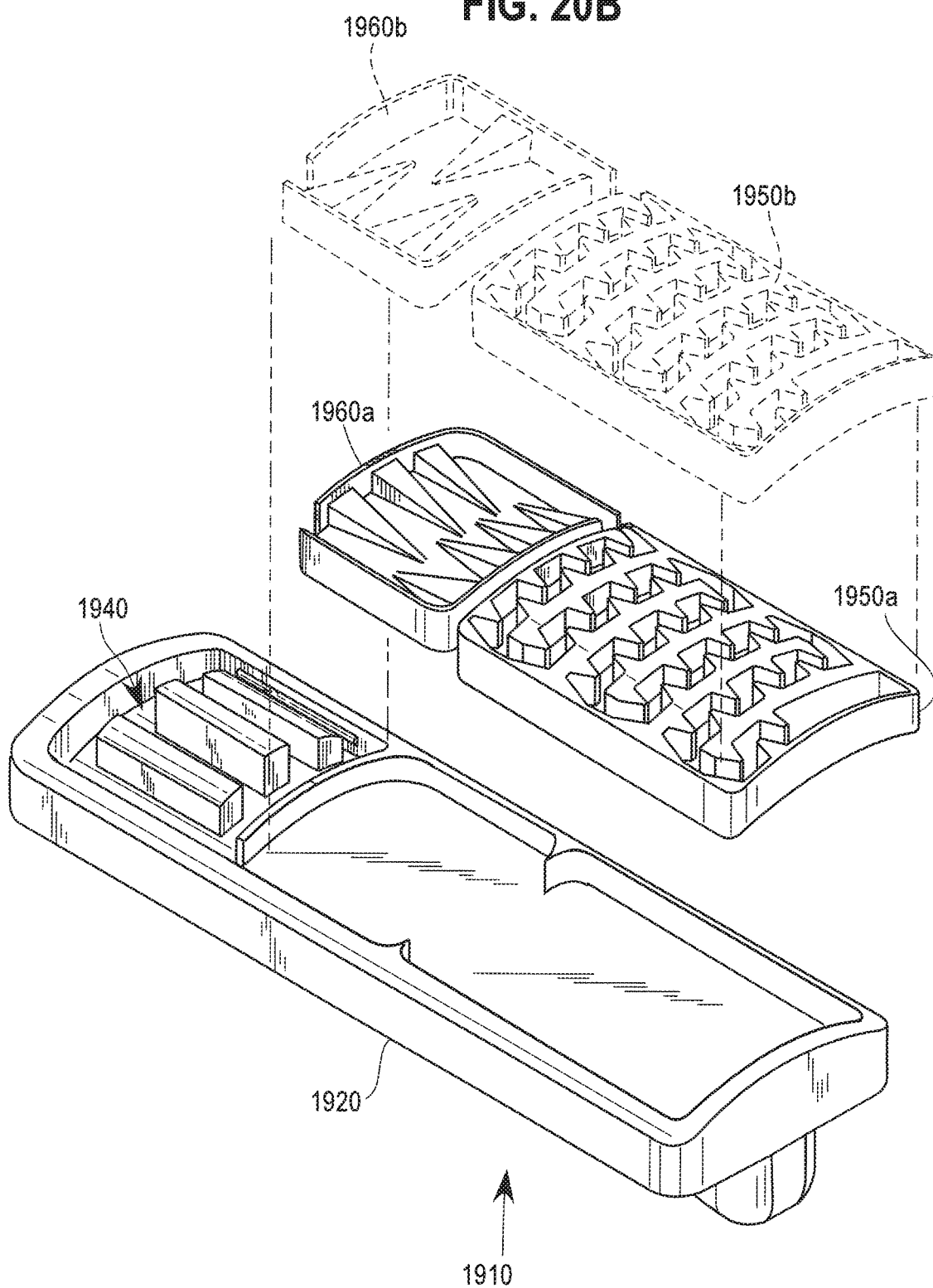

PRESSURE COMPENSATION MEMBERS, EMITTERS, DRIP LINE AND METHODS RELATING TO SAME

CROSS-REFERENCE TO RELATED APPLICATIONS

This application is a divisional of U.S. application Ser. No. 15/881,285, filed Jan. 26, 2018, which claims the benefit of U.S. Provisional Application No. 62/451,541, filed Jan. 27, 2017 and U.S. Provisional Application No. 62/510,458, filed May 24, 2017, which are hereby incorporated herein by reference in their entirety.

FIELD

The present invention relates to irrigation drip emitters, and more particularly, to pressure compensation members for same, to uniform elastomeric emitters, to poly-material emitters, to multiple irrigation drip emitters mounted to a supply tube to form an irrigation drip line assembly and methods relating to same.

BACKGROUND

Drip emitters are commonly used in irrigation systems to convert water flowing through a supply tube at a relatively high flow rate to a relatively low flow rate at the outlet of each emitter. Each drip emitter generally includes a housing defining a flow path that reduces high pressure water entering the drip emitter into relatively low pressure water exiting the drip emitter. Multiple drip emitters are commonly mounted on the inside or outside of a water supply tube. In one type of system, a large number of drip emitters are mounted at regular and predetermined intervals along the length of the supply tube to distribute water at precise points to surrounding land and vegetation. These emitters may either be mounted internally (i.e., in-line emitters) or externally (i.e., on-line or branch emitters). Some advantages to in-line emitters are that the emitter units are less susceptible to being knocked loose from the fluid carrying conduit and the conduit can be buried underground if desired (i.e., subsurface emitters) which further makes it difficult for the emitter to be inadvertently damaged (e.g., by way of being hit or kicked by a person, hit by a lawnmower or trimmer, etc.).

In addition to the advantages of in-line emitters, subsurface drip emitters provide numerous advantages over drip emitters located and installed above ground. First, they limit water loss due to runoff and evaporation and thereby provide significant savings in water consumption. Water may also be used more economically by directing it at precise locations of the root systems of plants or other desired subsurface locations.

Second, subsurface drip emitters provide convenience. They allow the user to irrigate the surrounding terrain at any time of day or night without restriction. For example, such emitters may be used to water park or school grounds at any desired time. Drip emitters located above ground, on the other hand, may be undesirable at parks and school grounds during daytime hours when children or other individuals are present.

Third, subsurface emitters are not easily vandalized, given their installation in a relatively inaccessible location, i.e., underground. Thus, use of such subsurface emitters results in reduced costs associated with replacing vandalized equipment and with monitoring for the occurrence of such vandalism. For instance, use of subsurface emitters may lessen the costs associated with maintenance of publicly accessible areas, such as parks, school grounds, and landscaping around commercial buildings and parking lots.

Fourth, the use of subsurface drip emitters can prevent the distribution of water to undesired terrain, such as roadways and walkways. More specifically, the use of subsurface drip emitters prevents undesirable "overspray." In contrast, above-ground emitters often generate overspray that disturbs vehicles and/or pedestrians. The above-identified advantages are only illustrative; other advantages exist in connection with the use of subsurface drip emitters.

Although some advantages of subsurface emitters are described above, it would be desirable to provide an improved in-line drip emitter design that can be used in both subsurface and above ground applications. For both applications, there is a need to provide for a relatively constant water output from each of the emitters in the irrigation system. More specifically, it is desirable to provide pressure compensation so as to ensure that the flow rate of the first emitter in the system is substantially the same as the last emitter in the system. Without such flow rate compensation, the last emitter in a series of emitters will experience a greater pressure loss than the first. Such pressure loss results in the inefficient and wasteful use of water.

There is also a need in the irrigation industry to keep drip emitters for both subsurface and above ground applications from becoming obstructed, which results in insufficient water distribution and potential plant death. Obstruction of an emitter may result from the introduction of grit, debris, or other particulate matter from debris entering the emitter through the supply tube. It is therefore desirable to have an inlet and/or other structures that are of a design to deflect particles that might otherwise clog flow passages in the body of the emitter. The flow through area of the inlet, however, must also be large enough to allow proper functioning of the drip emitter. A need also exists for better emitter designs that help prevent clogging and improve flushing of grit so that desired flow rates can be achieved and maintained.

It is also desirable to provide a drip emitter that minimizes parts and assembly as this will not only make the component less complicated to construct and likely save on material costs, but will also reduce the number of emitters that do not perform as desired due to misaligned parts, etc. Drip emitters are commonly formed of multi-piece components (e.g., two or more-piece housing structures with separate flexible diaphragms, etc.) that require individual manufacture of the various parts of the emitter and then assembly of the parts prior to mounting to the supply tube. Even slight misalignment of these components during assembly may result in a malfunctioning drip emitter. Thus, in addition to the above needs, it would be desirable to reduce the number of components required to make the emitter and the manufacturing steps and time it takes to create a finished product.

It is also desirable to provide a drip emitter that minimizes the amount of disturbance the emitter causes to the fluid flowing through the drip line or conduit to which the emitter is connected. Larger cylindrical emitters are available in the marketplace for in-line emitter applications, however, these emitters interfere with the flow of the fluid traveling through the drip line or tube and introduce more turbulence to the fluid or system due to the fact they cover and extend inward from the entire inner surface of the drip line or tube. The increased mass of the cylindrical unit and the fact it extends about the entire inner surface of the drip line or tube also increases the likelihood that the emitter will get clogged with grit or other particulates (which are more typically present at the wall portion of the tube than in the middle of the tube) and/or that the emitter itself will form a surface upon which grit or particulates will build-up on inside the drip line and slow the flow of fluid through the drip line or reduce the efficiency of this fluid flow. Thus, there is also a need to reduce the size of in-line emitters and improve the efficiency of the systems within which these items are mounted.

It is also desirable to provide a drip line that can be buried sub-surface and/or under surface coverings such as bark or mulch without being interfered with by obstructions such as roots, grit, etc. Conventional emitters typically have difficulty in being used in at least sub-surface applications due to root obstruction that occurs from plants or vegetation growing toward the emitter creating an obstruction to the normal flow of fluid through the emitter. In the past, chemicals have been devised for use with sub-surface irrigation equipment to inhibit such root growth/interference, but these chemicals are either expensive to use or damaging to other materials used in the irrigation system (e.g., tubing, couplings, valves, the emitter itself, etc.).

Another problem with conventional emitters and drip line is that they require the use of complex structures to regulate pressure and/or do not flush grit through the emitter in a way that makes the emitter more universally acceptable for broad applications. Often the complex structures drive up component cost, thereby pricing the component out of the market. Other times (or in addition) the complex structures needlessly complicate the emitter's grit tolerance.

An additional problem associated with conventional emitters relates to bonding such emitters to the inside surface of drip line tubing. Some have tried to address this problem by using a two-shot process for molding a bi-material emitter consisting of a rigid body formed by a first shot molding process and an elastomeric membrane formed by a second shot molding process. For example, U.S. Pat. No. 5,203,503 issued Apr. 20, 1993 to Cohen, now expired, discloses the use of a single mold and a two-shot molding process for forming a bi-material emitter. Other attempts at utilizing such a two-shot molding process to form a bi-material emitter have been pursued, (e.g., U.S. Pat. No. 8,372,326 issued Feb. 12, 2013 to Mamo, and U.S. Pat. No. 8,317,112 issued Nov. 27, 2012), but these require complex manufacturing processes which require cross-linking between materials or use of thermoset elastomeric components that require interlocking features to secure the elastomeric component to the surrounding rigid structure, respectively.

Accordingly, it has been determined that the need exists for improved pressure compensation members, an improved in-line emitter and methods relating to same which overcomes the aforementioned limitations and which further provides capabilities, features and functions, not available in current designs and methods, and for an improved method for doing the same.

BRIEF DESCRIPTION OF THE DRAWINGS

The above and other aspects, features and advantages of several embodiments of the present invention will be more apparent from the following more particular description thereof, presented in conjunction with the following drawings.

FIGS. 1A-F are perspective, top, left-side elevation, right-side elevation, bottom and front views, respectively, of a drip emitter embodying features of the present invention, with the perspective and front views illustrating the emitter bonded to the inner side of a drip line or tube (shown in broken line), the opposite end view (i.e., rear view) being a mirror image of the end view illustrated;

FIGS. 2A-D are perspective, top, right-side elevation, and left-side elevation views, respectively, of an alternate drip emitter embodying features of the present invention wherein a tongue and fork type arrangement is used instead of a single tapered portion to compensate for pressure fluctuations that the emitter is exposed to when inserted in a supply line, the end and bottom views of this embodiment looking similar to those of the embodiment of FIGS. 1A-F;

FIGS. 2E-F are cross-sectional views of the emitter of FIGS. 2A-D taken along line i-i illustrated in FIG. 2B, with FIG. 2E illustrating the tongue and fork arrangement at their low pressure position to show how fluid can flow over the top thereof, and FIG. 2F illustrating the tongue and fork arrangement at their high pressure position to show how fluid is restricted from flowing over the top thereof;

FIGS. 3A-D are perspective, top, left-side elevation and right-side elevation views, respectively, of an alternate drip emitter embodying features of the present invention wherein inlet openings of varying heights are used to compensate for pressure fluctuations that the emitter is exposed to when inserted in a supply line;

FIGS. 3E, F and G are additional right-side elevation, bottom and perspective views, respectively, of the embodiment of FIGS. 3A-D wherein FIG. 3E illustrates the inlet opening sleeves at a higher pressure position showing at least some of the inlet openings being closed to compensate for an increase in pressure and FIG. 3G illustrates the embodiment of FIGS. 3A-D from a rear left perspective instead of the front right perspective illustrated in FIG. 3A;

FIGS. 5A-B are perspective views of an alternate drip emitter and drip line embodying features of the present invention with FIG. 5A illustrating the emitter partially disposed in a drip line tube and wherein the pressure-reducing flow channel is made-up of baffles with flexible teeth that move in response to fluid flow through the emitter body;

FIG. 6A is a perspective view of an alternate drip emitter and drip line embodying features of the present invention wherein the pressure-reducing flow channel is made-up of baffles with hollow teeth or teeth that enlarge as fluid pressure increases within the supply line so that the pressure-reducing flow channel has a first cross-section at lower fluid pressures and a second cross-section, smaller than the first, at higher fluid pressures to compensate for the increase in fluid pressure so that the emitter and drip line trickle fluid at a generally constant or desired rate;

FIGS. 6B-C are perspective views of a portion of the flow channel of FIG. 6A illustrating the hollow teeth of the baffle partially enlarged and fully enlarged, respectively, in response to increasing fluid pressure showing how the cross-section of the pressure-reducing flow channel in FIG. 6B has a smaller cross-section than that illustrated in FIG. 6A due to an increase in fluid pressure and showing how the cross-section of the pressure-reducing flow channel of FIG. 6C is even smaller yet than that illustrated in FIG. 6B due to a further increase in fluid pressure;

FIG. 6D is a perspective view of a portion of the bottom of the emitter illustrated in FIG. 6A showing the underside of the hollow teeth members of the baffle and how such surfaces are exposed to the fluid and are affected by an increase in fluid pressure;

FIGS. 7A-B are perspective and perspective cross-sectional views, respectively, of another emitter embodying features of the present invention wherein a unitary body defines first and second walls interconnected together to form a pressure reduction flow channel, the cross-section being taken along lines ii-ii in FIG. 7A;

FIG. 7C-D are top plan and top cross-sectional views, respectively, of the emitter of FIGS. 7A-B, with the cross-section being taken along lines v-v of FIG. 7H;

FIG. 7E is a bottom perspective view of the emitter of FIGS. 7A-D illustrating how the first and second walls form a generally curved channel that increases of pressure will act upon to press the first and second walls toward one another to further restrict fluid flow;

FIGS. 7F-G are right-side elevation and right-side cross-sectional views, respectively, of the emitter of FIGS. 7A-E illustrating one form of the first and second walls that combine to restrict fluid flow through the emitter, the cross-section being taken along lines iii-iii in FIG. 7C;

FIGS. 8A-B are perspective and perspective cross-sectional views, respectively, of another emitter embodying features of the present invention wherein a unitary body defines a series of rows of baffles transverse to the longitudinal axis of the emitter and extending into the pressure reduction flow path, with a portion of the baffles varying in height to create a structure that compensates for pressure, the cross-section being taken along line vi-vi in FIG. 8A;

FIGS. 8C-E are top plan, front elevation and bottom perspective views, respectively, of the emitter of FIGS. 8A-B;

FIGS. 8F-G are left-side elevation and left-side cross-sectional views, respectively, of the emitter of FIGS. 8A-E, the cross-section being taken along line vii-vii in FIG. 8C; and FIGS. 9A-B are top and bottom perspective views, respectively, of another emitter embodying features of the present invention wherein a unitary body defines a series of rows of baffles transverse to the longitudinal axis of the emitter and extending into the pressure reduction flow path, and a plurality of outlet baths with at least a portion of outlet passage being moveable between first and second positions, the second position defining a fluid passage that is more constrictive than the first position;

FIGS. 10A-E are perspective, cross-sectional, left-side elevation, top plan and front elevation views, respectively, of an alternate emitter embodying features of the present invention wherein a unitary elastomeric body defines an inlet, pressure reduction and compensation section and an outlet bath having a root inhibitor member for disrupting root growth that could interfere with the operation of the emitter (FIG. 10E further illustrating the emitter mounted in a drip line or tube);

FIGS. 11A-E are perspective, cross-sectional, left-side elevation, top plan and front elevation views, respectively, of another emitter embodying features of the present invention wherein a unitary elastomeric body defines an inlet, pressure reduction and compensation section and an outlet bath having a root inhibitor member for disrupting root growth that could interfere with the operation of the emitter;

FIGS. 15A-B are top and bottom perspective views, respectively, of an emitter embodying features of the present invention wherein a unitary elastomeric body is illustrated with an alternate inlet, flow path and outlet and having the root growth inhibitor exploded from the emitter body in FIG. 15A;

FIGS. 18A-B are perspective and exploded views, respectively, of an emitter embodying features of the present invention wherein the unitary elastomeric body is illustrated with a connecting bracket coupled to the bonding side of the elastomeric emitter body in FIG. 18A which may be used to assist in connecting the emitter to drip tubing and exploded from the body in FIG. 18B;

FIGS. 19A-C are perspective, side cross-section and end cross-section views, respectively, of another emitter in accordance with an embodiment of the invention disclosed herein, with a root growth inhibitor insert exploded from the emitter in FIG. 19A, the left-side cross-section view of FIG. 19B taken along line B-B in FIG. 19A and the end cross-section view of FIG. 19C taken along line C-C in FIG. 19A;

FIGS. 20A-B are perspective and exploded views, respectively, of another exemplary emitter in accordance with an embodiment of the invention disclosed herein;

Figure 1A:
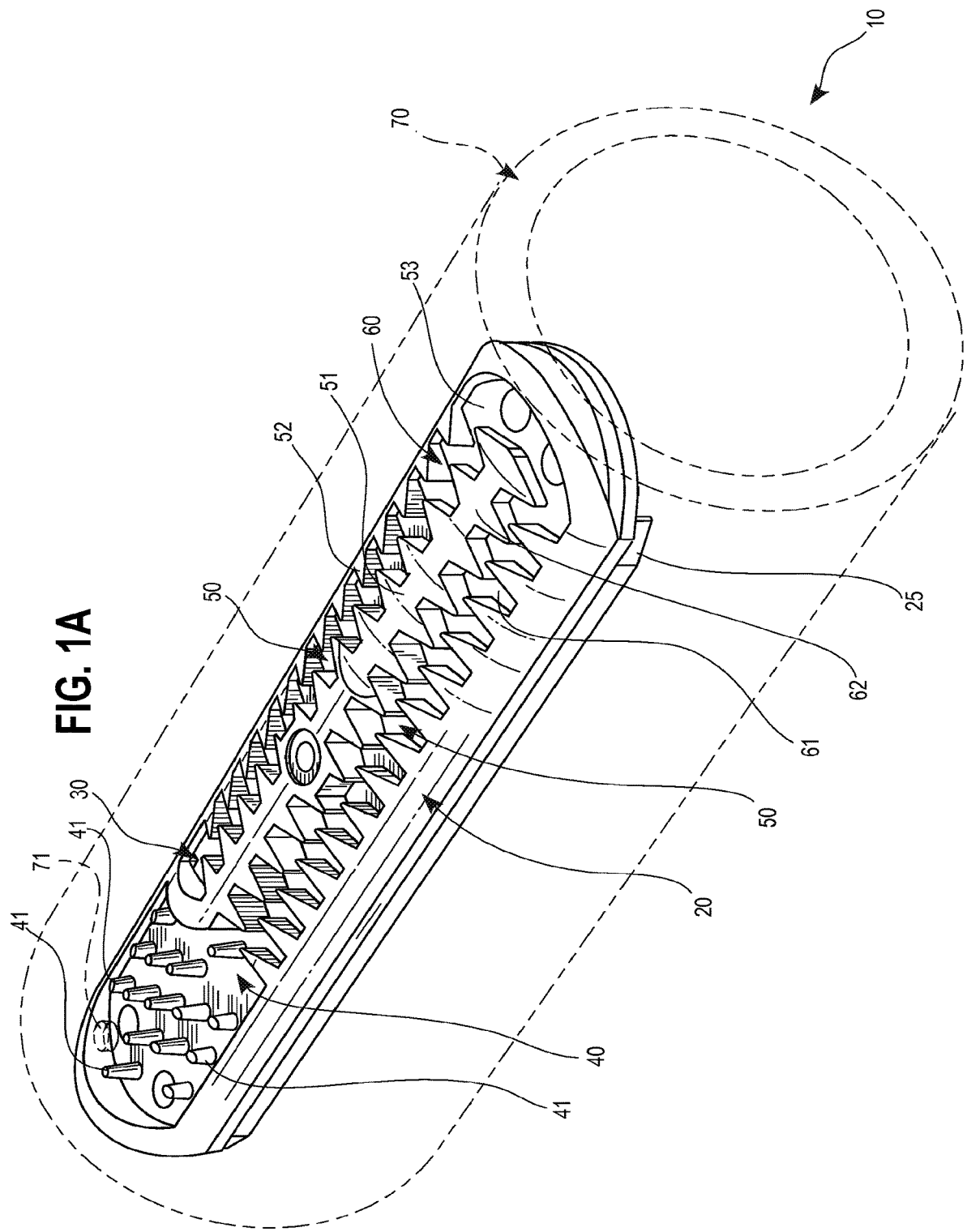
Figure 1D:
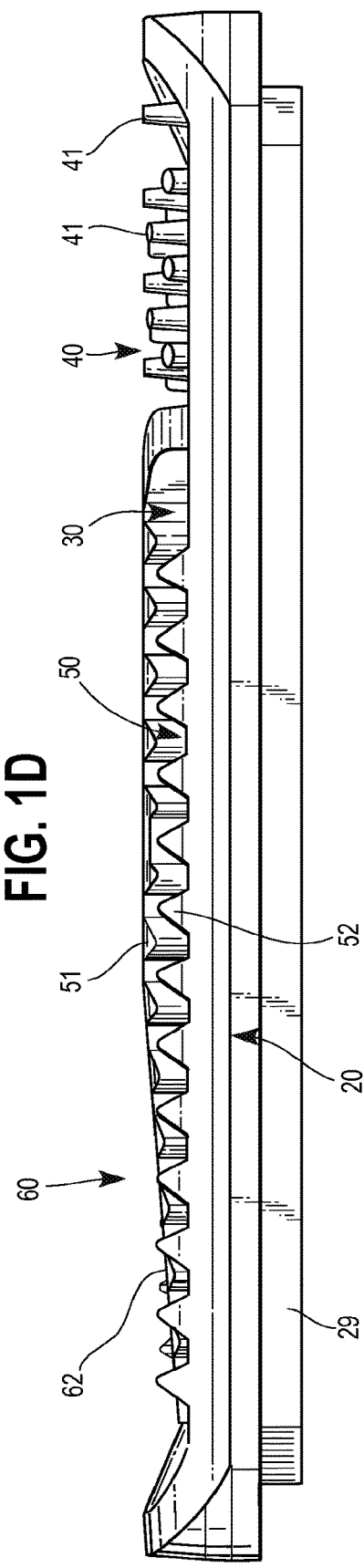

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DESCRIPTION OF THE PREFERRED EMBODIMENTS

As shown in FIGS. 1A-F, a drip irrigation emitter 10 is provided for distributing water from a fluid supply source or conduit, such as drip line or tube 70, at a low flow rate. The drip line 70 carries pressurized fluid throughout an irrigation system and preferably includes numerous emitters 10 spaced apart at predetermined intervals in the dip line 70 in order to allow the drip line 70 to be placed above or below ground to water and/or treat grass, plants, shrubs, trees or other landscaping, or to water agricultural crops of various kinds. In the form illustrated, the emitter 10 includes an integral body 20 which defines an inlet 30 connectible to a source of pressurized fluid, an outlet 40 for discharging the fluid from the emitter body 20, and a pressure reducing flow channel or passage 50 between the inlet 30 and outlet area 40 for reducing the flow of fluid discharged through the outlet 16. In addition, the emitter body 20 defines a pressure compensating member 60 for reducing a cross-section of the flow channel in response to an increase in pressure of the pressurized supply line fluid.

In the form illustrated, the emitter body 20 is made of an elastomeric material, such as a thermoplastic or thermosetting elastomeric material like materials that use ethylene, propylene, styrene, PVC, nitrile, natural rubber, silicone, etc., to form a polymer or copolymer. In a preferred form, the elastomeric material is made of thermoplastic polyolefin (TPO) and silicone rubber. This combination helps create an emitter and drip line that is capable of withstanding the high temperatures and harsh chemicals the emitter may be subjected to while in use. In addition, the emitter is made of a singular or unitary construction rather than having a multi-part construction and/or requiring the assembly of housing parts, diaphragms, etc. This simple construction makes it easier to manufacture the emitter and makes the emitter more grit-tolerant. More particularly, the simple and flexible construction of the emitter can easily process grit or other particulates by expanding to process the grit (aka burping) due to the fact there are no additional housing portions to prevent such expansion. This simple construction also allows the emitter to be flushed more easily by allowing line pressure to be increased to process grit out of the emitter without concern for damaging the emitter because there are no additional pieces, such as multi-part housings, that limit the amount of movement the emitter can make before breaking or coming apart.

Whereas in conventional emitters, even those having two-piece housings, diaphragms and metering grooves to assist in the flushing of grit, the emitter typically reaches a state where further increases is pressure will not increase processing of grit. For example, in conventional emitters, at a certain point of fluid pressure, the pressure on both sides of the diaphragm will eventually become equal and the emitter will cease processing or burping the grit. In the form illustrated, however, the disclosed emitter will continue to process grit with increases in pressure well beyond when conventional emitters stop processing grit (e.g., when this state of equal pressures on opposite sides of the diaphragm are reached). Thus, line pressure can simply continue to be increased in order to drive grit through the emitter body. The elastomeric nature of the emitter body 20 further helps flushing or burping particulates or grit even when simply turning on and off the supply line.

Figure 1E:
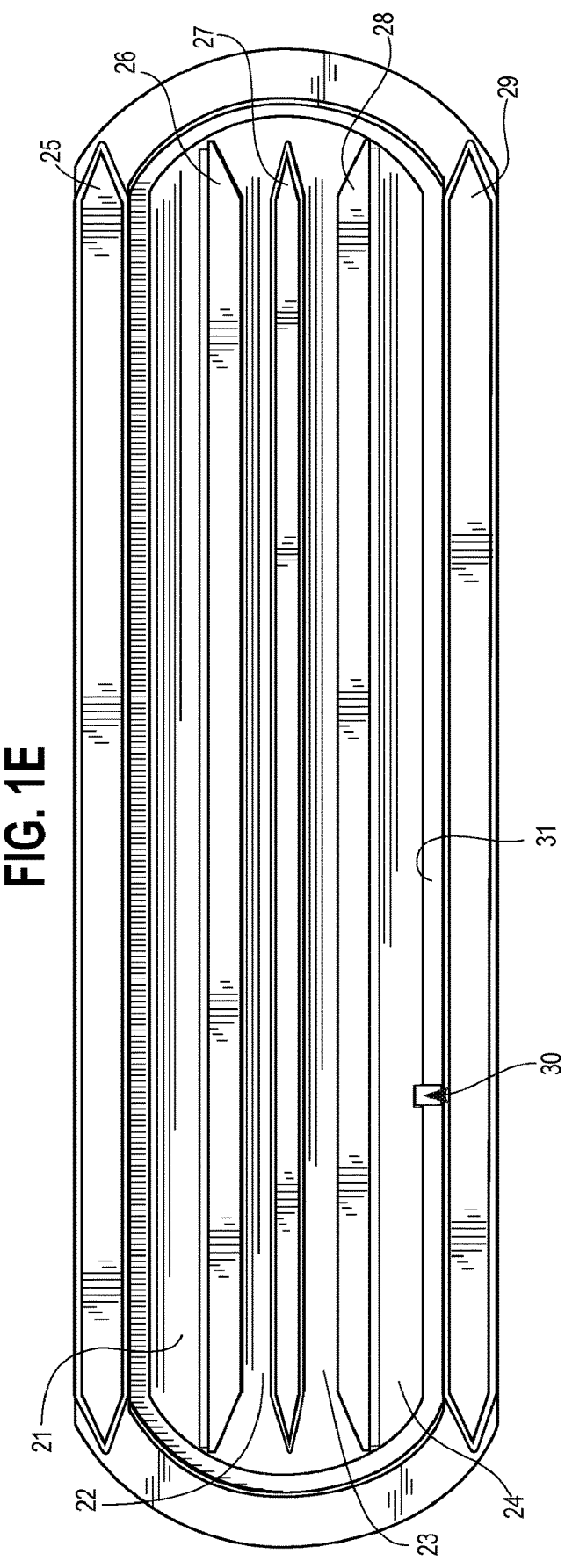
Figure 1F:
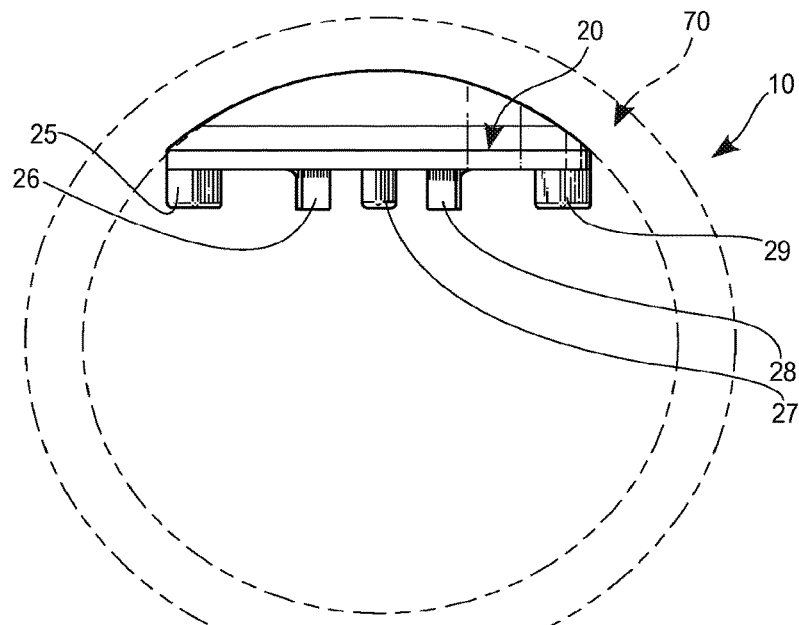

As best illustrated in FIGS. 1E-F, the body 20 defines a plurality of slots 21, 22, 23 and 24, extending longitudinally along the bottom surface of the emitter body 20 which are separated by protrusions, such as guide ribs 25, 26, 27, 28 and 29. The outer most guide ribs 25 and 29 are positioned on the periphery of the bottom surface of emitter body 20 while the inner most ribs 26-28 are positioned on an interior portion separated from the periphery by inlet channel 31. In a preferred form, the inlet channel 31 is sized to deflect foreign materials from obstructing the inlet 30 or entering the emitter body 20 and guide ribs 25-29 have at least one tapered end and run parallel to the longitudinal axis of the emitter body 20 to further help deflect foreign materials from obstructing the inlet channel 31 or entering the emitter body 20. In the form illustrated, the inlet channel 31 extends continuously around or at a perimeter region of the emitter body 20 and empties into the inlet 30. More particularly, in the form illustrated, the inlet channel 31 is a generally oval shaped raceway recessed in the bottom surface of the emitter body 20 having curved ends 31a, 31b and longer straight-aways 31c, 31d that run longitudinally along the bottom of body 20. The inlet channel has a generally rectangular cross-section and opens into the inlet 30 via a rectangular shaped opening.

The recessed nature and length of inlet channel 31 helps prevent grit or other particulates from entering into the inlet 30 that could clog the emitter 10 or form obstructions preventing the emitter 10 from operating in the desired manner. More particularly, once installed in the drip line 70, pressurized fluid flows along the bottom side of the emitter body 20 with some fluid entering into the raceway of inlet channel 31 and traveling about the periphery of the emitter body 20 and then, ultimately, into the inlet opening 30. In this manner, the side walls of channel 31 serve to deflect grit and other particulates in the fluid from entering into the inlet channel 31 and into the inlet opening 30. This prevents the emitter 10 from getting clogged and/or having obstructions enter the emitter 10 that might otherwise negatively affect or compromise the desired operation of the emitter. The circular flow that is created by the inlet channel 31 further helps ensure that larger particulates that might fit within the inlet channel 31 will fall out of or be flushed from the channel 31 as the fluid races about the raceway before the fluid enters into the inlet opening 30.

The guide ribs 25-29 serve the dual function of assisting with the mounting of the emitter body 20 into the irrigation drip line and further help deflect grit or particulates in the pressurized fluid away from the inlet channel 31 and inlet opening 30. More particularly, one or more of the guide ribs 25-29 may be used by an insertion tool to align and insert the emitter body 20 into the drip line 70 as the drip line is being extruded. In a preferred form, this is done as the drip line 70 is being extruded so that the upper surfaces of the emitter body 20 are bonded or welded to the drip line 70 while the drip line is hot and before it begins to cool. The guide ribs 25-29 may also be tapered or pointed to assist in the initial loading of the emitter body 20 from a bowl sorter and into the inserter or loader used to insert the emitter body 20 into the freshly extruded drip line 70. Such tapering further assists with getting fluid in the supply line to flow between the narrow passages defined by the ribs 25-29 without causing too much disturbance or adding too much turbulence to the fluid flowing through the supply line 70.

In the form illustrated, the guide ribs 25-29 also help prevent grit or other particulates in the pressurized fluid from entering into the inlet channel 31 and inlet opening 30. More particularly, like the sidewalls of inlet channel 31, the ribs 25-29 create narrowed passageways which help deflect larger particulates away from the inlet channel 31 and inlet opening 30. Thus, the ribs 25-29 deflect away larger particulates from the inlet channel 31 and inlet opening 30 and the sidewalls of inlet channel 31 deflect away smaller particulates that are capable of fitting into the narrowed passageways defined by the ribs 25-29. This prevents the emitter 10 from getting clogged and/or having obstructions enter the emitter 10 that might otherwise negatively affect or compromise the desired operation of the emitter 10.

Figure 4:
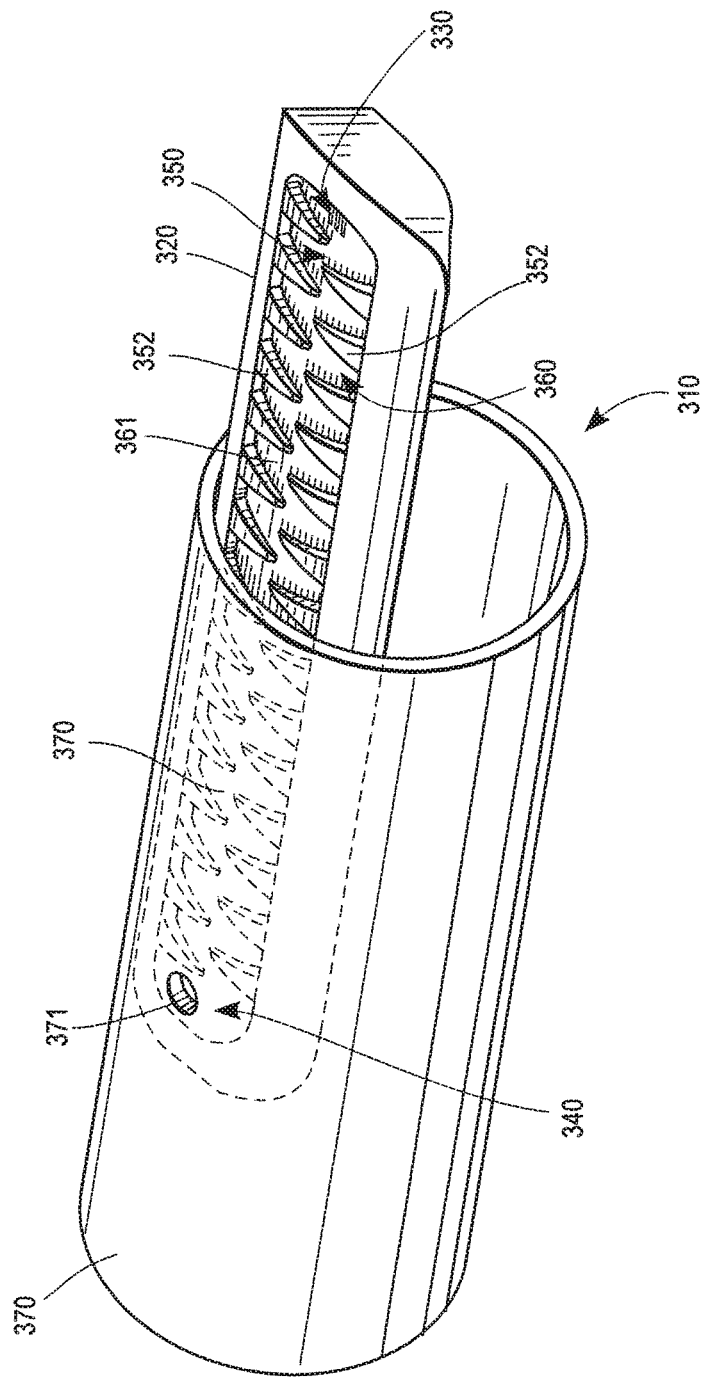
FIG. 4 is a perspective view of an alternate drip emitter and drip line embodying features of the present invention and illustrating an emitter with a baffle design which opens and closes in a non-sequential manner.

In the form illustrated, the inlet opening 30 is generally rectangular in shape and of a desired size to ensure that the emitter 10 receives a desired amount of fluid at a desired fluid flow rate in order to operate as desired. In alternate forms, however, the inlet opening 30 may be designed in a variety of different shapes and sizes to accommodate specific desires or applications. For example, in alternate forms, the inlet opening may be designed as more of an elongated slot or slit, or plurality of slot-like openings as illustrated in FIG. 4 (which will be discussed further below), for receiving fluid but further deflecting grit or particulates that are small enough to pass through the walls of inlet channel 31 or it may be designed to cooperate with the pressure-reduction flow channel 50 to start reducing the flow and pressure of the fluid as it enters the emitter body 20 (e.g., the inlet may form a tortuous passage that leads to the pressure-reduction channel 50). Similarly, the inlet channel 31 may be designed in a variety of different shapes and sizes. For example, instead of a generally oval shape, the inlet channel 31 may be designed to be a smaller slot that extends over a small portion of emitter body 20 instead of traveling about a periphery of the bottom of the emitter body 20, or may be designed with a zigzag pattern to form a tortuous path to further assist in reducing pressure of the fluid passing through the emitter body 20 (similar to that of the flow path 50, which will now be discussed in further detail).

With respect to the fluid that makes it through the passageways defined by ribs 25-29 and into the inlet channel 31, this fluid passes through the inlet opening 30 and enters a pressure-reducing flow channel 50 that produces a significant reduction in pressure between the fluid flowing in the primary lumen of the supply conduit or drip line 70 and the fluid ultimately emptying into and present in the emitter outlet area 40. In the form illustrated, the emitter body 20 defines opposed baffle walls to create the pressure-reducing flow channel and, in a preferred form, has an inner baffle wall 51 that is surrounded by an outer baffle wall 52 which extends about the inner baffle wall 51 in a generally U-shaped manner to form a flow passageway that generally directs the water in a U-shaped direction of travel. More particularly, the inner and outer baffle walls 51, 52 have alternating projections and recesses that form a tortuous passage and cause the fluid flowing therethrough to zigzag back and forth, reducing pressure with each turn the fluid makes. The outer baffle wall 52 is defined by an outer rim or peripheral wall of the emitter body 20 and the inner baffle wall 51 extends from a portion of the outer rim or peripheral wall and into to the middle of the emitter body 20 to form a peninsula about which the fluid flows from inlet 30 to outlet 40. The upper surfaces of the emitter body preferably have a radius of curvature that tracks the radius of curvature of the tube 70 so that the emitter body 20 can be bonded securely to the inner wall of the tube 70 and create an enclosed pressure reduction passage from inlet 30 to outlet 40. In the form illustrated, the tortuous passage is formed via alternating teeth extending from opposing surfaces of the inner and outer baffle walls 51, 52 and has a cross-section that is generally rectangular in shape when the emitter body 20 is bonded to the inner surface of the extruded drip line 70 (keeping in mind that the radius of curvature of the tube 70 will likely make the upper portion of the cross-section slightly curved and the side walls to be slightly wider at their top than at their bottom).

It should be understood, however, that in alternate embodiments, the pressure-reducing flow channel 50 may be made in a variety of different shapes and sizes. For example, instead of having projections with pointed teeth, the baffles could be made with blunt or truncated teeth, with teeth that are angled or tapered, with curved or squared projections instead of triangular shaped teeth, with projections of other geometrical shapes or geometries, symmetric or asymmetric, etc.

In the form illustrated, the pressure-reducing flow channel 50 also includes an intermediate bath 53 that the fluid pours into as it makes the turn in the generally U-shaped direction of travel which further causes pressure reduction as the water is flowing from a smaller passage to a larger passage in the bath 53. After making the turn, the fluid passes or zigzags through another section of the pressure-reducing flow channel 50 and empties into outlet pool 40.

In addition to the pressure-reducing flow path 50, the emitter 10 further includes a pressure compensating feature 60 which further allows the emitter 10 to compensate for increases in fluid pressure in the primary lumen of the tube 70. More particularly, pressure compensating feature 60 allows the emitter 10 to maintain relatively constant outlet fluid flow and pressure even though the inlet fluid pressure may fluctuate from time-to-time. In the form illustrated, the pressure compensating feature 60 is a two part pressure compensation mechanism that comprises an elastomeric portion 61 capable of deflecting under pressure to reduce the cross-section of the pressure-reducing flow channel 50 and regulate fluid flow through the emitter, and a moveable baffle portion 62 capable of changing the length of the flow channel to compensate for changes in supply line 70 fluid pressure.

The elastomeric portion 61 being a deflectable portion of the emitter body 20 that is moveable between a first position wherein at least a portion of the pressure-reducing flow channel 50 is of a first cross-section and a second position wherein the at least a portion of the pressure-reducing flow channel 50 is of a second cross-section, smaller than the first cross-section to regulate fluid flow through the emitter. In the form illustrated, the floor 61 of the flow channel 50 forms an elastomeric portion and raises and lowers in response to increases and decreases in supply line 70 fluid pressure, respectively. Thus, when fluid pressure increases in the supply line 70, the floor 61 of the flow channel 50 is pressed-up or deflected up into the flow channel 50 thereby reducing the cross-section of the flow channel to regulate the flow of fluid through the emitter 10. Conversely, when fluid pressure in the supply line 70 reduces, the floor of the flow channel 50 retreats from the flow channel back to a normal position wherein the floor is not deflected up into the flow channel thereby increasing the cross-section of the flow channel to allow fluid to flow more freely through the flow channel 50.

Although the above embodiment has been described with the floor of the flow path 50 deflecting up into the emitter flow path to reduce cross-section size of the flow path to compensate for increases in fluid pressure, it should be understood that in alternate embodiments, other emitter surfaces could be designed to either create this deflection on their own or to cooperate with the floor or other surface so that both deflect in order to compensate for fluid pressure increases. For example, rather than having the floor deflect, the side walls and/or ceiling of the flow channel 50 could be designed to deflect either in combination with any one of these items or on their own as the sole deflecting portion.

The second part of the pressure compensation mechanism 60 comprises a moveable structure, such as moveable baffle portion 62, which is capable of moving between a first low pressure position wherein the length of the flow channel 50 is of a first distance and a second high pressure position wherein the length of the flow channel 50 is of a second distance wherein the length of the flow channel is longer than the first distance to compensate for increase pressure in the supply line 70. More particularly, in the form illustrated, the moveable baffle portion 62 deflects up and down with the floor of the flow channel 50 to sealingly engage and disengage the moveable baffle portion 62 with the inner wall of the supply line 70, respectively, and thereby lengthen or shorten the extent of the flow channel for at least some fluid flowing therethrough to compensate for changes in supply line fluid pressure.

Figure 1G:
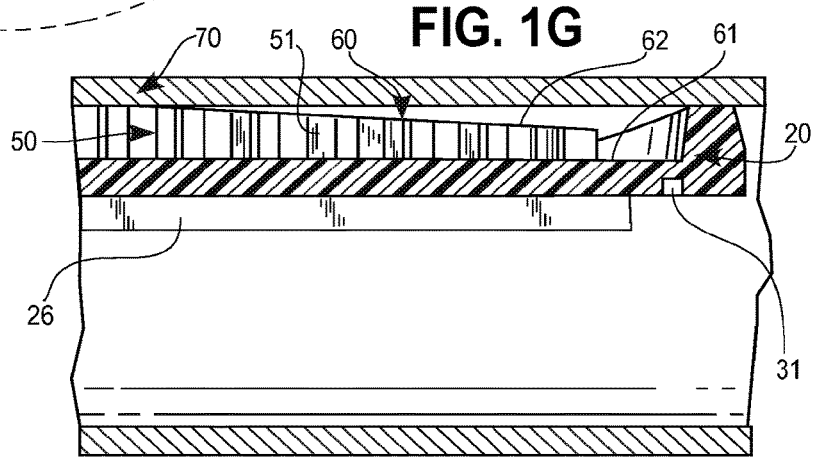
FIGS. 1G-H are cross-sectional views of the emitter of FIGS. 1A-F taken along line i-i illustrated in FIG. 1B, with FIG. 1G illustrating the tapered portion of the inner baffle wall at its low pressure position to show how fluid can flow over the top thereof, and FIG. 1H illustrating the tapered portion of the inner baffle wall at its high pressure position to show how fluid is prevented from flowing over the top thereof.
Figure 1H:
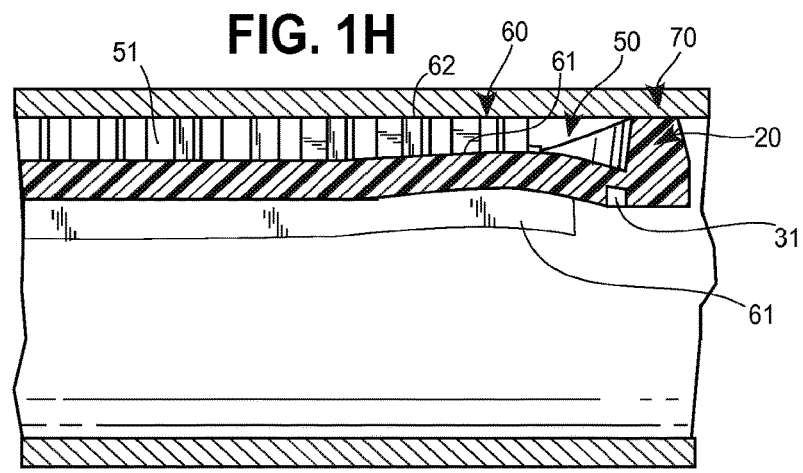

As best illustrated in FIGS. 1C, D and G, the moveable baffle portion 62 comprises a tapered portion of the central or inner baffle wall 51 that tapers down away from the inner surface of supply line 70 so that at lower fluid pressures in supply line 70, fluid flows through the inlet 30 and first section (or upstream section) of flow channel 50 and then over the top of the tapered baffle section 62, through the second section (or downstream section) of the flow channel 50 and then into outlet pool 40. Fluid may flow through the remaining portion of the flow channel 50 including intermediate bath 53 (located between the upstream and downstream sections of the flow channel 50), but it does not have to nor does all of the fluid flow through these portions of the flow channel 50 due to the gap between the upper surface of the tapered inner baffle wall section 52 and the inner surface of tube 70. As fluid pressure increases in the fluid supply line 70, and as best illustrated in FIG. 1H, the floor of the flow channel 50 starts to deflect upwards and into the flow channel 50 moving the tapered baffle section 62 toward the inner surface of tube 70 thereby reducing the gap between these two until the upper surface of the tapered baffle section 62 sealingly engages the inner wall of the tube 70 thereby preventing fluid from flowing over the top of the tapered baffle section 62 and lengthening the amount of the flow channel 50 through which all of the fluid must flow and reducing fluid pressure and flow due to same.

The emitter body 20 further defines an outlet area 40 which forms a pool into which the fluid that passes through inlet 30 and tortuous passage 50 and pressure compensation mechanism 60 collects or gathers. An outlet in outer supply line 70, such as opening 71, provides access to the fluid collected in the outlet pool 40 and, more particularly, provides an egress for the fluid to trickle or drip out of emitter 10.

Since the emitter 10 is made of an integral body 20, the outlet area 40 is provided with obstructions or stops, such as posts or nubs 41, that prevent the outlet are 40 from collapsing when the fluid pressure of supply line 70 raises to a level sufficient for deflecting the floor of the flow channel 50 into the flow channel 50 to reduce the cross-section of same and regulate fluid flow through the flow channel (or as the moveable structure 62 moves from the first or low pressure position to the second or high pressure position). In the form illustrated, the posts 41 extend away from the body 20 and are generally frustoconical in shape to make the posts easier to mold when the body 20 is molded. In addition, in a preferred form, the upper surfaces of the posts 41 have a radius of curvature common to the radius of curvature of the upper surfaces of baffles 51, 52 and that corresponds with a second radius of curvature of the inner wall of tube 70. The solid nature of the baffle walls 51, 52 and outer rim or peripheral wall of emitter body 20 likewise prevent these portions of the emitter body 20 from collapsing when the fluid pressure of supply line 70 pushes the floor of the flow channel 50 into the flow channel.

Although the form illustrated in FIGS. 1A-D shows the outlet 71 of outer tube 70 as a round opening, it should be understood that in alternate embodiments, this may be provided in a variety of different shapes and sizes. For example, in one form, the outer tube outlet 71 may be provided in the form of a slit, such as an elongated narrow oval shape, instead of a round hole. In other forms, the outer tube outlet 71 may further define a pressure reducing passageway such as a tortuous or zigzag passage.

Figure 1I:
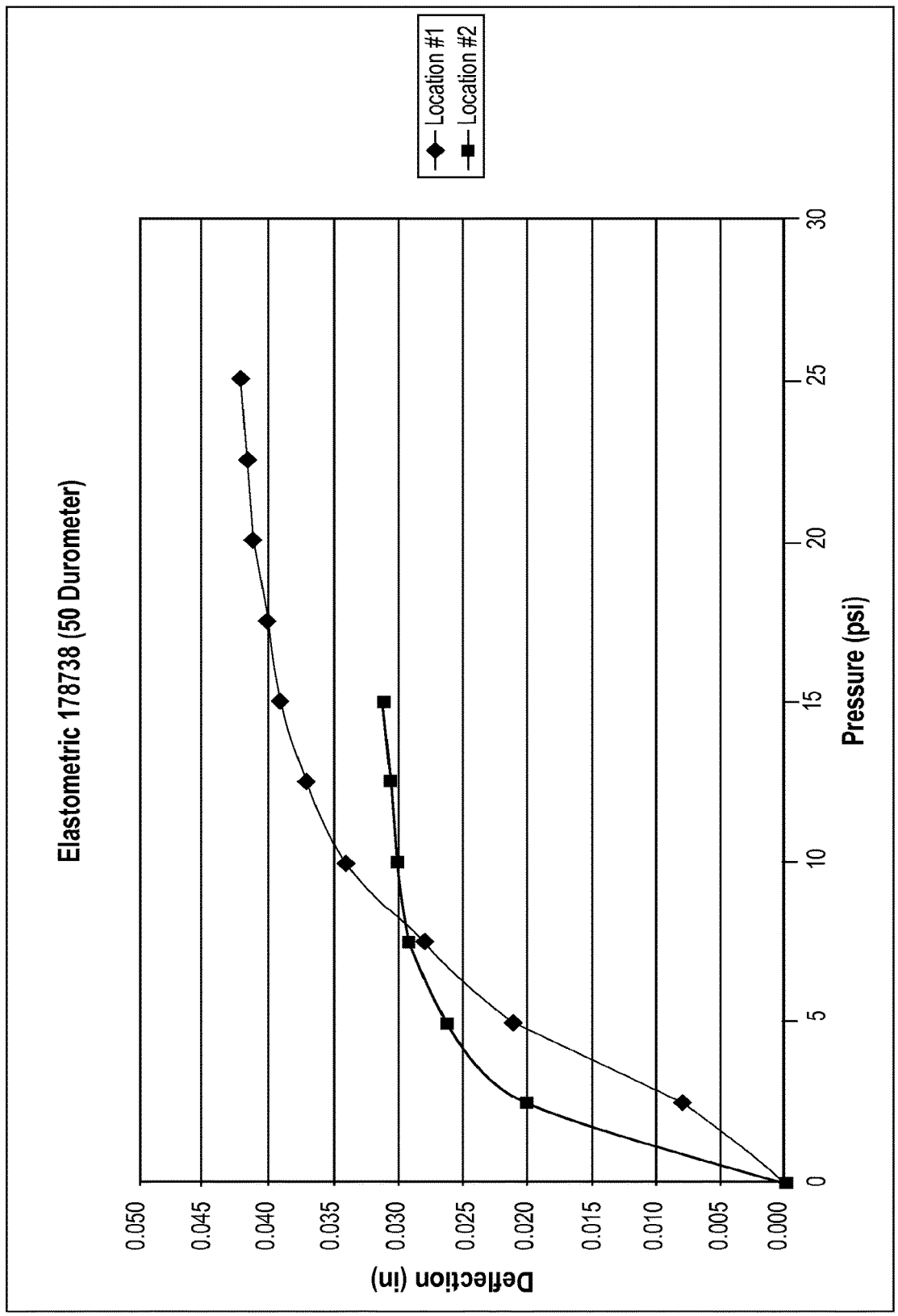
FIGS. 1I-J are charts illustrating the amount of deflection of the tapered portion of the inner baffle wall per increase in pressure at points 1 and 2 along the tapered portion as illustrated in FIG. 1B, with FIG. 1I illustrating deflection vs. pressure for an elastomeric emitter body material having a Durometer value of 50 and FIG. 1J illustrating deflection vs. pressure for an elastomeric emitter body material having a Durometer value of 75.
Figure 1J:
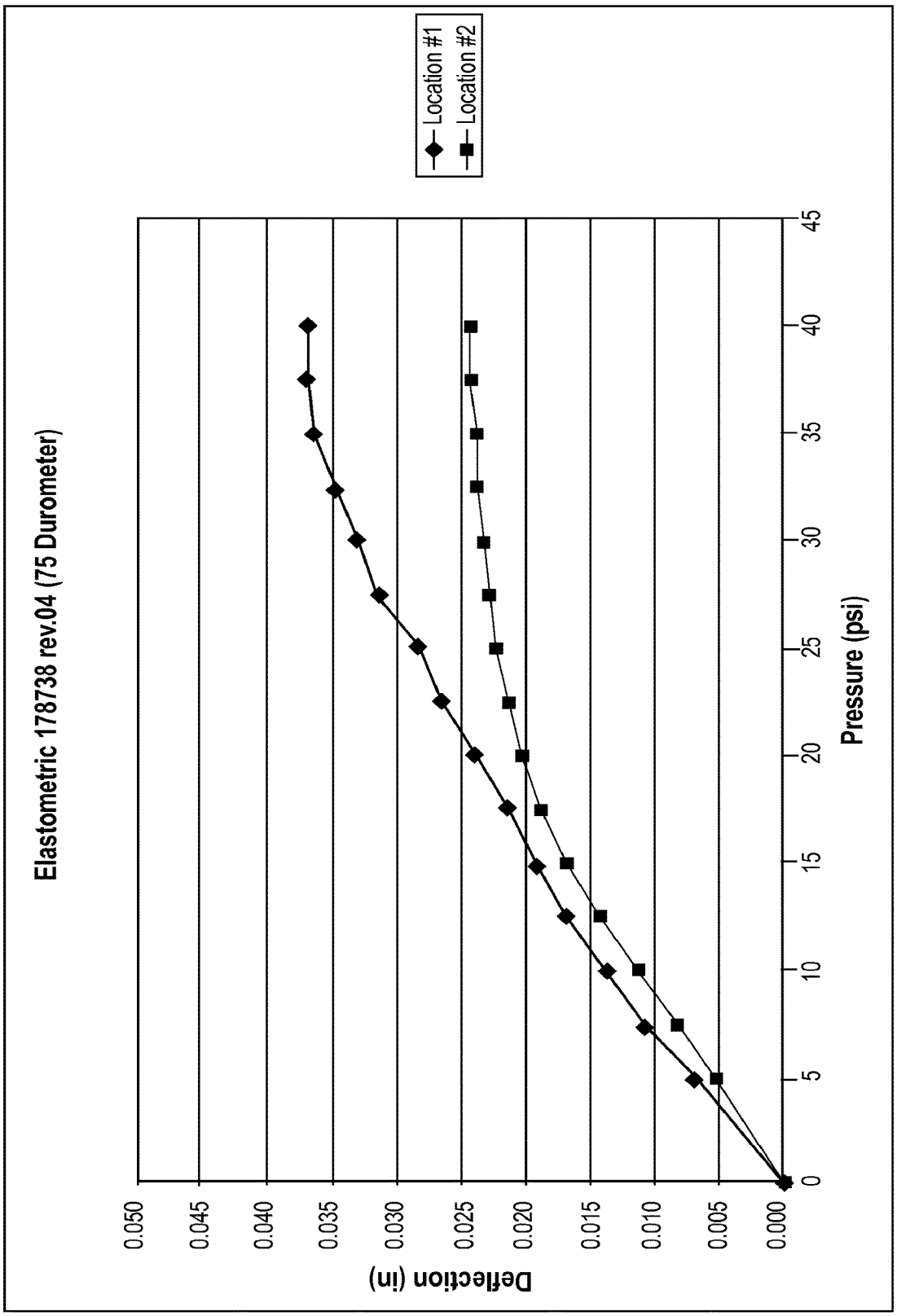
Figure 2B:
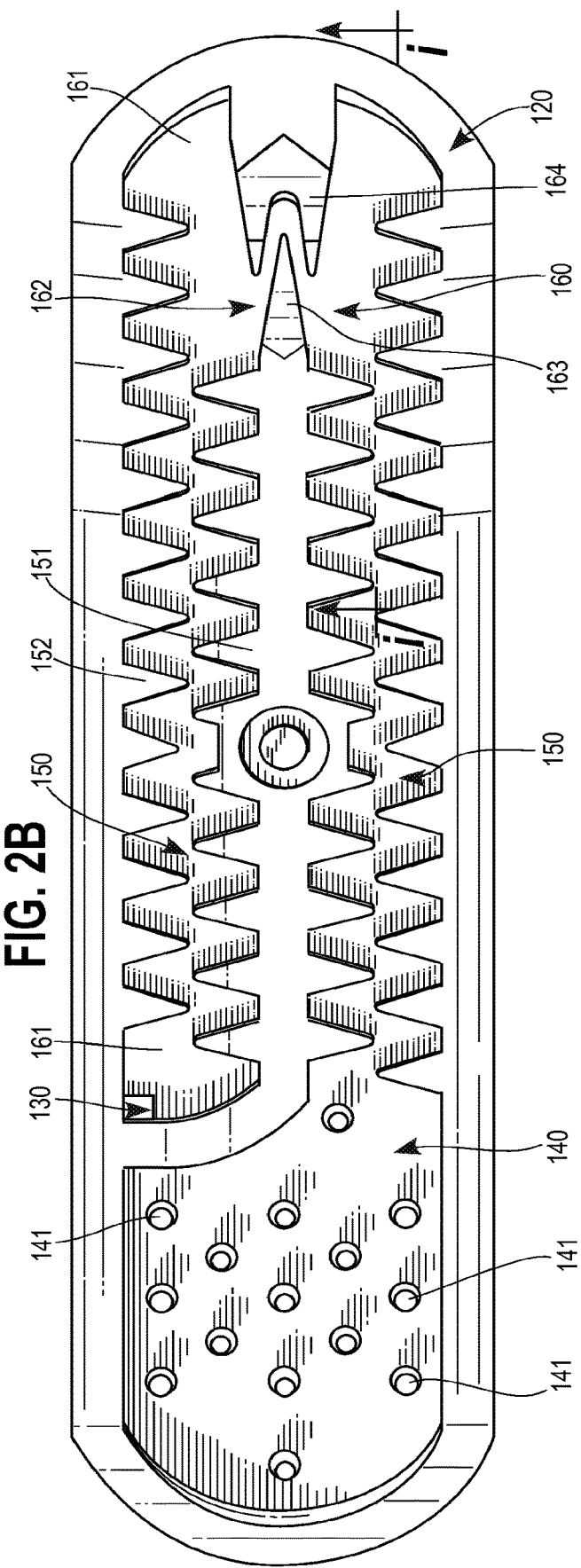
Figure 2C:
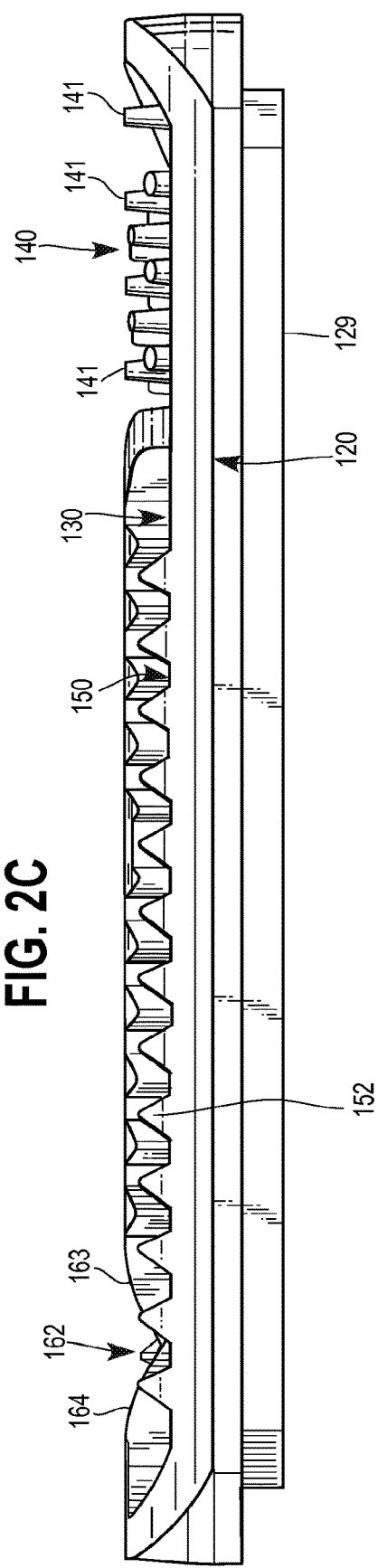
Figure 3A:
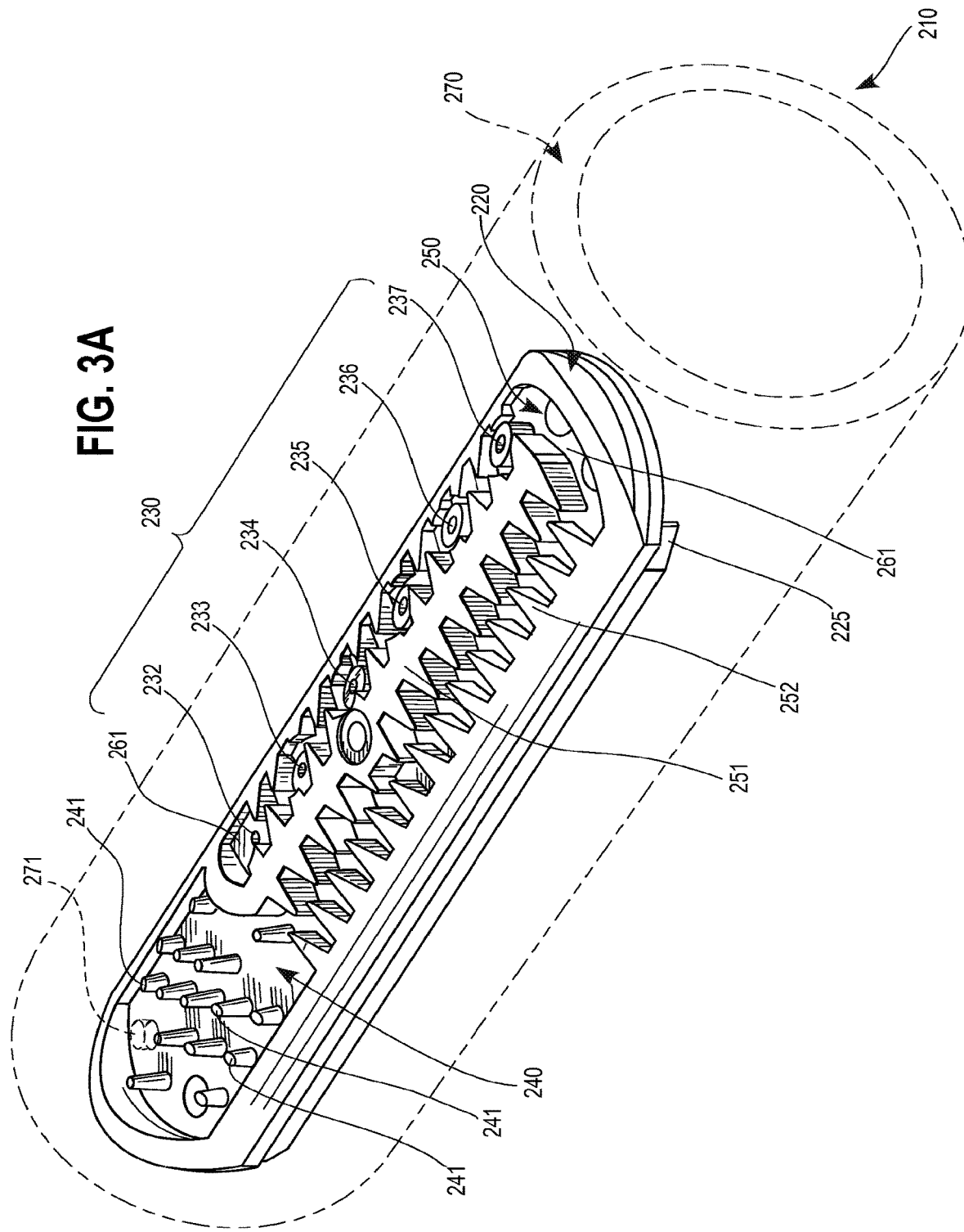
Figure 3D:
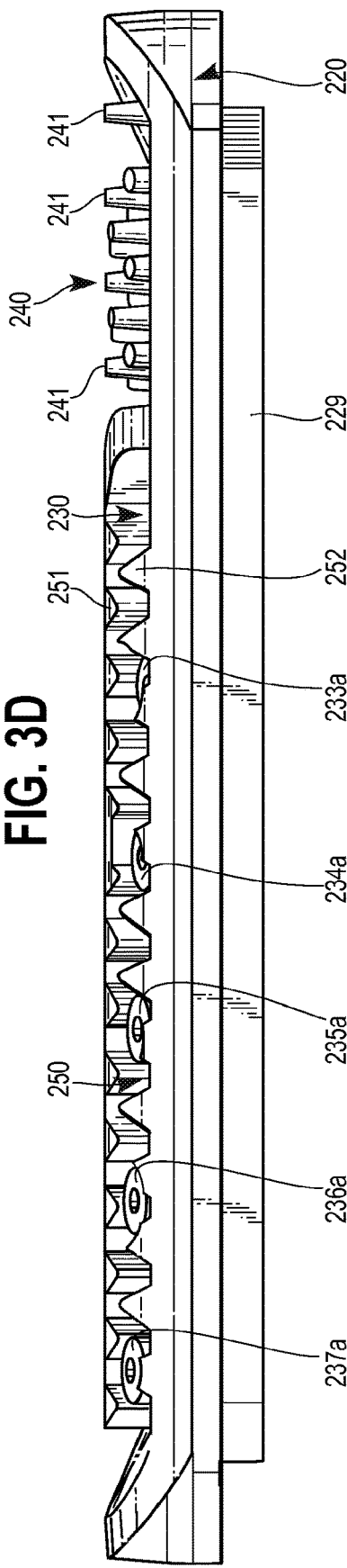
Figure 3E:
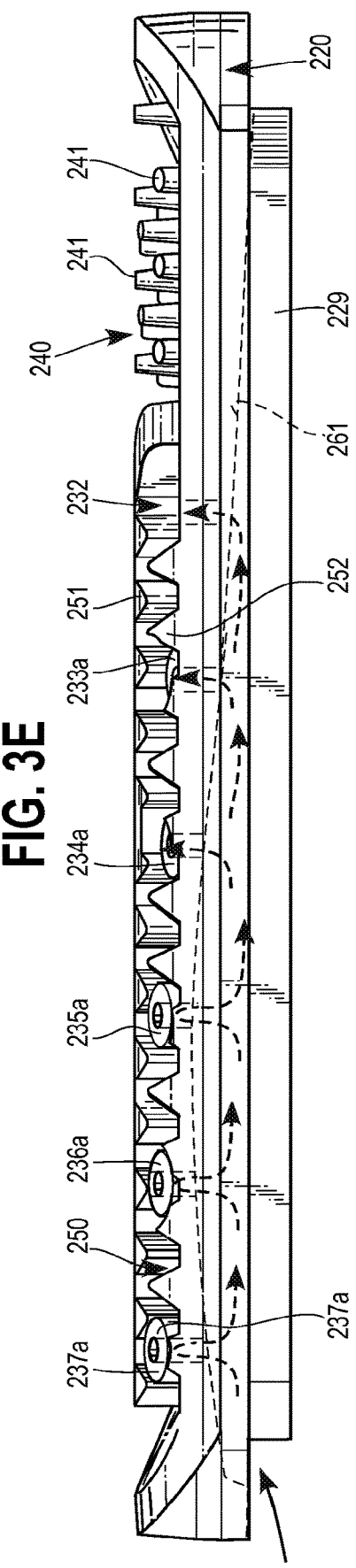
Figure 3F:
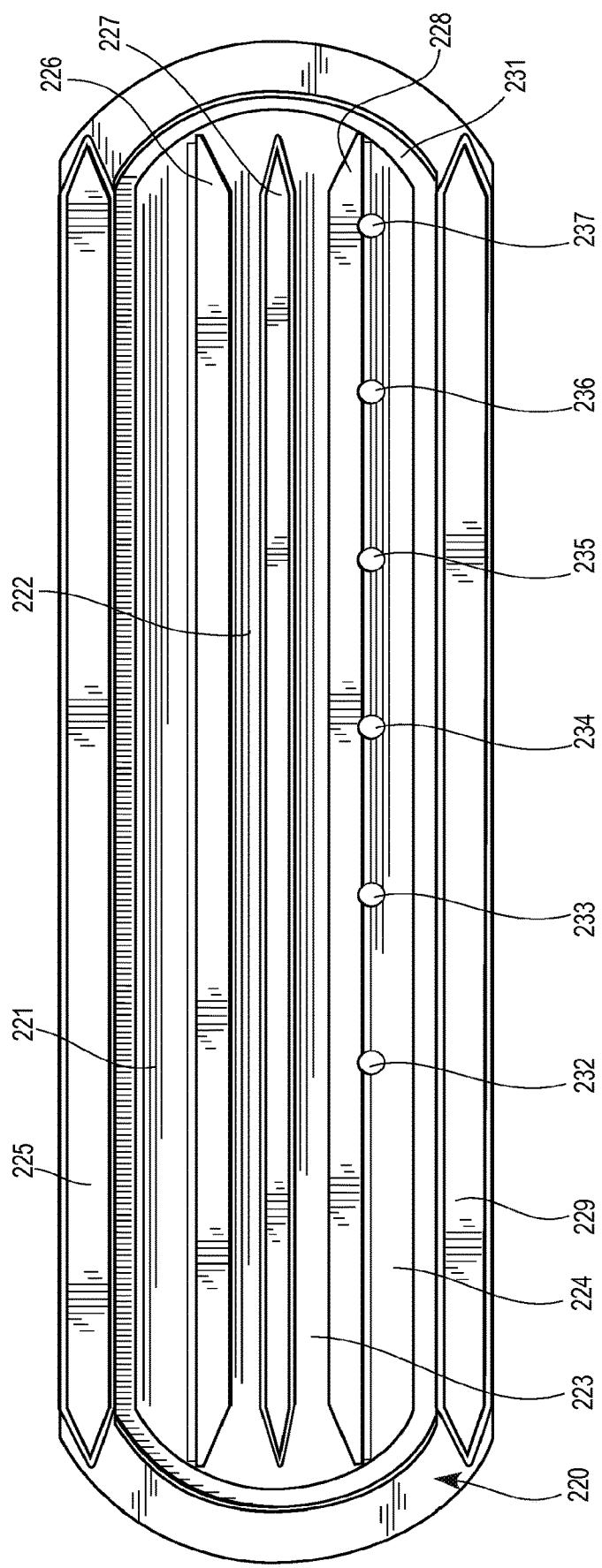
Figure 3G:
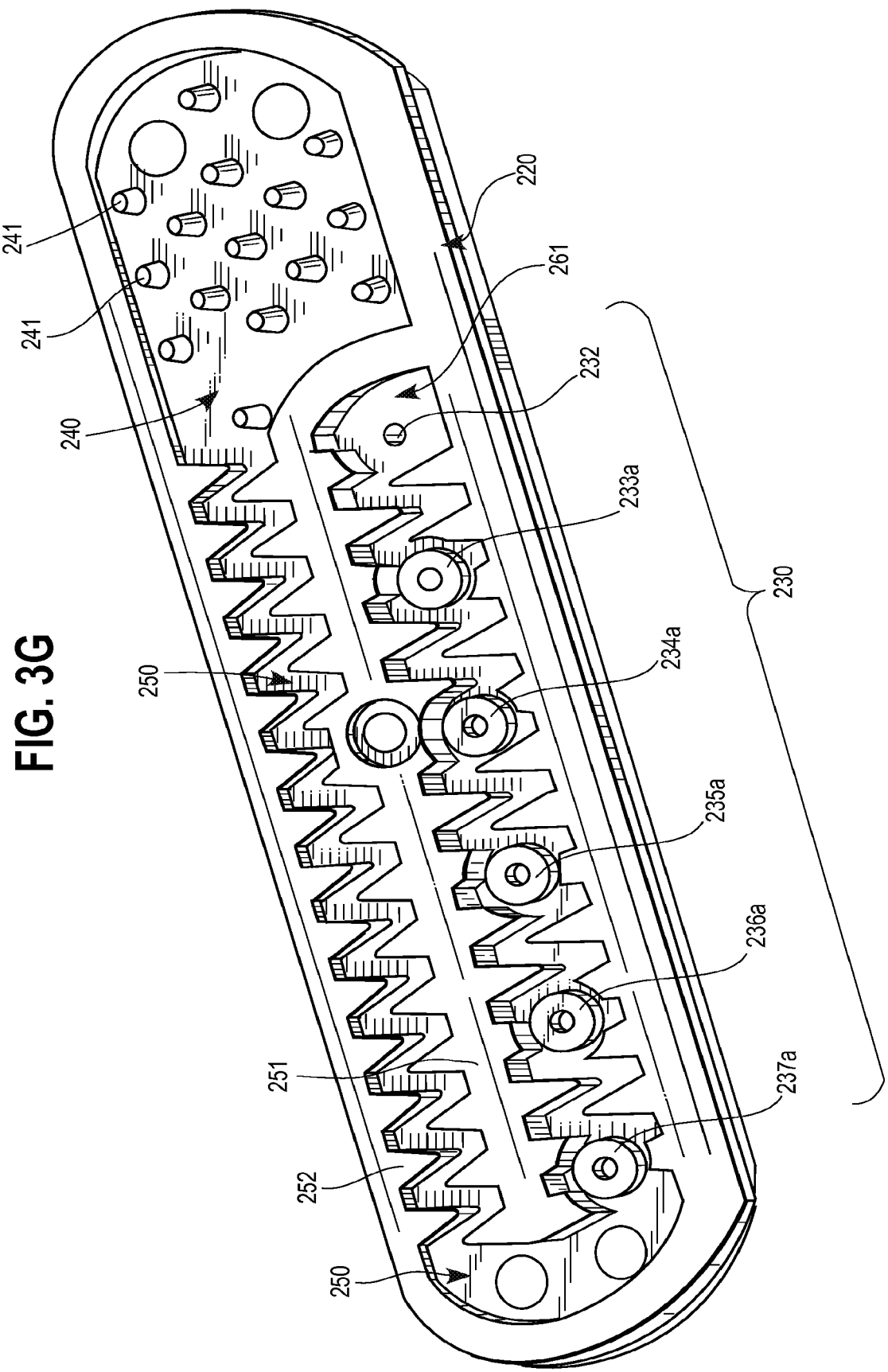

By using a unitary emitter body 20 to form the inlet 30, flow channel 50, outlet 40 and pressure compensating mechanism 60 rather than requiring multiple parts to be constructed and assembled to form such features, the emitter 10 is much easier to manufacture and provides significant cost savings due to the reduction in parts and materials, and assembly time. The body 20 may be made of any type of material capable of allowing for this type of movement for pressure compensation. In a preferred form, however, the body 20 is made of TPO having a Durometer reading ranging between 25 and 100, with the Durometer reading preferably being between 50 and 75. In FIGS. 1I-J, data is provided for the amount of deflection per increase in pressure for materials having Durometer readings of 50 and 75, respectively. In these examples, data was collected at location points 1 and 2, as indicated in FIG. 1B, with the distance (or gap) between the inner surface of tube 70 and the upper surface of the tapered inner baffle wall portion 62 being thirty thousandths of an inch (0.030") at location point 1 and thirteen thousandths of an inch (0.013") at location point 2, and the floor thickness of flow channel 50 being eight thousandths of an inch (0.008"). These distances being calculated when the tapered baffle wall portion 62 is at its normal position (or low pressure/non-deflected position), as illustrated in FIG. 1G.

As can be seen in comparing FIGS. 1I-J, a quicker movement of the tapered baffle wall portion 62 and corresponding lengthening of the flow channel 50 can be achieved using a material with a lower Durometer reading (e.g., a softer material), whereas a more constant movement (almost linear at times) of the tapered baffle wall portion 62 may be achieved by using a material with a higher Durometer reading (e.g., a harder material). Thus, the specific application the emitter 10 is intended for may play a role in the material selected for emitter body 20 (e.g., if a quicker lengthening of the flow channel 50 is desired a material with a lower Durometer reading will be used, whereas if a more gradual closing of the tapered baffle wall portion 62 and more gradual lengthening of the flow channel 50 is desired, a material with a higher Durometer reading will be used, etc.).

In order to ensure the consistency of operation for each emitter 10 mounted to the extruded supply line 70, care is taken to make sure that the various portions of body 20 are constructed with consistent thickness and density from one emitter to the next and that the distances between location points 1 and 2 and the inner surface of supply line 70 are maintained consistently from one emitter to the next. In doing so, the emitters 10 mounted to the supply line 70 should operate in a uniform manner and produce common low pressure fluid flow and flow rates at their respective outputs 40 (e.g., the flow rate of the first emitter mounted in the supply line should operate the same as the last emitter mounted in the supply line).

In an alternate form, the emitter and drip line may be made-up of a multi-part construction and/or use a multi-step manufacturing or assembly process. For example an emitter body of a first type of material may be combined with another type of material (e.g., a structure, a layer, a coating, etc.) that is more easily bonded to conventional drip tubing so that emitter can be bonded to the tubing in a more consistent manner and each emitter is ensured to work similar to one another. More particularly, since soft materials, such as silicon, do not always bond easily to the various types of conventional drip line tubing used in the industry, which is typically polyethylene tubing, the emitter body may be made-up of a combination of soft and hard materials to assist in the bonding of the emitter to the extruded tubing and to provide a process that can repeatedly bond such emitters to extruded tubing so that there is no significant (if any) variance in bonding between the emitters bonded to the tubing.

For example, by combining a soft material like silicon with a hard material like a polyethylene, the hard portion of the emitter may more easily be bonded to the extruded tubing in a uniform and repeatable fashion. Although this form of emitter and tubing may be considered by some to be a two-part construction, it would preferably remain housingless and the soft portion of the emitter would make up the majority of the component. For example, in one form, the hard portion of the emitter would simply comprise a polyethylene coating applied to an upper surface of the emitter to assist in consistently bonding the emitter to the inner surface of the drip line tubing in a manner that can be repeated easily from emitter to emitter. Not all of the upper surfaces of the emitter body need to be coated with the polyethylene coating and/or connected to the inner surface of the drip line tubing. Thus, in this example, the emitter continues to comprise a singular or uniform structure through which fluid flows that simply has a bonding layer or agent of polyethylene which assists in connecting the emitter to the inner surface of the drip line tubing. In addition, this configuration would still produce an emitter that can process grit better than conventional emitters, including those with multi-part housings, diaphragms and metering grooves. In alternate forms, true two-piece constructions may be used to form the emitter body if desired with either piece making up a majority of the structure or both making-up equal portions of the structure and/or either piece or both making up portions of the inlet, flow channel or outlet as desired.

Turning now back to FIGS. 1A-F, a housingless irrigation drip emitter 10 is provided for attachment to only a portion of an inner circumference of an inner surface of an irrigation drip line tube 70 having an elastomeric emitter body 20 integrally defining an inlet 30 for receiving pressurized fluid from a fluid supply source, an outlet area 40 for discharging the fluid from the body 20, a pressure reducing flow path 50 extending between the inlet 30 and the outlet area 40 for reducing the pressure and flow of fluid received at the inlet 30 and discharged through the outlet area 40, and a pressure compensating portion 60 for automatically adjusting the pressure and fluid flow reducing effect of the flow channel 50 in response to a change in pressure of the fluid supply source 70, wherein the pressure reducing flow channel 50 includes an inner baffle wall 51 and an outer baffle wall 52 that extends about the inner baffle wall 51 in a generally U-shaped manner. The baffle walls 51, 52 having upper surfaces that have a first radius of curvature that corresponds with a second radius of curvature of an inner wall of the irrigation drip line tube 70, and the inner baffle wall 51 having a first portion of constant height and a second portion 62 of tapering height, the second portion 62 being moveable between a first position wherein the upper surface of the second portion 62 is not level with the upper surface of the first portion such that fluid can flow over the upper surface of the second portion at predetermined low fluid pressures and a second position wherein the upper surface of at least a portion of the second portion 62 is level with the upper surface of the first portion and fluid cannot flow over the level upper surfaces of the second portion 62 such that the cross-section of the flow channel is reduced and the length of the flow channel is effectively lengthened.

In the form illustrated, the baffles of the inner and outer baffle walls 51, 52 do not close sequentially when the second portion 62 of inner baffle 51 moves from the first position to the second position, but rather, the teeth of the baffle walls 51, 52 on opposite ends of the flow passage 50 (i.e., some on the inlet end and some on the outlet end) close at the same time. This allows the moving portion 62 of inner baffle 51 to gradually lengthen the extent of the flow passage 50 as supply line fluid pressure increases and to gradually shorten the extent of the flow passage 50 as supply line fluid pressure decreases without having to worry about trying to sequentially close the baffles of the pressure-reducing passage 50.

In alternate embodiments, it should be understood that alternate portions of the emitter body 20 may be moved to compensate for increases in fluid line pressure, either in conjunction with or in lieu of those discussed above. For example, in one alternate form, the emitter body 20 may be designed so that additional sections of the baffle walls 51, 52 may be moved to compensate for pressure increases in the supply line 70. More particularly and as illustrated in FIGS. 2A-D, both the inner baffle wall and outer baffle wall may be designed to move and lengthen the flow path to compensate for increases in supply line fluid pressure. For convenience, items which are similar to those discussed above with respect to emitter 10 in FIGS. 1A-F will be identified using the same two digit reference numeral in combination with the prefix "1" merely to distinguish one embodiment from the other. Thus, the emitter body identified in FIGS. 2A-D is identified using the reference numeral 120 since it is similar to emitter body 20 discussed above. Similarly, the inlet, outlet and pressure-reducing flow channel are identified using reference numerals 130, 140 and 150 since they are similar to the above-mentioned inlet, outlet and flow channel 30, 40 and 50.

While the emitter body 120 of FIGS. 2A-F defines both a pressure-reducing flow channel 150 and a two part pressure compensating mechanism 160 having an elastomeric portion 161 and moveable baffle portion 162 like the embodiment of FIGS. 1A-H, the moveable baffle portion 163 in FIGS. 2A-F is made up of portions of the inner and outer baffle walls 151, 152 rather than just the inner baffle wall 151. More particularly, the inner and outer baffle walls 151, 152 move to compensate for fluid pressure increases and decreases in the supply line fluid. In the form illustrated, the central or inner baffle wall 151 tapers at its distal end into a tapered tongue-type structure or projection 163 to form a first moveable structure and the outer baffle wall 152 defines a mating fork or groove-type structure 164 that corresponds in shape to the tongue-type structure 163 to form a second moveable structure.

As best illustrated in FIG. 2F, the tongue and fork or groove structures 163, 164 cooperate with one another so that when the floor 161 of the flow channel 150 rises in response to increases in supply line pressure, the tapered structures 163, 164 both rise toward the inner surface of the tube 170, thereby reducing the amount of fluid that can flow over the upper surfaces of the tapered structures 163, 164 and effectively lengthening the flow channel 150 and reducing the cross-section of the flow channel 150 to compensate for the increase in supply line fluid pressure. Similarly, when the floor 161 of flow channel 150 falls in response to a decrease in supply line pressure, the tapered structures 163, 164 both move away from the inner surface of the tube 170, thereby increasing the amount of fluid that can flow over the top of the upper surfaces of the tapered structures 163, 164 and effectively shortening the length of the flow channel 150 and increasing the cross-section of the flow channel 150 to compensate for the decrease in supply line fluid pressure as illustrated in FIG. 2E.

In the form illustrated, the upper surfaces of the tapered structures 163, 164 never fully seal against the inner wall of the tube 170 when moved to their high pressure position, however, in alternate forms, the tapered structures 163, 164 could be designed such that this occurs if desired. Similarly, the embodiment of FIGS. 1A-H could be designed so that the upper surface of the tapered baffle section 62 does not seal completely against the inner surface of the tube 70, if desired.

It should be understood that in alternate embodiments, the first and second moveable structures 163, 164 of the inner and outer baffle walls 51, 52 could be swapped so that the inner baffle wall 51 terminated in a groove-type structure and the outer baffle wall 52 defined a tongue-type structure, or in yet other forms, both could define other structures meant to correspond with one another or mesh with one another to achieve the same effect of lengthening and shortening the flow channel 50 in response to increases and decreases in supply line fluid pressure, respectively, and if desired, reducing and increasing the cross-section of the flow channel 150 in response to increases and decreases in supply line fluid pressure, respectively. For example, in alternate forms, both the inner and outer baffle walls 51, 52 could define structures that correspond in shape with one another including but not limited to intermeshing U- or V-shaped structures that lengthen the flow channel 150 and reduce the cross-section of the flow channel 150 in response to increases in fluid pressure and that shorten the flow channel 150 and increase the cross-section of the flow channel 150 in response to decreases in fluid pressure.

Thus, with this configuration, an irrigation drip emitter 110 is provided for attachment to only a portion of an inner circumference of an inner surface of an irrigation drip line tube 170 having an elastomeric emitter body 120 integrally defining an inlet 130 for receiving pressurized fluid from a fluid supply source, an outlet area 140 for discharging the fluid from the body 120, a pressure reducing flow path 150 extending between the inlet 130 and the outlet area 140 for reducing the pressure and flow of fluid received at the inlet 130 and discharged through the outlet area 140, and a pressure compensating portion 160 for automatically adjusting the pressure and fluid flow reducing effect of the flow channel 150 in response to a change in pressure of the fluid supply source 170, wherein the pressure reducing flow channel 150 includes an inner baffle wall 151 and an outer baffle wall 152 that extends about the inner baffle wall 151 in a generally U-shaped manner. At least some of the upper surfaces of the baffle walls 151, 152 having a first radius of curvature that corresponds with a second radius of curvature of an inner wall of the irrigation drip line tube 170 and the inner baffle wall 151 defines a first tapered baffle structure 163 and the outer baffle wall 152 defines a second tapered baffle structure 164 positioned proximate the first baffle structure 163, with the first and second tapered baffle structures 163, 164 cooperating to form part of the pressure reducing flow channel 150 and the first and second tapered baffle structures 163, 164 tapering in height toward one another and being variably moveable between a first position wherein the upper surfaces of the first and second tapered baffle structures 163, 164 are not level with the upper surfaces of the baffle walls with the first radius of curvature so that fluid can flow over the first and second tapered baffle structures 163, 164 and a second position wherein the upper surfaces of the tapered baffle structures 163, 164 move toward and/or are at the same level as the other upper surfaces of the baffle walls with the first radius of curvature and fluid is restricted from flowing over at least a portion of the first and second tapered baffle structures 163, 164 and the cross-section of the flow channel 150 proximate the first and second baffle structures 163, 164 is reduced and the length or extent of the flow channel 150 is lengthened.

In yet other embodiments, the two part pressure compensating mechanism may use other types of moveable walls in combination with a deflecting member to compensate for changes in fluid pressure. For example, in the alternate embodiment illustrated in FIGS. 3A-G, the emitter body is designed with a plurality of fluid inlet openings with sleeves or annular walls extending therefrom, which can move in response to increases and decreases in supply line fluid pressure. For convenience, items which are similar to those discussed above with respect to emitter 10 in FIGS. 1A-F and emitter 110 in FIGS. 2A-F will be identified using the same two digit reference numeral in combination with the prefix "2" merely to distinguish this embodiment from the others. Thus, the emitter body identified in FIGS. 3A-F is identified using the reference numeral 220 since it is similar to emitter bodies 20 and 120, and defines an inlet 230, outlet 240 and pressure-reducing flow channel 250, which are similar to those discussed above (i.e., inlet 30, 130, outlet 40, 140, and pressure-reducing flow channel 50, 150). In addition, the upper surfaces of the peripheral wall of emitter body 220, inner and outer baffle walls 251, 252, and nubs 241 all have a first common radius of curvature that corresponds with a second radius of curvature of an inner wall of the irrigation drip line tube 270.

Unlike the embodiments discussed above, however, the inlet 230 of emitter body 220 comprises a plurality of inlet openings 232, 233, 234, 235, 236 and 237. In the form illustrated, the inlet openings 232-237 vary in height, with the initial inlet opening 232 being flush to the floor 261 of the pressure-reducing flow channel 250 and the remaining inlet openings 233-237 having annular walls, such as sleeves or bosses 233a, 234a, 235a, 236a and 237a, respectively, that have terminal ends that progressively extend further into the pressure reducing flow channel 250 with the terminal end of each boss moving variably from an open position wherein the terminal end of the boss is not generally level or flush with the first common radius of curvature of the upper surfaces of the baffle walls 251, 252 so that fluid can flow through the boss and into the flow channel 250, and a closed position wherein the terminal end of the boss is generally level or flush with the first common radius of curvature of the upper surfaces of the baffle walls 251, 252 so that fluid is prevented from flowing through the boss and into the flow channel 250.

In a preferred form, the upper surfaces of the terminal end of the bosses 233a-237a have a radius of curvature that is the same as the first common radius of curvature of the upper surfaces of baffle walls 251, 252 which corresponds with the second radius of curvature of the inner wall of the irrigation drip line tube 270 so that the bosses 233a-237a can close flush against the inner wall of tube 270 and prevent fluid from flowing through the boss and into the flow channel 250 when raised into engagement with the inner wall of tube 270. In addition, the height of the bosses 233a-237a are varied so that the inlets 233-237 close sequentially starting with the inlet furthest from the initial inlet opening 232 (i.e., which in the illustrated example is inlet 237) and then moving to the inlet that is the next furthest (i.e., 236), then the next furthest (i.e., 235) and so on. By closing the inlets 233-237 in this order (i.e., starting with the inlet furthest downstream and moving upstream), the emitter body 220 actually lengthens the pressure-reducing passage 250 with each sequential closing for all fluid flowing therethrough which allows the emitter to compensate for increases in the supply line fluid pressure. Conversely, as supply line fluid pressure decreases, the emitter body opens the inlets 233-237 beginning with the inlet furthest upstream and moving downstream, which allows the emitter to shorten the pressure-reducing passage 250 for some of the fluid flowing through the emitter to compensate for the reduction in supply line fluid pressure.

In the form illustrated, it is contemplated that each of inlet openings 233-237 will close during normal operation of the emitter 210, or that the emitter body 220 will be designed such that inlet openings 233-237 will normally close at some point during the operation of the emitter due to expected increases in supply line fluid pressure (i.e., that enough pressure is expected to be reached that will cause inlets 233-237 to close at some point or another). However, it should be understood that in alternate embodiments, the emitter body 220 may be designed to only shut one or more of the inlets 233-237 during normal or expected supply line fluid pressure conditions and only having the remaining inlets 233-237 close under extraordinary conditions (e.g., when supply line fluid pressures are reached that are much greater than normal or expected pressures). This can either be done by altering the size of the emitter body 220 or any of its features (e.g., inlet opening, floor thickness, baffle wall size, flow path cross-section, etc.) or by using different materials for body 220 (e.g., materials with different Durometer values, different compositions that make the body 220 harder or less flexible, etc.). Conversely, the emitter body 220 may be made of materials that allow for inlets 233-237 to close more rapidly if desired (e.g., by altering body features and/or selecting different materials as discussed above). In this way, the emitter 10 can be customized for specific applications.

Thus, with this configuration, an irrigation drip emitter 210 is provided for attachment to only a portion of an inner circumference of an inner surface of an irrigation drip line tube 270 having an elastomeric emitter body 220 integrally defining an inlet 230 for receiving pressurized fluid from a fluid supply source, an outlet area 240 for discharging the fluid from the body 220, a pressure reducing flow path 250 extending between the inlet 230 and the outlet area 240 for reducing the pressure and flow of fluid received at the inlet 230 and discharged through the outlet area 240, and a pressure compensating portion 260 for automatically adjusting the pressure and fluid flow reducing effect of the flow channel 250 in response to a change in pressure of the fluid supply source 270, wherein the pressure reducing flow channel 250 includes an inner baffle wall 251 and an outer baffle wall 252 that extends about the inner baffle wall 251 in a generally U-shaped manner. With at least some upper surfaces of the baffle walls 251, 252 having a first common radius of curvature that corresponds with a second radius of curvature of an inner wall of the irrigation drip line tube 270, and the inlet 230 includes a plurality of inlet passages 232-237 with each passage 232-237 extending from a surface of the body exposed to the pressurized fluid to the pressure reducing flow channel 250, with at least some of the inlet passages 233-237 extending through bosses each having a terminal end progressively extending further into the pressure reducing flow channel 250, the terminal end of each boss being moveable variably from an open position wherein the terminal end of the boss is not level with the upper surfaces of the baffle walls having the first radius of curvature so that fluid can flow through the boss and into the flow channel 250 and a closed position wherein the terminal end of the boss is generally level with the upper surfaces of the baffle walls having the first radius of curvature so that fluid is prevented from flowing through the boss and into the flow channel 250.

It should be understood that in alternate embodiments, the sleeves or bosses 233a-237a may take on other shapes and sizes as may be desired for specific applications. For example, in some applications, inlets with rectangular cross sections may be desired over the round inlets depicted in FIGS. 3A-G. In yet other forms, inlet passages that serve some form of pressure reduction, such as passages that define tortuous paths, may be desired. In still other embodiments, fewer or more inlet openings or bosses may be provided than those shown in FIGS. 3A-G if desired. For example, in FIG. 4, an alternate drip emitter and drip line is illustrated having an inlet made-up of a plurality of inlet openings. In keeping with the above practice, features that are common to those discussed above will use the same two-digit reference numeral, but having the prefix "3" merely to distinguish one embodiment from another.

In the form illustrated in FIG. 4, the plurality of inlets are shaped like elongated openings, such as slits or slots 330, which not only allow fluid to flow through the inlet of the emitter 310, but also help filter or deflect particulates such as grit away from the emitter 310 to help ensure the fluid flowing through the emitter 310 is free of such particulates so that the particulates do not interfere with the operation of the emitter 310. The plurality of openings 330 have longitudinal axes that parallel the longitudinal axis of the emitter 310, however, in alternate forms, it should be understood that the plurality of openings may take on a variety of different shapes and sizes and may be oriented in different ways so as not to have longitudinal axes parallel to the longitudinal axis of the emitter 310 (if even having longitudinal axes).

In alternate forms, it should be understood that the inlet or inlets of the emitter may be placed in certain positions to help determine how the emitter will operate. For example, in some forms, an inlet opening may be positioned further upstream to effectively shorten the length of the pressure-reducing flow channel and create an emitter that has a higher fluid flow rate (e.g., four gallons per hour or 4 GPH). In another form, the inlet opening may be positioned further downstream to effectively lengthen the pressure-reducing flow channel and create an emitter that has a lower flow rate (e.g., 1 GPH). In still another form, the inlet opening may be positioned somewhere in-between the above mentioned locations to create an emitter with an intermediate pressure-reducing flow channel length that has a flow rate somewhere in-between the other flow rates (e.g., 2 GPH). The changing of this inlet location could be accomplished by having a readily adjustable mold (e.g., one where the location of the inlet opening can be slid or moved between the desired locations) or, alternatively, separate molds could be made for each embodiment (i.e., one for the low flow rate emitter, another for the intermediate flow rate emitter, and another for the high flow rate emitter).

The same may be true for outlet openings. For example, when manufacturing the drip line, the location of the outlet opening may be altered to affect how the emitter will operate. The outlet opening could be located further upstream to effectively shorten the pressure-reducing flow channel and create an emitter with a higher flow rate (e.g., 4 GPH). In another form, the outlet opening may be located further downstream to effectively lengthen the pressure-reducing flow channel and create an emitter with a lower flow rate (e.g., 1 GPH). In another form, the outlet opening may be positioned somewhere between the above mentioned locations to effectively create an emitter with an intermediate pressure-reducing flow channel length that operates with a fluid flow rate somewhere between the above-mentioned flow rates (e.g., 2 GPH). The outlet opening may be formed in the drip line tubing before or after the emitter is bonded to the inner surface of the tubing, however, in a preferred form, the opening will be formed after the emitter is bonded to the inner surface of the tubing. The opening is typically formed via a die, press, awl or the like. Thus, adjustments to the location of where the outlet opening can be made by adjusting where this puncture occurs in the tubing.

In addition, in some forms, color may be added to the individual emitters and/or the drip line and methods of manufacturing same to distinguish these products or product lines from one another or to signify something relating to the items intended use or application. For example, one color may be used to identify an emitter or dip line that drips at a rate of one gallon per hour (1 GPH), another color may be used to identify an emitter or drip line that drips at a rate of two gallons per hour (2 GPH), another color may be used to identify an emitter or drip line that drips at four gallons per hour (4 GPH). In one form, emitters of different flow rates are distinguished by color so that workers can more easily determine which emitters are to be inserted into extruded tubing during assembly in order to obtain a drip line with common emitter drip rates. In another form, the extruded tubing may be made in a specific color or have a marking of a specific color to designate the flow rate of the drip emitters located therein in order to help workers and/or end users distinguish drip lines of different drip rates. In still other forms, both the emitters and the tubing may include color to specify the drip rate or intended application. In other forms, colors may be used to signify the source of fluid to be used with the emitter or drip line or the particular application for which the emitter or drip line is to be used. For example, the color purple is often used to indicate that reclaimed or recycled water is being used. Thus, the emitter or drip line could be marked with this color to indicate that the emitter or drip line is intended for these types of applications or to indicate the type of fluid that is supposed to travel through these types of emitters/drip lines. If desired, any of the embodiments and methods disclosed herein could include the addition of color for such purposes.

Turning back to the embodiment of FIG. 4, it should be appreciated that in this form, the emitter 310 includes a baffle design having teeth extending from the sides of the emitter body 320 toward one another to form the tortuous flow passage 350 without a central baffle portion. The height of each tooth is higher at the sides of the emitter body 320 than at the distal end of each tooth and, as fluid pressure increases, the floor 361 of flow channel 350 moves up toward the inner surface of the tube 370 causing the portions of the teeth closest to the sides of the emitter body 320 to close against (e.g., touch, engage, etc.) the inner surface of the tube 370 first, before gradually closing more and more of each tooth against the inner surface of tube 370 simultaneously until the floor 361 cannot move any further. Thus, rather than closing the baffle teeth consecutively or sequentially against the inner surface of tube 370 to lengthen the pressure-reducing flow passage 350 and compensate for the increase in pressure, this configuration allows each tooth to gradually close against the inner surface of tube 370 simultaneously in response to increases in line pressure thereby lengthening the pressure-reducing flow passage 350 and reducing the cross-section of the pressure-reducing flow channel 350 to form a pressure compensating mechanism 360 that compensates for increases and decreases in line pressure. For convenience, only a portion of tube 370 is illustrated in FIG. 4 so that a portion of the emitter body 320 remains visible, however, it should be understood that the tube 370 would extend over the entire emitter body 320 and that the emitter body 320 would be bonded to the inner surface of the tube in a manner similar to that discussed above.

In the form illustrated, fluid flowing through the drip line 370 enters the emitter 310 via inlet openings 330, travels through the tortuous passage 350 and then exits the emitter 310 via outlet opening 371. The pressure compensating mechanism 360 reduces the cross-section of the flow channel 350 by raising the floor 361 of flow channel 350 and pressing more of the upper surfaces of the baffle teeth into engagement with the inside surface of the tubing 370 as fluid pressure increases, and increases the cross-section of the flow channel 350 by allowing the floor 361 of flow channel 350 to move away from the inner surface of tubing 370 as fluid pressure decreases. This configuration also provides a large central flow path down the middle of the pressure-reducing flow channel 350 which allows for easier processing of grit or other particulates, particularly at start-up and shutdown of fluid flow due to the low pressures associated with same and due to the fact the portion of the flow channel 350 with the largest cross-sectional area will always remain in the middle of the emitter 310 and, specifically, at the longitudinal axis of the flow channel 350.

FIGS. 5A-B are perspective views of an alternate drip emitter and drip line embodying features of the present invention wherein the pressure-reducing flow channel is made-up of baffles with flexible teeth that move in response to fluid flow through the emitter body. In keeping with above practices, items that are common to those discussed above will use the same two digit reference numeral but with the addition of the prefix "4" to distinguish one embodiment from another. In the form illustrated, only a portion of the tube 470 is illustrated in FIG. 5A so that the details of emitter body 420 may be seen, however, it should be understood that the entire emitter body 420 would be inserted within the tube 470 and connected to an inner surface of tube 470.

The emitter 410 includes a plurality of flexible baffle walls extending from opposite sides of the emitter body 420 toward one another and in a staggered arrangement so one wall is not directly opposite a wall on the other side of the emitter body 420. In the form illustrated, the baffle walls form flexible teeth that are much narrower than those discussed above and form generally rectangular walls connected at their base to the floor 461 of the pressure-reducing flow channel 450 and on one side to the side of the emitter body 420. Thus, when fluid flows through the supply line 470, at least a portion of the fluid flows through the inlet opening 430, through the tortuous passage 450 defined by the baffle walls 452, to the outlet 440 and through outlet opening 471. As the supply line fluid pressure increases, the floor of the flow channel 461 moves toward the inner surface of tube 470 driving the tops of the baffle walls into engagement with the inner surface of the supply line tubing 470 and, thereby, restricting or reducing the cross-sectional area of the flow channel 450 and/or increasing the length of the flow channel 450 in response to the increase in pressure in order to compensate for the supply line fluid pressure increase. As the fluid pressure in the supply line continues to increase, the baffle walls 452 closest to inlet 430 flex or bend over in the direction of the fluid flow. This occurs because the pressure of the fluid is always greater than the pressure of the floor 461 raising the baffle walls 452 into engagement with the inner surface of the tube 470. As fluid pressure increases further within tube 470, more and more of the flexible baffle walls 452 will flex or bend in the direction of the fluid flow which can also help the emitter process obstructions such as grit or other particulates by allowing the baffle walls to bend so that the obstructions can be carried through the flow channel and out of the emitter 410. Conversely, when fluid pressure decreases in the supply line 470, the baffle walls cease bending and return to their normal positions (e.g., as illustrated in FIG. 5A) and the floor 461 lowers, allowing the walls 452 to move away from the inner surface of tube 470 and thereby increasing the cross-sectional area of the flow path 450 and/or reducing the length of the flow channel 450 to account for the decrease in fluid pressure. In this way, emitter 410 is equipped with a pressure compensating mechanism 460 like some of the other embodiments discussed herein.

Although the embodiment illustrated shows circular inlets and outlet openings 430 and 471, it should be understood that in alternate embodiments, these inlet and outlet openings may take on a variety of different shapes and sizes. In addition, in alternate forms, the emitter body 420 may be designed with larger pools or baths located at the inlet 430 and outlet 440 (like the embodiment of FIGS. 1A-H), instead of directly transitioning to the tortuous flow passage 450 as illustrated in FIGS. 5A-B. Furthermore, the flexible baffle walls 452 disclosed in this embodiment could easily be used in any of the other embodiments disclosed herein, just like any of the features of the various embodiments discussed herein could be mixed and matched together to form another embodiment regardless of which embodiment the specific feature is currently illustrated in. Thus, in one form, the flexible teeth 452 may be used in an embodiment more like that shown in FIGS. 1A-H (e.g., with a U-shaped tortuous passage). In still other forms, the flexible teeth 452 may be attached to the emitter body 420 in such a way as to be predisposed to flex or bend in a preferred direction. For example, rather than having the flexible teeth 452 bend in the same direction the fluid flows through the emitter 410, the teeth 452 could be predisposed with an angle causing the teeth 452 to bend in a direction opposite the fluid flow in order to cause more turbulence and interference with the fluid flowing through the emitter 410. As mentioned above, however, in a preferred form of the embodiment of FIGS. 5A-B, the baffle walls 452 will bend in the same direction as the fluid flow.

Yet another embodiment of an alternate drip emitter and drip line in accordance with the invention is illustrated in FIGS. 6A-D. As with the other embodiments discussed herein, this embodiment will use the same two digit reference numeral to refer to items similar to those discussed above, but will include the prefix "5" to distinguish one embodiment from the others. Thus, in the form illustrated in FIGS. 6A-D, the emitter 510 includes an emitter body 520 having an inlet 530, outlet 540 and tortuous flow path 550 extending therebetween; however, unlike the previous embodiments discussed herein, the baffle walls 552 include at least one hollow portion which fills with fluid as the supply line fluid pressure increases in order to reduce the cross-sectional area and/or increase the length of the flow channel 550 to compensate for an increase in fluid pressure.

More particularly, in the form illustrated in FIGS. 6A-D, the teeth 552 of the baffle walls are hollowed-out or define an opening or void 554 in order to allow supply line fluid to fill the void 554 of the hollow teeth 552 (or the space 554 defined by each hollow tooth) and, as supply line fluid pressure increases, to swell or enlarge the size of each tooth 552 by filling this void with pressurized fluid and thereby causing the size of the teeth to grow/expand and reduce the cross-sectional area of the flow channel 550 to compensate for the increase in the fluid pressure. A view of the bottom of emitter body 520 (which is the side of the emitter facing the fluid flowing through supply line 570) is illustrated in FIG. 6D showing the void 554 and illustrating how some of the supply line fluid is able to flow along the bottom surface of the emitter body 520, fill the voids 554 of the hollow teeth, enter the inlet 530 of the emitter and/or continue flowing down the supply line 570.

As fluid pressure increases, the floor of the emitter 561 will also move upwards and, thus, the upper surfaces of the baffle walls 552 will gradually engage more and more of the inner surface of tube 570 thereby increasing the length of the tortuous passage 550 that the fluid must flow through in order to compensate for the increase in fluid pressure. Conversely, when fluid pressure decreases, the floor 561 will drop, gradually disengaging the baffle walls 552 from the inner surface of the tube 570 and the teeth 552 will shrink or reduce in size to effectively increase the cross-sectional area of the flow path 550 and reduce the length of the tortuous passage that the fluid must flow through to compensate for the reduction in fluid pressure. Thus, like the previous embodiments discussed herein, the emitter 510 is equipped with both a pressure-reducing flow path 550 and a pressure compensating mechanism 560 for ensuring that each emitter operates uniformly and as desired.

In FIG. 6A, the supply line fluid pressure is low and, thus, the teeth of baffle walls 552 are not enlarged and the upper surfaces of the baffle walls are not fully engaged with the inner surface of the supply line tube 570. This reduces the length of the flow channel 550 that the fluid must flow through and allows for the flow channel 550 to have a maximum cross-sectional area. In FIG. 6B, the supply line fluid pressure has increased some to a generally intermediate level of pressure such that the teeth of baffle walls 552 have enlarged a bit and the upper surfaces of the baffle walls nearest the side of emitter body 520 begin to engage the inner surface of supply line tube 570. This increases the length of the flow channel 550 that the fluid must flow through and reduces the cross-sectional area of the flow channel 550 to account for or compensate for the increase in fluid pressure. In FIG. 6C, the supply line fluid pressure has increased further to a high level of pressure such that the teeth of the baffle walls 552 have grown or enlarged to their maximum size (or close to their maximum size) and the upper surfaces of the baffles fully engage the inner surface of the supply line tube 570. This further increases the length of the flow channel 550 that the fluid must flow through (thereby maximizing the amount of pressure-reduction taking place via flow channel 550) and reduces the cross-sectional area of the flow channel 550 to its smallest cross-sectional area to compensate for the increase in fluid pressure. In addition, the baffle teeth 552 in FIG. 6C are shown tipping or bending in the direction of the fluid flow (similar to that shown with respect to the embodiment of FIGS. 5A-B). Thus, with this configuration, the pressure-reducing flow channel has a first cross-sectional area at lower fluid pressures, a second cross-sectional area, smaller than the first, at higher fluid pressures to compensate for the increase in fluid pressure so that the emitter and drip line trickle fluid at a generally constant or desired rate, and a plurality of gradually decreasing cross-sectional areas as the fluid pressure increases from the pressure that exists at the first cross-sectional area to the pressure at the second cross-sectional area.

FIGS. 6B-C are perspective views of a portion of the flow channel of FIG. 6A illustrating the hollow teeth of the baffle partially enlarged and fully enlarged, respectively, in response to increasing fluid pressure showing how the cross-sectional area of the pressure-reducing flow channel in FIG. 6B has a smaller cross-sectional area than that illustrated in FIG. 6A due to an increase in fluid pressure and showing how the cross-sectional area of the pressure-reducing flow channel of FIG. 6C is even smaller than that illustrated in FIG. 6B due to a further increase in fluid pressure.

Another emitter embodying features of the present invention is shown in FIGS. 7A-I. In keeping with the above practices, this embodiment will use the same latter two-digit reference numerals to describe items that are similar to those discussed above, but will include the prefix "6" merely to distinguish one embodiment from another (e.g., emitter body will be referenced as 620 indicating it is similar to prior emitter bodies 520, 420, 320, 220, 120 and 20).

In this embodiment, the emitter 620 is made of an elastomeric material and defines a single pressure reducing flow channel or passage 650 laid out in a generally straight pattern like those illustrated in FIGS. 4-6D above, rather than a curved or U-shaped pattern like those illustrated in FIGS. 1A-3G. The flow channel 650 has a plurality of teeth extending from outer baffle walls 552 that move in response to changes in fluid pressure in order to provide a pressure compensating emitter. In this particular embodiment, however, the unitary emitter body 620 defines first and second outer baffle walls 652a, 652c that are interconnected via hinge or joint 652e. The baffles of first wall 652a extend into the flow path via teeth 652b and the baffles of wall 652c extend out into the flow path via teeth 652d. When fluid pressure increases, the walls 652a, 652c and their respective teeth 652b, 652d are moved from a first or static position wherein the walls and teeth are spaced apart from one another to a second, higher or high pressure position wherein the walls and teeth are squeezed closer together to one another thereby reducing the cross-section of the fluid passage 650 and restricting the amount of fluid that is allowed to flow through emitter 620 and reducing the flow rate of same. In this way, the entire fluid passage 650 is capable of serving as the pressure compensating member 660.

More particularly and as best shown in FIGS. 7B, 7C-E, 7G and 7I, the unitary emitter body 620 defines an inlet 630, outlet 640 and having first wall 652a and second wall 652c between the inlet 630 and the outlet 640. The first and second walls 652a, 652c define a pressure reduction or reducing flow channel 650 and having interconnecting member or interconnection 650e between one another. In this way, emitter 620 operates similar to emitter 520 (FIGS. 6A-D) in that increases in fluid pressure result in lateral or sideways movement or growth of teeth 652b, 652d to reduce the size of the flow path 650 and, in particular, the effective cross-section of the flow passage 650.

Figure 7H:
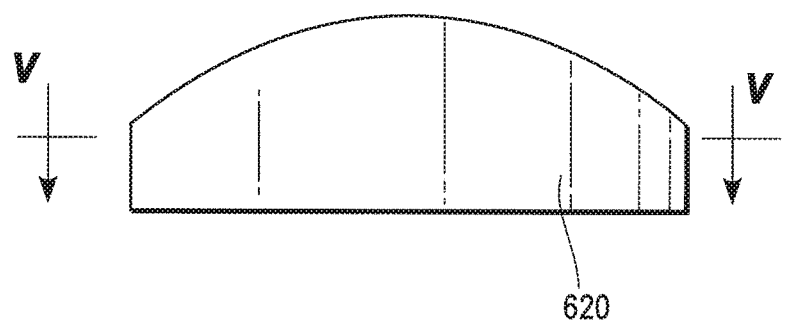
FIGS. 7H-I are front elevation and front cross-sectional views, respectively, illustrating the emitter body shape and shape of the first and second walls and the interconnection therebetween, the cross-section being taken along lines iv-iv in FIG. 7F.
Figure 7I:
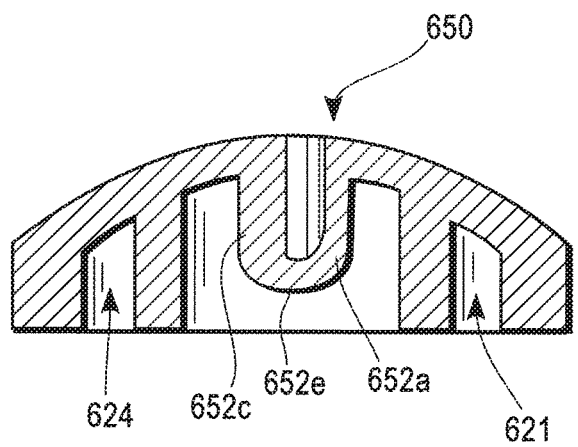
Figure 10C:
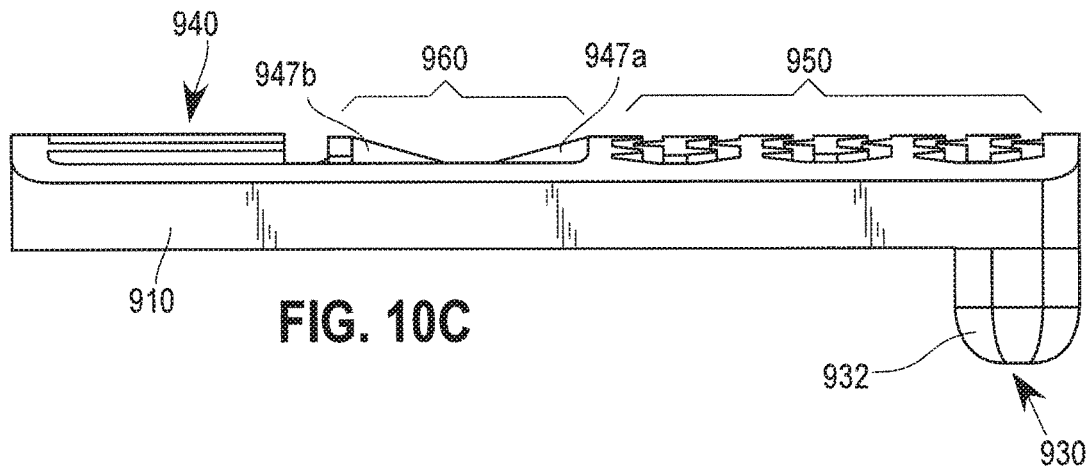
Figure 10D:
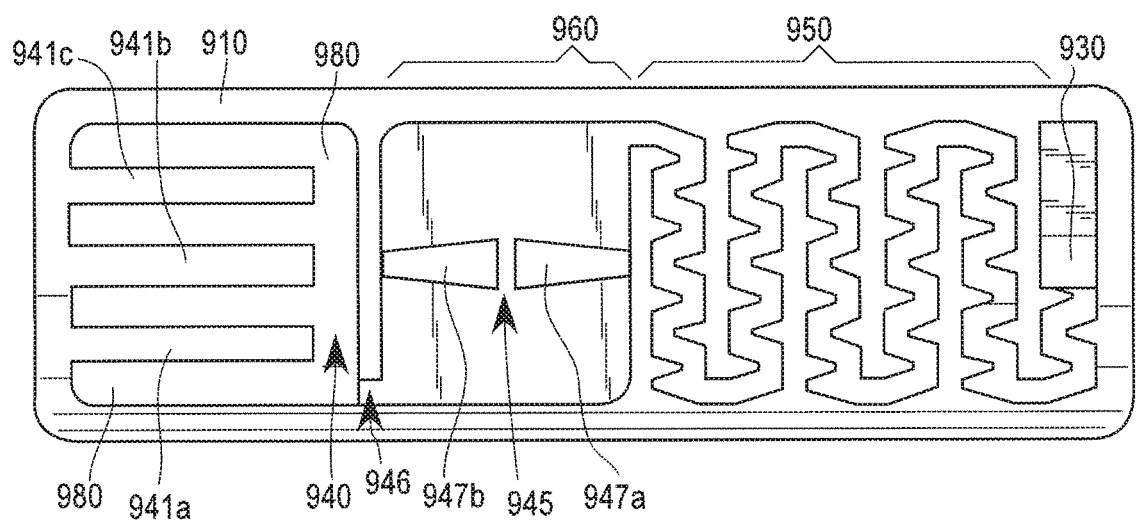
Figure 11A:
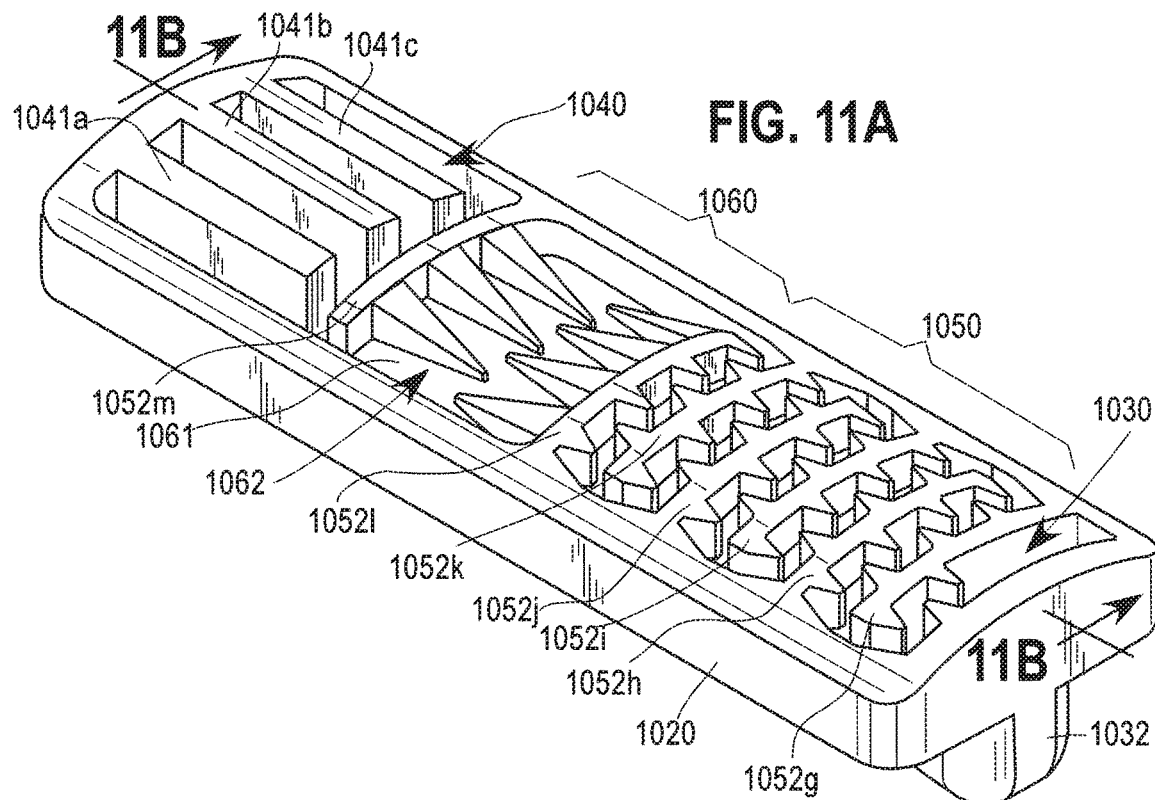
Figure 11B:
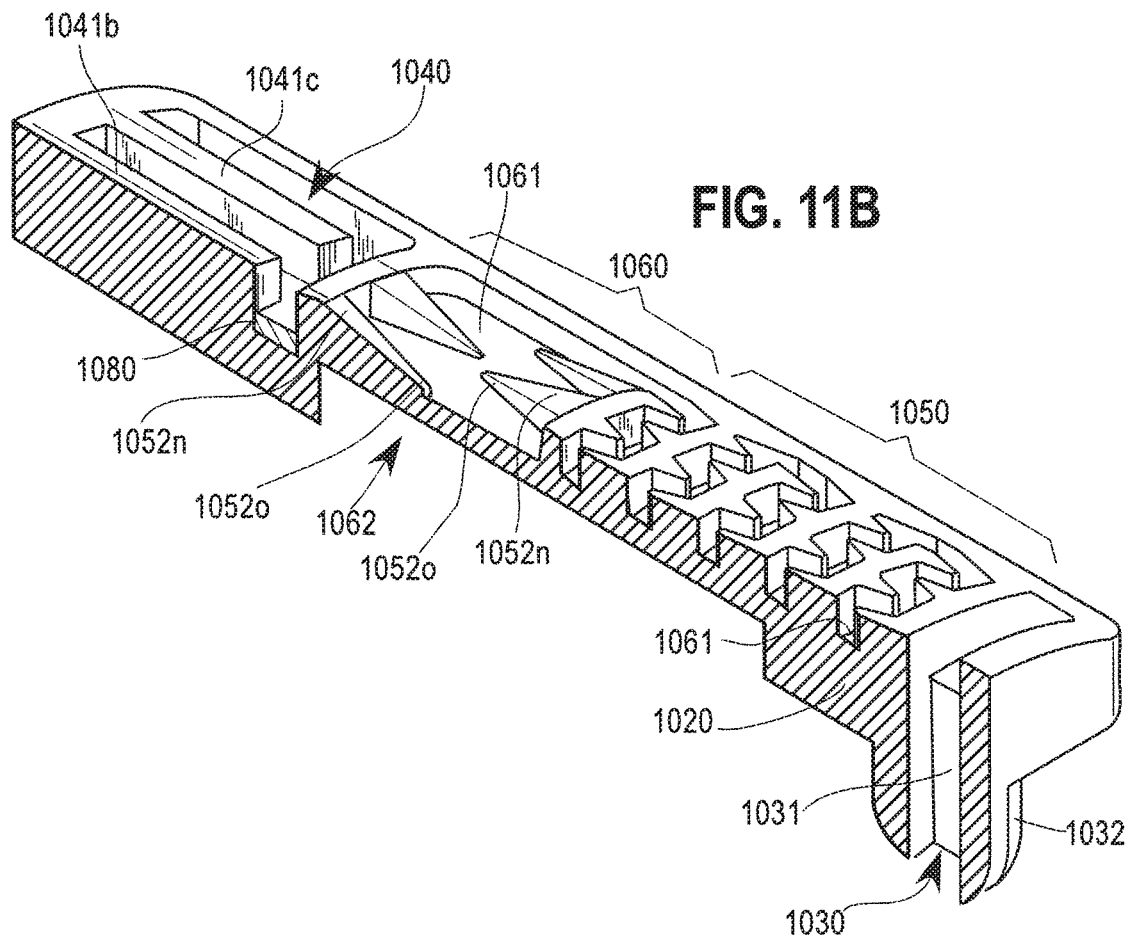

In the form illustrated in FIGS. 7E and 7I, the side walls 652a, 652c and interconnecting member 652e form an arcuate cross-sectional shape (e.g., a generally U-shape) extending down from the top of emitter 620 and running along the longitudinal axis of the emitter 620. In addition and as best illustrated in FIGS. 7D and 7E, the flow channel or passage 650 further increases in height from the inlet side or end 630 of the emitter 620 to an intermediate point of the emitter 620, but then decreases in height from the intermediate point of the emitter 620 to the outlet end 640 of the emitter 620. More particularly, the walls 652a, 652c increase in height from the inlet end of the emitter 630 to the general middle or center of the emitter 620 and then decrease in height from the middle/center of emitter 620 to the outlet portion 640 of emitter 620. Thus, the pressure reducing channel 650 has a varying cross-sectional area along its longitudinal axis and the maximum cross-sectional area of the flow channel 650 is in the intermediate portion of the flow channel 650.

In a preferred form, the alternating series of baffles 652b, 652d extending from first and second walls 652a, 652c vary in length or height in a manner corresponding with the varying length or height of walls 652a, 652c giving the first and second walls a cross-section that appears as an oval at certain planes as illustrated in FIG. 7D. This configuration means that the intermediate portion 650f of the flow channel 650 will have the maximum length or height for baffles 652b, 652d, and that this portion of the flow channel 650 will be affected first in relation to fluid pressure increases due to it offering more surface area than other portions of the flow channel 650. Thus, the flow channel 650 will be squeezed or pinched in the intermediate area 650f of the emitter first, before elsewhere along the flow channel (e.g., before the portions at or near the input and output ends 630, 640).

As best illustrated in FIGS. 7C and 7D, the baffles 652b, 652d are preferably tooth shaped, having the edges of the baffles 652b for the first wall 652a overlap with the edges of baffles 652d for the second wall 652c. In the form illustrated, the overlap is approximately twenty-thousandths of an inch (0.020") with the teeth 652b, 652d varying in length or height from thirty-thousandths of an inch (0.030") to one hundred-thousandths of an inch (0.100") and having a maximum flow gap when the first and second walls 652a, 652c are in their static or non-moved position of thirty-thousandths of an inch (0.030")(the bridge gap between first and second walls 652a, 652c being approximately fifty-thousandths of an inch (0.050"). It should be understood, however, that in alternate embodiments these dimensions may be changed and instead of having an overlap between teeth 652b, 652d, a gap may be maintained to assist with flushing the emitter 650 of obstructions such as grit (as discussed above).

Another difference with respect to emitter 620 of FIGS. 7A-I and prior embodiments is that the emitter 620 defines an outlet bath 640 that has projections such as walls or posts/stanchions 641 to prevent the outlet pool 640 from collapsing under increases in fluid pressure. In this way, these structures 641 are similar to the nubs discussed above (e.g., 41, 141 and 241), however, they connect to the outer wall of the emitter 620, the wall that defines the bath 640, rather than rising up from the surface of the floor of the outlet 640.

As with earlier embodiments, the emitter 620 has a top surface that is capable of being attached to the inside surface of a conduit (not show) at predetermined intervals thereof in order to form a drip line using said emitter. Unlike prior embodiments which used guide ribs (e.g., 25-29), the emitter body 620 uses guide recesses or slots 621 and 624 for aligning the emitter 620 and inserting same into the conduit during constructions, preferably as the conduit is extruded. The inlet 630 also preferably has a recessed opening or inlet, such as channel 631 which helps to prevent large obstructions from entering into the emitter 620 during operation within a fluid-filled drip line.

Turning now to FIGS. 8A-G, in which there is illustrated yet another emitter embodying features of the present invention, this emitter defines a series of rows of baffles transverse to the longitudinal axis of the emitter and extending into the pressure reduction flow path, with a portion of the baffles varying in height to create a structure that compensates for pressure. In keeping with the above, items that are similar to those discussed in earlier embodiments will be referenced using the same last two-digit identifier, but using the prefix "7" to distinguish one embodiment from others. Thus, in the form illustrated, the emitter body is referenced by reference numeral 720.

In the form illustrated in FIGS. 8A-G, the unitary emitter body 720 is made of an elastomeric material and defines a single pressure reducing flow channel or passage 750 laid out in a generally serpentine pattern. The body 720 has a longitudinal axis and defines an inlet 730 and outlet 740 in addition to the pressure reduction flow path 750 which connects both the inlet 730 and outlet 740. The body 720 has a series of rows of baffles 752g-m, extending transverse to the longitudinal axis of the emitter 720 and into the pressure reduction flow path 750. A first series of baffles, 752g, 752h and 752i have constant height, whereas, a second series of baffles, 752j, 752k, 752l and 752m vary in height. The baffles having a varying height, 752j-752m, have a static or normal position and a pressurized elevated position (or elevated pressure position).

In the embodiment depicted, the baffles are shaped in the form of teeth positioned about a wall wherein each varying height baffle tooth has a base 752n and a distal or terminal end 752o with the varying height being at a maximum height at the base 752n and at a minimum height at the distal or terminal end 752o. The baffle teeth are staggered or positioned to alternate with one another so that the teeth align opposite gaps between teeth members on the opposite wall defining the fluid flow passage 750.

In FIGS. 8A-G, at least two rows of the series of baffles (e.g., 752k, 752l) include varying height teeth members. An additional two rows of the series of baffles (e.g., 752j, 752m) include varying height teeth members on one side of the baffle. Baffle row 752j includes teeth of continuous height extending from one side of the row (e.g., the side facing the inlet 730) and teeth of varying height on the opposite side of the row (e.g., the side facing outlet 740). Baffle rows 752h and 752i having continuous height (including all teeth). Baffle rows 752g and 752m have teeth extending from only one side of their respective row, with the baffle row 752g being of continuous height and baffle row 752m being of varying height. Thus, with this configuration, the baffles with varying height 752j-m server as the pressure compensating member 760 for emitter 720.

Thus, when a plurality of emitters 720 are installed in a conduit to form a drip line, fluid will flow through the conduit, into the inlet of the drip emitter 720 and through pressure reducing flow passage 750. As fluid pressure increases in the conduit, the passage floor of passage 750 will push up into the flow passage 750 in at least the areas where baffles of varying height are provided (e.g., compensation portion 760) due to the spacing that exists and allows for baffle movement. This will cause the baffle teeth to move to their elevated pressure position, preferably forcing their upper surfaces to engage the inside surface of the conduit (or approaching such engagement), thereby, reducing the cross-section of the flow passage 750 in this area and restricting the amount of fluid that can flow through this region in order to compensate for the fluid pressure increase. In this way, the emitter operates similar to the emitter embodiments discussed above with respect to FIGS. 1A-I and 2A-F.

Although the embodiment depicted in FIGS. 8A-G shows specific series of baffles having continuous height and varying height, it should be understood that in alternate embodiments, more or less of the baffles 752g-m may have varying heights. In fact, in some forms, all of the baffles may be provided in constant height (for example, in situations where no pressure compensation feature is required or desired for the emitter). Alternatively, in other embodiments, all of the baffles may have some form of varying height component.

In FIGS. 8A-G, the emitter 720 preferably includes a guide recess, such as channel 721, which serves the dual role of helping position or align the emitter 720 for insertion into the conduit and helps recess the inlet 730 of emitter 720 into a recessed opening 731 which helps block larger obstructions from entering into the emitter 720 or at least blocking all flow of fluid into the inlet 730.

The emitter body 720 further defines an outlet bath 740 and the pressure reduction flow path 750 includes an outlet end at the outlet bath. In a preferred form, the unitary emitter body 720 will include at least one projection 741 in the outlet bath 740 to prevent the outlet bath from collapsing under increased fluid pressure. In the form illustrated, a plurality of projections or nubs 741 extend up from the floor of the outlet 740 to prevent collapse of the bath 740. Additional rectangular notches or voids are illustrated in FIG. 8E which show how the emitter body 720 may be designed to use less elastomeric material, which not only will have a material cost savings, but also will reduce the amount of time it takes to manufacture the emitter 720 and may potentially improve the operation of the pressure compensating portion 760 of the emitter 720 due to the fact thinner portions of elastomeric material will be more responsive to pressure increases than larger portions of elastomeric material.

Turning now to FIGS. 9A-B, there is illustrated yet another emitter embodying features of the present invention wherein a unitary emitter body defines a series of rows of baffles transverse to the longitudinal axis of the emitter and extending into the pressure reduction flow path, and a plurality of outlet baths with at least a portion of outlet baths being moveable between first and second positions, the second position being more constrictive for fluid flow than the first position. In keeping with the above, portions of this embodiment that are similar to those discussed above will use the same last two-digit reference numerals as those discussed above, but using the prefix "8" simply to distinguish one embodiment from the others. Thus, in FIGS. 9A-B, the emitter body will be referred to as body 820.

In the form illustrated in FIGS. 9A-B, the unitary emitter body 820 is made of an elastomeric material and has a longitudinal axis. The body 820 further defines a pressure reduction flow path 850 and an inlet 830 to the pressure reduction flow path 850. The body 820 includes a series of rows of baffles 852g, 852h, 852i and 852j, which are positioned transverse to the longitudinal axis of the emitter 820 and extend into the pressure reduction flow passage 850 to form a tortuous passage that is further laid out in a serpentine manner. In addition, however, the emitter body 820 further defines a plurality of outlet baths. In the form illustrated, the body 820 defines a first outlet bath 842, a second outlet bath 843 and a third outlet bath 844. The pressure reduction flow passage 850 includes an outlet end that opens to the first outlet bath 842, and a first passage 845 extends between the first and second outlet baths 842, 843. In a preferred form, at least a portion of the first outlet bath or first passage have a first position and a second position, the second position being more constrictive to fluid flow than the first position.

More particularly, in the form shown, first passage 845 is defined by wall member 847 and moves between a first non-pressurized position wherein the passage remains in its normal state and the cross-section of the passage 845 is at its initial size, and a second pressurized position wherein the first passage is elevated or moved toward the inner conduit surface to which the emitter is mounted thereby decreasing the cross-section of the first passage 845 to form a more constrictive passageway and compensate for the fluid pressure increase experienced by the emitter 820. The first passage 845 is in the shape of a notch, however, it should be understood that various different size notches or grooves could be used as desired while still maintaining the pressure compensation capabilities discussed above. One advantage to smaller configurations, however, is that a small surface area is being used to accomplish the pressure compensation and, thus, the pressure compensation member can be controlled more easily and can be produced in a way that yields more consistent results emitter to emitter.

In alternate embodiments, it should be understood that the floor of the first outlet bath 842 may alternatively be made moveable rather than first passage 845. For example, the floor of first outlet bath 842 may be configured to move between a first non-pressurized position wherein the floor remains in its normal state and the cross-section of the bath opening formed by first bath 842 is at its initial size, and a second pressurized position wherein at least a portion of the floor is pushed or extended into the first bath 842 via increased fluid pressure within the conduit to which the emitter 820 is mounted thereby decreasing the cross-section of the bath opening formed by first bath 842 to compensate for this fluid pressure increase. In still other embodiments, both the first passage 845 and first outlet bath 842 may be moveable between such positions. However, as mentioned above, in a preferred form, only the first passage 845 will be designed to move in such a way because the movement of such a small surface is easier to control and produce repeatable results from emitter to emitter.

Turning back to FIGS. 9A-B, the emitter 820 further defines a third outlet bath 844 and a second passage 846 extending between the second outlet bath 843 and the third outlet bath 844. The second passage 846 is defined by wall members 848a, 848b and differs in shape from that of first passage 845. In a preferred form, neither the second outlet bath 843 nor second passage 846 are setup to compensate for pressure and fluid flowing through the second outlet bath 843 is simply allowed to pass through to the third outlet bath 844. The conduit to which the emitter 820 is connected will define an outlet opening like drip line outlet opening 71 (mentioned with respect to FIG. 1 above) and this opening may be positioned above either the second or third outlet baths 843, 844. In alternate embodiments, it should be understood that if the desired flow rate may be accomplished through the first passage 845, the emitter 820 may be designed with only one additional outlet bath which may either result in combining the second and third outlet baths 843, 844 to provide only a second outlet bath, or result in the manufacturer being able to reduce the size of the emitter to terminate after the second outlet bath 843.

In yet other embodiments, it should be understood that at least a portion of the second outlet bath 843 or second passage 846 may also be configured to move between a third position and a fourth position, the fourth position being more constrictive to fluid flow than the third position in order to further compensate for fluid pressure changes if desired. For example, in the form illustrated, the floor of the second bath 843 could be made moveable between a third non-pressurized position wherein the floor remains in its normal state and the cross-section of the bath opening formed by second bath 843 remains at an initial size, and a fourth pressurized position wherein at least a portion of the floor is pushed or extended into the second bath 843 via increased fluid pressure within the conduit to which the emitter 820 is mounted thereby decreasing the cross-section of the bath opening formed by second bath 844 to compensate for this fluid pressure increase. Alternatively, the second passage 846 between the second and third outlet baths 843, 844, respectively, could be configured to move so that the cross-section of the passage opening reduces in size when moved from a third position to a fourth position. In still other forms, both the second outlet bath 843 and second passage 846 could be configured to move in response to increases in fluid pressure to compensate for same.

In yet other embodiments and as mentioned with respect to the first passage 845 above, the second passage 846 may be provided in a variety of different shapes and sizes. It is preferred, however, to maintain a smaller size and shape for this passage (if setup to compensate for pressure) so that the passage's operation is easier to control and to reproduce on a repeatable results from emitter to emitter. Alternatively and as mentioned above, no second passage 846 may be provided as the first outlet bath 842 may be configured to outlet fluid directly into the second and final outlet bath.

Turning back to FIGS. 9A-B, the third outlet bath 844 is connected to the second outlet bath 843 via second passage 846 and further includes projections or nubs 841 for preventing the third outlet bath 844 from collapsing in response to fluid pressure increases. As with the embodiment of FIGS. 8A-G, the rows of baffles 825g-j of emitter 820 of FIGS. 9A-B are preferably formed with teeth extending from wall members with the teeth being staggered with respect to one another so that the teeth at least partially align with the gaps created between opposing baffle teeth members to form the tortuous pressure reducing flow passage 850 therebetween. Lastly, the emitter 820 preferably includes guide recess 821 for aligning and inserting the emitter 820 into conduit and for creating a recessed inlet 831 that is protected from larger obstructions traveling through the conduit in a manner similar to that discussed above in prior embodiments.

As mentioned above, in alternate embodiments, other portions of the first, second and third outlet baths 842, 843 and 844 (including first and second passages 845 and 846) may be configured to move to compensate for fluid pressure changes. In addition, it should be understood that other features of earlier embodiments may be incorporated into the embodiment illustrated in FIGS. 9A-B and vice versa. More particularly, any of the above-mentioned features with respect to the various embodiments discussed herein may be combined or mixed and matched with one another to come-up with alternate embodiments intended to be covered herein.

An alternate embodiment of an emitter in accordance with aspects of the present invention is illustrated in FIGS. 10A-E. In keeping with the above practice, items in this embodiment that are similar to those previously discussed will be referred to using the same two-digit reference numeral but adding the prefix "9" to distinguish one embodiment from others. Thus, the emitter illustrated in FIGS. 10A-E will be referred to generally by reference numeral 910.

In the embodiment illustrated, emitter 910 has a single piece or unitary body construction and defines an inlet 930, inlet channel 931, pressure reducing flow channel 950, pressure compensating member or channel 960 and outlet 940. The pressure compensating member 960 and outlet 940 essentially form first and second baths 942, 943 divided by first and second wall members 947a, 947b with passage 945 passing therebetween, and a third or final bath 944 separated from the second bath 943 via passage 946. The emitter 910 includes an inlet protrusion or projection, such as elongated inlet sleeve 932, which extends the inlet opening 930 more towards the center or middle of the lumen of the tube 970 into which the emitter 910 is mounted (see FIG. 10E). This allows the inlet 930 to draw fluid from the center region rather than at a circumferential periphery of the inner lumen of the tube 970 to which the emitter is mounted. Since larger grit or other particulates or particles found in the fluid traveling through the drip line tube 970 tend to stay near the inner wall of the tube (near the circumferential periphery), having the sleeve 932 project the inlet 930 further into or toward the center of the inner lumen of the tube 970 helps reduce the potential that grit or other particulates will enter into and/or clog emitter 910 or prevent it from performing as desired (and particularly the larger pieces which are more likely to cause a problem with the operation of the emitter 910).

In the form illustrated, the inlet protrusion 932 forms a sleeve extending out from the emitter body 910 toward the center of the inner lumen of tube 970. The sleeve 932 has a rounded or beveled distal end and defines an inlet channel opening 931 that is generally rectangular in cross-section and connects in fluid communication the outermost inlet opening located at the distal end of the inlet sleeve 932 to the tortuous flow passage 950 and, in particular, the pressure reducing flow section of the flow channel. The inlet sleeve 932 extends from the longitudinal center of one end of emitter body 920; however, it should be understood that in alternate forms, the inlet sleeve 932 may extend from another location on the emitter body 920, such as from a corner or side of the emitter body (as will be discussed further with respect to the embodiments of FIGS. 12A-15B). It also should be understood that although the inlet sleeve 932 is illustrated as a generally oval or rounded rectangular sleeve in FIGS. 10A-E, the inlet sleeve 932 may be provided in a variety of different shapes and sizes (including without limitation length and cross-section). One advantage to the rounded edges of the inlet sleeve 932, however, is that it reduces the number of flat surfaces located on the emitter 910 which are typically prone to collecting grit and other particulates (e.g., grit build-up).

In the form illustrated, the emitter body 920 has a height ranging between one hundred thousandths of an inch (0.100") and one hundred fifty thousandths of an inch (0.150") (see dimension C in FIG. 10E), a width ranging between two hundred fifty thousandths of an inch (0.250") and four hundred thousandths of an inch (0.400"), and a length ranging between eight hundredths of an inch (0.800") and one and five hundred thousandths of an inch (1.500"). The emitter body 920 will be inserted into conventional drip tubing sizes, which vary not only in outer diameter ("OD") sizes (e.g., ¼", ½", ¾", 1", 1.5", etc.), but also vary in inner diameter ("ID") sizes due to differences in tube wall thicknesses. Thus, in a preferred form, the height of the inlet sleeve 932 (see dimension B in FIG. 10E) will be such that the opening of inlet 930 is positioned between twenty and fifty percent (20-50%) of the ID of the tubing 970. The following chart provides some exemplary height ranges for the extended inlet sleeve 932 at some of the more conventional ID tube sizes:

| | Height Range | |
|---|---|---|
| ID | 20% of ID | 50% of ID |
| 0.512" (13 mm) | 0.102" | 0.256" |
| 0.630" (16 mm) | 0.125" | 0.315" |
| 0.709" (18 mm) | 0.142" | 0.354" |
| 0.787" (20 mm) | 0.157" | 0.394" |

Although the chart indicates a height ranging between one hundred and two thousandths of an inch (0.102") and three hundred ninety-four thousandths of an inch (0.394"), it should be understood that tubing of varying sizes can be used, and thus, the actual height of inlet sleeve 932 may be above or below this range. In a preferred form, inlet sleeve 932 will be configured to be one half to one times (½× to 1×) the height of the emitter body 920 (see dimension C in FIG. 10E). Thus, using the height range specified above, this would give a sleeve height (see dimension B in FIG. 10E) of between fifty thousandths of an inch (0.050") and two hundred and twenty five thousandths of an inch (0.225"). If it is desirable to keep the size of the emitter 910 down to a minimum, sticking closer to a sleeve 932 that is one half times (½×) the size of the height of the emitter body 920 will be preferred.

The emitter 910 illustrated in FIGS. 10A-E further includes a different flow passage configuration and, specifically, a different pattern or layout to the pressure reduction portion of the flow passage and a different layout or orientation to the pressure compensation portion of the flow passage. More particularly, in the form illustrated, the pressure reduction portion of the flow path is a much more condensed serpentine pattern due to the smaller size of emitter 910 (e.g., emitter 910 is approximately one third (⅓$^{rd}$) the Size of the Embodiments Discussed previously), and the pressure compensation portion 960 includes a different orientation but yet still includes two opposing wall members 947a, 947b that tapper toward one another to form angled teeth or a notch that can be moved between low fluid pressure positions wherein maximum gaps are provided between upper surfaces of the wall members 947a, 947b and the surrounding inner surface of the tube 970 within which the emitter is mounted and high fluid pressure positions wherein the gaps between the upper surfaces of wall members 947a, 947b and the inner surface of tube 970 are at their minimum (possibly even having no gap). The movement of the wall members 947a, 947b is achieved via movement of the floor of the emitter proximate the wall members 947a, 947b. Thus, when fluid pressure increases within the inner lumen of tube 970, the floor of the emitter 910 and associated wall members 947a, 947b are moved toward the inner surface of the tube 970 thereby causing the cross sectional area of the flow passage through the emitter to be reduced at passage 945 to create a pressure drop from bath 942 to bath 943 to account for the increase in fluid pressure. This regulation causes the emitter 910 to drip fluid at a generally constant flow rate.

In the form illustrated in FIGS. 10A-E, a recess is formed in the backside (i.e., bottom or rear) of the emitter 910 below the pressure compensation portion 960 in order to thin the floor 961 to make it more responsive to increases in pressure for the fluid traveling through the inner lumen of tube 970. This recess gives the floor 961 a trampoline type effect or action and allows wall members 947a, 947b to be moved more easily between their low fluid pressure and high fluid pressure positions, similar to the moveable wall members discussed above with respect to prior embodiments. The recess extends beyond the moveable wall portion (i.e., the moveable notch or teeth portion or flipper teeth portion) of the flow path and into at least a part of the fixed tooth portion of the flow path. This configuration could be used in order to allow the floor 961 of that part of the fixed teeth portion to move in response to increases and decreases in fluid pressure in tube or line 970 to further help the emitter 910 compensate for such changes in the system. Thus, this portion of the fixed height section of the flow path may provide both pressure reduction and pressure compensation if desired. In alternate forms, however, the thinning of the floor of the fixed teeth portion will be designed not to move in such a manner despite the presence of such a recess in which case the fixed portion will only pressure reduction. It should be understood that in alternate embodiments of the invention recesses of different sizes and shapes may be used to create trampoline areas of different size and shape to achieve the desired pressure compensation effect (including without limitation those discussed in the embodiments that follow).

In a preferred form, the emitter 910 is made of any material capable of allowing for the upper surfaces of wall members 947a, 947b to be moved up toward the inner surface of tube 970 in order to reduce the cross-section of the flow channel and compensate for increased fluid pressure within tube 970. For example, the emitter 910 may be made of TPO having a Durometer reading ranging between 25 and 100 (preferably being between 50 and 75) and allowing the pressure compensation portion 960 to move between five thousandths of an inch (0.005") and thirty thousandths of an inch (0.030") and preferably between eight thousandths of an inch (0.008") and twenty-two thousandths of an inch (0.022").

As mentioned above, the emitter illustrated in FIGS. 10A-E is approximately one third (⅓$^{rd}$) the size of the emitters illustrated in FIGS. 1A-9B. This size still allows the emitter to operate within desired pressure compensation parameters, but saves a significant amount in material costs. It alternate forms, the emitter of FIGS. 10A-E may be configured so that it is slightly larger and approximately half (½) the size of the emitters illustrated in FIGS. 1A-9B. For example, this may be done in order to increase the size of the trampoline area or pressure compensation area 960 of the emitter 910 in order to improve the pressure compensation performance of the emitter.

In the form illustrated in FIGS. 10A-E, the trampoline area or pressure compensation area of the emitter makes-up one third (⅓$^{rd}$) to one half (½) of the overall emitter. In alternate forms, the pressure compensation portion of the emitter may make-up more or less of the overall emitter. For example, in a preferred form, the outlet bath would make-up one third (⅓$^{rd}$) of the emitter and the pressure compensation portion would make-up the remaining two-thirds (⅔rds) of the emitter (meaning there is no pressure reducing portion for grit to get stuck in or clog). Alternatively, a pressure reduction portion could be added and, if desired, the recess could be extended under the entire pressure reduction portion or fixed teeth portion of the flow passage so that the entire flow path or passage provides pressure compensation. If an emitter with only a pressure compensation portion and outlet bath cannot be used (i.e., one without a pressure reduction portion), in a preferred form, the pressure reduction portion will be one to one and a half times (1× to 1.5×) the size or area of the pressure compensation portion in order to provide a desired pressure drop to the fluid passing through the emitter 910. In other forms, the pressure reduction portion 950 may be incorporated into the inlet sleeve 932 and the remaining portion of the flow passage extending between the inlet sleeve 932 and the outlet bath 940 may be configured to be pressure compensating only.

In the specific embodiment illustrated in FIGS. 10A-E, the pressure compensation portion of the flow passage has a width ranging between two hundred fifty thousandths of an inch (0.250") and three hundred seventy-five thousandths of an inch (0.375") and a length ranging between one hundred twenty-five thousandths of an inch (0.125") and three hundred seventy-five thousandths of an inch (0.375"). The height (or depth) of the pressure compensation flow path ranges between twenty thousandths of an inch (0.020") and thirty thousandths of an inch (0.030"), with the overall height of the emitter again ranging between one hundred thousandths of an inch (0.100") and one hundred fifty thousandths of an inch (0.150").

The emitter 910 also includes a root growth inhibiting member, such as copper insert or body 980, which is positioned proximate to the outlet bath 940 to reduce the risk of roots growing into the outlet 940 of the emitter 910. In the form illustrated, the copper insert 980 corresponds in shape to the shape of outlet bath 940 and is, preferably, connected to the floor of the outlet bath 940 so that it cannot shift and block flow of fluid through the emitter 910 and out of the outlet 940. In one form, the copper insert 980 is formed as a plate that is fixed to the bottom of outlet bath 940 via an adhesive. It should be understood, however, that in alternate embodiments, the copper insert 980 may take a variety of different shapes and sizes and may be connected or affixed to the emitter in a variety of different ways. For example, with respect to size and shape, in alternate forms, the copper insert 980 may be shaped to fit in only a portion of the outlet bath 940 (e.g., filling only a single finger of the outlet bath 940 rather than all four fingers illustrated) or in passage 946. In a preferred form, the outlet 940 of the emitter 910 will take up no more than one third ($\frac{1}{3}^{rd}$) of the emitter's total size, thus, the copper insert 980 will preferably have a size that is less than one third ($\frac{1}{3}^{rd}$) the overall emitter size.

With respect to securing the copper insert 980 to emitter 910, in alternate forms, the insert 980 may be secured to the emitter 910 via alternate forms of fastening (heat stake, rivet, screw, pin, mating or interlocking structures (e.g., tongue and groove configuration, ball and/or detent, mortise and tenon, etc.), friction or press fitting, etc.). For example, the side wall of the outlet bath 940 may be designed with a lip or projection that the copper insert gets pushed past during installation in order to secure the copper insert 980 in position or prevent the insert 980 from interfering with the flow of fluid through the emitter 910 while generally maintaining the insert 980 in a desired location or position. In such a form, the lip may be located in a single spot on a side wall of the outlet bath 940. Alternatively, the lip may comprise multiple lips extending out from one or more side walls of the outlet bath 940. In still other forms, the lip may comprise a continuous lip extending around the entire outlet bath 940 or all side walls of the outlet bath 940.

In the form illustrated in FIGS. 10A-E, the emitter 910 may be provided in a plurality of different flow rates (e.g., 1 GPH, 2 GPH, 4 GPH, etc.). The emitter 910 may be altered in a variety of different ways to control flow rate of the emitter. For example and without limitation, the gap between moveable wall members may be adjusted to achieve different flow rates, the cross-sectional area of the flow passage of the emitter may be altered, and the number of fixed or moveable teeth can be adjusted to achieve different flow rates. In one form, the gap between the moveable wall members 947a, 947b (illustrated as passage 945) may be widened or narrowed in order to change the cross-sectional area of the flow passage to provide emitters of differing flow rates. For example, the gap between wall members 947a, 947b can be widened to allow more fluid to flow through the emitter to provide an emitter with a higher GPH flow rate. Conversely, the gap between wall members 947a, 947b can be narrowed in order to let less fluid flow through the emitter to provide an emitter with a lower GPH flow rate.

In another form, the cross-sectional area of other portions of the flow passage may be changed to provide emitters with different flow rates. For example, the floor or depth of the flow passage (either in the pressure reduction portion or the pressure compensation portion, or both) may be lowered to create a passage with a larger cross-sectional area that allows more fluid to flow through the emitter, thereby providing an emitter with a higher flow rate. Conversely, the floor of the flow passage may be raised to reduce the cross-sectional area of the flow passage so that less fluid can flow through the emitter, thereby reducing the flow rate of the emitter.

In still other forms, the number of teeth can be adjusted for the flow passage to provide emitters with different flow rates. For example, in one form, the number of fixed teeth (i.e., fixed-height teeth or non-moving teeth) may be increased to achieve a more tortuous path for additional pressure reduction and, thus, lower flow rate. Conversely, the number of fixed teeth can be reduced to achieve a less tortuous path for less pressure reduction and, thus, a higher flow rate. Alternatively, the number of moveable teeth (e.g., wall members 947a, 947b) may be increased or decreased to achieve more or less constrictions to produce greater or less pressure compensation, respectively, for achieving different flow rates.

In still other forms, the height of the moveable teeth may be adjusted to provide emitters with different flow rates. For example, moveable teeth having greater height may be used to reduce the amount of pressure required in order to saturate the pressure compensation section of the flow passage. Conversely, moveable teeth having less height may be used to increase the amount of fluid pressure the emitter can account for before reaching its saturation point.

In FIGS. 11A-E, an alternate form of emitter is illustrated having moveable teeth that can be adjusted to provide emitters with different flow rates as discussed above. In keeping with the above practices, items associate with this emitter that are similar to those discussed above will use the same two digit reference numeral but having the prefix "10" added to distinguish one embodiment from the others. Thus, in FIGS. 11A-E, the emitter is referenced as emitter 1010 and includes a single piece or unitary emitter body 1020 defining an inlet 1030 and outlet 1040. Like the embodiment of FIGS. 10A-E, the emitter 1010 of FIGS. 11A-E includes an elongated inlet protrusion, such as sleeve 1032, which is centrally located on one end of the emitter body 1020 and allows the emitter 1010 to draw fluid from the tube within which it is installed from a region closer to the center of the inner lumen of the tube and away from where larger pieces of grit or particles collect along the inner wall of the tube. The inlet sleeve 1032 preferably includes rounded edges to reduce the number of flat surfaces located on the emitter where grit build-up can occur. The emitter 1010 also includes outlet walls 1041a, 1041b, 1041c, which support the outlet bath 1040 and prevent the floor of the outlet bath 1040 from collapsing toward the adjacent inner surface of the tube as fluid pressure increases within the supply line or tube. A root growth inhibiting member, such as copper insert 1080 is also present in the outlet bath 1040 to hinder roots from obstructing the operation of the emitter 1010.

Unlike the embodiment of FIGS. 10A-E, however, the embodiment of FIGS. 11A-E includes a plurality of moving teeth 1062 staggered apart from and opposing one another in the pressure compensation section 1060 of the emitter 1010. The emitter 1010 has a notch or recess formed on the backside forming the trampoline area of the emitter so that the floor 1061 of the flow path can move the moveable teeth 1062 between their low pressure position wherein the upper surfaces of the moveable teeth are spaced apart from the inner surface of the tube or drip line within which the emitter is installed and their high pressure position where the floor 1061 pushes the teeth up toward the inner surface of the tube until the upper surfaces of the moveable teeth 1062 engage the inner surface of the tube. The movement of the moveable teeth or flippers 1062 into their high pressure position reduces the cross-sectional area of the flow passage so that less fluid can travel through the emitter 1010 as a means for compensating for increased line pressure within the tube and to keep the flow rate of fluid through the emitter 1010 relatively constant.

The dimensions specified for the emitter of FIGS. 10A-E apply equally well for the emitter of FIGS. 11A-E, and it should be understood that the alternate embodiments discussed with respect to FIGS. 10A-E equally apply for the embodiment of FIGS. 11A-E, as well. For example, in alternate forms, the height of inlet sleeve 1032 may be adjusted as needed to get the emitter to draw fluid more from the center region of the tube. In addition, the emitter could be configured with a pressure reduction flow passage only rather than both a pressure reduction portion and a pressure compensation portion. In still other forms, the pressure reduction portion could be incorporated into the inlet sleeve 1032 with the remainder of the flow passage between the sleeve 1032 and the outlet bath 1040 being pressure compensating.

Similarly, it should be understood that the alternate ways for providing emitters of varying flow rate equally apply to the embodiment of FIGS. 11A-E. For example, the depth of the flow passage or a portion of the flow passage could be adjusted to provide emitters of varying flow rates (e.g., 1 GPH, 2 GPH, 4 GPH, etc.). Alternatively, the height or number of the teeth members (either the fixed or the moveable) can be adjusted to provide emitters of varying flow rates. In still other forms, the gap or spacing between the teeth members may be adjusted to provide emitters of varying flow rates.

Figure 12A:
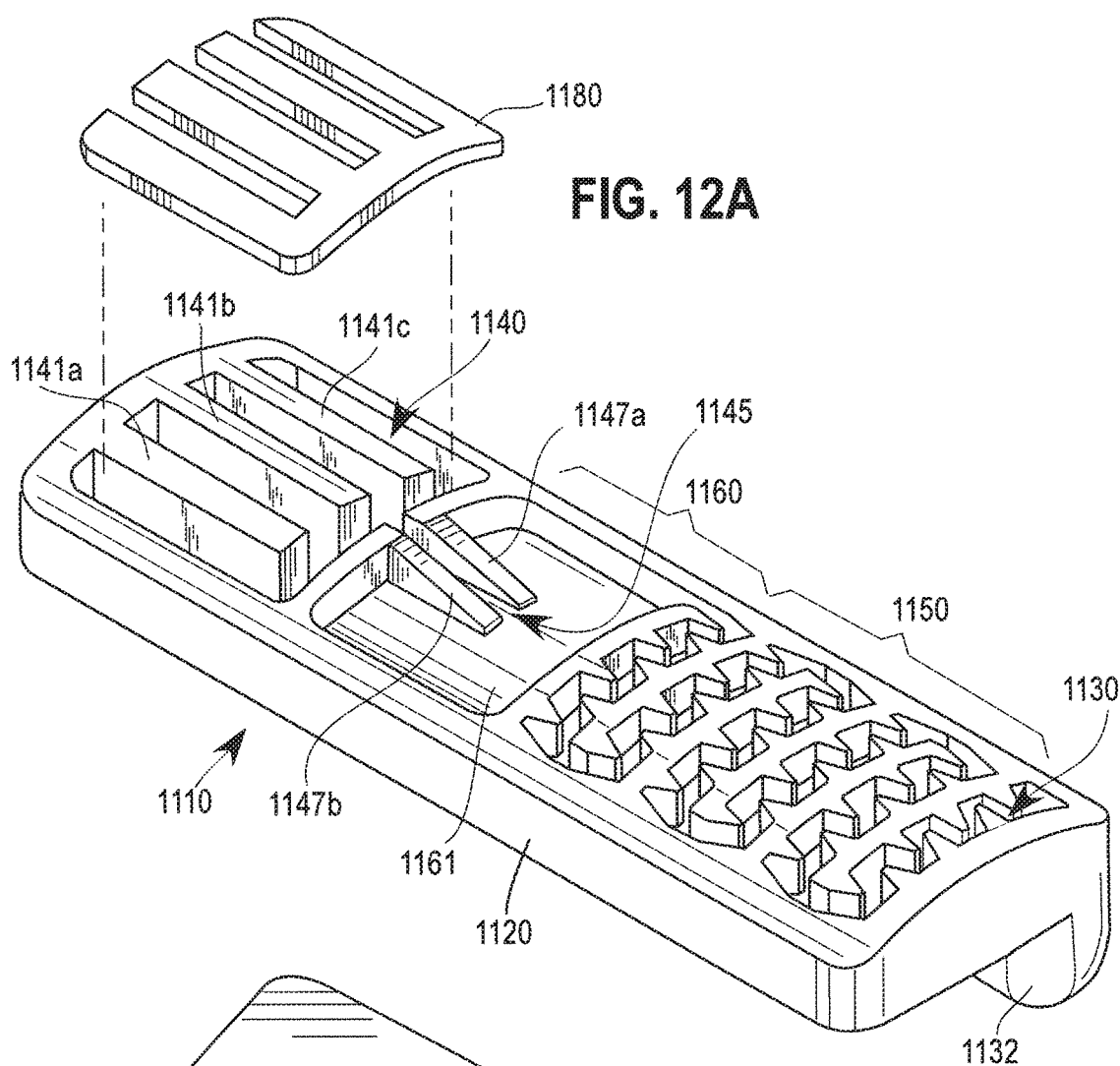
FIGS. 12A-B are top and bottom perspective views, respectively, of an alternate emitter embodying features of the present invention wherein a unitary elastomeric body defines an inlet, pressure reduction and compensation section and outlet bath having an alternate pressure compensation design with the root growth inhibitor exploded from the emitter body in FIG. 12A.
Figure 12B:
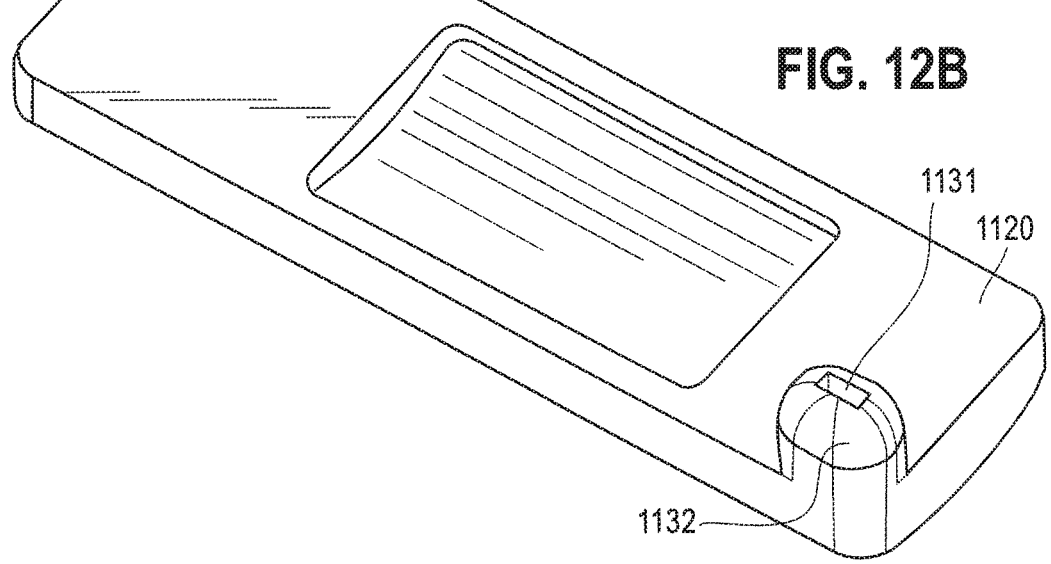

Another emitter embodiment in accordance with the invention is disclosed in FIGS. 12A-B. In keeping with the above practice, items with respect to this emitter that are similar to those discussed in the embodiments above will use the same two-digit reference numeral but add the prefix "11" to distinguish one embodiment from another. Thus, in FIGS. 12A-B, the emitter is referenced by reference numeral 1110 and comprises a unitary body 1120 that defines an inlet opening 1130, flow passage and outlet bath 1140. Like the embodiments of FIGS. 10A-11E, the emitter 1110 of FIGS. 12A-B includes an elongated inlet 1032, outlet bath walls 1141a, 1141b and 1141c, and a root growth inhibiting member, such as copper insert 1180 (shown exploded from the emitter body for purposes of illustrating its presence).

Unlike the embodiments of FIGS. 1A-11E, however, the emitter 1110 of FIGS. 12A-B has an elongated inlet sleeve 1032 that is positioned at a corner of the emitter body 1120 rather than centrally located on the end of the emitter. This configuration allows the length of the pressure reduction portion 1250 of the tortuous flow passage to be maximized as it starts from the corner of the emitter body 1220, rather than in the middle of the body 1220, as is done in the emitter of FIGS. 10A-11E.

Emitter 1110 of FIGS. 12A-B further includes a different configuration or layout to the pressure compensation portion 160 of the emitter 1110. Specifically, the emitter uses first and second moveable wall members 1147a, 1147b, respectively, to compensate for increase in fluid line pressure. When in the low pressure position (illustrated), the walls 1147a, 1147b and floor 1161 remain in their static state and allow fluid to flow over the top surfaces of walls 1147a, 1147b. However, when fluid line pressure builds, the floor or trampoline area 1161 of pressure compensating portion 1160 moves upward toward the inner surface of the tube to which the emitter is mounted until the upper surfaces of walls 1147a, 1147b seal against the inner surface of the tube (or approach this point), which reduces the cross-sectional area of the passage 1145 through which the fluid passes and thereby compensates for the increase in fluid line pressure.

As previously mentioned, the alternative embodiments covered above apply equally to the embodiment of FIGS. 12A-B. For example, although the copper insert 1180 is adhered to the floor of the emitter outlet bath 1140, it should be understood that in alternative embodiments the insert 1180 could be connected to the emitter in a variety of different ways (e.g., heat stake, rivet, screw, pin, mating or interlocking structures (e.g., tongue and groove configuration, ball and/or detent, mortise and tenon, etc.), friction or press fitting, etc.). Similarly, the dimensions of the emitter 1110 or any of its parts could be altered as discussed above in order to cater to a particular application.

Figure 13A:
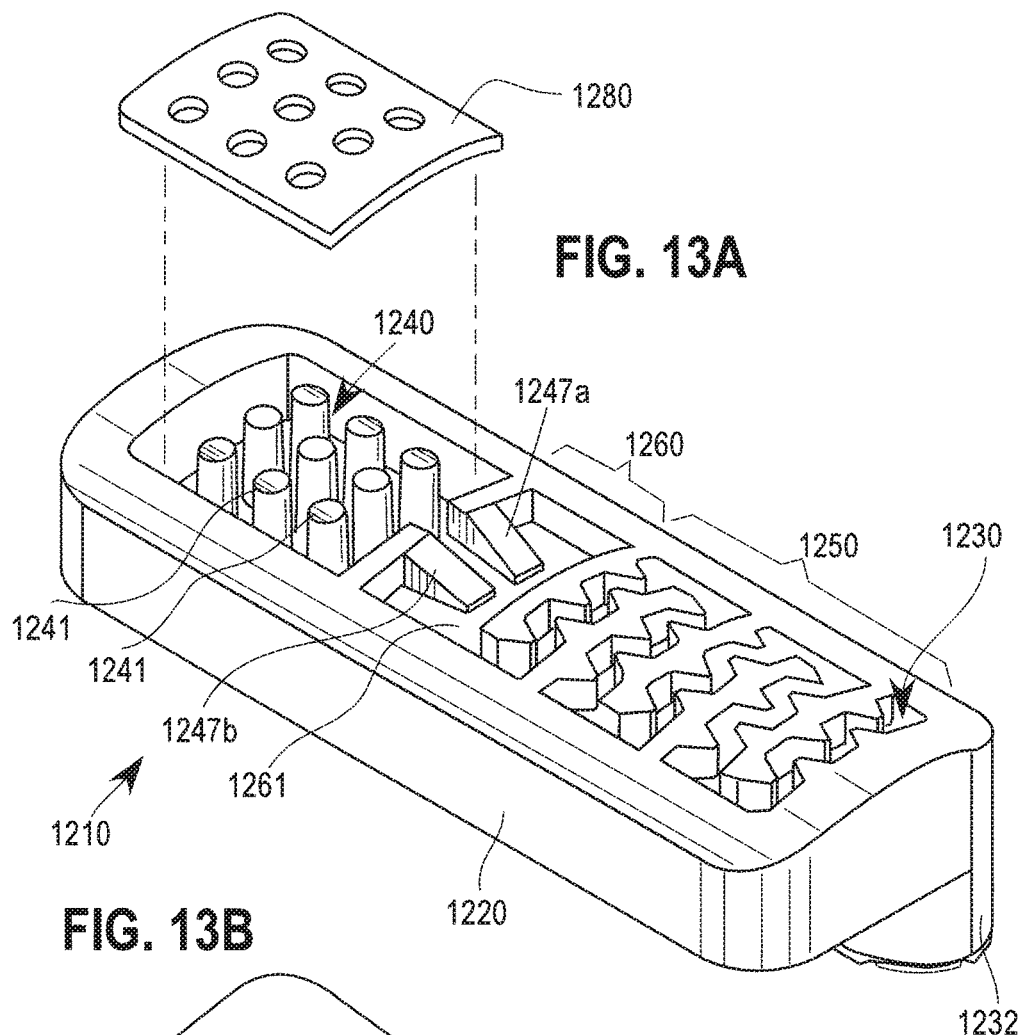
FIGS. 13A-B are top and bottom perspective views, respectively, of an emitter embodying features of the present invention wherein a unitary elastomeric body is illustrated with an alternate inlet, flow path and outlet, with the root growth inhibitor exploded from the emitter body in FIG. 13A.
Figure 13B:
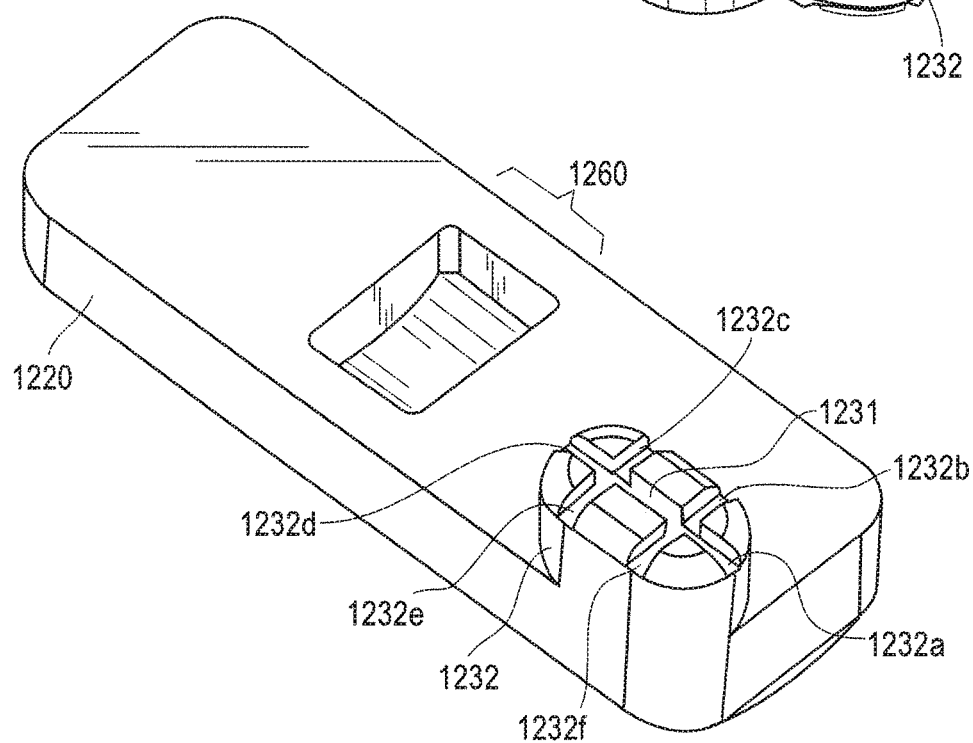

Yet another form of emitter in accordance with the invention is illustrated in FIGS. 13A-B. In keeping with the above, items that are similar to those discussed above will be numbered using the same later two digit reference numeral but adding a prefix "12" to distinguish one embodiment from the others. In the form illustrated, the emitter 1210 includes a single piece body 1220 defining an inlet opening 1232, flow path and outlet 1240. The emitter further includes an inlet protrusion, such as sleeve 1232, which extends from a corner of the emitter body to maximize the length of the tortuous flow passage 1250. A pressure compensation configuration 1260 similar to that described with respect to FIGS. 12A-B is also disclosed in which moveable walls 1247a, 1248b are allowed to move from a low pressure position to a high pressure position in response to increased line pressure to help compensate for the increase in pressure.

Unlike the prior embodiments of FIGS. 10A-12B, however, emitter 1210 of FIGS. 13A-B includes a filter in the distal end of the inlet sleeve 1232 to block relatively large particles (e.g., grit, particulates, etc.). Specifically, the distal end of sleeve 1232 includes a plurality of slots, such as filter channels 1232a, 1232b, 1232c, 1232d, 1232e and 1232f that are used to help block larger particles of debris or grit from entering into the inlet channel 1231 of emitter 1210. The network of channels 1232a-f further reduces the likelihood that a piece of debris or build-up of debris could block all fluid from flowing through the emitter 1210. Rather, such large objects would likely be blocked by the outermost surfaces of the inlet sleeve 1232, while fluid is allowed to work its way through the channels 1232*a-f* and continue to flow through emitter 1210.

The emitter 1210 of FIGS. 13A-B further includes projections or nubs, such as posts 1241, in the outlet bath 1240 instead of walls (like those shown in FIGS. 10A-12B). The posts 1241 prevent the floor of the outlet bath 1240 from collapsing in toward the inner surface of the tube in which the emitter is mounted when line pressure increases in the tube so that the emitter continues to allow fluid to flow through the emitter as desired. In view of this configuration, the shape of the root growth inhibiting member (e.g., copper insert 1280) is also changed to mate with the posts 1241. Specifically, the insert 1280 defines a plurality of mating openings that correspond to the location of posts 1241 so that the insert 1280 can be positioned within the outlet bath 1240 of the emitter 1210. In a preferred form, the posts 1241 and openings in insert 1280 are configured to allow the insert 1280 to rest flush against the floor of the outlet bath 1240 so that the insert 1280 can be adhered to the floor of the outlet bath 1240. This may require the insert 1280 to have a slight bend that tracks the curvature of the floor of the outlet bath 1240 (if any). However, in alternate embodiments, the posts 1241 and openings in insert 1280 could be configured to engage one another in a friction fit so that no adhesive is necessary. This configuration also could allow the plate to be held at a different position with respect to the posts 1241 instead of adjacent to the floor of outlet bath 1240 (although such a position is possible with this configuration as well). For example, it may be deemed desirable to position the plate 1280 closer to the outlet opening in the tubing to which the emitter body 1220 is mounted. In such a case, the size of the openings in the insert 1280 could be made so that the insert 1280 rests near the top of the posts 1240.

As mentioned above, the various alternative embodiments discussed with each embodiment are equally applicable to other embodiments, including without limitation the embodiment of FIGS. 13A-B. For example, in alternate forms, the insert 1280 does not have to fill the entire outlet bath 1240, but rather, could be a narrower plate that covers a smaller portion of the outlet bath 1240. In one form, the insert 1280 may take the form of a narrow plate that only has openings for one post 1241 or one row of posts. In another form, the insert 1280 may be configured with a different shape if desired (e.g., a triangular shape, various polygonal shapes, round or curved shapes, symmetrical shapes, asymmetrical shapes, non-planar shapes, etc.). For example, in one form, the insert 1280 may be configured to have a non-planar shape wherein the insert 1280 has a chimney portion that extends up from a planar portion to create a bulge in the tube once the emitter is mounted into the tubing which can then be used to locate and cut open the outlet in the tube to complete manufacturing process and provide a finished emitter and/or drip line. With this configuration the chimney of the copper insert 1280 would extend up into the tube outlet opening like a sleeve to further deter roots from growing toward or near this portion of the emitter and/or tubing. In still other forms, the insert 1280 may start out as one shape but be altered during the manufacturing process. For example, the insert 1280 may start out as a planar plate, but when the outlet opening is punched through the tube wall proximate the outlet bath 1240, the plate also may be punched down into the floor of the outlet bath 1240 leaving a dent in the insert 1280. This may help friction fit the insert 1280 to the emitter 1210 and/or may punch a portion of the insert 1280 partially into the floor of the emitter bath 1240 (but not through) in order to fasten the insert 1280 to the emitter 1210.

Another difference between the embodiment of FIGS. 13A-B and the prior embodiments of FIGS. 10A-12B is that the recess on the backside of the emitter that defines the trampoline area of the pressure compensation portion 1260 is smaller in size and shape and restricted to the pressure compensation portion 1260, rather than extending further under the tortuous passage of the pressure reduction portion 1250. This smaller trampoline area of pressure compensation portion 1260 is designed to make the emitter 1210 less responsive to supply line pressure increases. Specifically, the smaller area of the recess or trampoline area of the pressure compensation portion 1260 reduces the amount of movement floor 1261 will have and/or requires greater pressure to move wall members 1247*a*, 1247*b* to seal against the inner surface of the tube.

Figure 14A:
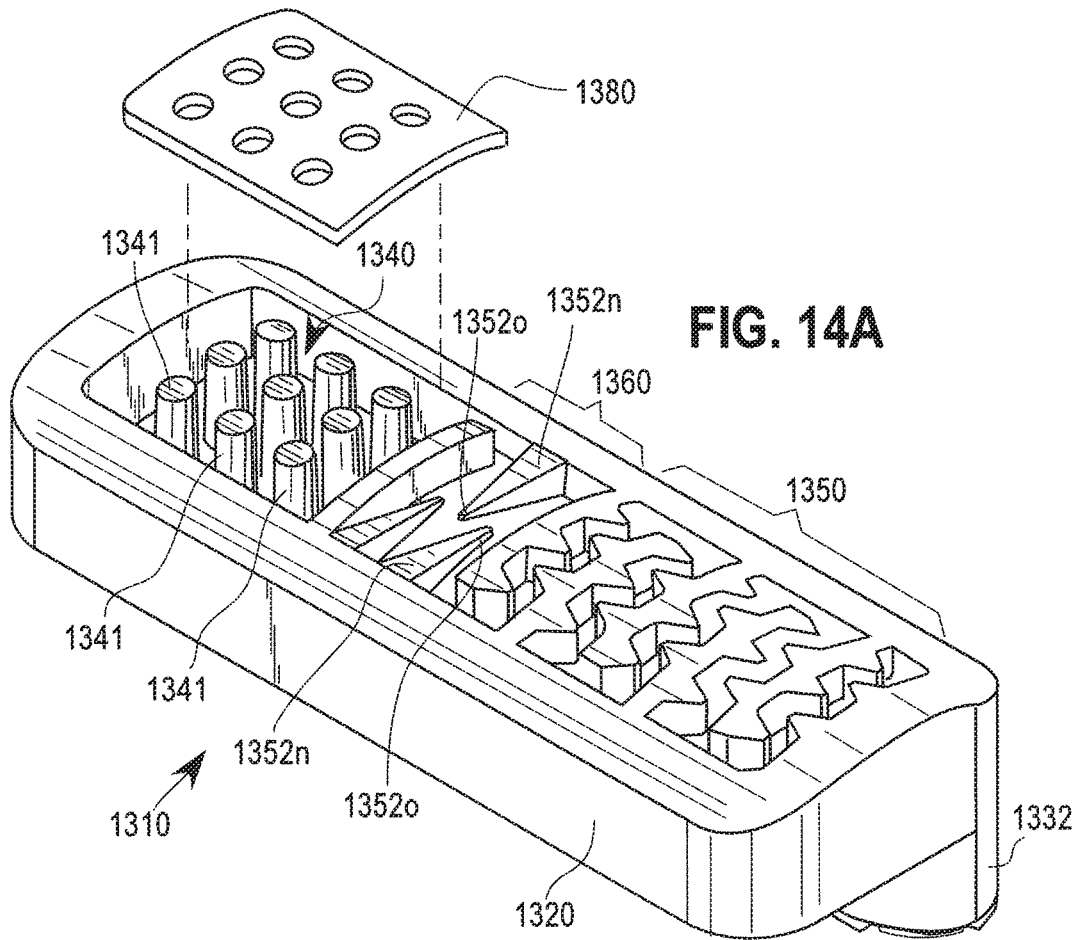
FIGS. 14A-B are top and bottom perspective views, respectively, of an emitter embodying features of the present invention wherein a unitary elastomeric body is illustrated with an inlet and another flow path and outlet, with the root growth inhibitor exploded frm the emitter body in FIG. 14A.
Figure 14B:
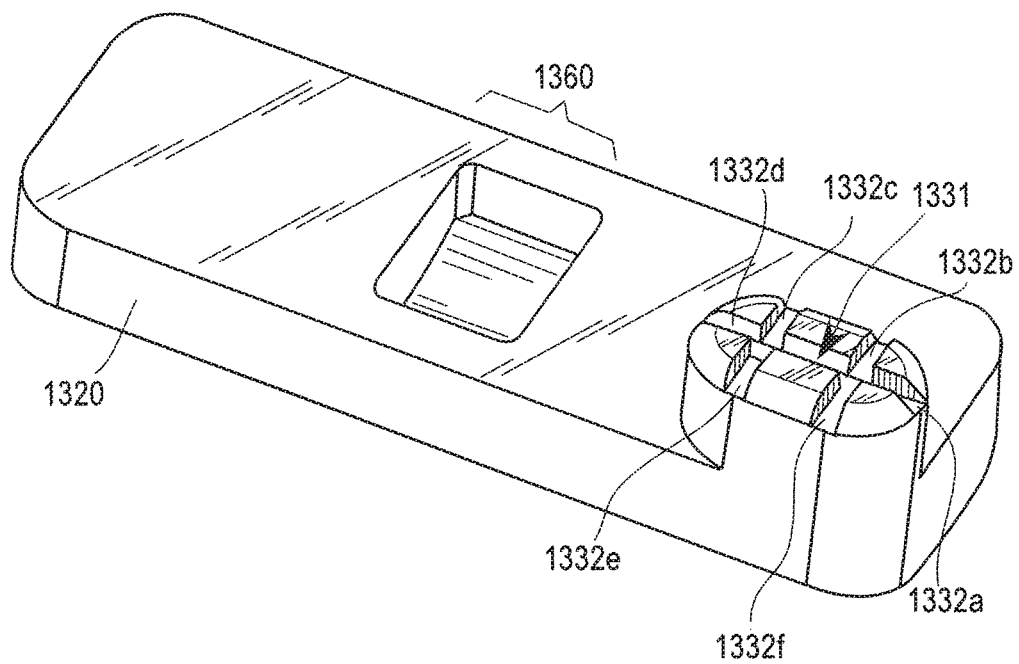

Another exemplary emitter is illustrated in FIGS. 14A-B. In keeping with the above, items that are similar to those discussed above with respect to prior embodiments will be marked designated with the same latter two-digit reference numeral but include the prefix "13" to distinguish one embodiment from another. Thus, in FIGS. 14A-B, the emitter is designated as emitter 1310 and includes a body 1320 that defines and inlet 1330, an outlet 1340 and a tortuous passage connecting the inlet 1330 and outlet 1340. Like the embodiment of FIGS. 13A-B, emitter 1310 of FIGS. 14A-B has an off-center inlet 1330 that extends down from the corner of the emitter body 1320 thereby allowing the length of the pressure reduction flow passage 1350 to be maximized. The emitter 1310 also includes an inlet projection, such as sleeve 1332, with an integral filter in the form of filter channels 1332*a*, 1332*b*, 1332*c*, 1332*d*, 13332*e* and 1332*f*, which allows the emitter to draw fluid from closer to the center or center region of the inner lumen of the tube in which the emitter is mounted and filter out relatively larger grit particles from entering the emitter 1310. The emitter further includes a smaller pressure compensation portion 1360 and a root growth inhibitor member in the form of copper insert 1380 which is positioned on outlet projections or nubs 1341.

Unlike the embodiment of FIGS. 13A-B, however, the emitter 1310 of FIGS. 14A-B includes a plurality of moveable teeth or flippers 1352 that move between a low fluid pressure position wherein the upper surfaces of the flippers are spaced apart from the inner surface of the tube in which the emitter 1310 is mounted and a high fluid pressure position wherein the upper surfaces of the flippers are moved toward the inner surface of the tube to reduce the cross-sectional area of the flow passage 1360 in response to increased fluid pressure in order to make the emitter 1310 pressure compensating. In the form illustrated, the flippers are generally triangular in shape and taper from a taller end 1352*n* to a shorter distal end 1352*o*. As best illustrated in FIG. 14B, the smaller size of the trampoline area 1360 for the emitter 1310 means that a greater amount of fluid pressure will be required in order to move the flippers between their low and high fluid pressure positions. In an alternate form, the trampoline area 1360 may be expanded like that shown in FIGS. 10A-12B, in order to make the pressure compensating trampoline area easier to move and, thus, more responsive to increases and decreases in fluid pressure. More particularly, the size of the trampoline area on one side of the emitter (e.g., see trampoline 1360 on FIG. 14B) may be made larger than the pressure compensating portion on the other side of the emitter (e.g., see moveable teeth of flippers 1360 on FIG. 14A) in order to make the emitter more responsive to fluid pressure increases or decreases. This increase in trampoline area 1360 may further be designed to convert a portion of the pressure reduction flow channel 1350 into part of the pressure compensating member 1360 (e.g., by allowing the floor of the pressure reduction flow channel to move in response to fluid pressure increases and decreases), but does not have to if it is desired to keep the pressure reduction flow channel 1350 separate and apart from the pressure compensation portion 1360.

As mentioned above, it should be understood that features of any of the above-mentioned embodiments may be incorporated into the emitter 1310 of FIGS. 14A-B if desired. For example, outlet bath walls could be used in lieu of or in addition to post members 1341. Similarly, alternate flow channel patterns and orientations may be used. The size of the emitter 1310 also may be adjusted within the range specified above.

Another emitter embodiment is illustrated in FIGS. 15A-B. In keeping with the above practice, features of this embodiment that are similar to those discussed above will use the same latter two-digit reference numeral but include the prefix "14" in order to distinguish one embodiment from the others. Thus, the emitter will be referenced using reference numeral 1410 for convenience.

In the form illustrated, emitter 1410 has a larger shape more akin to the embodiments of FIGS. 1A-9B. Unlike those prior embodiments, however, emitter 1410 includes a smaller inlet channel or raceway 1431 that is positioned in one end or half of the emitter rather than circumnavigating the entire periphery of the emitter. In addition, the emitter 1410 includes a root growth inhibitor member, such as copper insert 1480, and defines a smaller pressure compensation or trampoline area 1460. In the form illustrated, the copper insert 1480 forms a plate with openings corresponding to the post members 1441 of outlet bath 1440 so that the plate 1480 can be disposed in the outlet bath 1440 proximate the emitter outlet opening of the tube in which the emitter 1410 is mounted or affixed.

The pressure compensating portion 1460 of emitter 1410 includes a plurality of moveable teeth or flippers that are orientated such that they continue the serpentine pattern of the pressure reduction flow passage 1450. The teeth move between a low fluid pressure position (shown) wherein the upper surfaces of the teeth are spaced apart from the inner surface of the tube within which the emitter 1410 is mounted and a high fluid pressure position wherein the upper surfaces of the teeth are moved toward, if not into engagement with, the inner surface of the tube within which the emitter is mounted in order to reduce the cross-sectional area of the flow passage to compensate for increases in fluid pressure.

Figure 16A:
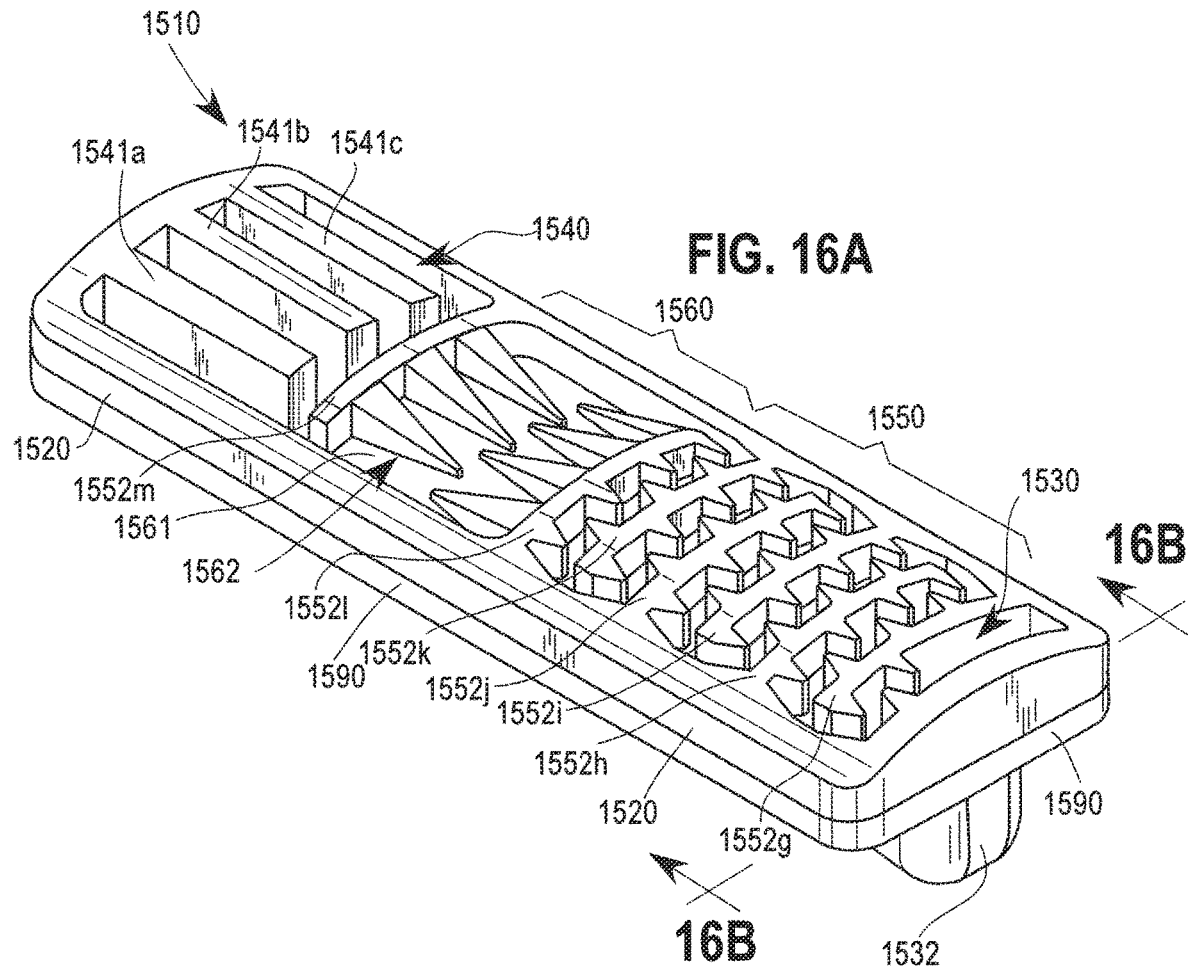
FIGS. 16A-B are perspective and cross-sectional views, respectively, of an emitter embodying features of the present invention wherein a unitary elastomeric body is illustrated equipped with a carrier for assisting in the installation of the emitter into tubing, with the cross-section of FIG. 16B being taken along line 16B-16B in FIG. 16A.
Figure 16B:
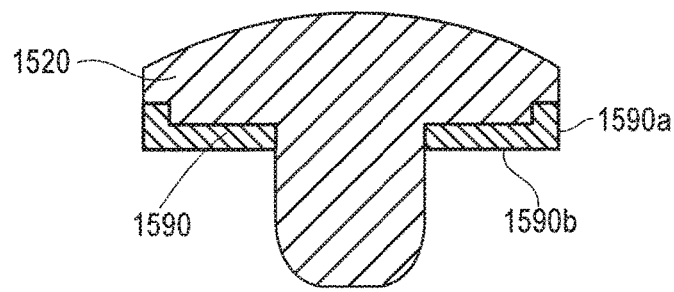

Another exemplary embodiment in accordance with the invention disclosed herein is illustrated in FIGS. 16A-B. In keeping with above practice, items of this embodiment that are similar to those discussed above will use the same latter two-digit reference numeral but include the prefix "15" to distinguish one embodiment from others. Thus, the emitter of FIGS. 16A-B will be referred to generally as emitter 1510. In the form illustrated, the emitter 1510 includes a unitary emitter body 1520 defining an inlet 1530, outlet 1540 and tortuous flow passage connecting the inlet 1530 and outlet 1540. In addition, the emitter 1510 further includes a carrier 1590 connected to at least a portion of the emitter body 1520 to assist with the insertion of the emitter 1510 into tubing or line to form a finished drip line. For example, the elastomeric material of emitter body 1520 can increase the amount of friction that exists between the emitter body 1520 and the insertion equipment used to install the emitter body 1520 into tubing. Such an increase in friction can lead to the binding-up of the insertion equipment and can ultimately cause the process to be stopped while the insertion equipment and emitters are cleared of obstructions and/or reorganized for proper insertion. To prevent this, the carrier 1590 may be used to smoothly guide the emitter body 1520 through the insertion tool and into tubing to form a finished emitter and drip line product.

In the form illustrated in FIGS. 16A-B, the carrier forms a skirt member that covers at least a portion of the lower and side surfaces of the emitter body 1520 as these are the surfaces used by the insertion tool to place the emitter into tubing. In the form illustrated, the carrier 1590 forms a generally rectangular skirt member that has vertical and horizontal wall portions 1590a, 1590b (respectively) and defines a large rectangular opening in the middle of the carrier to provide fluid access to the bottom surface of emitter body 1520. The vertical wall member allows the carrier 1590 to form a recess or cup for nesting at least a portion of the emitter body 1520 in and helps prevent lateral movement of the emitter body 1520 along the x and y axes in the carrier 1590. In a preferred form, the carrier 1590 is connected or fastened to the emitter body 1520 to further assist in preventing longitudinal movement of the emitter body 1520 along the z axis in the carrier 1590.

In the form illustrated, the carrier 1590 is made of a polyethylene and the emitter body 1520 is made of a thermoplastic or thermosetting elastomeric (e.g., TPO) and the carrier 1590 is connected or fastened to the emitter body 1520 via an adhesive. It should be understood, however, that in alternate embodiments the carrier 1590 and emitter body 1520 may be connected in a variety of different ways including without limitation, heat staking, thermal bonding, friction fit, mating structures (such as ball and detent, tongue and groove, mortise and tenon, etc.), set screws, etc. or using the shape of either of the structures themselves (e.g., as will be discussed further with respect to FIGS. 17A-B below). In a preferred form, the elastomeric emitter 1520 and carrier 1590 will be formed in a two-step molding process with either the body 1520 or carrier 1590 being formed in a first step and the other of the body 1520 or carrier 1590 being formed in a second step while still remaining in the same mold. For example, the carrier 1590 could be overmolded onto the body 1520 or, conversely, the body 1520 could be overmolded onto the carrier 1590. Overmolding one over the other in a single mold will help reduce the manufacturing time it takes to create the emitter unit and, thus, speed-up the manufacturing process for producing the final drip line product.

Emitter 1510 is similar to emitter 1010 of FIG. 11A-E, however, the inlet sleeve 1732 does not extend all the way to the forward edge of emitter body 1520 so that it will not interfere with the bracket or carrier 1590 extending around the periphery of the emitter body 1520. It should also be understood that in alternate embodiments a carrier may be used with any of the above-mentioned emitter embodiments. In addition, although the carrier of FIGS. 16A-B is in the form of a rectangular bracket with an open middle area so that the carrier 1590 only covers the outer periphery of the lower surface of the emitter body 1520, it should be understood that in alternate embodiments more or less of the emitter body 1520 may be covered by the carrier. For example, in one form, the carrier 1590 may form a solid rectangular structure covering the entire lower surface of the emitter body 1520 rather than having a large open middle area. However, in a preferred form, the carrier 1590 will define an opening that is at least as big as the pressure compensating portion of the emitter body 1520 (e.g., the trampoline area or recess in the bottom of body 1520) in order to provide fluid communication between the fluid in the drip line or tube within in which the emitter is mounted and the pressure compensation portion 1560 of the emitter 1520. In another form, the carrier 1590 may define a plurality of openings rather than one middle opening in order to further cut down on material costs so long as a sufficient amount of material is provided for the carrier 1590 so that it allows the emitter body 1520 to be smoothly moved through the insertion tool and into tubing. These plurality of openings may be located in the horizontal or bottom surface of the carrier 1590 and/or in the vertical or side surfaces of the carrier 1590 and may be made in a variety of different sizes and shapes (e.g., angled rectangular slots, rounded slots, circular openings, triangular openings, symmetrical designs, asymmetrical designs, etc.).

Similarly, although the carrier 1590 of FIGS. 16A-B illustrate a design that only covers a portion of the sides or side walls of the emitter body 1520, it should be understood that in alternate embodiments the carrier may be designed to cover more or less of the side walls of the emitter body 1520 (both vertically and horizontally). For example, in one form, the carrier 1590 may be designed with a skirt member having a vertical side wall that covers the entire side of the emitter body 1520. In such a form, the emitter body 1520 would likely not be designed with a notch or shoulder recess for receiving the carrier 1590 (like the notch or shoulder recess illustrated in FIGS. 16A-B), but rather would preferably have a planar side wall that the carrier 1590 simply covers. Again, the side wall of carrier 1590 could be designed with one or more openings to reduce or save on material costs associated with the carrier 1590 (as will be discussed further below with respect to FIGS. 17A-B). In other forms, the vertical side wall of carrier 1590 may be designed to cover only that portion of the side wall of emitter body 1520 necessary to ensure smooth movement of the emitter body 1520 through the insertion tool and into tubing. For example, in some forms the vertical side wall may not extend all the way around the side of emitter body 1520, but rather may only cover a portion of the side wall of emitter body 1520.

In another form, the carrier 1590 may be designed with no vertical wall extending about the side of the emitter body 1520. For example, if the inserter or insertion tool used to install the emitter body 1520 into tubing only contacts the bottom surface of the structure it is inserting, the carrier 1590 could be designed to only cover the bottom surface of the emitter body 1520 as that is all that is needed to ensure smooth movement of the emitter body 1520 through the insertion tool and into the tubing. As mentioned above, in such a form, the carrier body 1520 could cover as much or as little of the bottom surface of the emitter body 1520 as desired and could define one or more openings in the bottom surface in order to save material costs and to provide fluid contact to the bottom surface of the emitter body 1520 at least where the pressure compensation portion of the emitter is located (e.g., the trampoline area or recess on the bottom side of the emitter body). In the form illustrated, the carrier 1590 remains connected to the emitter body 1520 after the emitter is connected to the inner surface of the tubing and remains connected thereafter. It should be understood that in alternate embodiments, however, the carrier 1590 may be designed to disengage from the emitter body 1520 once the emitter body 1520 is connected to the inner surface of the tube if such a configuration is desired. For example, the carrier 1590 could be returned to the insertion tool to load another emitter body 1520 or could simply drop off into the tubing and blown out of the tubing before shipping.

Figure 17A:
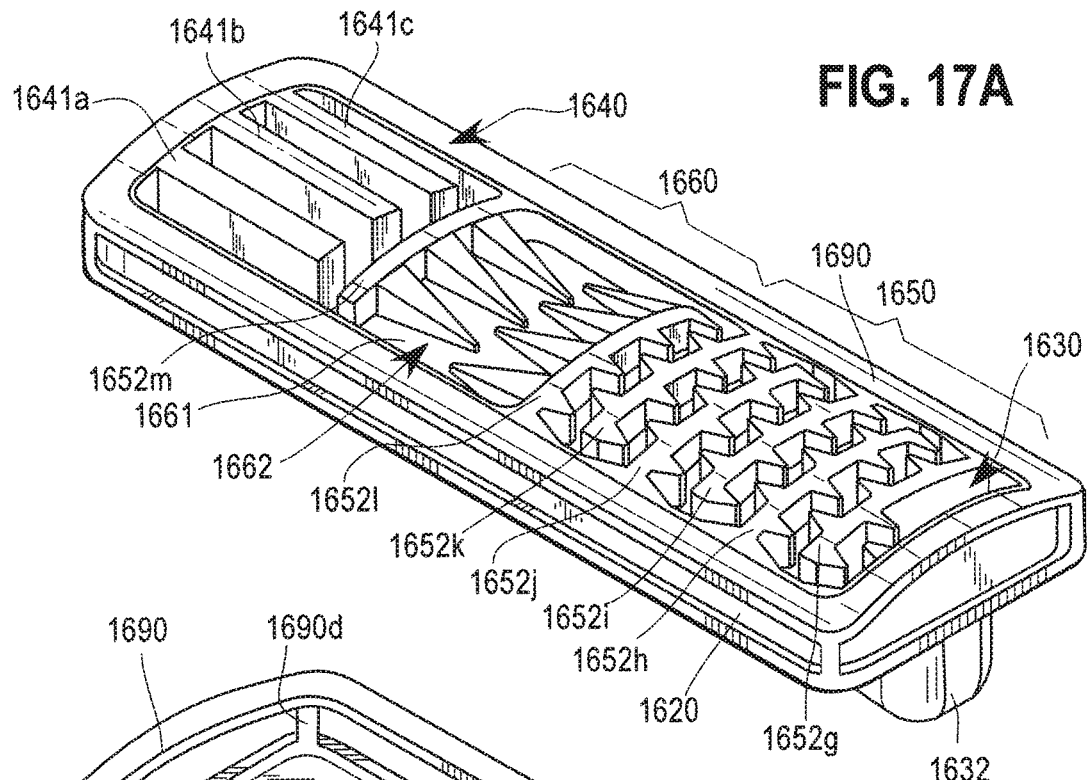
FIGS. 17A-B are perspective and exploded views, respectively, of an emitter embodying features of the present invention wherein the unitary elastomeric body is illustrated connected to a carrier or bracket in FIG. 17A for assisting in the installation of the emitter into tubing and the carrier or bracket exploded from the emitter body in FIG. 17B.
Figure 17B:
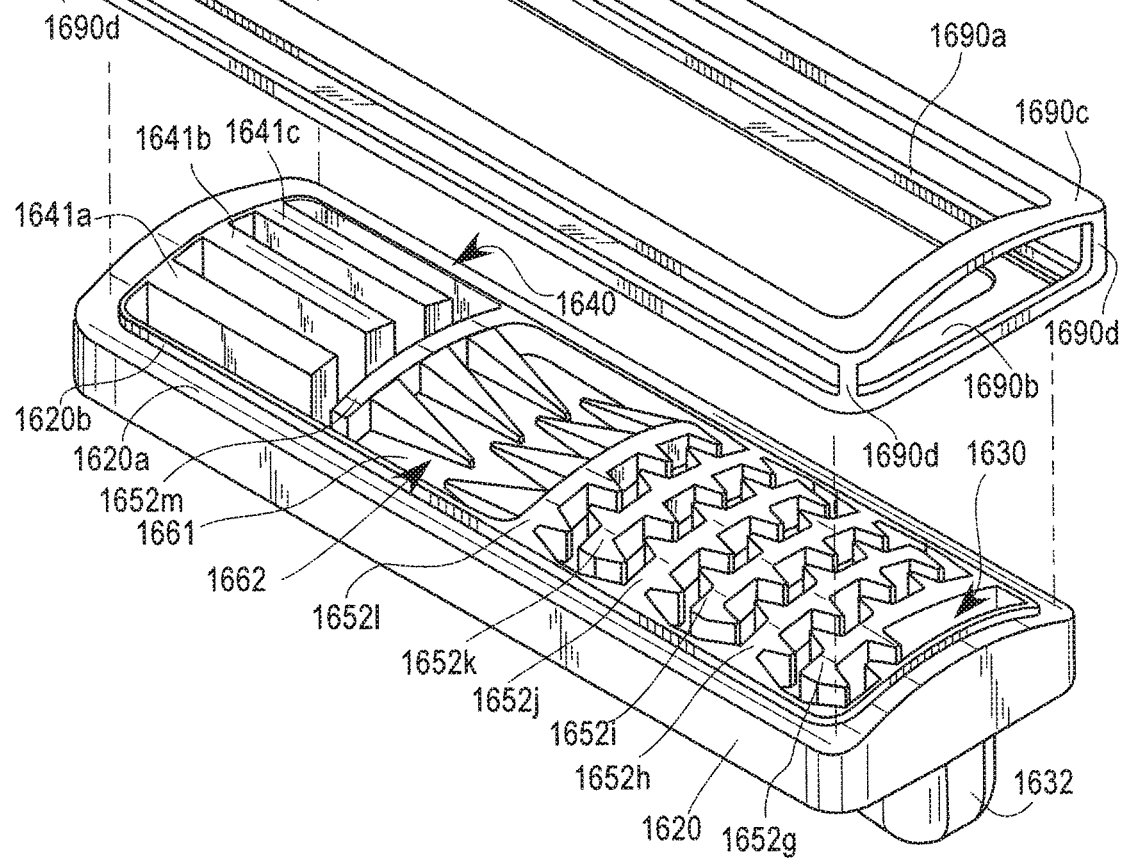

Another emitter in accordance with the invention is disclosed in FIGS. 17A-B. In keeping with the above-practice, features of this embodiment that are similar to those previously mentioned will be referenced using the same latter two-digit reference numeral but adding the prefix "16" to distinguish one embodiment from others. Thus, in FIGS. 17A-B the emitter will be referenced as emitter 1610. In the form illustrated, the emitter 1610 looks similar to the embodiment of FIGS. 16A-B and 10A-E and includes a body 1620 that defines an inlet opening 1630 and outlet bath 1640 with a tortuous fluid passage therebetween. Unlike prior embodiments, however, the emitter 1610 includes a carrier or bracket 1690 that captures portions of both the bottom and top of the emitter body 1620. More particularly, the bottom portion of carrier 1690 includes horizontal and vertical wall members 1690a, 1690b, respectively, similar to those illustrated in FIGS. 16A-B. In addition, the carrier 1690 defines a large rectangular inner opening like the carrier 1590 of FIGS. 16A-B. Unlike prior embodiments, however, the carrier 1690 further includes an upper bracket portion 1690c that extends above an upper portion of the emitter body 1620.

In the form illustrated, the body 1620 forms a recess 1620a and lip 1620b that corresponds in shape to the upper bracket 1690c so that when the carrier 1690 is installed on the emitter body 1620 the upper surfaces of lip 1620b and upper bracket 1690c are flush with one another. This configuration allows the upper surfaces of the upper bracket 1690c and emitter body parts (e.g., lip 1620b, outlet walls 1641a, 1641b, 1641c, and walls 1652g-m, etc.) to make contact with the inner surface of the tube when the emitter is installed therein so that fluid will properly flow through the inlet, along the pressure reduction portion 1650 and the pressure compensation portion 1660 of the tortuous fluid passage and into outlet bath 1640. The upper bracket 1690c is spaced apart from the lower bracket portion made-up of vertical and horizontal wall members 1690a, 1690b via risers or spacers, such as posts or stanchions 1690d, located at the corners of the carrier 1690 and emitter body 1620. Thus, the carrier 1690 defines a plurality of openings which saves on material costs and reduces the weight of the overall emitter 1610. As with the embodiment in FIGS. 16A-B, the inlet sleeve 1632 is recessed in from the edge of the emitter body 1620 or inset toward the center of the emitter body 1620 and away from the edge in order to allow the carrier 1690 to connect around the periphery of the emitter body 1620 (e.g., in order to allow bottom wall member 1690b to engage the bottom surface of emitter body 1620 about the periphery of the body 1620.

In the form illustrated in FIGS. 17A-B, the carrier 1690 captures the emitter body 1620 between the upper and lower bracket portions 1690c and 1690a,b, respectively, and the stanchions 1690d, and prevents the emitter body from moving laterally along the x and y axes and longitudinally along the z axis. This configuration secures the carrier 1690 to body 1620 without the need for further fastening such as by adhesive, bonding, etc., however, additional fasteners can be used if desired. In addition, the upper surface of upper bracket 1690c further provides a material and surface that can assist in the connection of the emitter to tubing. With the configuration of FIGS. 17A-B, cross linking between the emitter and the tugging could be enhanced by using the upper surface of upper bracket 1690c to ensure proper bonding between the emitter and the tubing.

As with the embodiment of FIGS. 16A-B, emitter body 1620 and carrier 1690 of FIGS. 17A-B are preferably made of an elastomeric material and a plastic polymer, respectively. In the form shown, the elastomeric body 1620 is made of TPO and the carrier 1690 is made of polyethylene. The tubing into which the emitter is inserted is also made of a plastic polymer, such as polyethylene. In a preferred form, the component is manufactured using a two-step molding process and a single mold wherein either the emitter body 1620 is made and then overmolded with the carrier 1690 or vice versa without the need to remove the structure from the mold before beginning the overmolding process. The component is then inserted into tubing and thermally bonded thereto during the extrusion of the tubing with the carrier 1690 providing for smooth passage of the emitter body 1620 through the insertion tool and into the tubing.

It should be understood that although two carrier embodiments have been illustrated in FIGS. 16A-17B, the carrier may be provided in a variety of different shapes and sizes. It also should be understood that various aspects of any of the above-mentioned embodiments may be combined with one another in order to provide a finished emitter and/or drip line or tubing. For example, the carrier of FIGS. 17A-B may be configured for use with the embodiment of FIGS. 1A-J. Alternatively, a portion of the carrier of FIGS. 17A-B may be used with one of the prior embodiments. In keeping with the latter, FIGS. 18A-B show another emitter in accordance with the invention, wherein a portion of the bracket of FIGS. 17A-B is used to assist in bonding an emitter similar to that depicted in FIGS. 11A-E to tubing. As with above embodiments, features of the emitter of FIGS. 18A-B that are similar to those discussed above will use the same latter two-digit reference numeral but include the prefix "17" to distinguish this embodiment from others. Thus, the emitter will be referred to as emitter 1710, which includes an inlet 1730, outlet 1740 and tortuous flow passage extending therebetween including a pressure reduction passage 1750 and pressure compensating passage 1760.

In FIGS. 18A-B, the emitter body 1720 defines a recess formed by horizontal wall 1720a and vertical wall or lip 1720b which are configured to receive bracket 1790. The depth and width of recess 1720a and lip 1720b are such that bracket 1790 is positioned so that its side wall is flush with the side of emitter body 1720 and its upper surface is flush with the upper surfaces of lip 1720b. The depth and width of the recess formed by surface 1720a and lip 1720b will preferably allow for easy overmolding of the bracket 1790 over emitter body 1720 in a two-step molding process using the same mold. It should be understood, however, that the emitter could also be formed using two separately molded pieces that are later connected to one another. With such a configuration, the lip 1720b forms a shoulder that aligns and orientates the bracket 1790 into its position on emitter body 1720. In the form illustrated, the bracket 1790 could be positioned in two orientations with one being illustrated in FIGS. 18A-B and the other consisting of the bracket pivoted one hundred and eighty degrees (180°). In alternate forms, the bracket 1790 and body 1720 could be configured to only allow assembly in one orientation, such as by adding mating structures that need to be aligned or by using shapes that only correspond with one another in one orientation. As mentioned above, however, in a preferred form, the bracket 1790 is simply molded over the emitter body 1720 using a two-step molding process and a single mold and, thus, orientation of the bracket 1790 is irrelevant as it is not assembled as a separately molded, two piece component.

With this configuration, the upper surface of bracket 1790 will be flush with or maintain the same radius of curvature as the upper surfaces of the remaining emitter body parts (e.g., uppers surfaces of outlet walls 1741a-c, flow passage walls 1752g-m, etc.) so that the emitter body 1720 and bracket 1790 will mount cleanly to the inner surface of the tubing within which the emitter is mounted and that fluid will properly flow through the inlet 1730, flow passage and outlet 1740. The bracket 1790 may further be made of a material that bonds well with the tubing to enhance cross-linking or bonding problems between the emitter and tubing.

FIGS. 19A-C illustrate yet another embodiment of an emitter in accordance with the invention disclosed herein. In keeping with prior practice, items of this embodiment that are similar to those discussed previously will be identified using the same latter two-digit reference numeral, but adding the prefix "18" in order to distinguish this embodiment from others. Thus, the emitter will be referred to as emitter 1810, which includes an inlet 1830, outlet 1840 and tortuous flow passage extending therebetween or located intermediate the inlet 1830 and outlet 1840. In a preferred form, the tortuous flow passage includes a pressure reduction passage 1850 and pressure compensating passage 1860, and the emitter is configured in an in-line non-cylindrical emitter construction for attachment to only a portion of an inner circumference or surface of the drip line tube within which the emitter is installed (e.g., attachment to an inner circumference of one hundred eighty degrees (180°) or less, and preferably less than ninety degrees (90°)).

As with prior embodiments, the emitter 1810 is formed of an integral or unitary elastomeric material that defines the inlet 1830, outlet 1840 and passages located therebetween. The emitter also includes an inlet protrusion or projection 1832 like the embodiment discussed in FIGS. 10A-E above. The elongated inlet protrusion 1832 forms a sleeve which extends the inlet opening 1830 more towards the center or middle of the tube into which the emitter 1810 is mounted (in a manner similar to that shown if FIG. 10E). This allows the inlet 1830 to draw fluid from the center region of the tubing rather than at a circumferential periphery of the tubing to which the emitter is mounted. Since larger grit or other particulates or particles found in the fluid traveling through the drip line tubing tend to stay near the inner wall of the tube (near the circumferential periphery), having the sleeve 1832 project the inlet 1830 further into or toward the center of the tube helps reduce the potential that grit or other particulates will enter into and/or clog emitter 1810 or prevent it from performing as desired (and particularly the larger pieces of grit or other particulates which are more likely to cause a problem with the operation of the emitter 1810).

In the form illustrated, the sleeve or inlet protrusion 1832 has a rounded or beveled distal end and defines an inlet channel opening 1831 that is generally rectangular in cross-section and connects in fluid communication the outermost inlet opening located at the distal end of the inlet sleeve 1832 to the tortuous flow passage 1850 and, in particular, the pressure reducing flow section 1850 of the flow channel. The inlet sleeve 1832 extends from the longitudinal center of one end of emitter body 1820; however, it should be understood that in alternate forms, the inlet sleeve 1832 may extend from another location on the emitter body 1820, such as from a corner or side of the emitter body (as discussed with prior embodiments). It also should be understood that although the inlet sleeve 1832 is illustrated as a generally oval or rounded rectangular sleeve in FIGS. 19A-C, the inlet sleeve 1832 may be provided in a variety of different shapes and sizes (including without limitation length and cross-section). One advantage to the rounded edges of the inlet sleeve 1832, however, is that it reduces the number of flat surfaces located on the emitter 1810 which are typically prone to collecting grit and other particulates (e.g., grit build-up). For example, over time a film may build up on flat surfaces of the emitter due to prolonged exposure to fluid and this film can attract grit or particles that build-up over time which can interfere with fluid flow through the tubing or drip line and/or the individual emitters installed in the tubing or drip line.

Emitter 1810 includes a pressure compensating section or portion 1860 that includes at least one stepped moveable baffle, such as a flipper or tooth member, that has an upper surface spaced apart from adjacent upper surfaces (or the uppermost bonding surfaces of the emitter 1810) and/or from the inner surface of the tubing once the emitter 1810 is inserted in same. In a preferred form, the pressure compensation portion 1860 will included at least a pair of stepped flippers 1847*a*, 1847*b* (also referred to herein as baffles, baffle teeth or tooth members, flippers, etc.) and, in the form illustrated, the emitter 1810 contains a series of alternating stepped and moveable flippers 1847*a*, 1847*b* positioned on a trampoline portion 1861 of the emitter 1810 to form a pressure compensating moveable baffle section 1862 with steps 1865 being located at the upper surface of the base or root of each baffle flipper/tooth and the tooth tapering toward the tip or distal end of each tooth. The pressure compensating section 1860 changes volume based on the pressure change of the fluid in the tube. As the pressure in the tube increases, it raises the trampoline portion 1861 which moves the stepped baffles 1847*a*, 1847*b* toward the inner surface of the tube. This reduces the volume of the pressure compensating section 1860 (e.g., reduces the cross-sectional area of the flow passage at this portion of the emitter), which in turn, restricts the flow of fluid through the pressure compensating section 1860. The change reduces the flow in coordination with an increase of pressure within the system (e.g., within the irrigation tubing and/or drip line network).

By lowering the upper surface of flippers 1847*a*, 1847*b* to create steps 1865 (or creating a stepped configuration for these alternating teeth), emitter 1810 is capable of providing improved pressure compensation because bonding (e.g., partial bonding) of the upper surface of the stepped tooth is no longer a concern, and thus, the operation of the pressure compensation portion 1860 of the emitter 1810 will not be impacted based on how much of the upper surface of the tooth is bonded to the inner surface of the irrigation tubing. Without this step or lowered surface at the base thereof, it has been discovered that some pressure compensation teeth (particularly at the base of those teeth) bond to the inner surface of the irrigation tubing more than other pressure compensating teeth (from one tooth to another tooth in the same emitter and/or from one emitter to another emitter) or in a non-uniform way amongst the pressure compensating teeth (from one tooth to another tooth in the same emitter and/or from one emitter to another emitter) making it harder to form an emitter, emitters and/or drip line that operates consistently. As illustrated by the data in the following chart, the stepped flipper configuration illustrated in FIGS. 19A-C provides a more consistent and repeatable pressure compensation characteristic from emitter to emitter and drip line to drip line, which is important if such items are to be mass produced.

To illustrate this point, an emitter having a length (L) of nine hundred and one thousandths of an inch (0.901"), width (W) of two hundred thirty two thousandths of an inch (0.232") and height (H) of ninety six thousandths of an inch (0.096") with a pressure reduction section 1850 having a flow passage with a height or floor height (FH) of twenty-five thousandths of an inch (0.025") and flow passage width (FW) of twenty thousandths of an inch (0.020") and a pressure compensation trampoline area of two hundred thousandths of an inch (0.200") long by two hundred thirty two thousandths of an inch (0.232") wide and stepped flippers 1847*a*, 1847*b* with a gusset step of five thousandths of an inch (0.005") down from the upper bonding surface of the adjacent or proximate emitter bonding surfaces and a floor thickness of fifteen thousandths of an inch (0.015") was tested under various fluid line pressures and showed remarkably steady pressure compensation (e.g., flowing steadily from seven pounds per square inch (7 psi) up to sixty pounds per square inch (60 psi)). The floor thickness of the flow passages 1850, 1860 of the emitter 1810 is fifteen thousandths of an inch (0.015"), and it should be understood that floor height refers to the distance from the upper surface of the floor to the top or bonding surface of the emitter 1810 (or effectively the height of the flow passage formed between the floor of the emitter and the inner surface of the tubing once the emitter is inserted therein). The inlet protrusion 1832 has a length and width of one hundred four thousandths of an inch (0.104") and a height of one hundred thousandths of an inch (0.100"). The results were as follows:

| Flow Rates shown in (gph), Pressure shown in (psi) | | | | | | | | |
|---|---|---|---|---|---|---|---|---|
| Pressure | | | | | | | | |
| 5 | 7 | 10 | 15 | 20 | 30 | 40 | 50 | 60 |
| Avrg Flow Rate 0.166 | 0.187 | 0.191 | 0.188 | 0.187 | 0.185 | 0.184 | 0.184 | 0.189 |

In the embodiment illustrated, the stepped flippers or teeth taper from a height and width of twenty thousandths of an inch (0.020") by forty-four thousandths of an inch (0.044"), respectively, at the base or root of each tooth, all the way down to the floor of the flow passage of FIGS. 19A-C (what also is referred to as a zero end taper or zero taper because the distal end of the tooth tapers to zero or merges into the floor surface rather than truncating in a step). It should be understood, however, that in alternate embodiments, different shapes and sizes of teeth 1847*a*, 1847*b* may be used. For example, in another form, the pressure compensation portion 1860 may alternatively include stepped flippers or teeth 1847*a*, 1847*b* that taper down to a truncated tip at the distal end of the tooth or flipper having a height of five thousandths of an inch (0.005") and a width of five thousandths of an inch (0.005"), similar to that shown with respect to FIGS. 18A-B. The truncation of the tip of the flippers or teeth may be in height (e.g., leaving another step down in height to the flow passage floor surface) and/or in width. In the form illustrated in FIGS. 19A-C, the flippers or teeth have a zero taper, but the tips do not come to a point but rather are truncated before reaching a pointed tip. In alternate forms, however, the tapering may taper both in height and width to a zero taper. In practice, it has been found easier to mold a tip that is truncated in width than it is to mold a tip that tapers in width to zero or toward zero. However, as mentioned herein, sharper surfaces form more turbulence within the emitter and, thus, the geometry of the emitter may be altered to provide sharper or duller surfaces in order to get the emitter to perform in a desired manner (e.g., using sharper surfaces to add turbulence and create more pressure reduction throughout the emitter, use duller surfaces to reduce turbulence and create less pressure reduction throughout the emitter). The rate of taper of the flippers or teeth may also be adjusted in order to get the emitter to perform as desired. Using a slower rate of taper to obtain an emitter with a first performance characteristic and a greater rate of taper to obtain an emitter with a second performance characteristic different than the first. Any one of these modifications may be used with any number of the other modifications discussed herein in order to produce emitters with desired performance characteristics.

In addition to having an alternate pressure compensating portion 1860, emitter 1810 illustrates alternate outlet configuration 1840, which includes alternate outlet protrusions or stops 1841. In the form illustrated, the outlet protrusions 1841 are free floating or free standing walls 1841*a*, 1841*b*, 1841*c* capable of performing the function of preventing or hindering the outlet 1840 from collapsing when the fluid pressure of supply line raises to a level sufficient for deflecting the elastic floor of the emitter 1810, similar to the outlet obstructions discussed above (e.g., 41, 941, etc.). Since the protrusions 1841*a*, 1841*b* and 1841*c* are freestanding, they do not connect to the outer sidewalls of the outlet 1840 and operate more similar to the post protrusions 41 in FIGS. 1A-H in that they allow fluid to flow all the way around the protrusion 1841, which helps in preventing or hindering grit/particulate buildup that could otherwise form in the corners or ends of passages (also referred to as dead ends) like those illustrated in FIGS. 10A-12B. Thus, in the form illustrated in FIGS. 19A-C, the protrusions or walls 1841*a*, 1841*b*, 1841*c* do not form dead ends in the outlet 1840 where debris can collect and build-up over time and ultimately negatively affect the operation or performance of the emitter 1810.

Emitter 1810 further includes an alternate fastener 1849 for securing the root growth inhibitor 1880 to the emitter 1810. In the form illustrated, fastener 1849 comprises a protrusion, such as a shoulder, lip or rib 1849, extending from at least one side wall of outlet 1840 for securing a copper insert 1880 into position within outlet 1840. In a preferred form, the fastener 1849 includes at least two protrusions 1849*a*, 1849*b* (FIG. 19C) for securing separate sides of the copper insert 1880 to securely position the insert 1880 into a desired spot within the outlet 1840. More particularly, protrusions 1849*a*, 1849*b* are positioned on opposite sides of the outlet 1840 in order to secure opposite sides of the insert 1880 and are spaced above the floor of the outlet 1840 an amount sufficient to secure the insert 1880 flush against the floor of the outlet 1840 so that debris or particulates cannot collect under the insert 1880 or between the insert 1880 and the floor of outlet 1840. The insert 1880 will preferably be curved or arched to track the radius of curvature of the floor of outlet 1840 to allow for such a flush mounting of the insert 1880.

During manufacture or assembly of emitter 1810, the insert 1880 will preferably be press fit into the outlet 1840 by having the plate like insert 1880 inserted or disposed in the outlet 1840 and pressed passed the protruding fastener 1849 to securely mount the insert 1880 into position within the outlet 1840. This may be accomplished manually if desired, however, in a preferred form, the insert 1880 will be automatically inserted in this way via machinery such as a press. In some embodiments, it may be desirable to apply another fastener such as an adhesive to either the floor of the outlet 1840 or the bottom surface of the insert 1880 to further bond or secure the insert to outlet 1840. In still other forms, another fastener may be used to connect the insert 1880 to the outlet 1840 (either in lieu of or in addition to the shoulder protrusion 1849) such as a friction fit between the insert defined openings 1880*a*, 1880*b*, 1880*c* and their respective outlet wall members 1841*a*, 1841*b*, 1841*c*.

One advantage of mechanical fasteners, such as shoulder protrusions 1849 and/or the friction fit between the insert 1880 and outlet wall members 1841, is that no chemicals are involved in the assembly of the emitter components, and thus, there is no need for concern as to how those chemicals might react to materials, such as pesticides and fertilizers, that may be flushed through the emitter and drip line containing the emitter from time-to-time (e.g., no need for concern as to whether such pesticides, fertilizers or other such chemicals could cause the adhesive to become undone). Another advantage of such mechanical fasteners is that there is no cure time involved in getting the insert 1880 fastened to the outlet 1840 like there might otherwise be with adhesives and the like or additional cost associated with the purchase and/or application of such adhesives. A mechanical fastener can be quickly and easily fastened so that the emitter 1810 may immediately be inserted into tubing rather than requiring it to be allowed to cure or requiring additional steps such as UV treatments to facilitate bonding, etc. Insertion machinery and methods of transporting and/or inserting emitters such as those described herein are disclosed in pending U.S. Provisional Patent Application No. 61/894,296, filed Oct. 22, 2013, which is incorporated herein by reference in its entirety.

In the form illustrated in FIGS. 19A-C, the floor of the outlet 1840 and the flow passage of the pressure compensating portion 1860 and the pressure reduction portion 1850 are of a common depth (e.g., a common floor height as described above). Thus, when the insert 1880 is installed in the outlet 1840, the insert 1880 forms a step that raises the effective floor level of the outlet 1840 and, thus, reduces the floor height in this portion of emitter 1810. However, in alternate embodiments, it may be understood that the floor of outlet 1840 could be set at a different level or position from that of the remainder of the flow passage, if desired. For example, the floor of outlet 1840 could be sunken so that when the insert 1880 is installed in the outlet 1840 the upper surface of insert 1880 is level with the remainder of the flow passage of the emitter so that a common floor height is provided throughout the emitter 1810. This configuration may be desired in order to prevent having a step in the flow passage where debris or particulates could collect.

In yet other embodiments, different types of root growth inhibiting structures may be desired. For example, as discussed above with respect to earlier embodiments, different positions may be desired for the root growth inhibitor 1880. In some forms, it may be desired to position the insert 1880 at the top of the emitter outlet 1840, just below the inner surface of the tubing to which the emitter is mounted and/or to have the insert define an opening to the outlet of the tubing. In other forms, it may be desirable to have the insert positioned intermediate the floor of outlet 1840 and inner surface of the tubing to which the emitter is mounted, such as midway between the two and only taking up a portion of the outlet so that fluid can flow around the insert and through to the outlet of the tubing. In such configurations, the insert may have one or more passages (e.g., perforations, holes, vias, etc.) or be sized to allow fluid to pass through the emitter and out the emitter outlet. In some forms, a plurality of protruding shoulders may be positioned parallel to one another and spaced sufficiently apart from one another to allow for the insert 1880 to be sandwiched or retained between the parallel protrusions to retain the insert 1880 in the desired position. In addition and/or alternatively, the walls 1841 could be designed so that they hold the insert 1880 at the desired position. For example, walls containing a wider base than respective insert openings could be used (e.g., a wall could gradually widened toward the base to provide a point at which the insert cannot be further pressed into the outlet 1840, a wall could be designed with a step or shoulder in an exterior surface thereof in order to place the insert at a desired position, etc.). In this way, the shoulder protrusion 1849 could alternatively be located on the inner free-standing walls 1841a, 1841b and/or 1841c instead of being formed in the outer upstanding walls of the outlet 1840 as illustrated in FIGS. 19A-C. In yet other forms, it may be desirable to have an insert that takes up less space within outlet 1840, such as a narrower or shorter plate that only extends about one of the outlet protrusion walls 1841a, 1841b, 1841c. Similarly, a structure other than a plate could be used, such as a frame that surrounds a portion of the outer upstanding walls or inner upstanding walls of the outlet 1840. Although a solid plate type insert has been shown in FIGS. 19A-C, it should be understood that in alternate forms the insert may be formed of a mesh or screen type structure, or a matrix type structure that allows fluid to flow through the emitter, the insert and out the emitter outlet.

In yet other forms, it may be desirable to have the root growth inhibitor 1880 positioned elsewhere in the emitter or drip line besides the emitter outlet 1840. For example, in some forms, it may be desirable to have the root growth inhibitor 1880 connected to the drip line outlet opening rather than the emitter 1810. As mentioned above, the root growth inhibitor could be connected to the drip line tubing like a copper sleeve or rivet positioned at the outlet opening of the tubing. Pending International Patent Application No. PCT/US2013/046603, filed Jun. 19, 2013, illustrates an alternate outlet tube that could be connected to the drip line at the outlet and communicates with the emitter to control where fluid ultimately egresses from the emitter/drip line (e.g., at a location spaced from an outside surface of the drip line or supply tube so that the fluid does not simply run along the outer surface of the drip line/supply tube). In some forms, this outlet tube and the root growth inhibitor could be combined into one structure to perform both tasks. For example, the outlet tube could be made out of copper so that it both directs fluid flowing from the emitter away from the outer surface of the drip line and inhibits roots from growing toward the drip line and/or emitter. Thus, the disclosure of International Patent Application No. PCT/US2013/046603 filed Jun. 19, 2013 is incorporated herein by reference in its entirety, and it should be understood that the outlet tube disclosed therein could be integrated with root growth inhibitor 1880. It should be understood that any of the features of the above embodiments may be used with one another to form a variety of different emitter embodiments. For example, in some forms, an emitter in accordance with the invention may include one or more of the inlet protrusion feature, root growth inhibitor feature, root growth inhibitor fastener feature, stepped baffle tooth or teeth feature, etc.

Additional emitter embodiments and features are illustrated in two sheets attached hereto as an Addendum. These sheets will not be described in further detail herein due to their similarity to the embodiment of FIGS. 19A-C, other than to mention that the first sheet illustrates exemplary dimensions and a design for a non-zero end tapper stepped flipper (e.g., the tip of the flipper is truncated in height and width) and the second sheet illustrates exemplary dimensions and a design for a zero end tapper stepped flipper (e.g., the flipper tapers to zero at its tip or distal end). In these embodiments, the outlet portion has walls that are not freestanding, but rather connect to one end of the outlet (e.g., one portion of the outer or peripheral wall that forms the outlet).

Thus, it should be understood that various embodiments are contemplated in accordance with the invention disclosed herein. For example, in one form, an irrigation drip emitter for attachment to only a circumferential portion of an inner surface of an irrigation drip line tube carrying pressurized fluid is disclosed having a unitary elastomeric body defining an inlet or inlet area, an outlet or outlet area and a flow channel connecting in fluid communication the inlet and outlet or inlet area and outlet area. The flow channel defining a pressure reduction portion and a pressure compensating portion having a first volume at lower fluid pressure and a second volume smaller than the first volume at a higher fluid pressure to restrict flow through the channel. Wherein the pressure compensating portion includes one or more stepped baffle teeth having a base, a tip, an upper surface extending between the base and tip and a step along the upper surface, the step spacing at least a portion of the upper surface of the one or more stepped baffle teeth from an inner surface of the irrigation drip line tube to facilitate movement of the one or more stepped baffle teeth.

In a preferred form, the one or more stepped baffle teeth will comprise a plurality of stepped tapered baffle teeth that alternate with one another and have a first set of stepped baffle teeth extending from a first wall and tapering in a first direction and a second set of stepped baffle teeth extending from a second wall located opposite the first wall and tapering in a second direction opposite the first direction. In some forms, the one or more stepped baffle teeth taper down to a truncated tip spaced slightly above the floor of the pressure compensating portion of the emitter. In other forms, the one or more stepped baffle teeth are tapered down to a floor of the pressure compensating portion of the emitter.

In a preferred form, the drip emitter will include at least one freestanding wall positioned within the outlet or outlet area of the emitter such that fluid may flow entirely around exposed sides of the at least one freestanding outlet wall. In addition, the emitter may also include a root growth inhibitor positioned in or proximate the outlet or outlet area to deter roots from obstructing the flow of fluid from the emitter. In some forms, the emitter includes a fastener for securing the root growth inhibitor in the outlet area of the emitter. In the form illustrated in FIGS. 19A-C, the fastener comprises at least one protrusion extending from at least one wall side surface located within the outlet or outlet area to secure the root growth inhibitor at the outlet area. Emitters such as any of those described above may be positioned within an irrigation drip line tube at predetermined intervals and, preferably, regular or equally spaced intervals to form a drip line.

In other embodiments, irrigation drip emitters for attachment to only a circumferential portion of an inner surface of an irrigation drip line tube carrying pressurized fluid are disclosed having a unitary elastomeric body defining an inlet area, outlet area and a flow channel connecting in fluid communication the inlet and outlet areas. The flow channel defining a pressure reduction portion and a pressure compensating portion having a first volume or cross-sectional area at lower fluid pressure and a second volume or cross-sectional area smaller than the first volume or cross-sectional area at higher fluid pressure to restrict flow through the channel. In a preferred form, the emitter will have at least one freestanding outlet wall member positioned within the outlet area of the emitter such that fluid may flow entirely around exposed sides of the at least one freestanding outlet wall member.

In yet other forms, irrigation drip emitters for attachment to only a circumferential portion of an inner surface of an irrigation drip line tube carrying pressurized fluid are disclosed herein having a unitary elastomeric body defining an inlet area, outlet area and a flow channel connecting in fluid communication the inlet and outlet areas, with the flow channel defining a pressure reduction portion and a pressure compensating portion having a first volume or cross-sectional area at lower fluid pressure and a second volume or cross-sectional area smaller than the first volume at higher fluid pressure to restrict flow through the channel. The emitter further having a root growth inhibitor positioned in or proximate the outlet area to deter roots from obstructing the flow of fluid from the emitter and having a fastener for securing the root growth inhibitor in or proximate the outlet area of the emitter.

In still other forms, a non-cylindrical irrigation drip emitter for attachment to only a circumferential portion of an inner surface of an irrigation drip line tube carrying pressurized fluid is disclosed herein having a unitary elastomeric body defining an inlet area, outlet area and a flow channel therebetween connecting the inlet and outlet areas, with the flow channel defining a pressure reduction portion and a pressure compensating portion having a first volume or cross-sectional area at lower fluid pressure and a volume or cross-sectional area smaller than the first volume or cross-sectional area at higher fluid pressure to restrict flow through the channel. The pressure compensating portion including at least one baffle tooth having a base, a tip and an upper surface extending between the base and tip, with the at least one baffle tooth further having a stepped configuration wherein the base of the tooth is positioned at a height different from a proximate upper bonding surface of the emitter.

In one form, the at least one baffle tooth is tapered downward from the base toward the tip and is moveable between a first lower pressure position wherein the upper surface of the at least one baffle tooth is spaced apart from an inner surface of the irrigation drip line tube by a first distance and which coincides with the first volume of the pressure compensating portion and a second higher pressure position wherein the upper surface of the at least one baffle tooth is spaced apart from the inner surface of the irrigation drip line tube by a second distance less than the first distance and coincides with the second volume of the pressure compensating portion. In a preferred form, the at least one baffle tooth is tapered down so that the tip of the tooth is flush with a floor of the pressure compensating portion of the emitter (e.g., a zero-taper configuration). As with prior embodiments, the at least one baffle tooth may comprise a plurality of stepped tapered baffle teeth each being moveable between the first lower pressure position and the second higher pressure position. Similarly, the plurality of stepped tapered baffle teeth may alternate with one another with a first set of stepped baffle teeth extending from a first wall and tapering in a first direction and a second set of stepped baffle teeth extending from a second wall located opposite the first wall and tapering in a second direction opposite the first direction.

In some forms, the non-cylindrical irrigation drip emitter may include at least one freestanding outlet wall member positioned within the outlet area of the emitter such that fluid may flow entirely around exposed sides of the at least one freestanding outlet wall member, and may include a root growth inhibitor positioned in or proximate the outlet area to deter roots from obstructing the flow of fluid from the emitter. A fastener for securing the root growth inhibitor in or proximate to the outlet area of the emitter may also be provided and/or used. For example, in the form illustrated in FIGS. 19A-C, the fastener comprises at least one protruding shoulder extending from at least one wall side surface located within the outlet area that secures the root growth inhibitor into the outlet area.

Although most of the embodiments discuss herein have specified a unitary emitter body constructed of elastomeric material, it should be understood that any of the above embodiments may be provided in other materials if desired for particular applications. For example, in some forms it may be desired to provide non-pressure compensating versions of the above emitters. In such instances, the emitter bodies may be made of more rigid material, such as polyethylene or any material with a higher durometer number, since movement of emitter body portions in response to increases and decreases in fluid pressure in the drip line is not required in non-pressure compensating versions of the emitters.

It should also be understood that in alternate embodiments, the geometry or design of the emitter may be changed in order to get the emitter to perform in a desired manner for a particular application. For example, in some instances, an emitter with a higher flow rate may be desired, e.g., 1 gallon/hour (1 gph), instead of one with a lower flow rate, e.g., 0.2 gallon/hour (0.2 gph). In such cases, the emitter may be designed with fewer teeth in the pressure reduction (PR) region or portion of the emitter, fewer teeth in the pressure compensating (PC) region or portion of the emitter, with a flow channel with a greater depth (or greater floor height), with teeth and flow channel geometries that present less pressure reduction or greater fluid flow through the emitter (e.g., more rounded edges, less flat surfaces, softer angles, etc.), and the like. In addition, the entire emitter or just a portion of the emitter, such as the PC portion, could be made of a stiffer material with a higher durometer value so that the emitter chokes up or constricts less to allow for a higher flow rate. Alternatively or in addition, the emitter body or portions thereof (e.g., the trampoline of the PC portion) could be made thicker so that it is less flexible and chokes up or constricts less. As mentioned herein, the shape of structures may be made sharper or more duller to alter performance, the rate of taper of the teeth in the PC or PR section may be altered to change performance, etc.

In still other embodiments, the emitter could be designed to have one or more receptacles for receiving different emitter portions (e.g., portions with different geometries, such as different shapes, sizes, patterns, designs, etc., and/or portions that are made of different materials so that the emitter may be provided in different flow rates or with different optional features intended for a particular application). For example, in one form, the emitter may be designed with a receptacle for receiving different PR portions to provide emitters with different flow rates (e.g., 0.2 gph, 0.5 gph, 1.0 gph, 2.0 gph, 5.0 gph, 7.0 gph, 10.0 gph, 12.0 gph, 18.0 gph, 24.0 gph, etc.). In one form, a lower flow rate PR portion insert may be provided with additional teeth, teeth with more turbulence-inducing features or shapes, a smaller flow passage cross-section, etc. In another form, a higher flow rate PR portion insert may be provided with fewer teeth, teeth with smoother features or shapes, a larger flow passage cross-section, etc. The different PR portion inserts may be inserted into the receptacle and optionally secured thereto via any form of fastener, such as a friction fit, an adhesive, overmolding (e.g., having the insert molded over the remainder of the emitter body or having the emitter body molded over the insert, etc.). In a preferred form, the inserts will be friction fit into the emitter and emitters with common inserts placed into a vibratory drum feeder for manufacturing drip line with common emitter flow rates as disclosed in U.S. Provisional Patent Application No. 61/894,296, filed Oct. 22, 2013, which has been incorporated herein by reference in its entirety above.

In alternate forms, the emitter may be designed with a receptacle for receiving different PC portions to provide emitters with different properties (e.g., flow rates, reaction times to variances in supply line fluid pressure, etc.). In one form, a lower flow rate PC portion and/or a faster reacting PC portion insert may be provided with additional teeth, teeth with more turbulence-inducing features or shapes, smaller flow passage cross-section, made of a material or structure with a higher durometer (e.g., with a higher durometer value), etc. In another form, a higher flow rate PC portion insert may be provided with fewer teeth, teeth with smoother features or shapes, a larger flow passage cross-section, made of a material or structure with a lower durometer value, etc.

In still other forms, the emitter may be designed with a plurality of receptacles for receiving different emitter portions (e.g., emitter inlet portions, PR portions, PC portions and/or outlet portions, etc.). For example, in some forms the emitter may be provided with first and second receptacles for receiving PR portion and PC portion inserts, respectively. In FIGS. 20A-B an exemplary embodiment of an emitter with removable, replaceable, or swappable PR and PC inserts is shown. In keeping with the above practice, items that are similar to those discussed above with respect to other embodiments are identified using similar latter two-digit reference numerals, but having the prefix 19 to distinguish one embodiment from the others. Thus, in this embodiment, the emitter is referenced generally by reference numeral 1910 and includes an emitter body 1920 made of a uniform elastomeric material and defining an emitter inlet 1930 and outlet 1940 integral to the emitter body 1920 with a flow passage extending between the inlet 1930 and outlet 1940. In a preferred form, the flow passage includes a pressure reduction portion 1950 and a pressure compensating portion 1960. Unlike prior embodiments, however, the emitter includes a pressure reduction ("PR") insert 1950*a* and a pressure compensating ("PC") inset 1960*a* which are disposed within mating recesses defined by the emitter body 1920. The mating recesses form sockets within which the PR insert 1950*a* and PC insert 1960*a* may be inserted or disposed prior to the emitter being connected to tubing.

Thus, with this configuration, emitter 1910 defines an open-face non-cylindrical irrigation drip emitter for attachment to only a circumferential portion of an inner surface of an irrigation drip line tube carrying pressurized fluid. The emitter 1910 includes an emitter body made of elastomeric material and defining at least one recess for receiving an insert (e.g., at least one of the recess for receiving insert 1950, the recess for receiving insert 1960, etc.). The emitter 1910 further includes the insert (e.g., 1950*a*, 1950*b*, 1960*a*, 1960*b*, etc.) disposed within the recess defined by the emitter body 1920, together the emitter body and insert defining a flow passage between an inlet and outlet through which fluid may travel. In a preferred form, the recess defined by the emitter body 1920 is an open-faced socket having a first wall that extends about a majority of a side periphery of the insert and a second wall that traverses an opening defined by the first wall to close an end of the recess and define the open-faced socket within which the insert is disposed, the insert being disposed within the open-faced socket by a sufficient amount to allow an upper surface of the insert and an adjacent upper surface of the emitter body to be flush with one another so that the emitter assembly may be bonded to an inner surface of conduit without gaps forming between the upper surfaces of the emitter body and insert and the inner surface of conduit.

In this way, the emitter 1910 can be customized for a particular purpose (e.g., application, environment, flow rate, etc.) by allowing different types of inserts to be installed for the various pressure reduction and pressure compensating portions. For example, the inserts 1950*a*, 1960*a* may be desired and used to form an emitter having a first fluid flow rate (e.g., 0.195 gallons per hour (GPH) or approximately 0.2 GPH). Whereas, alternate inserts 1950*b*, 1960*b* shown in broken line in FIG. 20B may be desired and used to form an emitter having a second fluid flow rate different from the first fluid flow rate (e.g., 1 GPH). The inserts 1950*a*-*b*, 1960*a*-*b* can do this by defining flow passages of different size, shape, pattern, or characteristic, by using materials with different durometers (whether that be from the material chosen itself or from differences in the thickness or shape of the material, etc.), by using baffle teeth of different geometries (e.g., shapes, sizes, etc.) or with a different number of baffle teeth, etc. For example, one set of PC inserts 1860*a*, 1860*b* may be provided with stepped flippers or moveable baffle teeth that taper down to zero at their distal end, whereas in other forms another set of PC inserts 1860*b*, 1860*a* may be provided with flippers or moveable baffle teeth that are not stepped at their base and that are truncated at their end rather than tapering down flush to the floor of the flow passage. In other forms, one set of PR inserts 1850*a*, 1850*b* may be provided with a first flow passage pattern and/or a first number of baffle teeth to achieve an emitter with a first characteristic, whereas in other forms another set of PR inserts 1850*b*, 1850*a* may be provided with a second flow passage pattern and/or a second number of baffle teeth (both different than the respective first flow passage pattern and number of baffle teeth) to achieve an emitter with a second characteristic different than the first characteristic.

In a preferred form, the PR and PC inserts 1950, 1960 are made of the same elastomeric material as the remainder of the emitter body 1920 and the upper surfaces of the inserts 1950, 1960 have the same radius of curvature as the upper surfaces of the remainder of the emitter body 1920 so that the assembled emitter 1910 (including the body 1920 and inserts 1950, 1960) can be bonded to the inner surface of tubing or conduit to produce a properly working emitter and drip line that does not leak and that drips fluid at the intended or desired flow rate. By having a common radius of curvature the upper surfaces of the emitter body 1920 and inserts 1950, 1960 will remain flush with one another so that the emitter 1910 can be bonded to the inside surface of tubing or conduit without gaps that could result in leaks.

In other examples, the emitter may be provided with inlet and/or outlet receptacles for receiving inlet and/or outlet portion inserts (either in addition to or in lieu of the PR and PC portion inserts). In yet other forms, the inlet may be formed integral to the PR portion and thus removable and insertable with the PR portion. It should be understood that the emitter may be provided with any one or more of such receptacles and inserts and that any of the insert or insert portions discussed herein may optionally be secured to the emitter via a fastener or the like as discussed above.

In addition to different geometries, different inserts may be used to allow a consumer to customize the emitter for a particular application or to provide options that can be added to or removed from the emitter. For example, in some applications such as steeply inclined or declined landscape (e.g., hilly or mountainous regions, etc.) inserts may be provided with optional check valve designs used to prevent fluid from flowing out of the emitters or drip line when not intended. In other applications, a protruding inlet that draws fluid from an inner portion of the supply or drip line (e.g., like that illustrated in FIGS. 10A-14B and 16A-19C) may be desired; whereas, in still other applications a non-protruding inlet may be desired to draw fluid from an outer periphery or circumference of the supply line or dip line may be desired (e.g., like that shown in FIGS. 1A-9B and 15A-B). Thus, with this configuration, emitters in accordance with the invention may be customized for various applications, such as specific applications and/or based on specific attributes with respect to the environment the emitters will be used in.

Several different patterns for flow passages have been disclosed herein and it should be understood that numerous other designs are contemplated under this disclosure and can be configured to get the emitters to operate at the desired flow rate and/or with the desired grit tolerance or performance. In other forms, a different flow path may be utilized to reduce fluid pressure and/or compensate for fluctuations in fluid line pressure within the tube an emitter is mounted. An example of one such alternate design is illustrated in FIGS. 21A-F and, in keeping with prior practice, will use the same latter two-digit reference numeral for items similar to those discussed previously, but add the prefix 20 to distinguish this embodiment from others. Thus, in FIGS. 21A-F, the emitter is referenced generally as reference numeral 2010 and includes a unitary body of elastomeric material 2020 that forms an inlet 2030, an outlet 2040 and a flow path extending between the inlet and the outlet including a pressure reduction ("PR") portion 2050 and a pressure compensating ("PC") portion 2060.

In a preferred form, emitter 2010 is a discrete, single piece elastomeric emitter intended to be attached to only a portion of an inner circumference of an inner surface of an irrigation drip line tube like tube 70 in FIG. 1A and tube 970 in FIG. 10E. The discrete elastomeric emitter body 2020 integrally defines the inlet 2030 on a first side of the body for receiving pressurized fluid from a fluid supply source, the outlet 2040 on a second side of the body for discharging the fluid from the body, with a flow channel extending between the inlet 2030 and outlet 2040 and including the above-mentioned PR portion 2050 and PC portion 2060. The emitter further defines at least one internal wall that is movable to adjust the pressure and/or flow rate of the fluid received at the inlet and discharged through the outlet and a perimeter wall forming at least a portion of an exterior of the emitter body and forming at least a portion of a curved upper surface of the emitter body 2020 that is shaped to correspond to an interior radius of curvature of the portion of the inner circumference of the inner surface of the irrigation drip line tube to which the emitter body is to be mounted. In some forms, the internal wall is located in the PC portion 2060 of the emitter 2010 and moves along with other portions of the PC portion 2060 of the emitter (e.g., the floor of the PC portion) in response to a change in pressure of the pressurized fluid traveling through the tube from the fluid supply source. A preferred dripline is then formed by bonding the emitter 2010 at regular intervals to the inner surface of the tube and then forming an outlet opening through the tube over or aligned with the outlet 2040 so that fluid can flow from the tube.

As with prior embodiments discussed above, at least a portion of the emitter body 2010 further defines a generally planar floor in the outlet 2040 and an obstruction, such as posts or walls 2041a, 2041b and 2041c, that extends upward from the floor for preventing the outlet 2040 from collapsing in response to increases in pressure of the pressurized fluid within the tube. The obstructions 2041a-c could be any shape, but preferably will be posts or walls and will include a curved upper surface that corresponds in height and shape to the curved upper surface of the emitter body 2020. In the form illustrated, emitter 2010 further includes an inlet protrusion 2032 that extends from the emitter body and away from the emitter proximate the inlet 2030 to draw fluid from a location closer to the center of the tube which tends to have fluid with less debris than the fluid traveling near the inner surface of the tube.

Unlike prior embodiments, however, emitter 2010 has a multi-stage PR portion 2050 including a serpentine shaped tortuous flow passage having a first portion 2050a containing baffles and a second portion 2050b without baffles. The portion with baffles 2050a is positioned proximate the inlet 2030 and, in particular, downstream of the inlet 2030. The flow path then transitions from the portion with baffles 2050a to the PR portion without baffles 2050b, which in the form illustrated comprises smooth walls or a buffer zone devoid of baffles as the flow path transitions from the portion with baffles to the PC portion 2060. The upper surfaces of both PR portions 2050a and 2050b are of the same height (or of equal or constant height) and preferably track the radius of curvature of the upper surfaces of the emitter 2010, which corresponds to the radius of curvature of the inner tube surface to which the emitter 2010 is ultimately bonded in order to provide a sealed flow passage between the emitter 2010 and tube.

As illustrated in FIGS. 20A-E, the tortuous flow passage of emitter 2010 is defined by a plurality of baffles and is laid out in a winding serpentine path. The plurality of baffles comprise baffles of constant height (e.g., those in PR portion 2050a) and baffles of tapering height (e.g., baffles 2067a, 2067b in PC portion 2060). The baffles of constant height are positioned in the first portion 2050a of pressure reduction portion 2050 of the flow passage and the baffles of tapering height 2067a, 2067b are positioned in the pressure compensation portion 2060 of the flow passage. More particularly, the baffles of constant height are positioned downstream of the inlet 2030 and the baffles of tapering height 2067a, 2067b are positioned downstream of the baffles of constant height in PR portion 2050a and upstream of the outlet 2040. The second portion 2050b of PR portion 2050 forms a serpentine flow passage and buffer zone between the baffles of constant height and the baffles of tapering height free or devoid of any baffles.

Figure 21A:
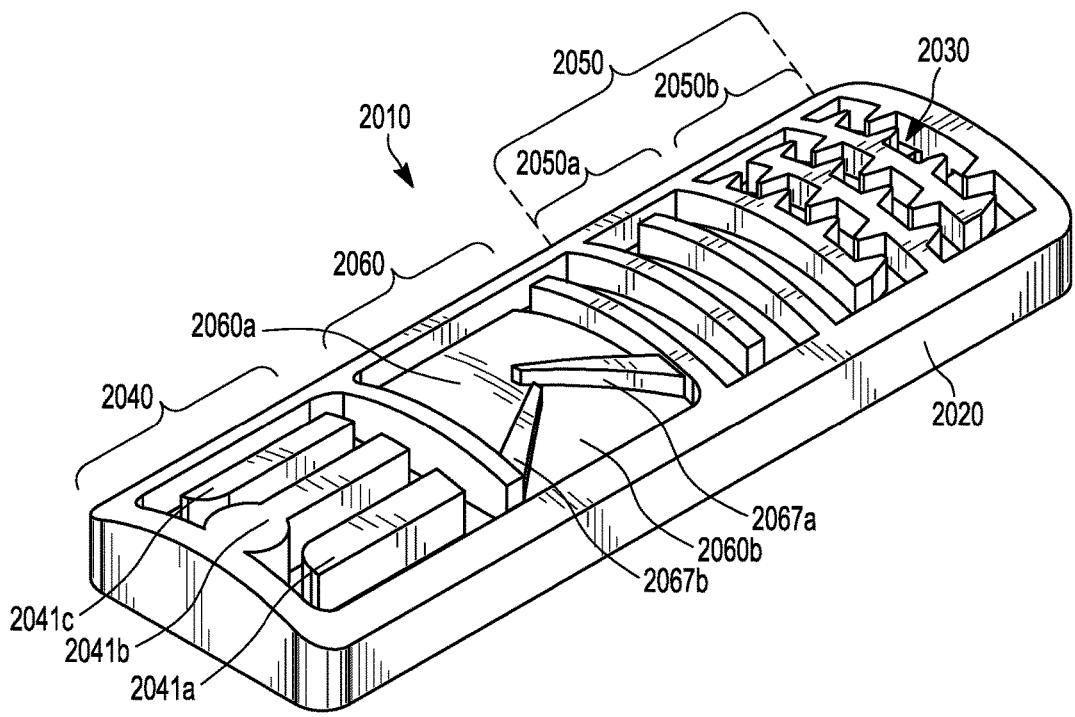
FIGS. 21A-E are perspective, top, bottom, right and left side elevation views, respectively, of an elastomeric emitter in accordance with embodiments of the invention.
Figure 21B:
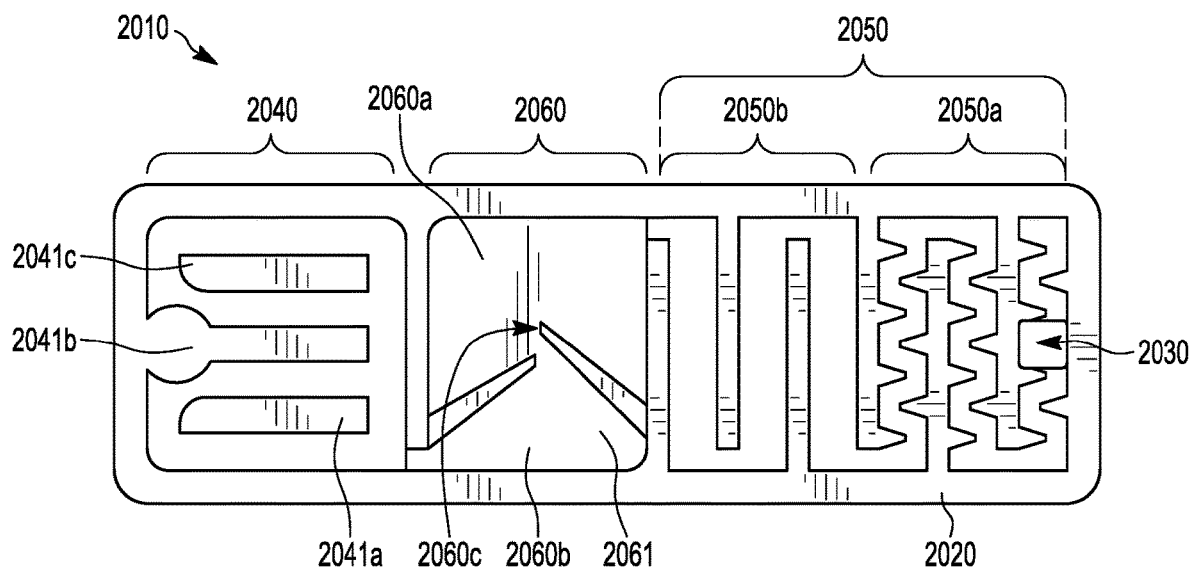
Figure 21C:
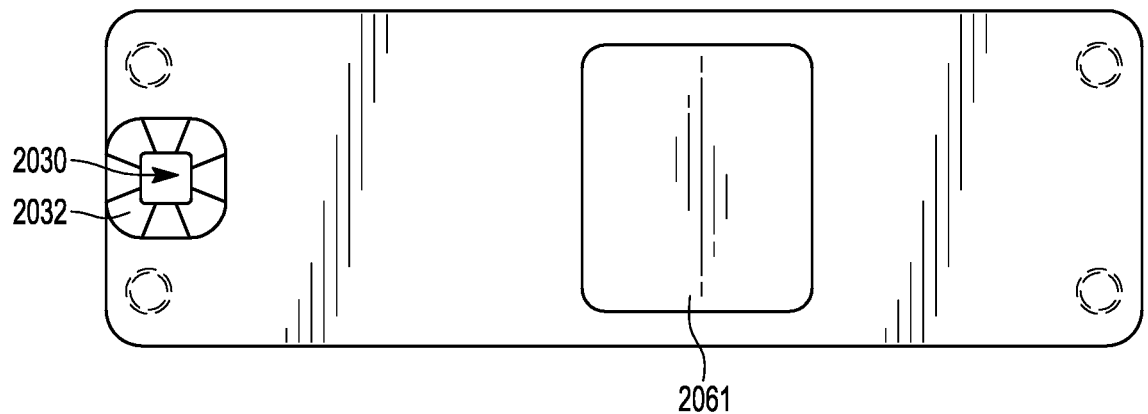
Figure 21D:
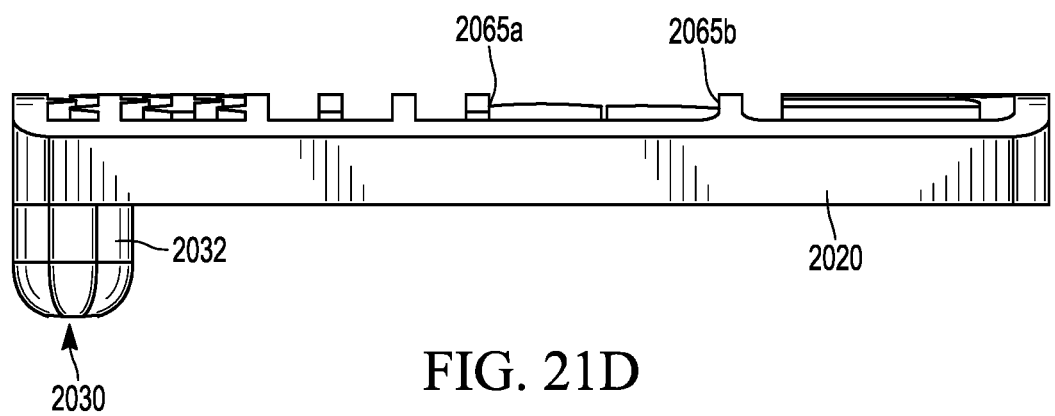
Figure 21E:
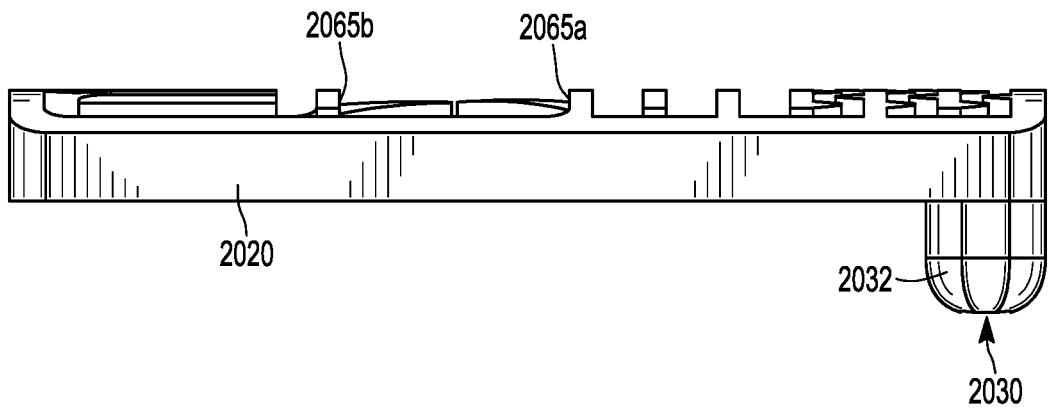
Figure 22A:
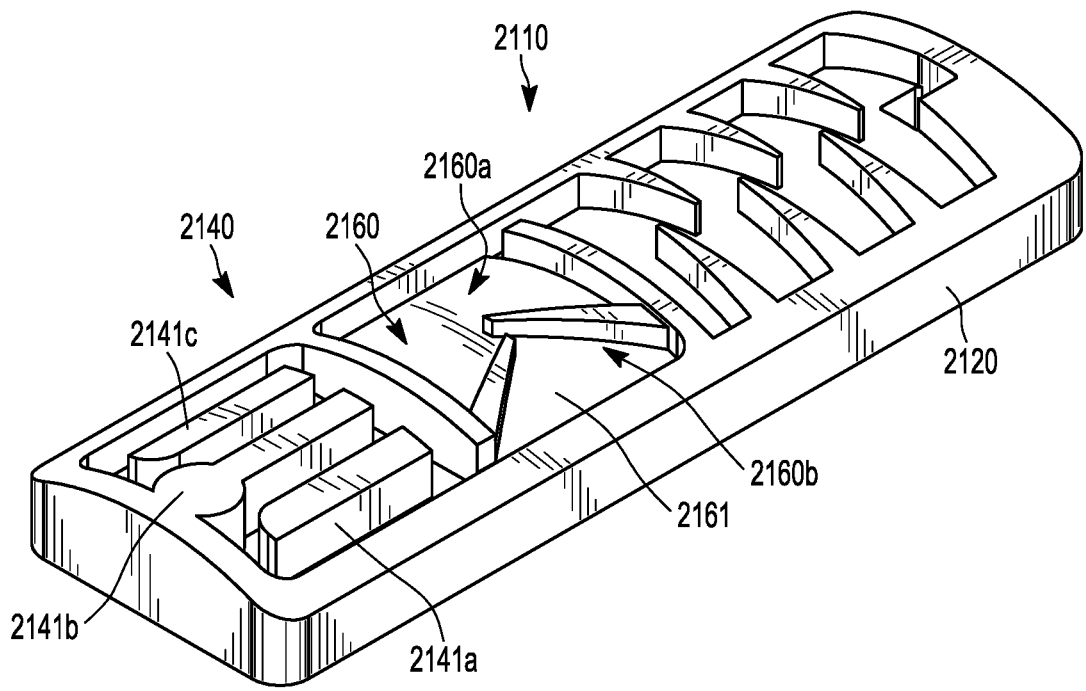
FIGS. 22A-E are perspective, top, bottom, right and left side elevation views, respectively, of an elastomeric emitter in accordance with embodiments of the invention.
Figure 22B:
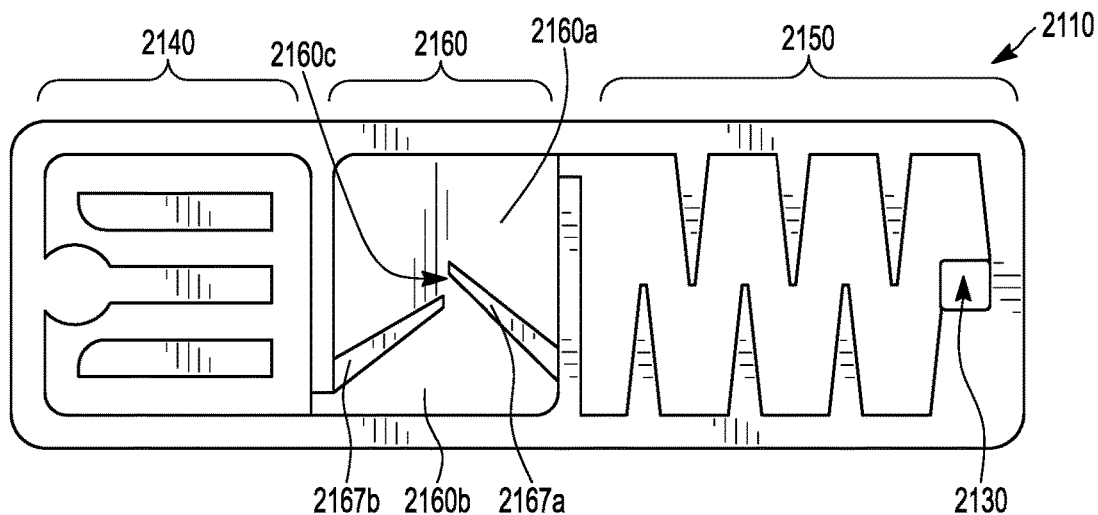
Figure 22C:
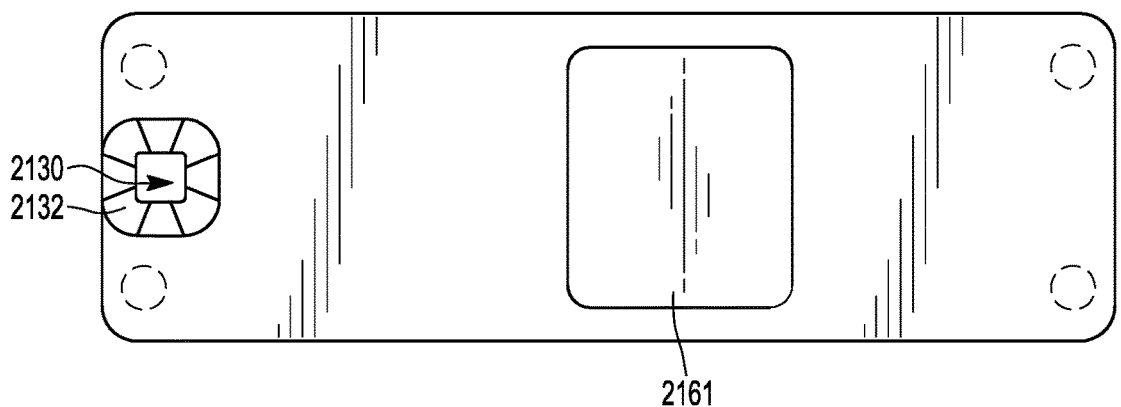
Figure 22D:
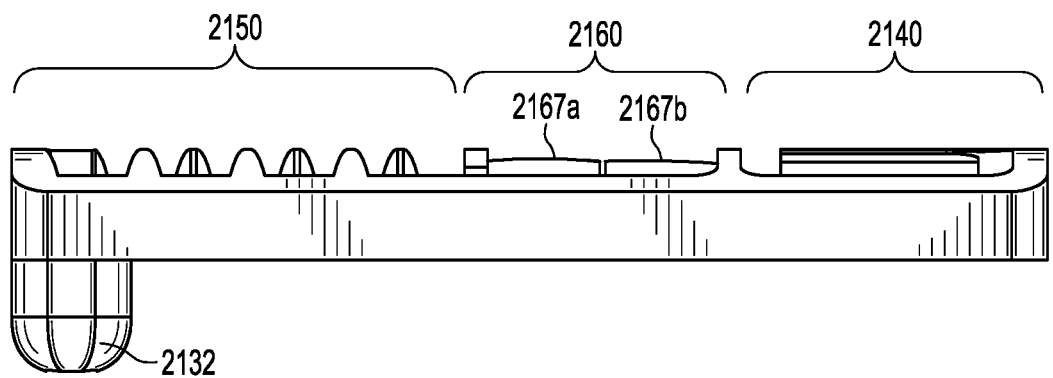
Figure 22E:
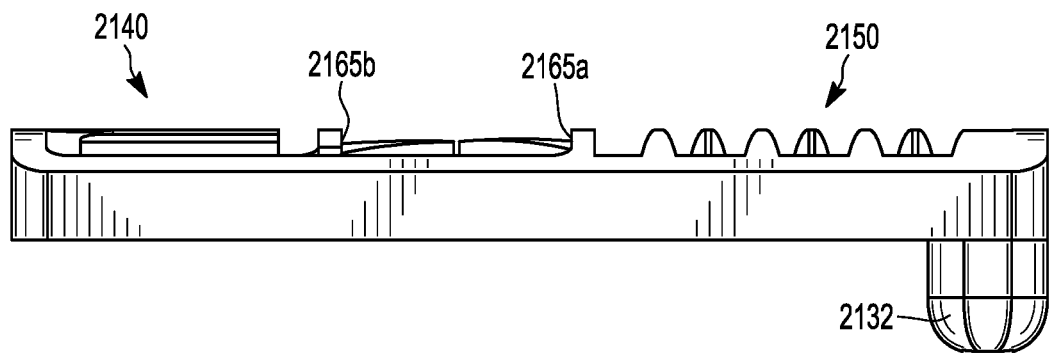
Figure 23A:
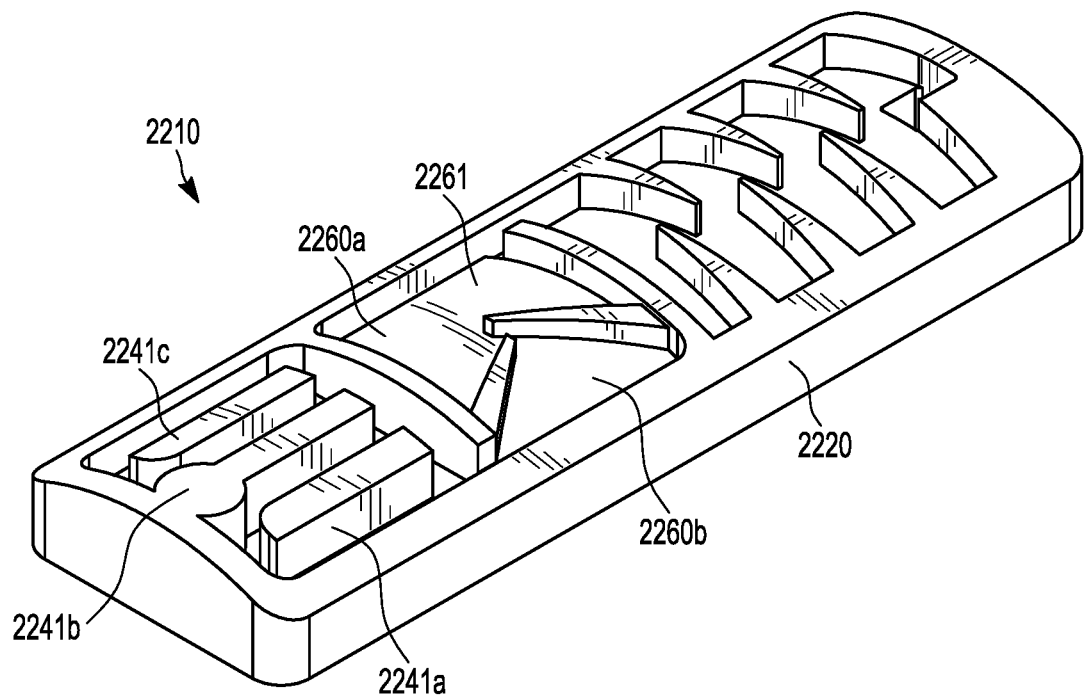
FIGS. 23A-E are perspective, top, bottom, right and left side elevation views, respectively, of an elastomeric emitter in accordance with embodiments of the invention.
Figure 23B:
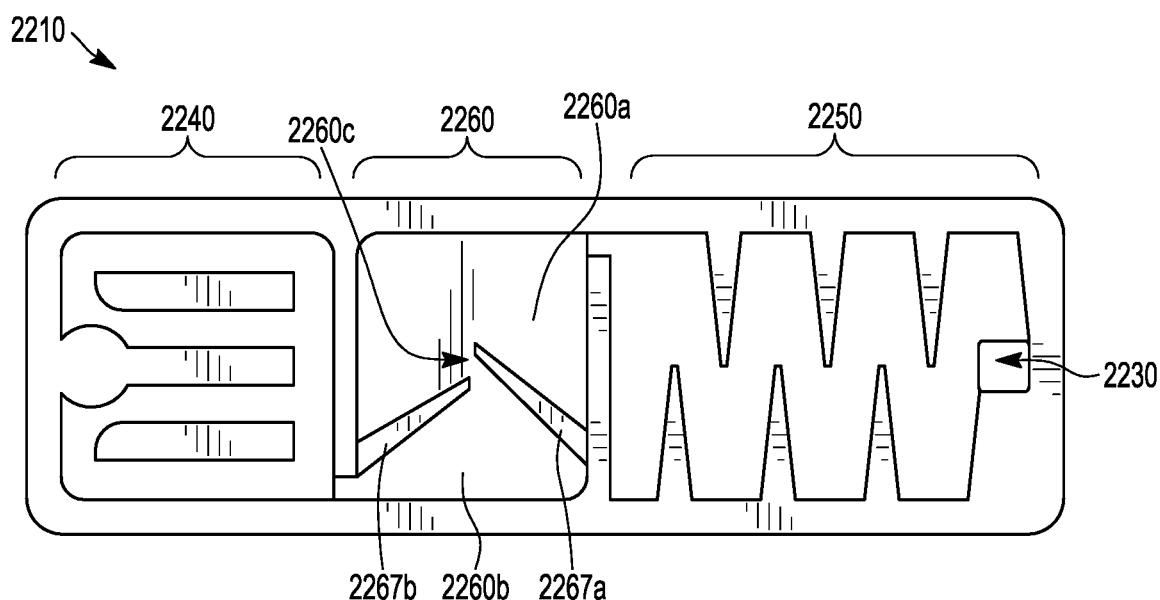
Figure 23C:
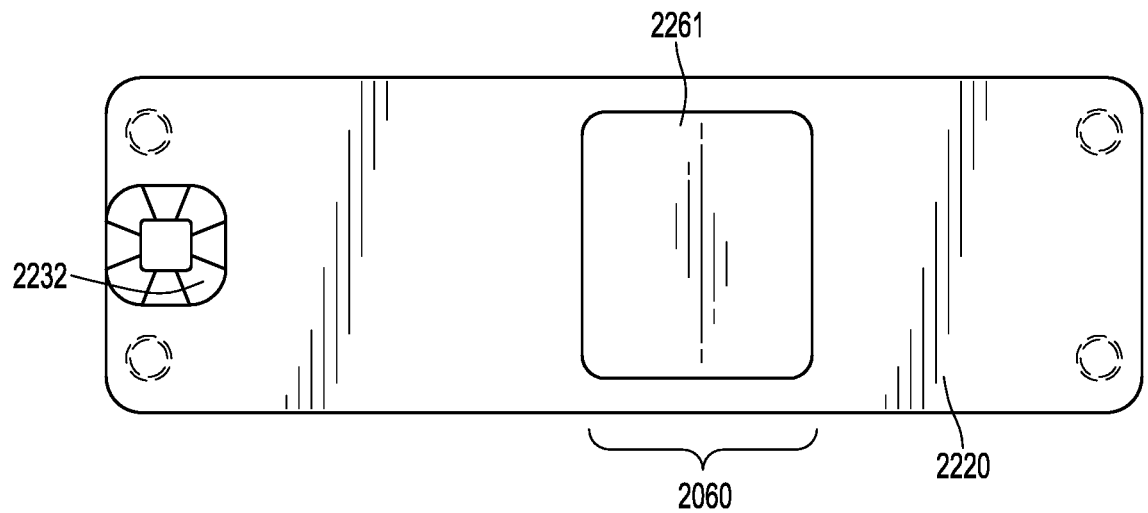
Figure 23D:
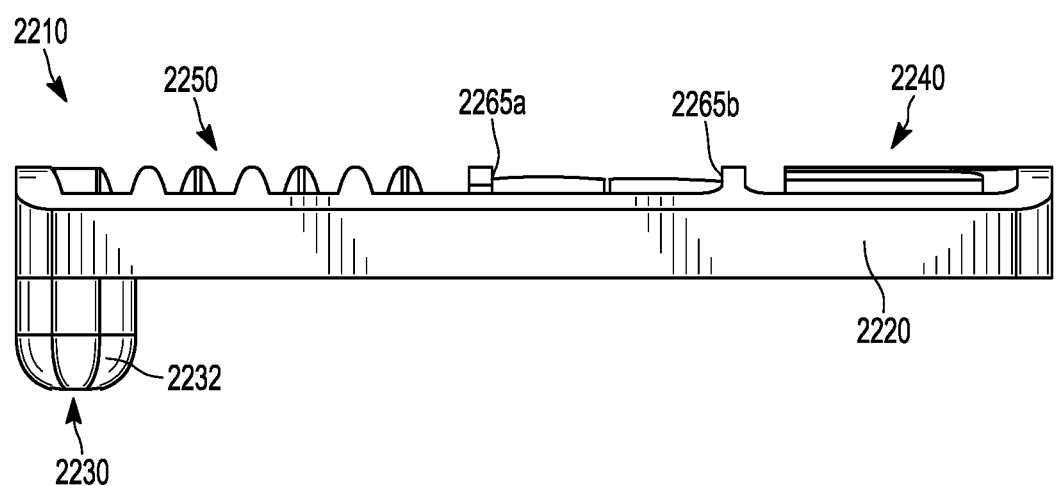
Figure 23E:
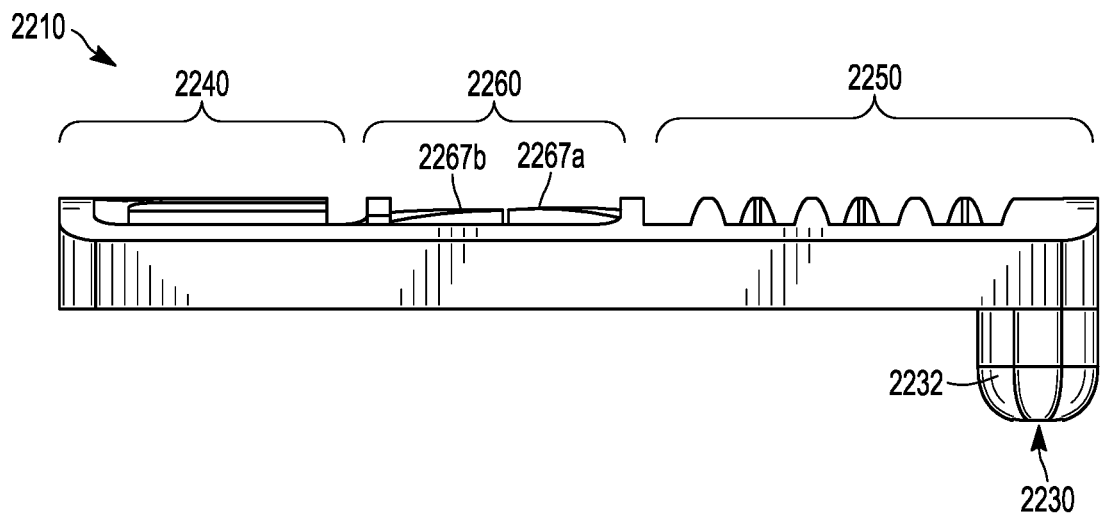

The flow passage of emitter 2010 transitions from the PR portion without baffles 2050b to the PC portion 2060. The PC portion 2060 further includes one or more movable baffles, such as tapered baffles 2067a and 2067b. In a preferred form and as best illustrated in FIGS. 21D and 21E, the tapered baffles 2067a, 2067b are stepped baffles with the upper baffle surface being stepped down from the upper surface of the adjacent wall structure from which the baffle extends. The steps 2065a and 2065b are located at the base of the baffles and the baffles taper toward the distal end of the baffles and toward the floor of the flow passage. In some forms, the baffles taper all the way down to the floor of the flow passage (also known as a zero taper), while in other forms they have less of a taper such that the distal end still protrudes up from or forms a step with the floor of the PC portion 2060.

Thus, emitter 2010 forms an irrigation drip emitter for attachment to only a portion of an inner circumference of an inner surface of an irrigation drip line tube having a discrete elastomeric emitter body 2020 integrally defining an inlet 2030 on a first side of the body 2020 for receiving pressurized fluid from a fluid supply source, an outlet 2040 on a second side of the body for discharging the fluid from the body, a flow channel extending between the inlet 2020 and outlet 2030 for reducing a pressure and flow of fluid received at the inlet 2030 and discharged through the outlet 2040. The flow channel defined by at least one inner wall and further including a pressure compensating portion 2060 having a plurality of baffles 2067a, 2067b extending from one or more side walls that border the pressure compensating portion 2060, with at least two baffles extending from the one or more side walls that border the pressure compensating portion 2060 and separating the pressure compensating portion 2060 into an upstream portion 2060a and a downstream portion 2060b with the upstream portion 2060a having a larger area and volume than the downstream portion 2060b to ensure greater pressure is exerted on the upstream portion than the downstream portion to assist in flushing the emitter 2010 of grit, as explained further below.

More particularly, when the emitter 2010 is bonded to the inside of a drip tube and fluid pressure within the drip tube increases, pressure is exerted on the exterior of the floor 2061 of the pressure compensating portion 2060 thereby causing the floor 2061 and at least two baffles 2067a, 2067b to move toward the tube surface to which the emitter 2010 is bonded. This reduces the cross-section of the flow channel 2050, 2060 (or flow passage opening) defined by the emitter 2010 and tube to which it is bonded and allows the emitter 2010 to compensate for the fluid pressure increase by making a corresponding decrease in flow passage cross-section to control the amount of fluid flowing therethrough. Also, the distal ends of the at least two baffles 2067a, 2067b form a pinch point or constriction 2060c through which the fluid must travel in order to pass through the flow passage and on to the outlet 2040 of the emitter. In the form illustrated, baffles 2067a, 2067b extend out from separate side walls that border the pressure compensating portion 2060 toward one another and in an upstream direction, with one of the at least two baffles 2067a, 2067b extending further than the other in order to create another pressure reducing turn for fluid traveling through the flow passage. In the form illustrated, the baffles 2067a, 2067b angle upstream and baffle 2067a extends further upstream than baffle 2067b in order to create an additional turn for the fluid traveling through the pinch point 2060c created by the ends of the baffles 2067a, 2067b.

Emitter 2010 includes a perimeter wall forming at least a portion of an exterior of the emitter body 2020 and forms a curved upper surface of the emitter body that is shaped to correspond to the inner radius of curvature of the tube to which the emitter is bonded (e.g., to an interior radius of curvature of the portion of the inner circumference of the inner surface of the irrigation drip line tube to which the emitter body is to be mounted). The step 2065a, 2065b in the at least two baffles 2067a, 2067b positions the upper surface of the baffles 2067a, 2067b below the upper surface of the remainder of the emitter or at least the perimeter wall of the emitter 2010. The steps 2065a, 2065b allow fluid to flow over at least some portions of the baffles 2067a, 2067b at all times, but primarily allow the baffles 2067a, 2067b to move more consistently from emitter to emitter and, thus, allow the emitters to be manufactured with more repeatable accuracy (again emitter to emitter). In turn, this means that emitters with more consistent performance from emitter to emitter will yield dripline with more consistent performance (dripline to dripline). In a preferred process, a plurality of emitters of the type disclosed herein (both above and below) will be bonded to the inner surface of drip line tubing, at regular intervals, as the tubing is extruded and then an opening (e.g., hole, slit, etc.) will be formed in the tubing over the emitter outlet 2040 in order to form operational drip line tubing that allows fluid flowing through the tubing to flow into the emitter inlet 2030, through the flow passage 2050, 2060 to the emitter outlet 2040 and then out through the opening (e.g., hole, slit, etc.) formed in the drip line tubing.

The emitter 2010 preferably defines a generally planar floor in the outlet 2040 and an obstruction, such as walls 2041a-c, extending upward from the floor for preventing the outlet 2040 from collapsing in response to increases in pressure of the pressurized fluid traveling through the drip line tubing. In the form illustrated, the obstruction comprises a first wall 2041b extending from a side wall defining a portion of the outlet 2040 and extending into a center of the outlet 2040, and two additional free standing walls 2041a, 2041c positioned on opposite sides of the first wall 2040b and spaced from any side walls defining the outlet 2040 so as to prevent creating dead ends or zones where grit/debris can become trapped within the emitter. The upstanding edges of the walls can be curved. These features help the emitter 2010 flush grit that may be encountered during use of the emitter 2010 in normal applications or uses.

An inlet protrusion 2032 that extends away from the emitter body 2020 to draw fluid from a position closer to the center of the irrigation drip line tube instead of from an outer periphery of the tube is also illustrated and helps reduce the amount of grit introduced into the emitter 2010. In some forms, the inlet protrusion 2032 may define a channel or channels on a distal end thereof, such as the channels 1332a-f illustrated in FIGS. 14A-B above, which are sized to deflect foreign material (e.g., grit/debris) from obstructing the inlet or entering the emitter body 2010 with the channel being defined by an exterior surface of the inlet protrusion, as has been discussed in alternate embodiments disclosed herein. However, in the form illustrated in FIGS. 21A-E, such an inlet protrusion channel or filter is not needed in all forms of the emitter given the grit flushing ability of emitter 2010.

Thus, when inserted into tubing, the emitter 2010 and tubing form irrigation dripline having a tube with an inside surface, at least one discrete elastomeric emitter body 2010 attached to the inside surface of the tube and integrally defining: an inlet on a first side of the body 2020 for receiving pressurized fluid from the tube; a pressure reducing flow channel 2050 extending from the inlet 2030 for reducing a pressure and flow of fluid received at the inlet 2030; and a pressure compensating chamber 2060 configured to receive fluid from the pressure reducing flow channel 2050. The PC chamber 2060 is defined by moveable floor 2061 and at least two opposing side walls and the inside surface of the tubing to which the emitter is connected. The chamber 2060 preferably includes at least two teeth or baffles 2067a, 2067b, with one extending from each of the at least two opposing side walls toward a center region of the chamber 2060. The at least two teeth 2067a, 2067b dividing the chamber 2060 into at least an upstream portion 2060a and a downstream portion 2060b, the upstream portion 2060a being larger than the downstream portion 2060b, and the two teeth 2067a, 2067b being moveable toward and away from the inside surface of the tube an amount depending on the pressure of the fluid in the tube to adjust the pressure and flow of the fluid received from the pressure reducing flow channel 2050. In the form illustrated, the teeth 2067a, 2067b originate from a position in the chamber closer to the outlet 2040 than the PR flow passage 2050 and angle upstream toward the center region of the PC chamber 2060.

In a preferred form, the pressure reducing flow channel 2050 has a floor or bottom with a first thickness and the moveable floor 2061 of pressure compensation chamber 2060 has a second thickness, the second thickness being less than the first thickness to allow sufficient movement of the moveable floor 2061 relative to the remainder of the emitter and/or the tubing for providing a predetermined range of movement for the moveable floor. More particular, in the form illustrated, the exterior of emitter body 2020 is recessed (e.g., into the side from which inlet protrusion 2132 extends) to reduce thickness of the movable floor 2061 as compared to the remainder of the emitter 2010 (and in particular the floor of the pressure reduction flow channel 2050 and outlet 2040). This allows the moveable floor 2061 to operate like a trampoline and more easily move teeth or baffles 2067a, 2067b and/or makes the emitter 2010 more easily reproducible with consistent performance characteristics. A cross-sectional view exemplifying this floor thickness is shown and will be discussed further with respect to FIG. 24E. Although the floor of the remainder of the flow passage (e.g., pressure reduction portion) and the outlet illustrated in that cross-sectional view is illustrated as rather thick, in alternate embodiments moveable floors of different thickness may be used, such as thinner floors like the one illustrated in FIG. 19B (see floor 1861).

In operation, the teeth 2067a, 2067b move toward the wall of the drip line tube to which the emitter is connected as pressure of the supply fluid in the tube increases. This causes the passage over the teeth 2067a, 2067b to become smaller and, therefore, restricts flow past the teeth 2067a, 2067b. As pressure of the supply fluid in the tube decreases, the teeth 2067a, 2067b move away from the wall of the drip line tube to which the emitter is connected (e.g., away from the inner tube surface) to allow more fluid to flow through the emitter (e.g., over teeth 2067a, 2067b). In addition, one tooth extends slightly further upstream than the other in order to introduce yet another turn in the flow passage as the teeth are constricted for further pressure reduction. In a preferred form, the emitter 2010 is configured to produce drips of fluid at a 0.4 gallon per hour (0.4 gph) flow rate.

As mentioned, there is potential for obstructions, such as grit, to affect or even clog the emitter 2010, especially at the teeth 2067a, 2067b in the pressure compensation portion or chamber 2060. For instance, as the supply line fluid pressure increases, the teeth 2067a, 2067b move toward the inner surface of the tube creating a constriction along the top of the teeth 2067a, 2067b (as described above). There also is a constriction between the distal ends of the teeth 2067a, 2067b. As these constrictions form, the risk of grit clogging the edges of teeth 2067a, 2067b increases as does the risk for complete blockage or clogging of the emitter 2010. Once the blockage or clogging affects the flow too much, pressure will build up on the upstream side 2060a of teeth 2067a, 2067b. Since the area of the floor 2061 on the upstream side 2060a of the teeth and the volume of that upstream portion of the PC chamber is greater than the area of the floor on the downstream side 2060b and the volume of that downstream portion of the PCT chamber, the pressure will cause the floor 2061 to move away from the inside surface of the tube. This will cause the teeth 2067a, 2067b to also move away from the inner surface of the tube, which permits the debris forming the clog or blockage to be flushed from the pressure regulating chamber 2060 over the teeth 2067a, 2067b. Once the blockage or clog is flushed sufficiently, the pressure build-up on the upstream side 2060a of the teeth 2067a, 2067b will drop and the pressure compensating chamber 2060 will resume its normal pressure compensating function.

In a preferred form, the walls or teeth 2067a, 2067b are angled or pointed upstream on an intersecting course from the walls from which they extend within the pressure compensating chamber 2060 in order to prevent the teeth 2067a, 2067b from forming a funnel that could get clogged more easily and frequently. This is counter-intuitive as one would normally think to have the baffles aligned or funnel downstream in order to assist with fluid flow and, in particular, the flushing of grit/debris. It also is counter-intuitive in that the design used appears to form dead ends or zones at the upstream side of the base of each tooth where the tooth connects to the side wall from which it extends. However, applicant has found that by using this configuration the volume and area of the upstream side 2060a of the pressure compensation portion 2060 is capable of being made larger than the volume and area of the downstream side 2060b and allows the emitter 2010 to flush grit, debris or obstructions more effectively in the manner discussed above. In the form shown, the tips of teeth 2067a, 2067b do not overlap with one another and include a gap (e.g., 0.005±0.002) at the pinch point 2060c in order to help flush grit/debris. Further dimensions regarding an exemplary PC chamber will be discussed in more detail below with respect to FIGS. 24A-F.

Another embodiment of an emitter in accordance with the invention is illustrated in FIGS. 22A-E and in keeping with prior practice, the following will use the same latter two-digit reference numeral to describe similar items, but use the prefix 21 to distinguish this embodiment from others. Thus, in these illustrations, the emitter is referred to general as 2110 and integrally defines an inlet 2130, an outlet 2140 and a passage made up of a pressure reduction (PR) portion 2150 and a pressure compensation (PC) portion 2160 all formed from a uniform elastomeric material. Unlike the embodiment of FIGS. 21A-E, emitter 2110 of FIGS. 22A-E has a consistent pressure reduction passage 2150 that serpentines back and forth, but in a less aggressive manner as that used with emitter 2010. The emitter 2110 further includes in inlet protrusion 2132 defined by an elongated protrusion or projection extending from one end of the emitter body 2120 and outlet obstructions, such as walls 2141a-c, for preventing the outlet 2140 from collapsing under pressure when pressure increases in the lumen of the tubing to which the emitter 2110 is mounted.

The PC portion 2160 is similar to that of the PC portion 2060 of emitter 2010. The PC portion 2160 includes moveable floor 2161 and tapered baffles 2167a, 2167b which extend from side walls that define the PC portion 2160. The baffles 2167a, 2167b are preferably angled upstream toward one another and the center of the PC portion 2160, with one baffle 2167a extending further upstream than the other baffle 2167b in order to provide an additional pressure reducing turn that fluid has to make when the movable floor 2161 is moved toward the inner surface of the tube to which the emitter 2110 is mounted as fluid pressure conditions within the tube increase. Like emitter 2010, the distal ends of baffles or teeth 2167a, 2167b form a pinch point or constriction 2160c through which fluid traveling through the emitter 2110 has to pass. The baffles or teeth 2167a, 2167b further separate the PC portion 2160 into an upstream portion 2160a and a downstream portion 2160b, and the upstream portion 2160a has an area and volume greater than the area and volume of the downstream portion 2160b so that more pressure is exerted on the upstream portion 2160a of the PC portion 2160 so as to assist with flushing grit through emitter 2110.

In operation, the teeth 2167a, 2167b move toward the wall of the drip line tube to which the emitter 2110 is connected as pressure of the supply fluid in the tube increases. This causes the passage over the teeth 2167a, 2167b to become smaller and, therefore, restricts flow past the teeth 2167a, 2167b. As pressure of the supply fluid in the tube decreases, the teeth 2167a, 2167b move away from the wall of the drip line tube to which the emitter is connected (e.g., away from the inner tube surface) to allow more fluid to flow through the emitter (e.g., over teeth 2167a, 2167b). In addition, one tooth extends slightly further upstream than the other in order to introduce yet another turn in the flow passage as the teeth are constricted for further pressure reduction. In the form illustrated, the emitter 2110 is configured to drip fluid at a flow rate of approximately 0.6 gallons per hour (0.6 gph).

As mentioned previously, there is potential for obstructions, such as grit, to affect or even clog the emitter 2110, especially at the teeth 2167a, 2167b in the pressure compensation portion or chamber 2160. For instance, as the supply line fluid pressure increases, the teeth 2167a, 2167b move toward the inner surface of the tube creating a constriction along the top of the teeth 2167a, 2167b (as described above). There also is a constriction 2160c between the distal ends of the teeth 2167a, 2167b. As these constrictions form, the risk of grit clogging at the teeth 2167a, 2167b increases as does the risk for complete blockage or clogging of the emitter 2110. Once the blockage or clogging affects the flow too much, pressure will build up on the upstream side 2160a of teeth 2167a, 2167b. Since the area of the floor 2161 and corresponding volume on the upstream side 2160a of the teeth is greater than that of the downstream side 2160b, the pressure will cause the floor 2161 to move away from the inside surface of the tube. This will cause the teeth 2167a, 2167b to also move away, which permits the debris forming the clog or blockage to be flushed from the pressure regulating chamber 2160. Once the blockage or clog is flushed sufficiently, the pressure build-up on the upstream side 2160a of the teeth 2167a, 2167b will drop and the pressure compensating chamber 2160 will resume its normal pressure compensating function.

In a preferred form, the walls or teeth 2167a, 2167b are angled or pointed upstream on an intersecting course from the walls from which they extend within the pressure compensating chamber 2160 in order to prevent the teeth 2167a, 2167b from forming a funnel that could get clogged more easily and frequently. This is counter-intuitive as one would normally have the teeth extend directly toward one another, or staggered but extending in opposing directions, or angled downstream to create a pressure reduction, but not a clogging point. It also is counter-intuitive in that the design used appears to form dead ends or zones at the upstream side of the base of each tooth where the tooth connects to the side wall from which it extends and could collect debris that ultimately could clog the emitter. However, applicant has found that by using this configuration the areas at the base of the teeth flush better. Further, this configuration assists to make the area and volume of the upstream side 2160a of the pressure compensation portion 2160 larger than the area and volume of the downstream side 2160b and allows the emitter 2110 to flush grit, debris or obstructions in the manner discussed above. In the form shown, the tips of teeth 2167a, 2167b do not overlap with one another and include a gap (e.g., 0.005±0.002) at pinch point 2160c in order to help flush grit.

Yet another emitter design in accordance with the invention is illustrated in FIGS. 23A-E and, in keeping with prior practice regarding use of similar numbering on similar items, is referenced generally by reference numeral 2210. In the form illustrated, emitter 2210 forms a discrete, single piece, elastomeric emitter body 2220 intended to be bonded to a portion of an inner surface of a drip line tube and integrally forming an inlet 2230, an outlet 2240 and a flow passage extending between the inlet 2230 and outlet 2240 made up of a pressure reduction (PR) portion 2250 and a pressure compensation (PC) portion 2260. PR portion 2250 travels in a less aggressive serpentine manner (even less aggressively than the PR portion 2150 of emitter 2110) and has smooth walls over a portion of its distance (rather than teeth extending from the walls over the length of the PR portion). In comparison, the PR portion 2050 causes the most pressure reduction, the PR portion 2150 causes the second most pressure reduction, and this PR portion 2250 causes the least pressure reduction of the three PR portions disclosed in the embodiments of FIGS. 21A-23F. The emitter 2210 further includes an inlet protrusion 2232 to draw cleaner (or less gritty) water from the center of the drip line and includes outlet obstructions or supports, such as walls 2241a-c, to prevent the outlet 2240 from collapsing under increased fluid line pressure.

Like the emitter embodiments of FIGS. 21A-E and 22A-E, emitter 2210 of FIGS. 23A-E further includes a moveable floor 2261. The exterior of the emitter body 2220 is recessed to reduce the thickness of the floor 2261 and allow the floor 2261 to move more easily and responsively to changes in fluid pressure within the tube to which the emitter is mounted. Thus, floor 2261 operates in a trampoline-like manner to move tapered baffles or walls 2267a, 2267b between a first, low fluid pressure position and a second, high fluid pressure position. The low and high fluid pressure referring to the fluid pressure of the fluid within the lumen of the drip line tube in which the emitter 2210 is mounted or affixed. The tapered baffles or walls 2267a, 2267b form a pinch point or constriction 2260c through which fluid must travel. The constriction further forms when the baffles 2267a, 2267b move toward their high fluid pressure position. That is, as they move toward the inner surface of the tube that the emitter is connected to as fluid pressure increases in the tube (i.e., when the floor 2161 elevates), which translates to a flow passage having a smaller cross-sectional area than the flow passage cross-sectional area when the baffles 2267a, 2267b are in their low fluid pressure position (i.e., when the floor 2161 is in its normally biased position). Baffle walls 2267a, 2267b extend from side walls defining PC portion 2260 and are angled upstream so as to divide the PC portion into a PC portion having an upstream portion 2260a and a downstream portion 2260b, with the upstream portion 2260a having a greater area and volume than the downstream portion 2260b so that more pressure is exerted against the upstream portion 2260a to help flush the emitter 2210 of grit.

In operation, the teeth 2267a, 2267b move toward the wall of the drip line tube to which the emitter 2210 is connected as pressure of the supply fluid in the tube increases. This causes the passage over the teeth 2267a, 2267b to become smaller and, therefore, restricts flow past the teeth 2267a, 2267b. As pressure of the supply fluid in the tube decreases, the teeth 2267a, 2267b move away from the wall of the drip line tube to which the emitter is connected (e.g., away from the inner tube surface) to allow more fluid to flow through the emitter (e.g., over teeth 2267a, 2267b). In addition, one tooth extends slightly further upstream than the other in order to introduce yet another turn in the flow passage as the teeth are constricted for further pressure reduction. In the form illustrated, the emitter 2210 is configured to drip fluid at a flow rate of approximately 0.9 gallons per hour (0.9 gph).

As mentioned previously, there is potential for obstructions, such as grit, to affect or even clog the emitter 2210, especially at the teeth 2267a, 2267b in the pressure compensation portion or chamber 2260. For instance, as the supply line fluid pressure increases, the teeth 2267a, 2267b move toward the inner surface of the tube creating a constriction along the top of the teeth 2267a, 2267b (as described above). There also is a constriction between the distal ends of the teeth 2267a, 2267b. As these constrictions form, the risk of grit clogging the edges of teeth 2267a, 2267b increases as does the risk for complete blockage or clogging of the emitter 2210. Once the blockage or clogging affects the flow too much, pressure will build up on the upstream side 2260a of teeth 2267a, 2267b. Since the area of the floor 2261 on the upstream side 2260a of the teeth is greater than the area of the floor on the downstream side 2260b, the volume of the upstream portion is larger than the volume of the downstream portion and pressure will cause the floor 2261 to move away from the inside surface of the tube. This will cause the teeth 2267a, 2267b to also move away, which permits the debris forming the clog or blockage to be flushed from the pressure regulating chamber 2260. Once the blockage or clog is flushed sufficiently, the pressure build-up on the upstream side 2260a of the teeth 2267a, 2267b will drop and the pressure compensating chamber 2260 will resume its normal pressure compensating function.

In a preferred form, the walls or teeth 2267a, 2267b are angled or pointed upstream on an intersecting course from the walls from which they extend within the pressure compensating chamber 2260 in order to prevent the teeth 2267a, 2267b from forming a funnel that could get clogged more easily and frequently. This is counter-intuitive as one would normally think to have the baffles aligned or funnel downstream to assist operation of the emitter and the emitter's ability to process or handle debris/grit. It also is counter-intuitive in that the design used appears to form dead ends or zones at the upstream side of the base of each tooth where the tooth connects to the side wall from which it extends. However, applicant has found that by using this configuration the area and volume of the upstream side 2260a of the pressure compensation portion 2260 is capable of being made larger than that of the downstream side 2260b and allows the emitter 2210 to flush grit or obstructions in the manner discussed above. In the form shown, the tips of teeth 2267a, 2267b do not overlap with one another and include a gap (e.g., 0.005±0.002) in order to help flush grit, and the teeth 2267a, 2267b form an acute angle with the respective walls they extend from on their upstream side and an obtuse angle with the respective walls they extend from on their downstream side.

Yet another elastomeric emitter embodiment is illustrated in FIGS. 24A-F. In keeping with prior practice, items that are similar to those discussed above will use the same latter two digit reference numeral but add the prefix "23". Thus, the emitter is referred to generally by reference numeral 2310 and includes an emitter body 2320 made of a single piece construction and integrally forming an inlet 2330, outlet 2340 and an internal flow passage having a pressure reduction (PR) portion 2350 and a pressure compensating (PC) portion 2360. Like the emitter of FIGS. 21, 22 and 23, the emitter of FIGS. 24A-F includes an inlet protrusion 2332 that forms a perimeter wall extending about the inlet opening 2330 and helps draw fluid from a position closer to the center of the conduit or tubing within which the emitter is mounted. The PC portion 2360 has two tapered baffle teeth 2367a, 2367b that divides the PC portion 2360 into an upstream portion 2361a and a downstream portion 2361b.

In the form illustrated, the outer boundary or side walls that define the PC portion 2360 have a length of two hundred thousandths of an inch plus or minus five thousandths of an inch (0.200"±0.005") and a width of two hundred thirty two thousandths of an inch plus or minus five thousandths of an inch (0.232"±0.005"), with the height of the PC portion (floor height) being twenty five thousandths of an inch plus or minus five thousandths of an inch (0.025"±0.005"). The height of the PC portion is slightly smaller than the height of the PR portion which is thirty hundredths of an inch plus or minus fifteen thousandths of an inch (0.32"±0.015"). This further reduces the cross-section of the flow passage from inlet 2330 to outlet 2340 and helps with pressure reduction. The teeth 2367a, 2367b have a step (e.g., gusset step) of five thousandths of an inch plus or minus two thousandths of an inch (0.005"±0.002") and taper down to a distal end height of fifteen thousandths of an inch plus or minus two thousandths of an inch (0.015"±0.002"). In order to ensure the PC portion 2360 provides enough movement to compensate for fluid line pressure increases in the inner lumen of the conduit containing the emitter 2310, the floor of the PC portion has a thickness or height of thirty thousandths of an inch plus or minus two thousandths of an inch (0.030"±0.002"). Thus, the teeth 2367a, 2367b act as stepped flipper teeth that move up and down with changes in fluid line pressure to compensate for such changes.

In the form illustrated in FIGS. 24A-F, the teeth 2367a, 2367b extend from their respective side walls at an angle $\alpha$ and an angle $\beta$, respectively. In a preferred form, angle $\alpha$ of tooth or stepped flipper 2367a is fifty-two degrees ($\alpha$=52°), however, in alternate forms this angle may range between forty-seven degrees to fifty-seven degrees ($\alpha$: 47°-57°) (which is 52°±5°). In still other forms, angle $\alpha$ may range between forty-two degrees and sixty-two degrees ($\alpha$: 42°-62°) (or 52°±10°). In the form illustrated, the angle $\beta$ that tooth or stepped flipper 2367b extends from the side wall of the PC portion is fifty-two degrees ($\alpha$=60°), however, in alternate forms this angle may range between fifty-five degrees to sixty-five degrees ($\beta$: 55°-65°) (which is 60°±5°). In still other forms, angle $\beta$ may range between fifty degrees and seventy degrees ($\beta$: 50°-70°) (or 60°±10°). These angles, combined with the length of the teeth or flippers 2367a, 2367b, allow the first tooth or stepped flipper 2367a to extend further upstream than second tooth or stepped flipper 2367b in order to position the opening or pinch point 2360c in the middle of the PC portion 2360. In the form illustrated in FIGS. 24A-F, the opening between the teeth 2367a, 2367b is positioned in the middle of the PC pocket 2360 to obtain maximum deflection of the teeth 2367a, 2367b, which allows maximum pressure compensation.

In the form illustrated, the upstream PC portion 2361a on one side of teeth 2367a, 2367b defines a first volume (e.g., a PC entrance volume or upstream volume) and the downstream PC portion on the other side of teeth 2367*a*, 2367*b* defines a second volume (e.g., the PC exit volume or downstream volume). In a preferred form, the ratio of the PC entrance volume to exit volume is within the range of twenty hundredths to fifty hundredths (0.20 to 0.50), which may also be referred to as the grit resistance ratio. In a preferred form, the ratio of the PC entrance volume to PC exit volume is between thirty five hundredths and thirty-nine hundredths (0.35 to 0.39). In the form illustrated, the ratio between the PC entrance volume to PC exit volume is thirty seven hundredths plus or minus fifteen thousandths (0.37±0.015). While these dimensions and ratios have only been discussed with respect to the embodiment of FIGS. 24A-F, it should be understood that they may apply to any of the emitters discussed herein and, without limitation, specifically the emitters of FIGS. 21-24. Furthermore and as with earlier embodiments, it should be understood that the end views of the emitter of FIGS. 24A-F have not been illustrated because these look like the end views already illustrated in prior embodiments (e.g., FIGS. 10E, 11E, etc.).

In the emitter of FIGS. 24A-F, the outlet 2340 includes an alternate set of outlet protrusions 2341*a*, 2341*b* and 2341*c* that are used to prevent the outlet from collapsing completing under increased fluid pressure in the main tubing or conduit the emitter is mounted to or in. In prior embodiments, these outlet protrusions were either walls extending from one side wall of the outlet or free standing posts or walls, however, in the embodiment of FIGS. 24A-F, the outlet protrusions 2341*a*, 2341*b* and 2341*c* are walls that extend from a first wall of the outlet 2340 to a second wall of the outlet 2340 opposite the first wall. By extending one end of the outlet to the other opposite end of the outlet, the protrusions 2341*a*, 2341*b* and 2341*c* strengthen the outlet construction and, thereby, further prevent the outlet 2340 from collapsing under high fluid pressure (which would negatively impact the emitters ability to drip fluid from the outlet as is intended for this structure).

A prior shortcoming noted with outlet protrusions that connect directly to a side wall of the outlet 2340 is that they can form dead ends or zones that grit or debris collects in, which can ultimately prevent the emitter from operating in a preferred way (e.g., due to clogging, hindering movement, etc.). In the form illustrated in FIGS. 24A-F, however, the emitter 2310 is capable of avoiding such dead end shortcomings by using an outlet wall that is shorter than the height of the outlet 2340 and, in a preferred form that has a truncated triangular cross-section (e.g., a triangular shape with the tip or top of the triangular structure removed). This structure allows the outlet protrusions 2341*a*, 2341*b* and 2341*c* to assist in strengthening the structural integrity of the outlet bath 2340 and preventing it from collapsing fully under increased fluid pressure in the inner lumen of the drip line or tubing, while still allowing grit to be flushed through the outlet bath 2340 so that the grit is not allowed to collect and interfere with the operation of the emitter 2310.

Figure 24A:
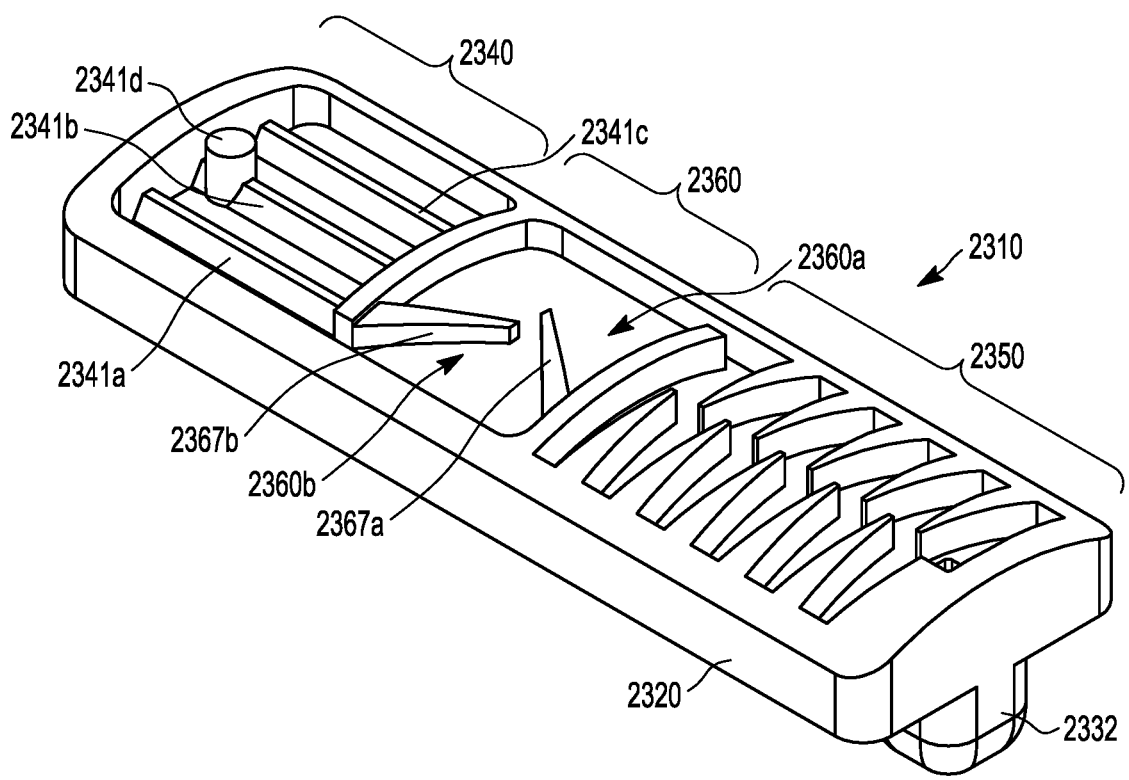
FIGS. 24A-D are perspective, top, bottom and left side elevation views, respectively, of another elastomeric emitter in accordance with embodiments of the invention.
Figure 24B:
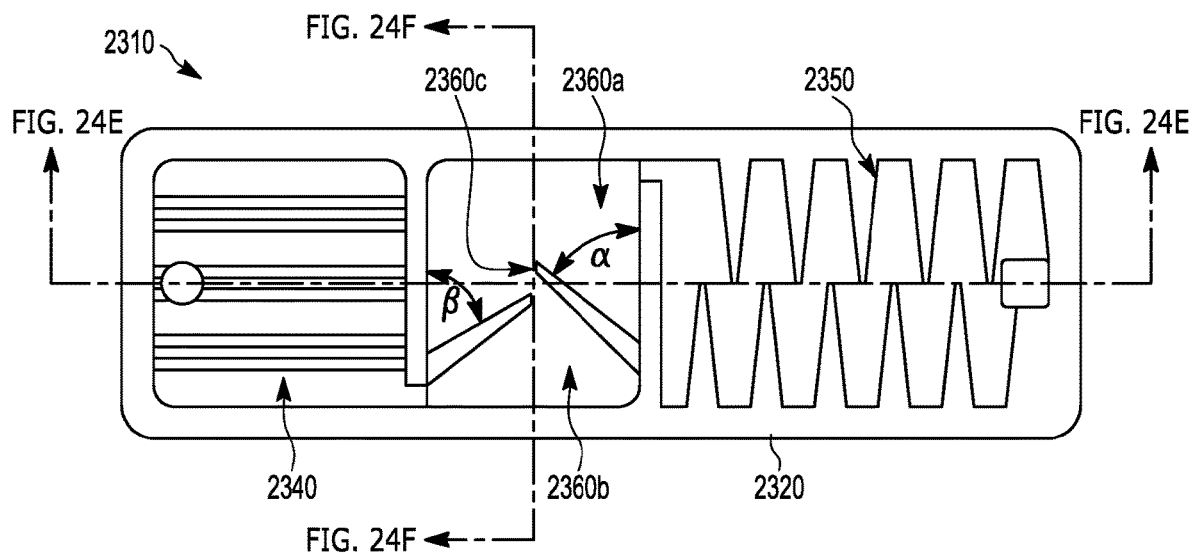
Figure 24C:
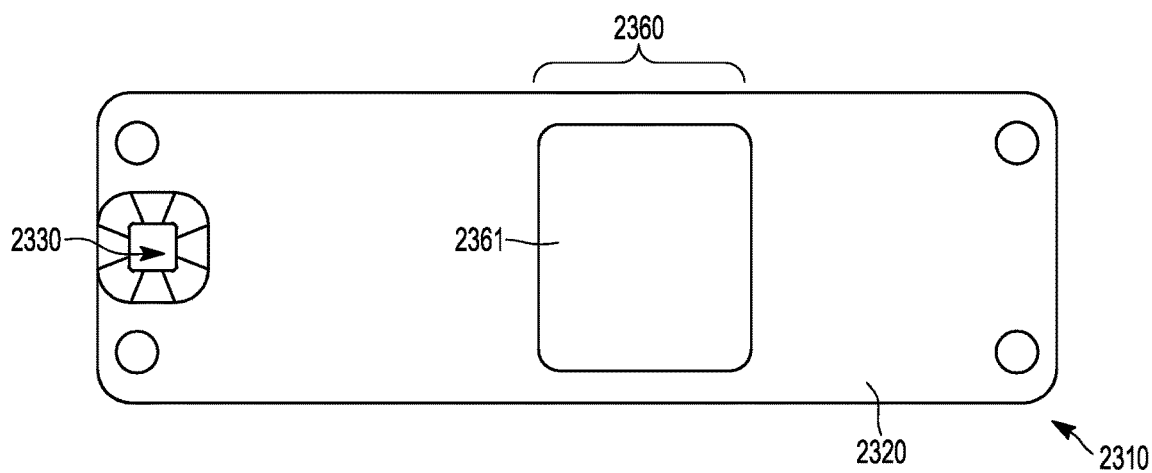
Figure 24D:
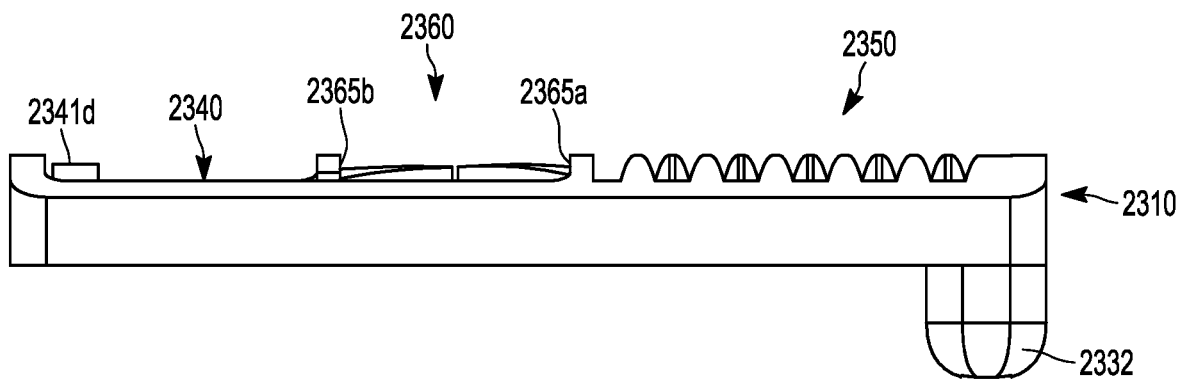

In the form illustrated in FIGS. 24A-F, the emitter 2310 is injection molded and, thus, has a gate 2341*d* where the molten material enters the cavity of the mold. As can be seen in FIGS. 24A, B, D and E, in a preferred form the gate 2341*d* is slightly higher than the height of the outlet protrusions 2341*a*, 2341*b* and 2341*c*, but lower than the height of the nearby perimeter walls of emitter 2310. In instances where the outlet floor is movable enough to fully collapse shut against the inside surface of the tube (or collapse fully under pressure to have the floor contact the inside surface of the tube at least enough to block the outlet opening in the tube), having the gate 2341*d* be taller than the nearby outlet protrusions 2341*a-c*, prevents the outlet floor from being capable of such a total collapse so that the emitter continues to operate as desired. In the form shown, however, the outlet protrusions 2341*a-c* structurally strengthen the outlet 2340 so that such a total collapse of the outlet is not possible.

In addition, by having the gate 2341*d* be slightly lower than the nearby perimeter walls of the outlet 2340, this prevents the gate 2341*d* from interfering with the insertion tooling's ability to form an outlet in the outer drip line tube aligned with the outlet bath 2340 and/or prevents the gate 2341*d* from potentially blocking (partially or totally) the outlet formed in the outer drip line tubing which would prevent the emitter 2310 from operating in the intended way. For example, in some forms where the gate 2341*d* is generally equal in height with the height of the nearby perimeter walls and the outlet opening in the outer drip line tubing is aligned at least partially with the gate 2341*d*, the gate 2341*d* can at least partially obstruct the outlet opening as the floor of the outlet 2340 moves due to increased fluid pressure in the inner lumen of the drip line tube. This obstruction can be enough to cause the emitter 2310 to interfere with the normal flow of fluid from the emitter 2310. In some examples, rather than having fluid drip from the emitter 2310 and out of the outlet formed in the outer drip line tubing as is normally desired, the obstruction caused by the gate 2341*d* can cause the fluid to squirt from the outlet opening of the outer drip line tube in an undesirable fashion. Although the outer drip line tube is not illustrated in FIGS. 24A-F, it is similar to the outer drip line tube illustrated in prior embodiments (e.g., tube 70 in FIG. 1F-H, tube 170 in FIGS. 2E-F, tube 270 in FIG. 3A, tube 970 in FIG. 10E, etc.).

Figure 24E:
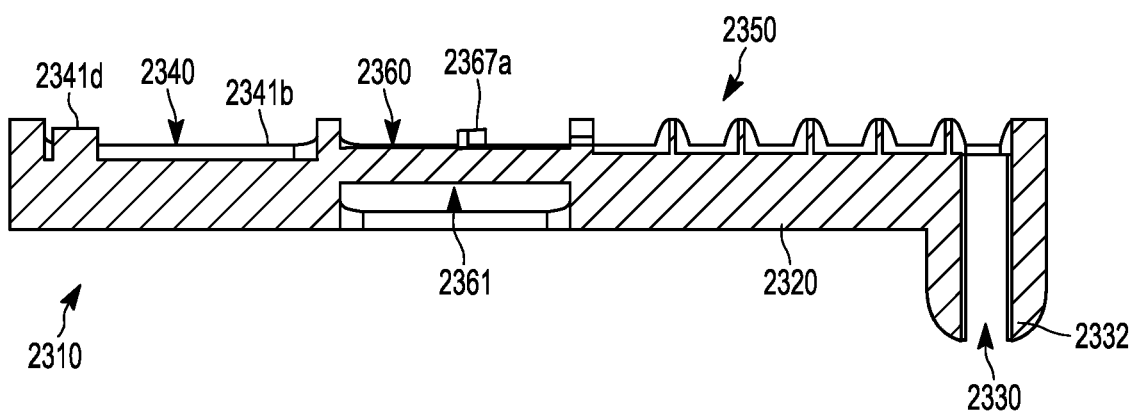
FIGS. 24E-F are left-side cross-sectional and front cross-sectional views of the emitter of FIGS. 24A-D taken along line A-A and line B-B of FIG. 24A, respectively.
Figure 24F:
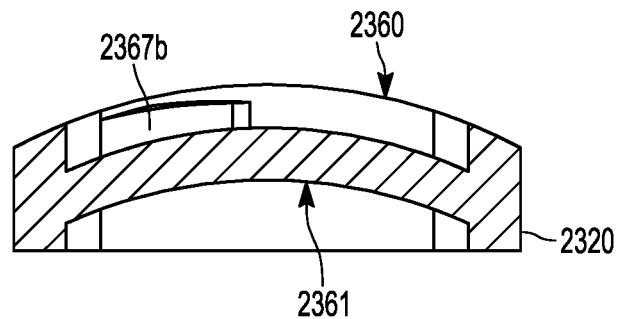

While a cross-section of the emitter of FIGS. 24A-F taken along the longitudinal axis of same has been illustrated in FIG. 24E, it should be understood that the cross-sections of the emitters of FIGS. 21A-23D would look similar at least with respect to floor thickness, and PR, PC and outlet size. Although the floor of the remainder of the flow passage (e.g., pressure reduction portion) and the outlet illustrated in that cross-sectional view is illustrated as rather thick, in alternate embodiments moveable floors of different thickness may be used to achieve the amount of floor deformation under pressure that is desired to compensate for fluid pressure increases in the supply line or main lumen of the tube. For example, in some forms, a thinner floor may be desired like that illustrated in FIG. 19B (see floor 1861).

Figure 25A:
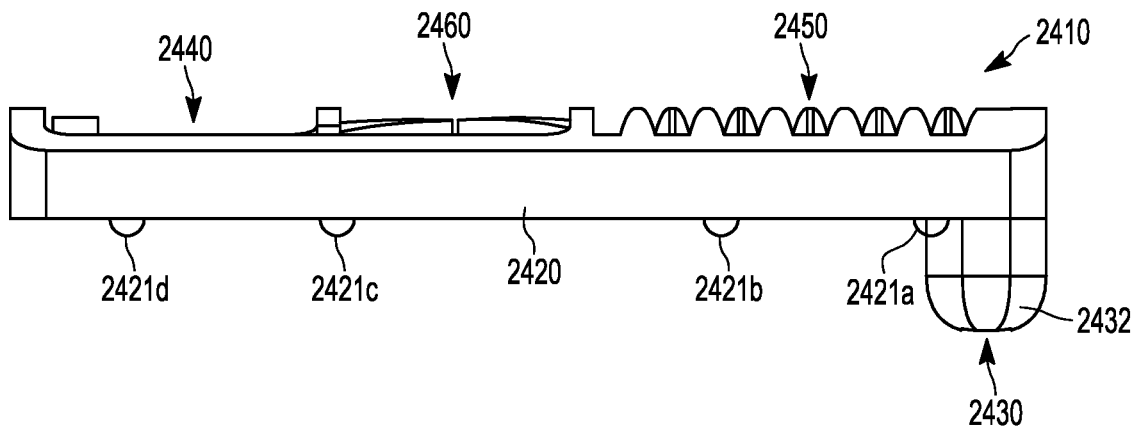
FIGS. 25A-B are left-side elevation and bottom views of an elastomeric emitter in accordance with embodiments of the invention illustrating eight protrusions that may be used to assist in removal of the emitter from a mold and/or transport the emitter through insertion tooling.
Figure 25B:
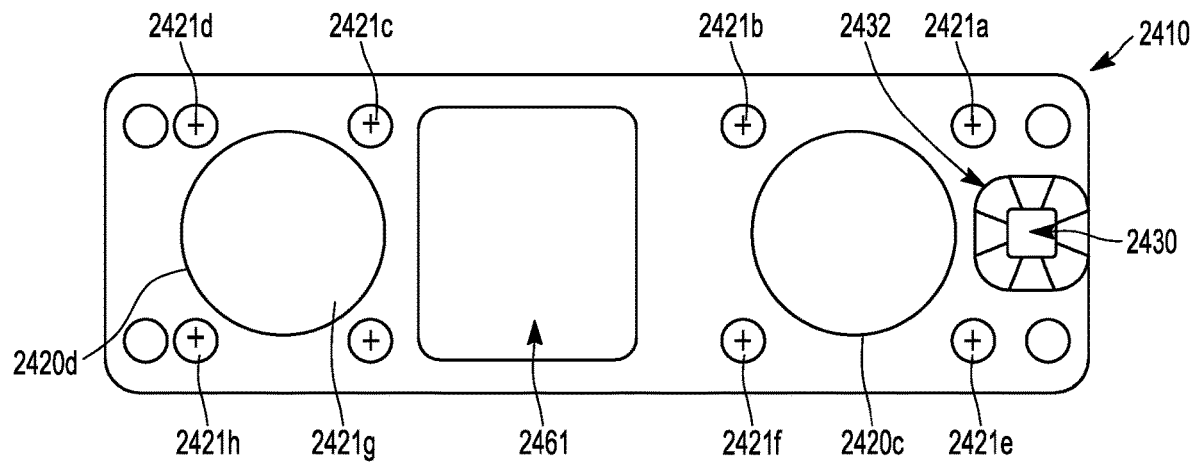
Figure 26:
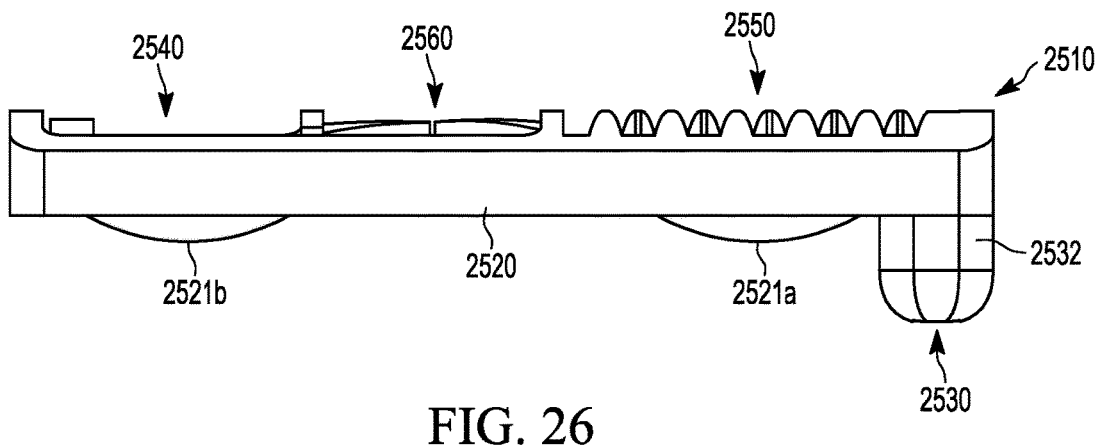
FIG. 26 is a left-side elevation view of an elastomeric emitter in accordance with embodiments of the invention and illustrating two protrusions that may be used to assist in removal of the emitter from a mold and/or transport the emitter through insertion tooling.

In FIGS. 25A-B and 26, elastomeric emitters like any of those discussed herein are illustrated. In keeping with prior practice, items that are similar to those discussed above will use the same latter two-digit reference numeral and including the prefix "24" for the embodiment of FIGS. 25A-B and "25" for the embodiment of FIG. 26. Thus, the emitters of FIGS. 25A-B and 26 are referred to generally by reference numerals 2410 and 2510, respectively, and respectively have bodies 2420, 2520 that integrally form inlets 2430, 2530, outlets 2440, 2540, pressure reduction flow passages 2450, 2550 and pressure compensating flow passages 2460, 2560. Unlike prior embodiments, however, emitters 2410 and 2510 further include at least one protrusion extending from an exterior surface of the emitter 2410, 2510 which assists in the removal of the emitter from the injection molding mold and/or the transport of the emitter through emitter insertion tooling.

In FIGS. 25A-B, the emitter 2410 includes a plurality of such protrusions and the protrusions, are spaced apart from the inlet 2430 of the emitter 2410 on the bottom surface of the emitter body 2420 on the emitter body side opposite the side containing the flow passages 2450 and 2460 and outlet 2440. In FIGS. 25A-B the plurality of protrusions are illustrated as convex nubs or round (or rounded) protrusions 2421a, 2421b, 2421c, 2421d, 2421e, 2421f, 2421g and 2421h. The protrusions are aligned with four on one side of the bottom surface of the emitter and the other four on the opposite side of the bottom surface of the emitter such that the protrusion pattern is laid out in a symmetrical orientation. In a preferred form, four protrusions are spaced around the perimeter of each ejector location 2420c and 2420d for the emitter 2410. The ejector locations 2420c, 2420d are the area where the injection mold tooling will press on to eject the emitter from the mold.

In FIG. 26, an alternate protrusion construction is illustrated. More particularly, in this embodiment, a plurality of protrusions is again used, however, in this form, only two protrusions are illustrated and they are aligned with the ejection areas of the emitter. In this form, the ejector locations are identical to those identified in FIGS. 25A-B (e.g., 2420c, 2420d) and the protrusions 2521a, 2521b correspond in shape to the ejector locations (meaning the diameters of the protrusions 2521a, 2521b are the same size as the circles 2420c, 2420d illustrated in FIG. 25B). Thus, in this form the protrusions 2521a, 2521b are round convex (preferably semi-spherical) dimples protruding from the bottom surface of emitter body 2520.

The protrusions 2421a-h and 2521a-b may assist in removing the emitter from the injection tooling mold, but a primary benefit of these protrusions is to help reduce the frictional surface area of the emitter 2410, 2510 so that the emitter is easier to transport through the insertion tooling. For example, such protrusions reduce the frictional surface area of the emitter as it is moved from a feeder bowl to an inserter via a conveyor of some form (e.g., conveyor belt, conveyor chain, etc.).

While many of the above-mentioned embodiments illustrate the tapered baffles of the PC portion extending from separate side walls and angled toward one another or on a path to intersect one another, it should be understood that in alternate embodiments the tapered baffles could extend from the same side wall of the PC portion and/or could extend out from a wall or walls parallel to one another in non-intersecting paths. It should also be understood that one or more features from any one of the above mentioned embodiments may be combined with one or more features from any other embodiment to come up with still other embodiments. For example, a root growth inhibitor, such as a copper plate, and associated retaining structure could be added to any of the emitters of FIGS. 21A-26. Similarly, although specific layouts have been illustrated, it is to be understood that in further alternate embodiments the layouts may be changed while still following the teachings of the illustrated embodiments to achieve new embodiments (such as to reach a desired flow rate, pressure reduction, pressure compensation or grit tolerance).

Yet another embodiment in accordance with the invention is illustrated in FIGS. 27A-J and, in keeping with prior numbering practice, is referred generally by reference numeral 2610. Like prior embodiments, the emitter 2610 is made of an elastomeric body 2620 and integrally defines an inlet 2630, outlet bath 2640 and a flow channel extending between the inlet 2620 and outlet bath 2640 having a pressure reduction portion 2650 and a pressure compensating portion 2660. In a preferred form, the inlet 2630 includes an inlet protrusion 2632 comprising a perimeter inlet wall that defines an inlet channel terminating at the pressure reduction flow channel 2650, and the outlet bath 2640 includes a plurality of shortened outlet walls 2641a, 2641b and 2641c which strengthen the outlet and help flush grit and/or hinder grit buildup as discussed in prior embodiments (e.g., FIGS. 24A-F). In the form illustrated, the outlet bath 2640 also includes a reduced height gate 2641d which is lower than the surrounding outlet perimeter walls to prevent the above-mentioned complications when the outlet is formed in the outer tubing of the assembled drip line and emitter.

Figure 27A:
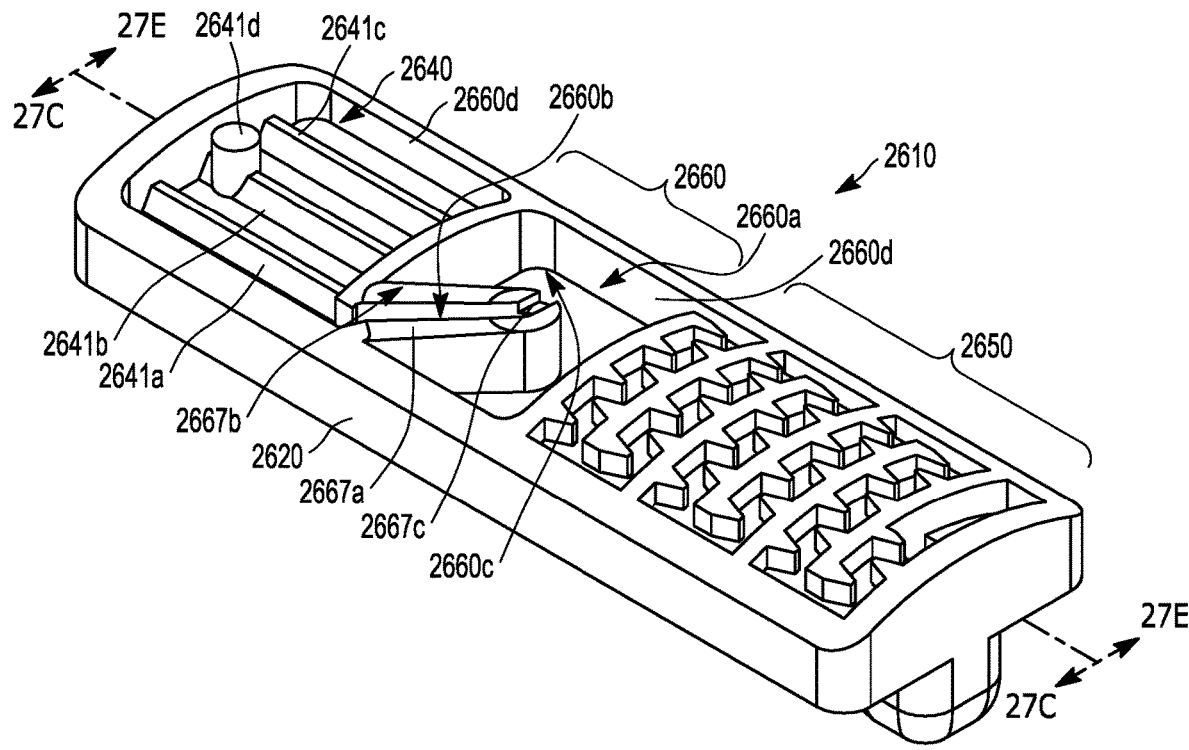
FIGS. 27A-J are top perspective, right-side elevation, right-side cross-sectional taken along line 27C-27C in FIG. 27A, left-side elevation, left-side cross-sectional taken along line 27E-27E in FIG. 27A, bottom perspective, top, bottom, front elevation and rear elevation views, respectively, of another elastomeric emitter in accordance with embodiments of the invention.
Figure 27B:
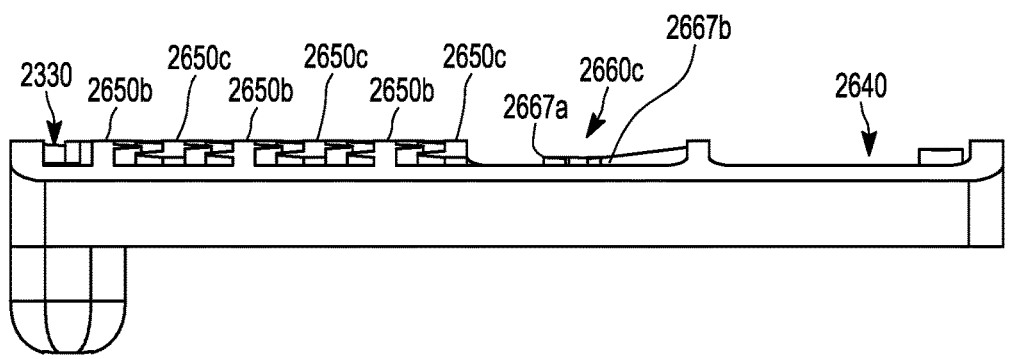
Figure 27C:
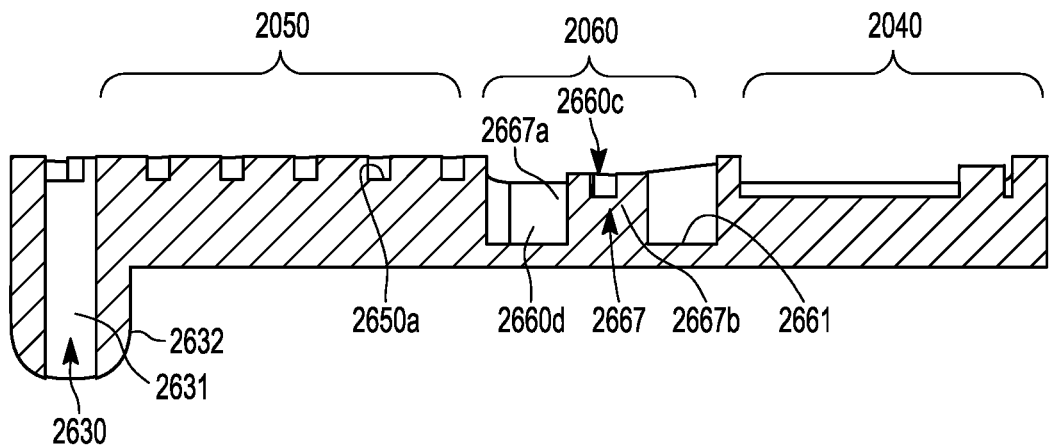
Figure 27D:
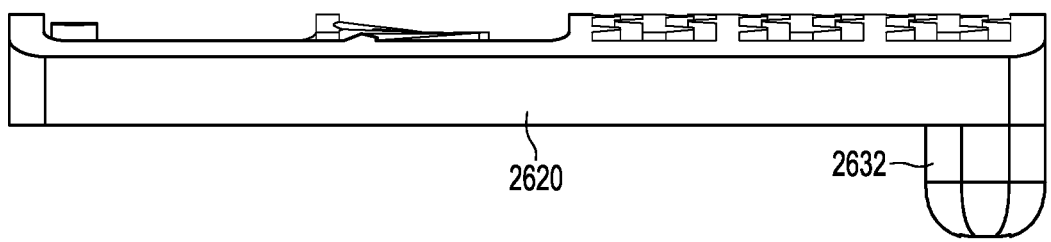
Figure 27E:
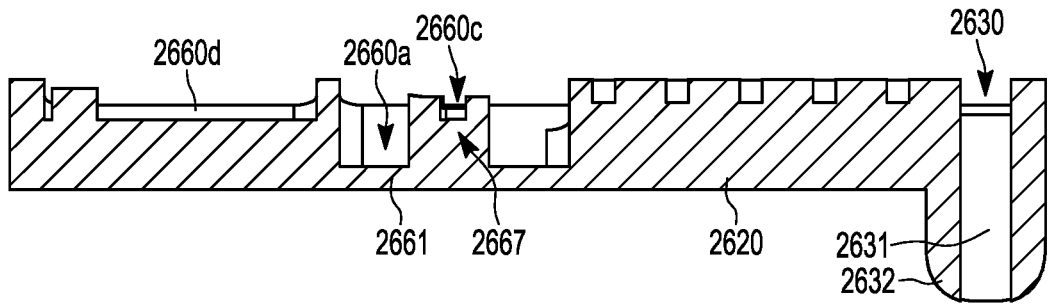

Unlike prior embodiments, however, the emitter 2610 includes a pressure reduction passage 2650, pressure compensating passage 2660 and outlet bath 2640 that are all at different depths (e.g., have passage floor surfaces of different depths) or on different planes (e.g., not coplanar with one another). As best seen in FIGS. 27C and 27E, the pressure reduction passage 2650 has a first depth, the pressure compensating passage 2660 has a second depth different than the first depth and the outlet bath has a third depth different than either the first or second depths. In a preferred form, the first depth is smaller than the second depth and third depth and the third depth is smaller than the second depth. Another way of stating this is that the surface of the pressure reduction passage 2650 floor is in a first plane, the surface of the pressure compensating passage 2660 floor is in a second plane and the surface of the outlet bath 2640 is in a third plane and none of the first, second and third planes are coplanar with one another. Rather, the first plane and third plane are located on one side of the second plane, but neither the first plane nor the third plane are coplanar with one another.

Figure 27F:
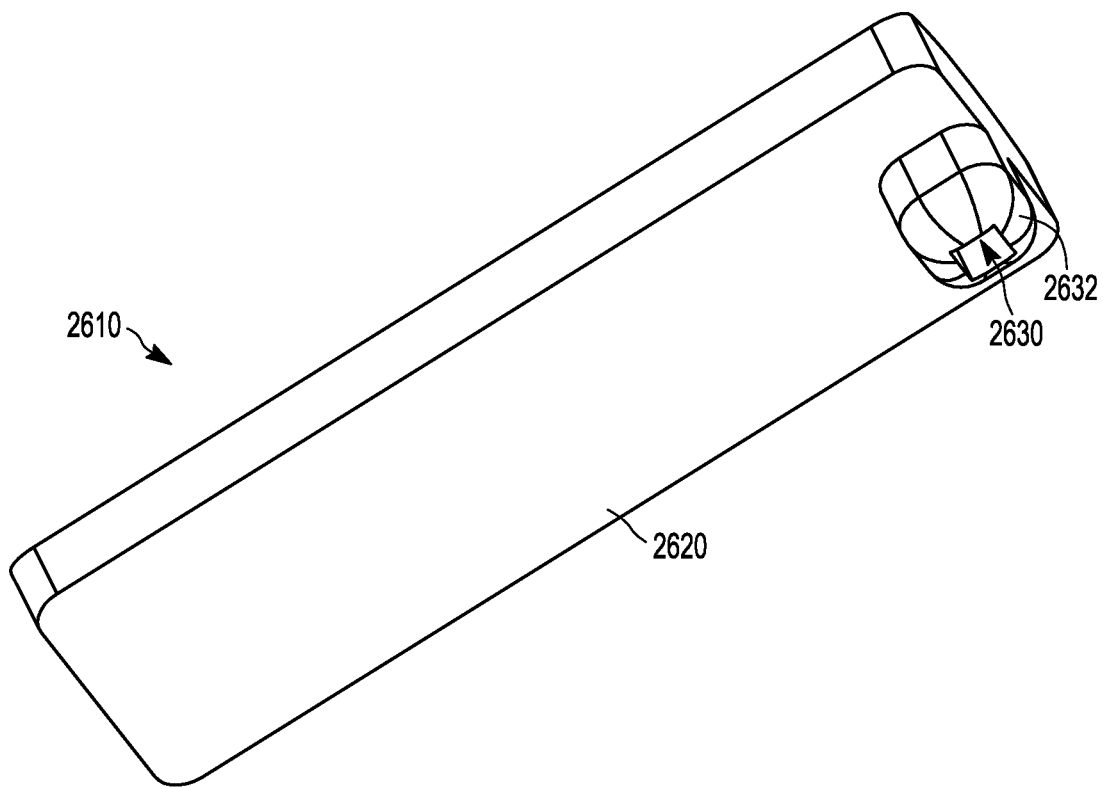
Figure 27G:
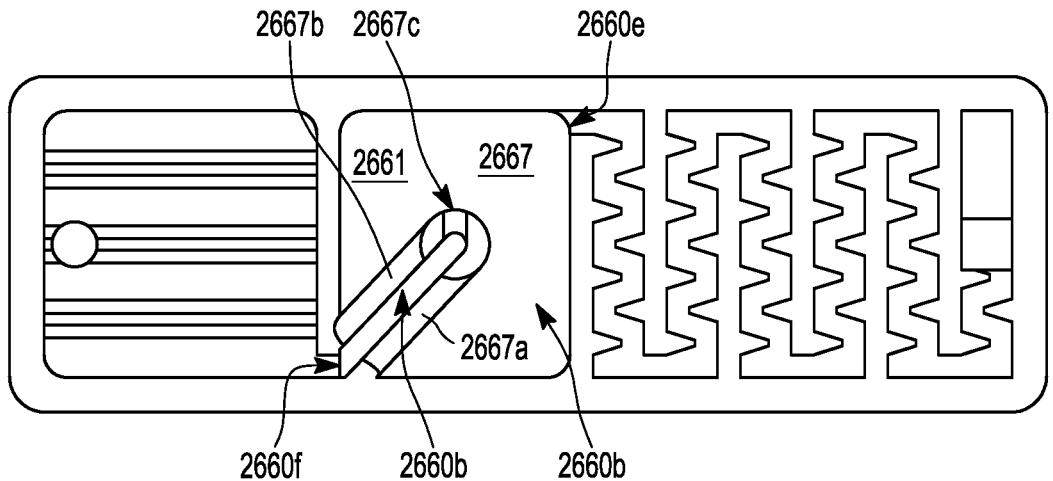
Figure 27H:
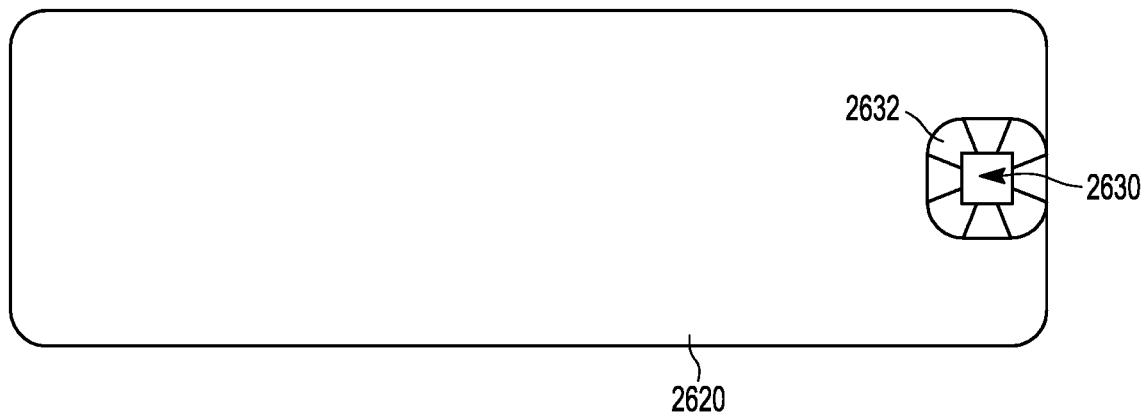
Figure 27I:
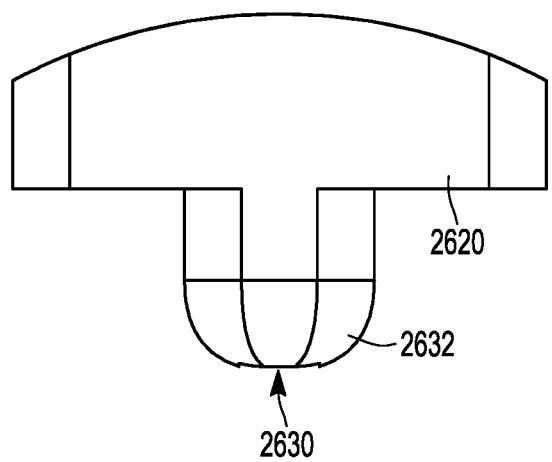
Figure 27J:
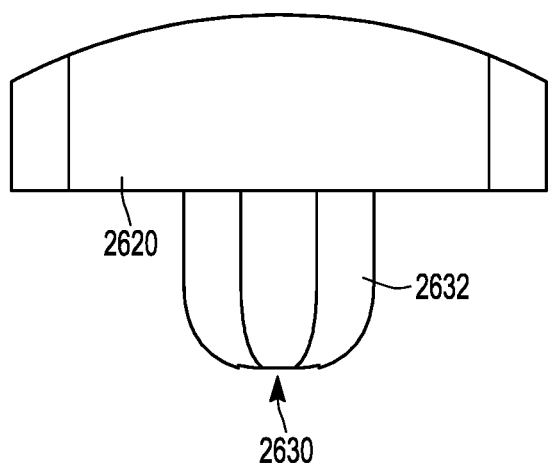

In the form illustrated in the figures (and as best seen in FIG. 27F), the pressure compensating portion 2660 is capable of having the largest depth to its floor passage surface because no recess is formed in the bottom of the emitter body 2620 (as has been shown in prior embodiments). Thus, the first side of the emitter body 2620 defines the open face of the emitter and the side defining at least a portion of the inlet 2630, outlet bath 2640 and flow passage extending therebetween, and the second side of the emitter body 2620 (located opposite the first side) forms a generally flat opposite side of the emitter body 2620 with the exception of the perimeter wall of the inlet protrusion 2632 extending therefrom (if and when such a structure is present). In a preferred form, the inlet protrusion 2632 is centrally located on a distal end of the emitter body 2620 and formed of a rounded perimeter wall that solely defines the inlet protrusion 2632 of the emitter 2610 and no other part of the emitter, however, as has been mentioned above, the protrusion 2632 can be positioned elsewhere on the body 2620 and/or may not even be included (in which case the entire bottom or second side of the emitter body will be generally flat and/or coplanar). However, in the embodiment illustrated in FIG. 27F, the inlet 2630 is located on a first side of the emitter body 2620 and the outlet bath 2640 is located on a second side of the emitter body and the emitter body 2620 further defines an inlet protrusion 2632 extending from the first side of the emitter body 2620 and forming a perimeter wall 2632 about the inlet that defines an inlet channel 2631 and the remainder of the first side of the emitter body 2620 is devoid of further protrusions or recesses.

Another difference in emitter 2610 as compared to prior embodiments is the at least one baffle 2667 positioned on the movable floor 2661 of the pressure compensation portion 2660. The pressure compensating chamber 2660 is positioned between the pressure reducing flow channel 2650 and the outlet bath 2640 to receive fluid from the pressure reducing flow channel 2650. The chamber 2660 being defined by moveable floor 2661 and at least one tapered baffle 2667 that separates the pressure compensating chamber into an upstream portion 2660a and a downstream portion 2660b. In the form illustrated, the downstream portion 2660b is defined by an inner flow passage formed by the at least one tapered baffle 2667 through which the fluid travels through when transitioning from the upstream portion 2660a to the outlet bath 2640.

Thus, in the form illustrated, the irrigation drip emitter 2610 forms an emitter for attachment to only a portion of an inner circumference of an inner surface of an irrigation drip line tube and includes a discrete elastomeric emitter body 2620 integrally defining: an inlet 2630 for receiving pressurized fluid from the tube; an outlet bath 2640 for discharging the fluid from the body 2620; a pressure reducing flow channel 2650 extending from the inlet 2630 for reducing a pressure and flow of fluid received at the inlet 2630, and a pressure compensating chamber 2660 positioned between the pressure reducing flow channel 2650 and the outlet bath 2640 to receive fluid from the pressure reducing flow channel 2650, the chamber 2660 being defined by a moveable floor 2661 and at least one tapered baffle 2667 that separates the pressure compensating chamber 2660 into an upstream portion 2660a and a downstream portion 2660b formed by an inner flow passage defined by the at least one tapered baffle 2667 through which the fluid travels from the upstream portion 2660a to the outlet bath 2640.

In one embodiment, the at least one tapered baffle 2667 has two tapering side portions 2667a and 2667b and defines a recess, such as metering groove 2667c, which forms the pinch point 2660c between the upstream portion 2660a and downstream portion 2660b (as discussed with prior embodiments herein). In a preferred form, the two tapering side portions 2667a, 2667b are connected to one another at a distal end thereof to form a generally U-shaped or V-shaped structure with a recess 2667c to allow fluid to flow from the upstream portion 2660a to the downstream portion 2660b formed by the inner flow passage defined by the at least one tapered baffle 2667. In some forms, the upstream portion 2660a and downstream portion 2660b have respective volumes and the recess 2667c is generally located in the distal end of the at least one tapered baffle 2667 and the recess 2667c defines a recess volume (or pinch point volume) that is smaller than both the upstream portion volume and the downstream portion volume of the pressure compensation chamber 2660. In the embodiment illustrated in FIGS. 27A-J the tapering walls 2667a, 2667b terminate in the distal end that has a generally circular diameter of constant height with the exception of the recess 2667c and internal flow passage 2660b. In some forms, the distal end of the two tapering side portions 2667a, 2667b comprises an end portion having a generally circular diameter of constant height with the exception of the recess 2667c and internal flow passage 2660b for allowing fluid to flow from the upstream portion 2660a to the downstream portion 2660b defined by the inner flow passage formed by the two tapering side portions 2667a, 2667b.

Another way of stating the above is that the pressure reducing flow channel 2650 has a first volume and/or cross-sectional area, and the pressure compensating chamber 2660 has a second volume and/or cross-sectional area that is larger than the first volume and/or cross-sectional area of the pressure reducing flow channel 2650. Alternatively, it can be stated with respect to the passage depths as mentioned above. In some forms, the pressure reducing flow channel 2650 has first and second side walls connected to one another via a first transverse wall (e.g., floor 2650a) and the pressure compensating chamber 2660 has side walls or one or more perimeter walls 2660d connected via a second transverse wall or floor 2661 and the second transverse wall 2661 is positioned at a depth from the top of the emitter 2610 different than the first transverse wall 2650a so that the second volume and/or cross-sectional area of the pressure compensation chamber 2660 is larger than the first volume and/or cross-sectional area of the pressure reduction passage 2650.

In some embodiments, the first and second perimeter walls are separated by the egress defined by the pressure compensation chamber 2660 (and specifically the perimeter wall 2660d) where fluid flows from the pressure compensation chamber 2660 to the outlet bath 2640. Thus, the pressure reducing flow channel 2650 has a pressure reducing flow channel floor 2650a of a first depth and the pressure compensation chamber 2660 has a moveable floor 2661 of a second depth that is deeper than the first depth. In a preferred form, the emitter body 2620 has an emitter body height and the first depth associated with the pressure reducing flow channel 2650 is less than fifty percent the emitter body height at the pressure reducing flow channel 2650 and the second depth of the pressure compensation chamber 2660 is greater than fifty percent the emitter body height at the pressure compensation chamber 2660. For example, in one form, the first depth of the pressure reduction portion 2650 is less than twenty-five percent the emitter body height at the pressure reducing flow channel 2650 and the second depth of the pressure compensating chamber 2660 is greater than seventy-five percent the emitter body height at the pressure compensation chamber 2660.

In the form shown in FIGS. 26A-J, the tapered walls 2667a, 2667b extend from separate or different side walls defining chamber 2660. More particularly, in the form illustrated, the perimeter wall 2660d defines a generally rectangular side wall with interruptions at the ingress 2660e and egress 2660f (e.g., ingress and egress passages) of the pressure compensation chamber 2660. In a preferred form, the perimeter or side walls 2660d of the pressure compensation chamber 2660 are defined by the emitter body 2620 and include first, second, third and fourth side walls positioned in a generally rectangular orientation, with the first and second side walls positioned parallel to one another (preferably on sides of the emitter body 2620) and having a generally flat upper surface, and the third and fourth side walls positioned parallel to one another and generally transverse the first and second side walls, with the third and fourth side walls having a curved upper surface with a first radius of curvature that corresponds to an interior surface of an irrigation drip tube like the perimeter walls located at the ends of the emitter body (as opposed to the walls on the sides of the emitter body).

In FIGS. 26A-J, the first tapered wall 2667a extends from a first perimeter wall and the second tapered wall 2667b extends from a second perimeter wall neighboring and generally transverse the first perimeter wall. In other forms, the pressure compensating chamber 2660 may be defined by at least two sidewalls bordering the moveable floor 2661 and the at least one tapered baffle 2667 may comprise a first tapering wall 2667a and a second tapering wall 2667b with the first and second tapering walls 2667a, 2667b extending from different chamber sidewalls toward a center region of the pressure compensating chamber 2660 and toward one another. In some forms like those discussed above (FIGS. 22A-E, 23A-E, 24A-F, etc.) the tapering walls 2667a, 2667b may not meet, and in some cases they may overlap or come close to overlapping to form a pinch point 2060c between the upstream portion 2060a and the downstream portion 2060b. In the form illustrated in FIGS. 27A-J, the tapering walls 2667a, 2667b extend toward one another and the center of the pressure compensating chamber 2660 until contact is made therebetween (or between the distal ends of tapering walls 2667a, 2667b), a recess 2667c being formed proximate the distal ends of the first and second tapering walls 2667a, 2667b to provide a passage 2660c from the upstream portion 2660a of the pressure compensating chamber 2660 to the downstream portion 2660b of the pressure compensating chamber 2660 formed between the first and second tapering walls 2667a, 2667b.

As with prior embodiments discussed above, the emitter of FIGS. 27A-J is intended to be mounted inside of a drip line tube at regular intervals therein in order to form irrigation drip line or drip line tubing. Thus, in addition to emitter 2610, there is contemplated herein an irrigation drip line tube including a tube having an inner surface and an outer surface with the inner surface defining an inner circumference of the tube, and a plurality of discrete elastomeric emitters 2610 connected to only a portion of the inner circumference of the inner surface of the tube and at regular intervals therein. In a preferred form, each elastomeric emitter body 2620 integrally defining: an inlet 2630 for receiving pressurized fluid from the tube; an outlet bath 2640 for discharging the fluid from the body 2620; a pressure reducing flow channel 2650 extending from the inlet 2630 for reducing a pressure and flow of fluid received at the inlet, and a pressure compensating chamber 2660 positioned between the pressure reducing flow channel 2650 and the outlet bath 2640 to receive fluid from the pressure reducing flow channel 2650, the chamber 2660 being defined by a moveable floor 2661 and at least one tapered baffle 2667 that separates the pressure compensating chamber 2660 into an upstream portion 2660a and a downstream portion 2660b formed by an inner flow passage defined by the at least one tapered baffle 2667 through which the fluid travels from the upstream portion to the outlet bath 2640.

In yet other embodiments of the invention and as has been discussed herein with respect to FIGS. 16A-B and 17A-B, it may be desirable to form an emitter out of two different materials to assist with transporting the emitter during the drip line manufacturing process and/or the bonding of the emitter to the extruded tubing to form the desired irrigation drip line. For example, another embodiment of the invention is the poly-material emitter illustrated in FIGS. 28A-J. In keeping with prior practice, similar latter two digit reference numerals will be used for items that are similar to those discussed in prior embodiments, but adding a prefix of "27" to the two-digit reference numeral to distinguish one embodiment from others. Thus, in FIGS. 28A-J, the emitter is referred to generally as emitter 2710 and includes a body 2720 defining an inlet 2730, outlet bath 2740 and flow path extending therebetween. However, unlike prior embodiments, in the form illustrated, the body only defines the pressure reduction portion 2750 of the flow passage and is made of a polyethylene instead of a thermoplastic elastomeric component (e.g., TPO). In this embodiment, only the pressure compensating chamber 2760 is made of a thermoplastic elastomeric component (e.g., TPO). In this way, the majority of the emitter 2710 is made of a more rigid and easily transportable and bondable polyethylene material and only a small portion is made of an elastomeric material (which tends to be harder to transport throughout insertion tooling or machinery and which tends to be harder to bond repeatably to extruded tubing.

In a preferred form the polyethylene body 2720 and thermoplastic elastomeric chamber 2760 are formed in a two-shot molding process and in a way that the thermoplastic elastomeric chamber 2760 chemically bonds to the rigid polyethylene material without the need for interlocking features or cross-linking between the two distinct materials. In other forms, the emitter 2710 may be formed in separate steps, such as by having the elastomeric pressure compensating portion or chamber 2760 formed separately and inserted or disposed into a socket or seat 2720c defined by the rigid polyethylene body 2720. In some forms, the rigid body 2720 may further be formed with an inlet protrusion 2732 similar to those discussed in prior embodiments that defines an inlet channel 2731 terminating in and in fluid communication with the pressure reduction portion 2750 of emitter 2710.

Regardless of the manufacturing process used, the body 2720 will preferably define a seat 2720c having at least one supporting surface upon which the pressure compensating portion 2760 will be nested or supported. In the form illustrated, the seat 2720c is formed from walls extending out transversely from the boundary or perimeter walls 2720d that define the socket within which the pressure compensating member 2760 is disposed. The seat 2720c will further define an inner opening that allows at least a portion of the bottom surface of the movable floor 2761 of the pressure compensation member 2760 to be exposed to fluid traveling through the drip line so that the fluid traveling in the drip line can move the movable floor 2761 and cause the pressure compensating member 2760 to compensate for increases or decreased in the fluid supply line pressure. In the form illustrated, the seat 2720c is formed such that it only overlaps with a minimal portion of the pressure compensating member 2760 and the opening defined by the seat 2720c is centrally located within the body 2720 and leaves exposed a majority of the bottom surface of the pressure compensating member 2760 (e.g., greater than 90% of the bottom surface of the pressure compensating member 2760 remains exposed).

Figure 28A:
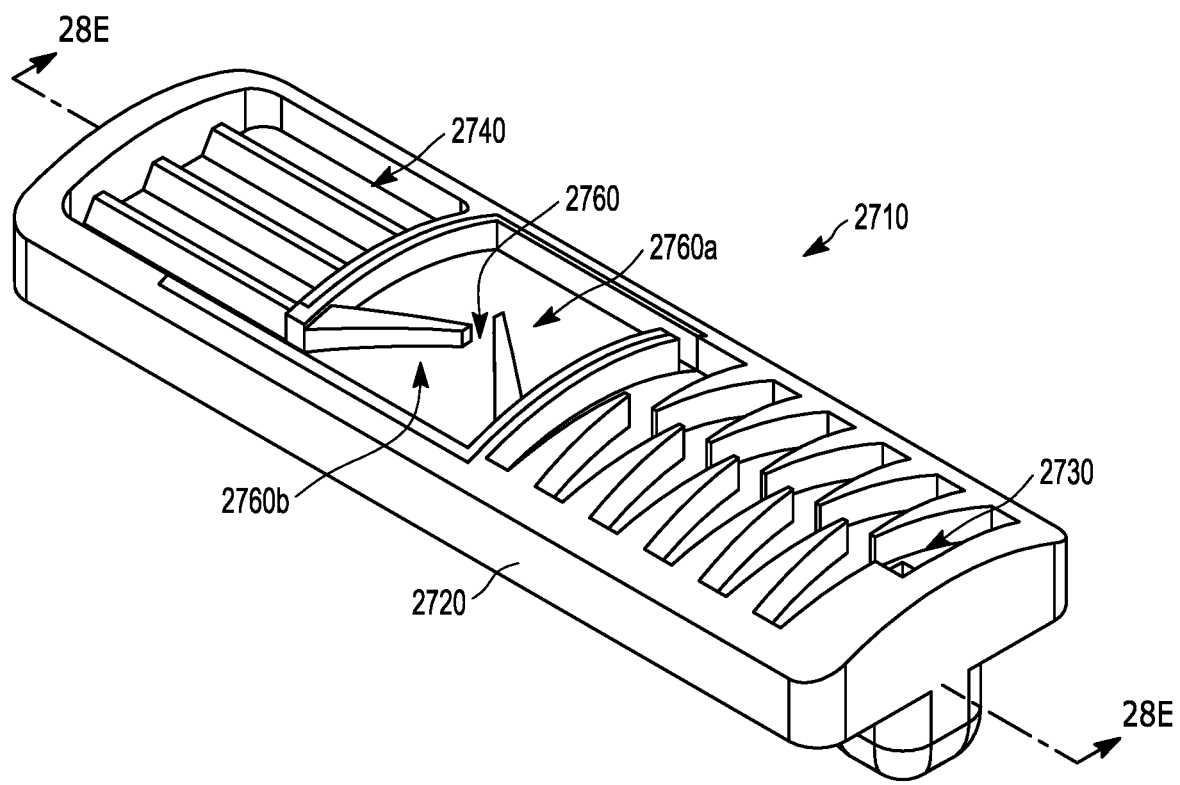
FIGS. 28A-J are top perspective, exploded, right-side elevation, left-side elevation, left-side cross-sectional view taken along line 28E-28E in FIG. 28A, front elevation, rear elevation, top, bottom and bottom perspective views, respectively, of an alternate bi-material emitter in accordance with embodiments of the invention.
Figure 28B:
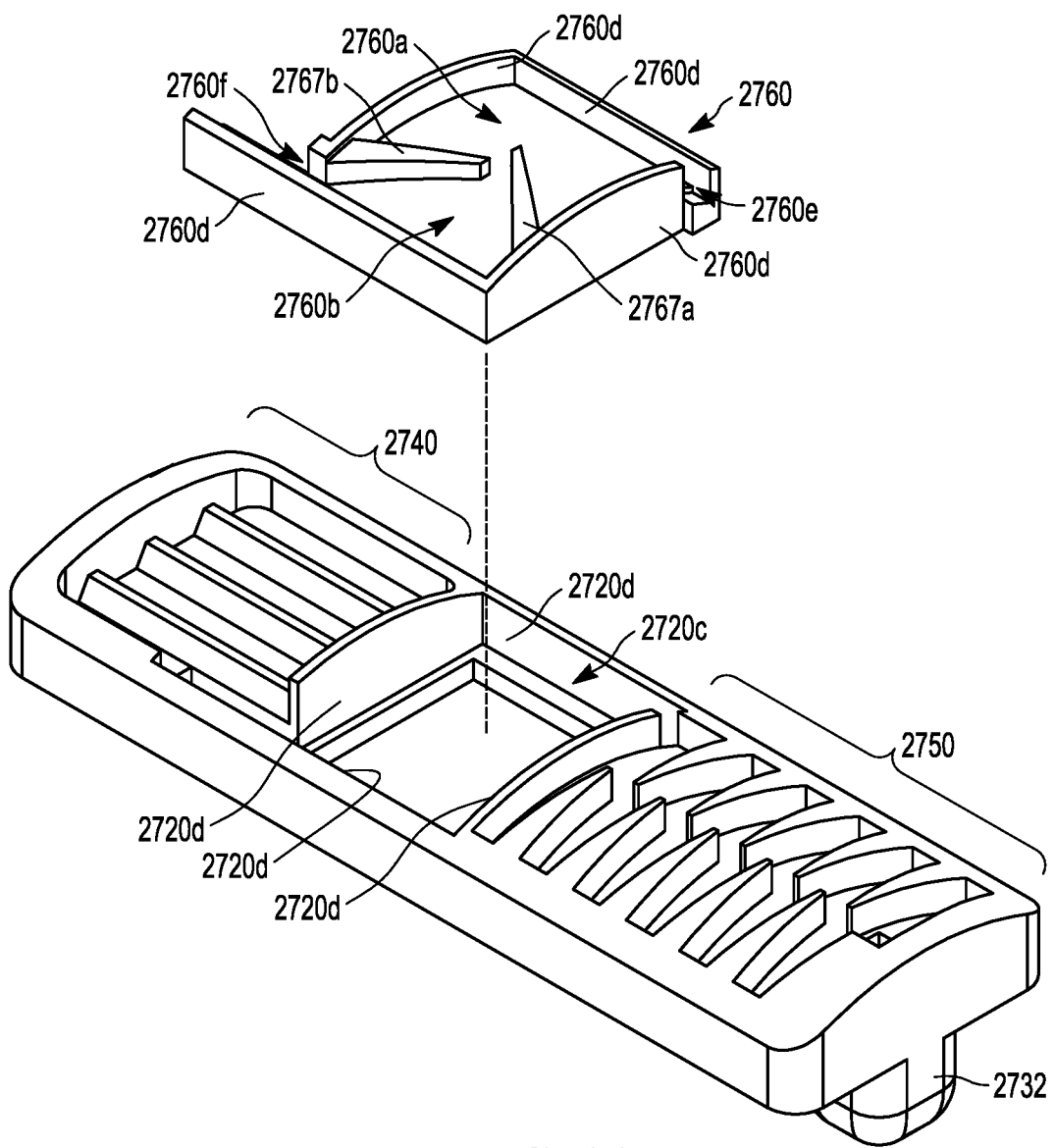
Figure 28C:
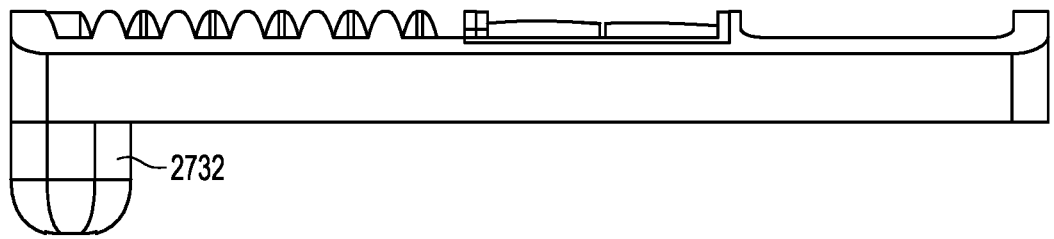
Figure 28D:
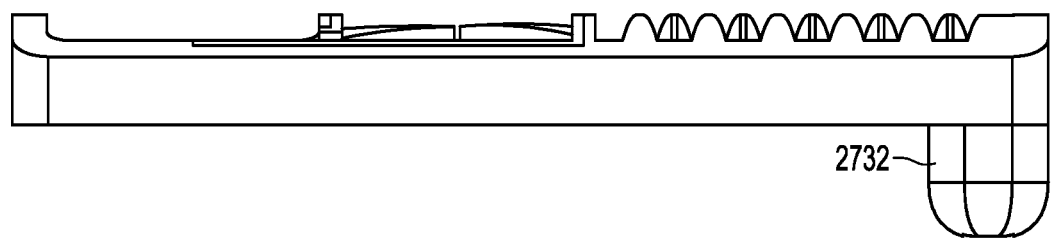

Turning now more particularly to the to the pressure compensating member 2760 (and as best illustrated in FIGS. 28B, E and H), it should be understood that in a preferred form, a pressure compensating member 2760 for a poly-material emitter 2710 is disclosed herein integrally defining: a flexible floor 2761; side walls 2760d extending substantially about a perimeter of the flexible floor 2761 and including an ingress opening 2760e and an egress opening 2760f; and at least one tapering baffle (e.g., 2767a, 2767b) that separates the flexible floor 2761 and pressure compensating member 2760 into an upstream portion 2760a and a downstream portion 2760b with both the upstream portion 2760a and downstream portion 2760b having respective volumes or cross-sectional areas and the volume or cross-sectional area of the upstream portion 2760a being larger than the volume or cross-sectional area of the downstream portion 2760b to assist the pressure compensating member in flushing grit therethrough in a manner similar to that discussed above with respect to FIGS. 22A-E, 23A-E, 24A-F, etc.).

Figure 28E:
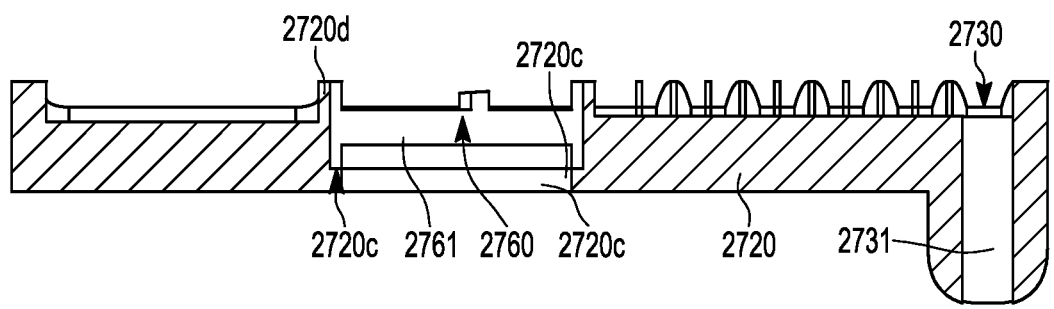
Figure 28F:
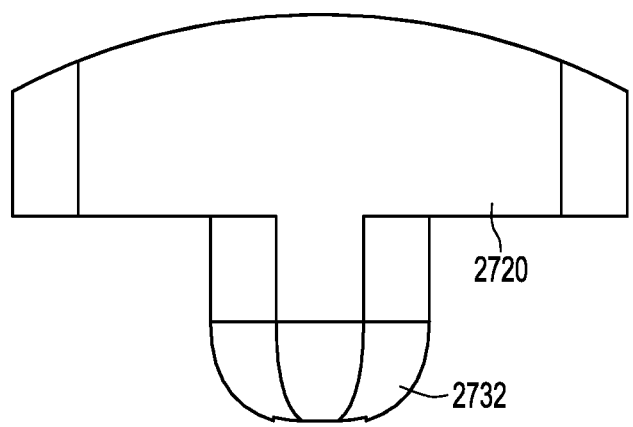
Figure 28G:
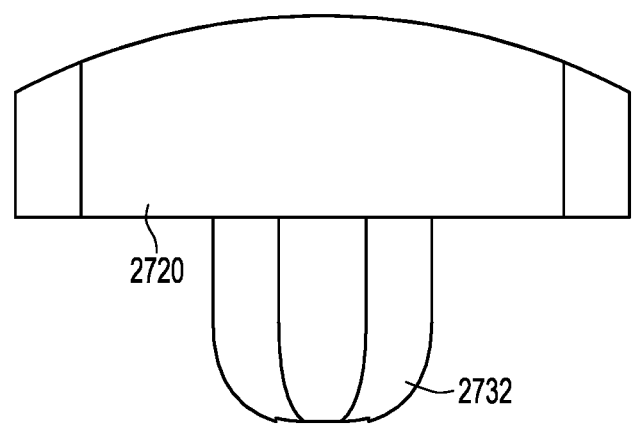
Figure 28H:
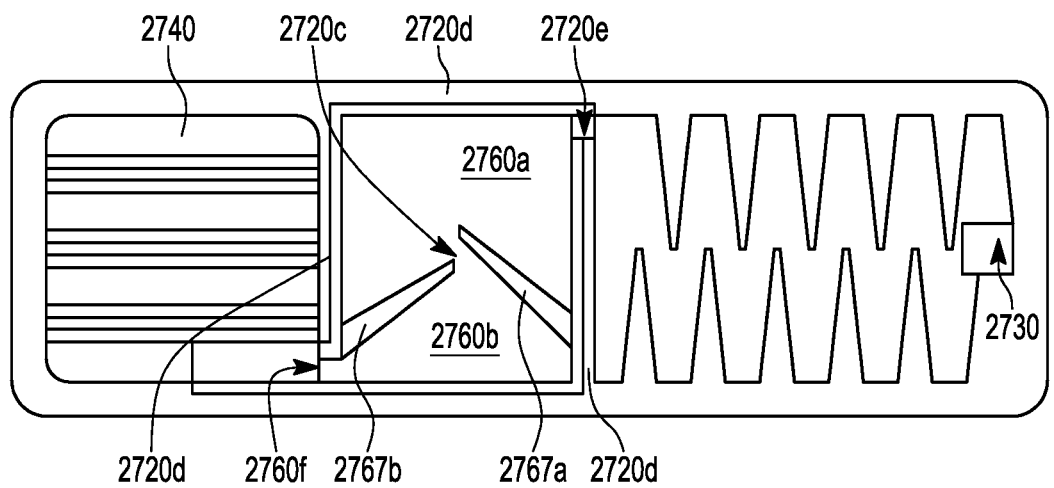
Figure 28I:
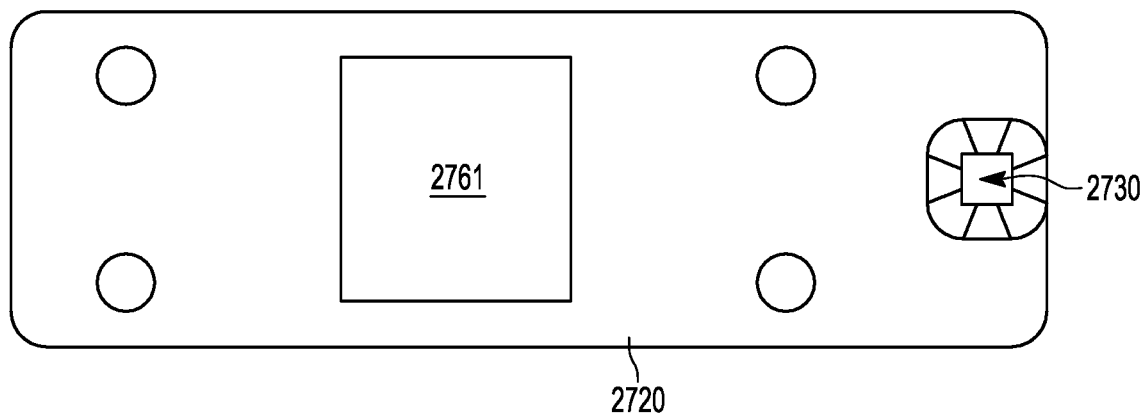
Figure 28J:
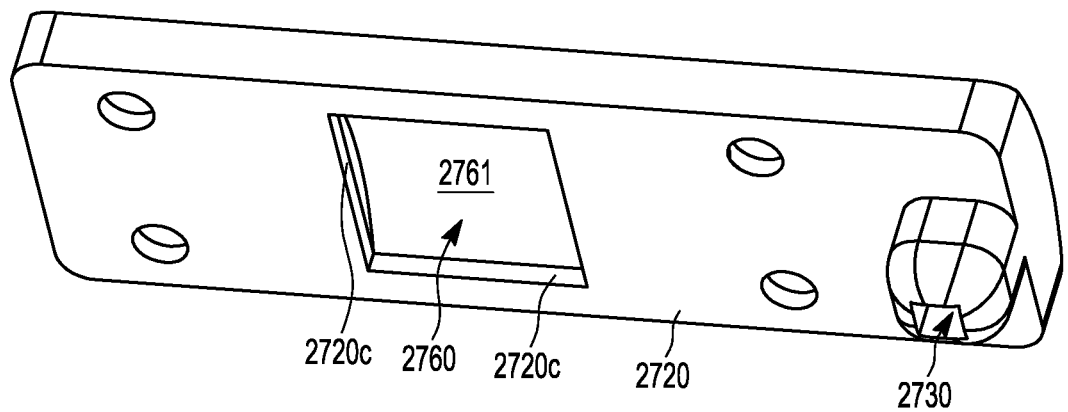

In a preferred form, the perimeter or side walls 2760d of the pressure compensation chamber 2760 include first, second, third and fourth side walls positioned in a generally rectangular orientation, with the first and second side walls positioned parallel to one another and having a generally flat upper surface (preferably configured to be positioned along sides of the emitter body 2720), and the third and fourth side walls positioned parallel to one another and generally transverse the first and second side walls (e.g., transverse to the longitudinal axis of the emitter body 2720), with the third and fourth side walls having a curved upper surface with a first radius of curvature that corresponds to an interior surface of an irrigation drip tube (e.g., like the walls at the distal ends of the emitter body 2720). In a preferred form and as best illustrated in FIG. 28E, the flexible floor 2761 has a first side upon which the at least one tapering baffle (e.g., baffles 2767a, 2767b) is connected, and a second side located opposite the first side, and wherein the flexible floor is shaped so as to be concave on the second side and convex on the first side. The flexible floor 2761 has a second radius of curvature that corresponds in shape to the first radius of curvature of the upper surfaces of the third and fourth side walls 2760d. In the form shown, the first, second, third and fourth side walls 2760d extend above the first side of the flexible floor 2761 and terminate in the generally flat upper surfaces of the first and second side walls and the curved upper surfaces of the third and fourth side walls, respectively, and the first, second, third and fourth side walls 2760d further extend below the second side of the flexible floor and terminate in generally flat and coplanar bottom surfaces. Due to the curve of the upper surfaces of the third and fourth wall and the generally flat upper surfaces of the first and second wall, the upper surfaces of walls 2760d are not coplanar.

In a preferred form, the elastomeric body of the pressure compensating member 2760 will further define a protruding portion proximate at least one of the ingress opening and/or the egress opening, or both to ensure a smooth transition from pressure reduction portion 2750 and to outlet bath 2740, respectively. In the form illustrated in FIGS. 28A-J, the elastomeric body of the pressure compensating member 2760 includes a first protruding portion aligned with the ingress 2760e and a second protruding portion aligned with the egress 2760f and the first and second protruding portions extend out beyond a boundary defined by the side walls 2760d. In the form illustrated, the second protruding portion at egress 2760f extends out further from the boundary defined by the adjacent upstanding side wall 2760d farther than the first protruding portion aligned with the ingress 2760e does from its adjacent upstanding side wall 2760d. In view of this configuration, it should be understood that the emitter body 2720.

In the form shown in FIGS. 28A-J, the pressure compensating member 2760 includes at least a first side wall and a second side wall (e.g., any one of the perimeter walls 2760d) and the at least one tapering baffle comprises a first tapering baffle 2767a extending from a first side wall and a second tapering baffle 2767b extending from a second side wall, with the first and second tapering baffles 2767a, 2767b extending toward a center of the flexible floor 2761 and toward one another to define the upstream portion 2760a and downstream portion 2760b of the pressure compensating member 2760. Note, the first and second side walls referenced here could be any of the first, second, third and fourth side walls 2760d mentioned above or could be alternate configurations (e.g., such as an ellipse shaped structure with two curved perimeter walls that connect to one another to form the ellipse, etc.). In the form shown, one of the first and second tapering baffles 2767a, 2767b extends further toward the center of the flexible floor 2761 than the other tapering baffle 2767b, 2767a (e.g., in FIGS. 28A-J, tapering baffle wall 2767a extends further toward the center of floor 2761 than tapering baffle wall 2767b).

It should be understood, that disclosed herein are various embodiments of emitters including some that are integral elastomeric emitters made entirely of one material, others are poly-material emitters and still others are simply components for use with emitters such as the elastomeric pressure compensation member 2760 illustrated in FIGS. 28A-J. In some forms, just the pressure compensating member 2760 may be provide for use with other emitter bodies (e.g., off the shelf emitter bodies, etc.). In other forms, however, the elastomeric pressure compensating member 2760 may be provided along with a rigid emitter body 2720 and, preferably having the pressure compensating member 2760 disposed within an opening formed by the rigid emitter body 2720. As mentioned above, in some forms the emitter body 2720 defines a seat 2720c within which the pressure compensating member 2760 is disposed.

Figure 29A:
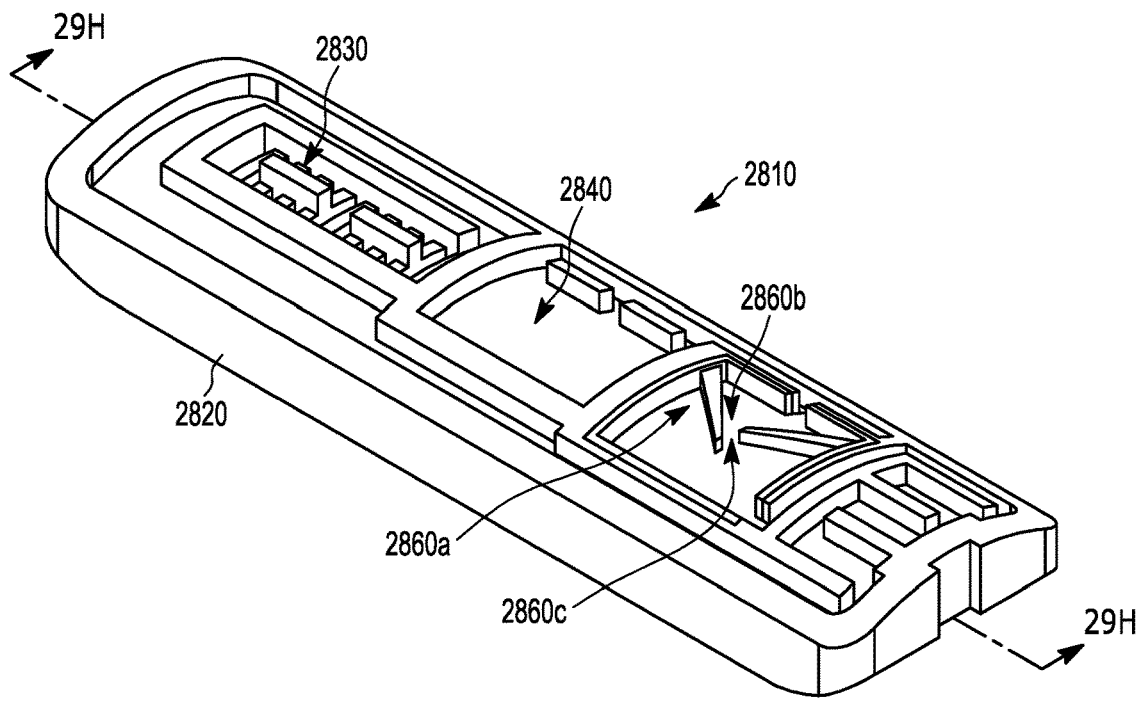
FIGS. 29A-H are top perspective, exploded, right side elevation, left side elevation, top, bottom, bottom perspective and perspective cross-sectional views, respectively, of another bi-material emitter in accordance with embodiments of the invention with the perspective cross-sectional view taken along line 29H-29H in FIG. 29A.
Figure 29B:
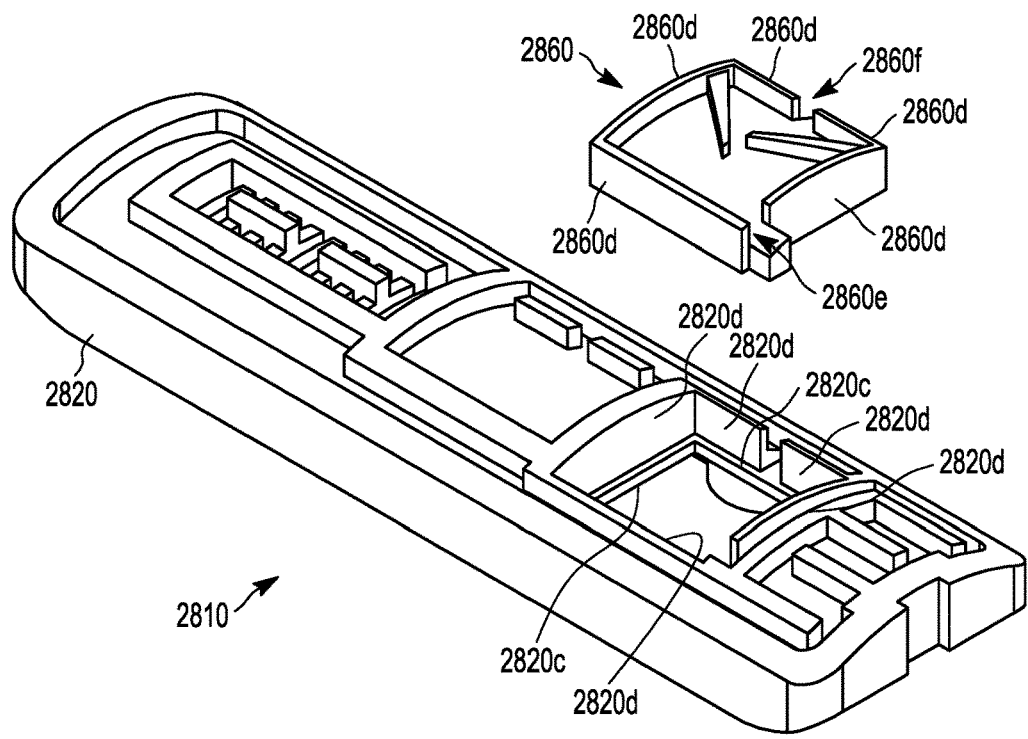
Figure 29C:
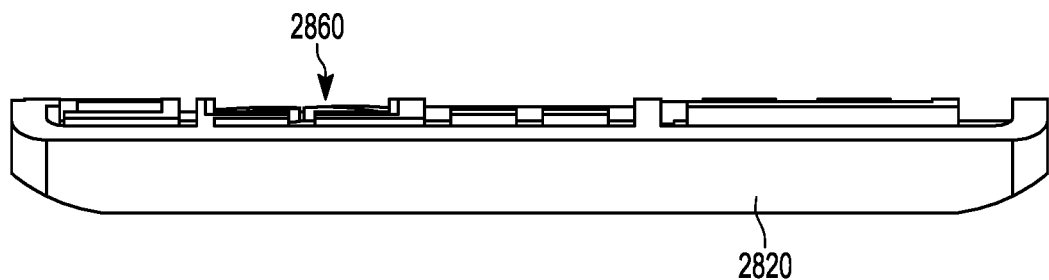
Figure 29D:
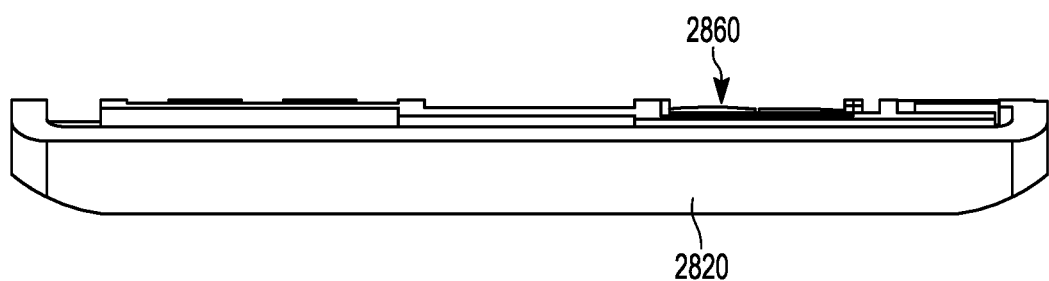
Figure 29E:
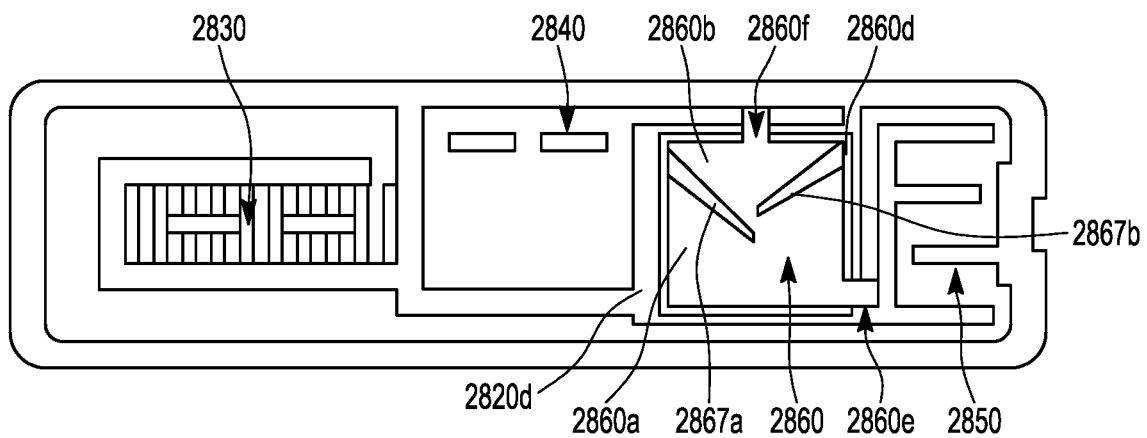
Figure 29F:
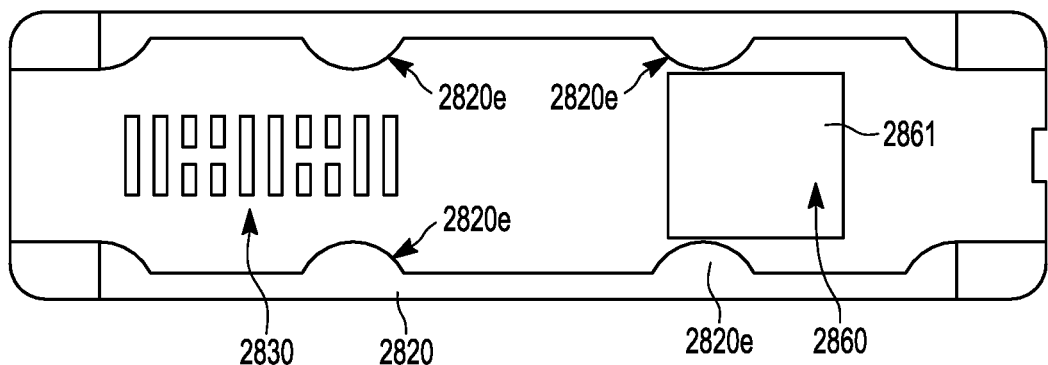
Figure 29G:
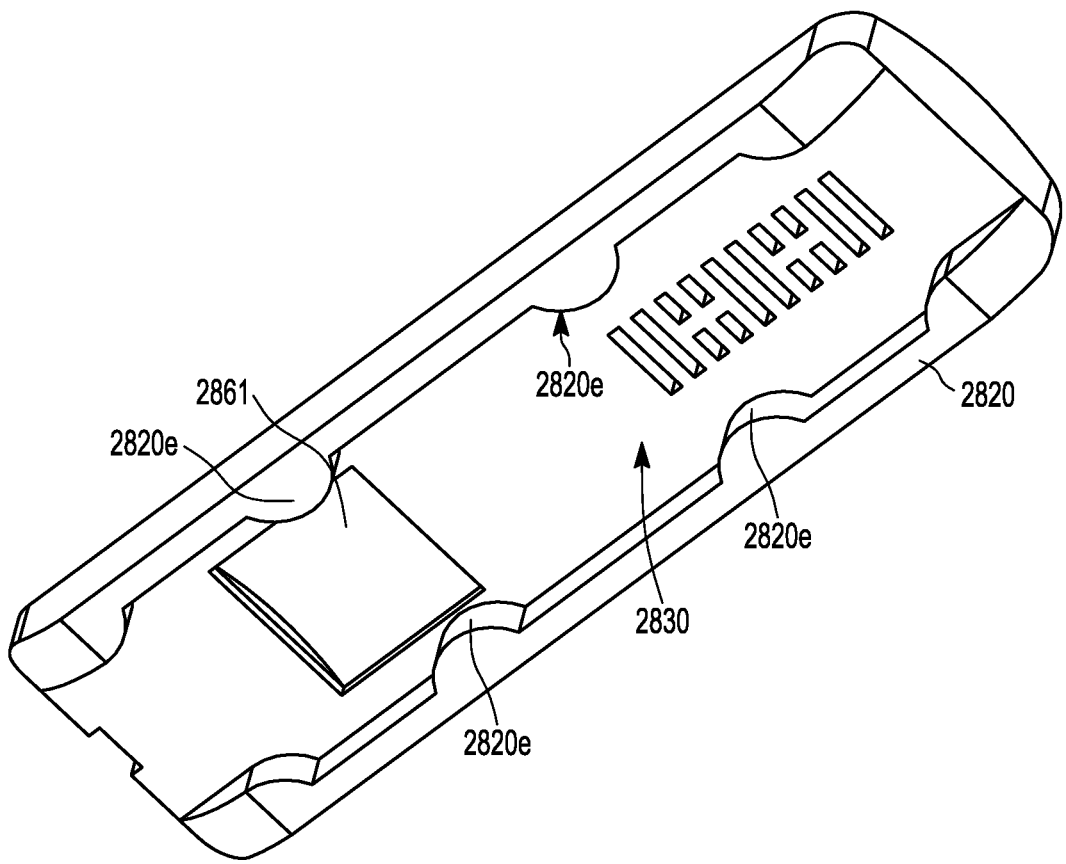
Figure 29H:
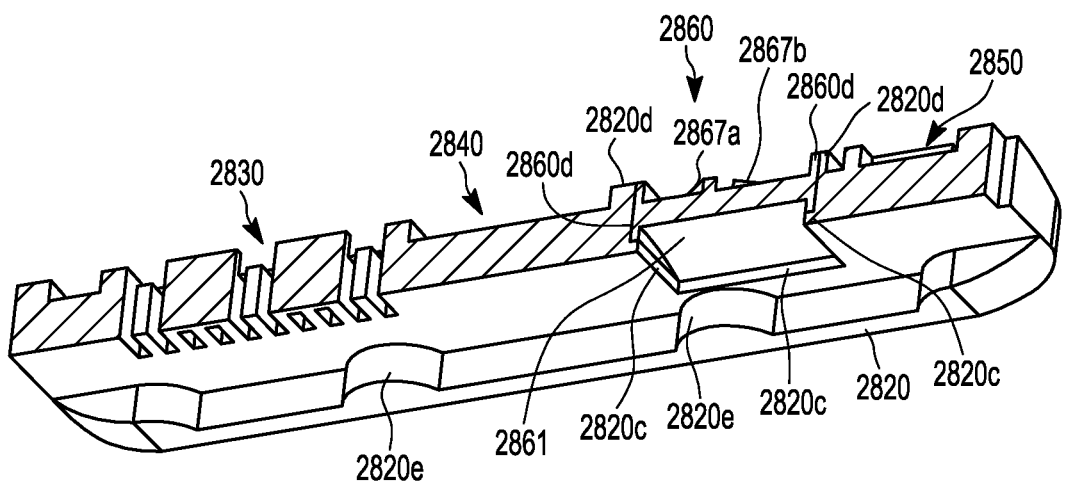

Another exemplary emitter in accordance with such disclosure is shown in FIGS. 29A-H. In this form a pressure compensating member very similar to pressure compensating member 2760 is illustrated connected to another rigid emitter similar to existing conventional emitters. Unlike such conventional emitters, however, the emitter body has been altered to accommodate a pressure compensating member in accordance with the disclosure herein. In keeping with prior practice, the emitter of FIGS. 29A-H will use similar latter two-digit reference numerals but with the prefix 28 in order to identify similar items and distinguish one embodiment from another. Thus, in the form illustrated, the emitter is referred to generally by reference numeral 2810 and includes an emitter body 2820 defining an inlet 2830, and outlet 2840 and a flow passage extending therebetween partly made up by a pressure reduction portion 2850 and a pressure compensating member 2860 similar to the pressure compensating member 2760 discussed above with respect to FIGS. 28A-J. More particularly, a poly-material emitter 2810 is illustrated in FIGS. 29A-H having a rigid emitter body 2820 integrally defining an inlet 2830, an outlet 2840 and a pressure reducing flow passage 2850 extending from the inlet. The rigid emitter body 2820 further defining an opening for receiving pressure compensating member 2860. As best illustrated in FIGS. 29B and 29H, in a preferred form, the rigid body 2820 defines a seat 2820c for supporting at least a portion of the pressure compensating member 2860. The elastomeric pressure compensating member 2860 integrally defines a flexible floor 2861 and side walls 2860d extending substantially about a perimeter of the flexible floor 2861 and including an ingress opening or portion 2860e and an egress opening or portion 2860f, and at least one tapering baffle that separates the flexible floor 2861 and pressure compensating member 2860 into an upstream portion 2860a and a downstream portion 2860b. In the preferred form illustrated, the at least one tapering baffle includes first tapering baffle 2867a and second tapering baffle 2867b, with the first tapering baffle 2867a extending further toward the center of the movable floor 2861 than the second tapering baffle 2867b (e.g., the first tapering baffle 2867a extending further upstream than the second tapering baffle 2867b). Both the upstream portion 2860a and downstream portion 2860b have respective volumes or cross-sectional areas and the volume or cross-sectional area of the upstream portion is preferably made larger than the volume or cross-sectional area of the downstream portion to assist the pressure compensating member 2860 in flushing grit through the emitter 2810.

In the form illustrated in FIGS. 29A-H, the seat 2820c of the rigid emitter body 2820 is defined by a step or shelf formed in the rigid emitter body and at least a portion of the pressure compensating member is rested on the step or shelf 2820. As with at least one prior embodiment the side walls of the pressure compensating member 2860 will rest above the seat 2820c and include first, second, third and fourth side walls positioned in a generally rectangular orientation, with the first and second side walls positioned parallel to one another and having a generally flat upper surface, and the third and fourth side walls positioned parallel to one another and being generally transverse to the first and second side walls, with the third and fourth side walls having a curved upper surface with a first radius of curvature that corresponds to an interior surface of an irrigation drip tube. The flexible floor 2861 has a first side upon which the at least one tapering baffle is connected (e.g., first baffle 2867a and second baffle 2867b), and a second side located opposite the first side, and wherein the flexible floor 2861 is shaped so as to be concave on the second side and convex on the first side. The first side of flexible floor 2861 having a second radius of curvature that corresponds in shape to the first radius of curvature of the upper surfaces of the third and fourth side walls so as to give the flow passages of the emitter a generally uniform cross-section despite the curvature of the inner tube surface to which the emitter 2810 is connected.

Again, as best illustrated in FIGS. 29B and 29H, the first, second, third and fourth side walls of pressure compensating member 2860 extend above the first side of the flexible floor 2861 and terminate in the generally flat upper surfaces of the first and second side walls and the generally curved upper surfaces of the third and fourth side walls. In addition, the first, second, third and fourth side walls of pressure compensating member 2860 further extend below the second side of the flexible floor 2861 and terminate in generally flat and coplanar bottom surfaces designed to rest at least partially on seat 2820c of rigid emitter body 2820.

The pressure compensating member 2860 further defines a protruding portion proximate at least one of the ingress opening and/or the egress opening. In the form illustrated, the pressure compensating member 2860 has a first ingress protruding portion 2860e proximate the ingress opening of the pressure compensating member 2860 and a second egress protruding portion 2860f proximate the egress opening of the pressure compensating member 2860. In the illustrated form, the ingress and egress protrusions 2860e, 2860f protrude or extend out beyond a boundary defined by the perimeter or side walls 2860d of pressure compensating member 2860.

As with the prior embodiment of FIGS. 28A-J, pressure compensation member 2860 includes side walls 2860d having at least a first side wall and a second side wall and the at least one tapering baffle comprises a first tapering baffle 2867a extending from the first side wall and a second tapering baffle 2867b extending from the second side wall, with the first and second tapering baffles 2867a, 2867b extending toward a center of the flexible floor and toward one another to define the upstream portion 2860a and downstream portion 2860b of the pressure compensating member. As mentioned, the first tapering baffle 2867a extends further toward the center of the flexible floor 2861 than the second tapering baffle 2867b. The first tapering baffle 2867a extends upstream than the second tapering baffle 2867b. In this form, the baffles 2867a, 2867b extend generally from corner regions of the pressure compensation member 2860 and on opposite sides of the pressure compensation member, however, it should be understood that in alternate embodiments the baffles could extend from a common wall or from corners that are not only on opposite sides of the pressure compensation member 2860, but also that are kitty or catty corner to one another (e.g., diagonal from one another).

In addition to disclosing herein pressure compensating members and emitters, it should also be understood that various forms of drip line are also disclosed herein using any of the above mentioned pressure compensating members or emitters. In addition, it is contemplated that components or features of one embodiment can be combined with one or more embodiments to come up with entire new embodiments in accordance with this disclosure. For example, an irrigation drip line is contemplated herein having a tube having an inner surface and an outer surface with the inner surface defining an inner circumference of the tube, and a plurality of discrete emitters (any disclosed herein) connected to only a portion of the inner circumference of the inner surface of the tube and at regular intervals therein. For example, in some forms, the discrete emitters may take the shape of the emitters depicted in FIGS. 21A-28H. In other forms, the emitters may use features from any of the above emitters to form new emitters placed at regular intervals within the drip line tube. In some instances, this will mean emitters with uniform elastomeric emitter bodies will be used in the dripline, while in other instances poly-material emitters may be used in the dripline.

In addition to the above-mentioned emitter embodiments, there has been disclosed herein numerous different methods. For example, methods of making grit tolerant emitters are disclosed herein. In some forms, such methods include providing an emitter having an inlet, an outlet and a flow passage extending between the inlet and outlet and in fluid communication with same, the flow passage having a pressure compensating portion with tapered baffles capable of moving between a first position having a flow passage opening of a first cross-section and a second position having a flow passage opening of a second cross-section smaller than the first cross-section to compensate for increases in fluid pressure traveling within a fluid line that the emitter is connected to, the tapering baffles separating the pressure compensating portion of the emitter into an upstream portion and a downstream portion; and configuring the tapering baffles such that the upstream portion of the compensating portion is larger in area and volume than the downstream portion in order to ensure greater pressure will be applied to the upstream portion of the pressure compensating portion to assist in flushing grit from the pressure compensating portion of the emitter. That is, as grit blockage reaches a point where the desired flow rate is not being provided, pressure will build-up on the upstream side of the teeth in the PC chamber. This will cause the floor to move away from the inner surface of the tube, thereby opening up the span between the teeth and the inner surface of the tube to allow the grit to pass over and downstream of the teeth. The size of the upstream floor and volume of the upstream portion is determined based on being able to provide the appropriate amount of flushing pressure. Thus, this are and volume can be changed to accommodate design parameters where larger or smaller pressure thresholds are desired. Further, a step is preferably formed in each tooth in order to ensure that the teeth cannot stop all fluid flow so that fluid flow continues downstream and can further assist with the flushing of grit out of the emitter. The step in the teeth also helps the desired movement to occur in the PC portion of the emitter on a more consistent and repeatable basis from emitter to emitter. Other methods include methods of reducing pressure of fluid flowing through an emitter, methods of compensating for fluid line pressure fluctuations and methods for preventing grit buildup.

Again, the different emitter designs or layouts may be formed by a single, one-piece emitter, however, in other forms, they may be formed by interchanging various emitter portions to obtain the emitter properties desired for a particular application. In addition to having these interchangeable portions or in lieu of having these interchangeable portions, it should be understood that the mold for producing the emitter could be configured with different inserts to produce emitters of different types (e.g., emitters of different flow rates, emitters of different pressure compensation characteristics (if any pressure compensating), emitters with different flow channel shapes or sizes, etc.).

Thus, disclosed herein is also an open-face non-cylindrical irrigation drip emitter for attachment to only a circumferential portion of an inner surface of an irrigation drip line tube carrying pressurized fluid comprising an emitter body having an inlet portion, flow passage portion and outlet portion, wherein at least one of the inlet portion, flow passage portion or outlet portion is formed from a first insert disposed in the emitter body that can be interchanged with a second insert in order to provide an emitter with a different performance characteristic. In one form, the flow passage portion of the open-face non-cylindrical irrigation drip emitter includes both a pressure reduction portion and a pressure compensation portion and at least one of the inlet portion, pressure reduction portion, pressure compensation portion and outlet portion is formed by the first insert disposed in the emitter body that can be interchanged with the second insert in order to provide an emitter with a different performance characteristic. an emitter body having an inlet portion, flow passage portion and outlet portion, wherein at least one of the inlet portion, flow passage portion or outlet portion is formed as an interchangeable or swappable insert that can be changed or replaced with a second emitter insert portion in order to provide an emitter with a different design or performance characteristic. Thus, the first insert disposed in the emitter body comprises an interchangeable or swappable insert that can be interchanged or swapped with a second insert having a different design or performance characteristic to alter how the emitter performs. This configuration provides yet another way in which emitters with different performance characteristics may be made or formed (e.g., emitters with different flow rates, reaction rates to changes in fluid line pressure, etc.).

In addition to the above embodiments, it should be understood that various methods of manufacturing or assembling irrigation drip lines, methods of compensating for pressure in a supply line (e.g., increases or decreases in supply line fluid pressure), methods of manufacturing an emitter and methods of reducing fluid flow pressure are also disclosed herein. For example, a method of assembling an irrigation drip line is disclosed which comprises providing a drip emitter according to any of the above mentioned embodiments where at least one of the inner and outer baffle walls include a tapered baffle wall section, extruding a drip line tube and inserting the provided drip emitter into the drip line tube as it is extruded such that upper surfaces of the emitter other than the tapered baffle wall section are bonded with an inner surface of the extruded drip line tube to form a sealed engagement so that a pressure reduction flow channel is formed between the inlet and outlet area of the emitter. In a preferred form, the upper surfaces of the non-tapered baffle walls are bonded to the inner surface of the extruded drip line tube to form this sealed engagement so that an elongated tortuous passage is formed between the inlet and outlet of the emitter.

In addition to this method, there are disclosed several methods of compensating for pressure in irrigation drip emitters. For example, a method of compensating for pressure in an irrigation drip emitter is disclosed comprising providing a drip emitter according to any of the above-mentioned embodiments wherein the baffle walls have upper surfaces with a first radius of curvature and the inner baffle wall has a first portion of constant height and a second portion of tapering height that is variably moveable between a first low pressure position wherein the upper surface of the second portion is not generally level with the upper surface of the first portion and fluid can flow over the upper surface of the second portion at low fluid pressures and a second high pressure position wherein the upper surface of the second portion is level with the upper surface of the first portion such that fluid is prevented from flowing over the upper surface of the second portion and the cross-section of the flow channel is reduced and the extent of the flow channel is effectively lengthened, and moving the second portion of the inner baffle wall between the first low pressure position wherein the upper surface of the second portion is not level with the upper surface of the first portion and fluid can flow over the upper surface of the second portion at low fluid pressures and the second high pressure position wherein the upper surface of the second portion moves toward a position that is level with the upper surface of the first portion so that fluid is prevented or at least hindered from flowing over the upper surface of the second portion to reduce the cross-section of the flow channel and effectively lengthen the extent of the flow channel the fluid has to pass through at high fluid pressure in order to compensate for an increase in fluid supply pressure, and moving variably the second portion of the inner baffle wall toward and/or to the second high pressure position to compensate for an increase in fluid pressure and toward and/or to the first low pressure position to compensate for a decrease in fluid supply pressure.

Alternatively, a method of compensating for pressure in an irrigation drip emitter is disclosed which comprises providing a drip emitter according to any of the above-mentioned embodiments wherein the baffle walls have upper surfaces with a first radius of curvature and the inner baffle wall terminates in a first structure and the outer baffle wall includes a second structure that generally corresponds in shape and/or meshes with the first structure and is positioned proximate the first structure, with the first and second structures tapering in height toward one another and being variably moveable between a first low pressure position wherein the upper surfaces of the tapered structures are not level with the upper surfaces of the baffle walls and fluid can flow over the tapered structures at low fluid pressure and a second high pressure position wherein the upper surfaces of the tapered structures are level with the upper surfaces of the baffle walls and fluid is prevented from flowing over the tapered structures to reduce the cross-section of the flow channel proximate the first and second structures and effectively lengthen the extent or amount of the flow channel the fluid has to pass through at high fluid pressure, and moving variably the first and second structures toward and/or to the second high pressure position to compensate for an increase in fluid supply pressure and toward and/or to the first low pressure position to compensate for a decrease in fluid supply pressure.

Alternatively, another method of compensating for pressure in an irrigation drip emitter is disclosed comprising providing an irrigation drip emitter according to any of the embodiments disclosed herein, wherein the baffle walls have upper surfaces with a first radius of curvature and the inlet includes a plurality of inlet openings or passages extending from a surface of the body exposed to the pressurized supply fluid to the pressure reducing flow channel, each inlet passage extending through a boss with a terminal end extending progressively further into the pressure reducing flow channel, each of the terminal ends moveable variably between an open position wherein the upper surface of the terminal end of the boss is not at the same general level as the baffle walls (or with the upper surfaces of the terminal end and baffle walls not being at a common radius of curvature) so that fluid can continue to flow through the boss and into the flow channel and a closed position wherein the terminal end of the boss is generally level with the upper surfaces of the baffle walls and has a generally common radius of curvature as the first radius of curvature of the baffle walls so that fluid is prevented from flowing through the boss or inlet sleeve and into the flow channel, and moving variably the inlet openings or terminal ends of the bosses toward and/or to the second high pressure closed positions to compensate for an increase in fluid supply pressure and toward and/or to the first low pressure open positions to compensate for a decrease in fluid supply pressure.

In the above examples, it should be clear that movement of the moveable walls or structures to compensate for fluid pressure increases and decreases can either be complete movements from a first limit of travel to a second limit of travel (i.e., from a furthest most open position to a furthest most closed position and vice versa), or alternatively, may simply be movements toward one or more of those limits of travel without those limits actually having been reached (i.e., movement toward a furthest most open position to a furthest most closed position and vice versa). In addition, the material chosen for the emitter body (e.g., 20, 120, 220 above), may be selected such that such movement happens at a desired pace. For example, if a quick opening and closing is desired, a material that is more flexible or has a lower Durometer value may be selected. Whereas, if a slower or more gradual opening and closing (or transitioning from one or the other) is desired, a material that is less flexible or that has a higher Durometer value may be selected.

There also are disclosed herein various methods for processing grit through an emitter or clearing emitters and/or drip lines of obstructions. For example, one method for processing grit comprises providing an emitter of the type discussed above, adjusting the fluid pressure that the emitter is subjected to in a supply line to alter the size or shape of the flow channel to expel any obstructions clogging the emitter (e.g., obstructions clogging an inlet, flow channel, outlet, etc.). In one form, this is done by decreasing the fluid pressure to maximize the cross-sectional area of the flow channel and/or create a central flow channel through which any obstructions such as grit or other particulates may be flushed. In another form, this is done by increasing the fluid pressure to cause the baffle walls of the flow channel to deflect, bend or tip so that obstructions can pass through the flow channel or be carried out of the emitter via the high pressure fluid passing therethrough.

Other methods disclosed herein include methods for manufacturing an emitter comprising providing an emitter body made-up of a single material or unitary body construction defining an emitter inlet, at least part of the tortuous flow passage and an outlet bath and inserting a root inhibiting member in or proximate to the outlet bath of the emitter to inhibit roots from obstructing the emitter or operation thereof once the unitary body member is connected to tubing to form the finished emitter. In another form, a method of manufacturing an emitter comprises providing an emitter body made-up of a single material or unitary body construction defining the emitter inlet, at least part of the tortuous flow passage and an outlet bath and elongating the inlet opening to draw fluid from closer to the center of the inner lumen of the tube in an effort to draw fluid with less grit to inhibit grit from obstructing the emitter or operation thereof once the unitary body member is connected to tubing to form the finished emitter product. Another method disclosed relates to the manufacturing of an emitter comprising providing an unitary emitter body defining an emitter inlet, at least a portion of the tortuous flow passage and an outlet bath and both inserting a root inhibiting member in or proximate to the outlet bath and elongating the inlet opening to draw fluid from closer to the middle or center region of the inner lumen. Yet another method disclosed relates to a method of controlling a pressure compensation portion of an emitter by defining a trampoline area that allows the pressure compensation portion to move as desired. For example, such a method may include increasing the size of the trampoline area of the pressure compensation member on one side of the emitter to an area larger than the overall size of the pressure compensation member area located on the opposite side of the emitter (e.g., the area containing the moveable teeth or flippers) to make the emitter more responsive to fluid pressure increases and decreases. Conversely, the size of the trampoline area may be reduced in order to make the emitter less responsive to fluid pressure increases and decreases.

Another method comprises a method of manufacturing and/or inserting an emitter into tubing which includes providing an emitter body having an inlet, outlet and tortuous flow passage connecting the inlet and outlet in fluid communication with one another, providing a carrier in which the emitter body is disposed or to which the emitter body is connected, and connecting the emitter body to the carrier so that the emitter body can more easily be transported through an insertion tool and into drip tubing. In a preferred form, the connection between emitter body and carrier is permanent such that the carrier remains with the emitter body after the emitter is installed into tubing. However, in alternate forms, the method may further include separating the carrier from the emitter body once the emitter body is installed into the tubing.

In addition, a method for reducing problems associated with cross-linking and bonding between an emitter and tubing have also been disclosed herein. For example, such a method may include providing an emitter body having an inlet, outlet and fluid passage connected between the inlet and outlet, and connecting a bracket to the emitter body made of a material that easily bonds with tubing as the tubing is being extruded to ensure a good connection between the emitter body and tubing that is free of cross-linking or bonding defects.

It should also be understood that methods of improving and/or controlling emitter pressure compensation are also disclosed herein. For example, methods of improving and/or controlling emitter pressure compensation by forming a step in at least one moveable baffle tooth or flipper of the pressure compensator of the emitter have been disclosed (or forming a step in one or more baffle teeth/flippers for this purpose). Similar such methods have been disclosed that include forming a plurality of steps in a plurality of moveable baffles to help improve and/or control emitter pressure compensation. Methods of securing a root growth inhibitor to an emitter and methods for preventing and/or hindering grit build-up in an emitter and, specifically, an emitter outlet also have been disclosed.

In view of the above, it should be appreciated that a method of manufacturing an open face flat in-line emitter has been disclosed herein including one or more of the following additional features: a root growth inhibitor member, an inlet projection and/or a carrier for assisting with installation of the emitter into tubing and/or bonding of the emitter to tubing. In addition, methods of manufacturing or assembling non-pressure compensating components are disclosed as are methods of manufacturing or assembling pressure compensating and/or non-pressure compensating emitters with interchangeable parts. Similarly, methods of manufacturing or assembling customizable emitters and methods of customizing or configuring emitters are also disclosed herein. In addition to providing methods of customizing or configuring emitters with interchangeable inserts, there are also methods of customizing or configuring emitters using a mold. The different emitter designs or layouts may be formed by interchanging various emitter portions to obtain the emitter properties desired for a particular application. In addition to having these interchangeable portions, it should be understood that the mold for manufacturing or producing the emitter could alternatively be configured with different inserts to produce emitters of different types (e.g., emitters with different designs or layouts, emitters with different flow rates, emitters with different pressure compensation characteristics (if any pressure compensating), emitters with different flow channel shapes or sizes, etc.).

In some exemplary forms, the method for manufacturing an open-face non-cylindrical irrigation drip emitter for attachment to only a circumferential portion of an inner surface of an irrigation drip line tube carrying pressurized fluid comprises providing an emitter body having an inlet portion, flow passage portion and outlet portion, wherein at least one of the inlet portion, flow passage portion or outlet portion is formed as an interchangeable or swappable insert, and interchanging or swapping the interchangeable or swappable insert with a second emitter insert in order to alter the design or performance of the emitter. In other exemplary forms, the method of manufacturing an open-face non-cylindrical irrigation drip emitter for attachment to only a circumferential portion of an inner surface of an irrigation drip line tube carrying pressurized fluid comprises providing a mold for forming an emitter body having an inlet portion, flow passage portion and outlet portion, wherein the mold includes at least one interchangeable or swappable insert for forming at least one of the inlet portion, flow passage portion and outlet portion, and interchanging or swapping the interchangeable or swappable insert with a second emitter insert in order to alter the design or performance characteristic of the emitter manufactured by the mold. In still other exemplary forms, the method for improving the pressure compensating performance of a non-cylindrical irrigation drip emitter for attachment to only a circumferential portion of an inner surface of an irrigation drip line tube carrying pressurized fluid comprises providing an emitter body defining an inlet area, outlet area and a flow channel therebetween connecting the inlet and outlet areas, the flow channel defining a pressure reduction portion and a pressure compensating portion having a first volume at lower fluid pressure and a second volume smaller than the first volume at higher fluid pressure to restrict flow through the channel, wherein the pressure compensating portion includes at least one baffle tooth having a base, a tip and an upper surface extending between the base and tip, and forming at least one step in the base of the at least one baffle tooth so the base of the tooth is positioned at a height different from a proximate upper bonding surface of the emitter in order to improve pressure compensating performance of the emitter.

Another method disclosed herein is a method of manufacturing an irrigation drip emitter for attachment to only a portion of an inner circumference of an inner surface of an irrigation drip line tube like that depicted in FIGS. 27A-J. For example, a method of manufacturing an emitter comprising providing an elastomeric material, and molding the elastomeric material into a discrete elastomeric emitter body integrally defining: an inlet for receiving pressurized fluid from the tube; an outlet bath for discharging the fluid from the body; a pressure reducing flow channel extending from the inlet for reducing a pressure and flow of fluid received at the inlet, and a pressure compensating chamber positioned between the pressure reducing flow channel and the outlet bath to receive fluid from the pressure reducing flow channel, the chamber being defined by a moveable floor and at least one tapered baffle that separates the pressure compensating chamber into an upstream portion and a downstream portion formed by an inner flow passage defined by the at least one tapered baffle through which the fluid travels from the upstream portion. Similarly, a method of manufacturing a drip line having emitters similar to those illustrated in FIGS. 27A-J is also contemplated. More particularly, a method of manufacturing an irrigation drip line tube including: providing an elastomeric material; molding the elastomeric material into a plurality of discrete elastomeric emitter bodies, each emitter body integrally defining an inlet for receiving pressurized fluid from the tube, an outlet bath for discharging the fluid from the body, a pressure reducing flow channel extending from the inlet for reducing a pressure and flow of fluid received at the inlet, and a pressure compensating chamber positioned between the pressure reducing flow channel and the outlet bath to receive fluid from the pressure reducing flow channel, the chamber being defined by a moveable floor and at least one tapered baffle that separates the pressure compensating chamber into an upstream portion and a downstream portion formed by an inner flow passage defined by the at least one tapered baffle through which the fluid travels from the upstream portion; extruding a drip line tube having an inner surface and an outer surface with the inner surface defining an inner circumference of the tube; and connecting the plurality of discrete elastomeric emitter bodies to only a portion of the inner circumference of the inner surface of the tube and at regular intervals therein.

Other methods contemplated herein relate to the emitters of FIGS. 28A-J and 29A-H and include methods for manufacturing a pressure compensating member solely, as well as methods for manufacturing poly-material emitters having pressure compensating members. For example, in one instance a method of manufacturing a pressure compensating member for a poly-material emitter comprising providing an elastomeric material, and molding the elastomeric material into an elastomeric pressure compensating member integrally defining: a flexible floor; side walls extending substantially about a perimeter of the flexible floor and including an ingress opening and an egress opening; and at least one tapering baffle that separates the flexible floor and pressure compensating member into an upstream portion and a downstream portion with both the upstream portion and downstream portion having respective volumes or cross-sectional areas and the volume or cross-sectional area of the upstream portion being larger than the volume or cross-sectional area of the downstream portion to assist the pressure compensating member in flushing grit therethrough. The method may further entail molding a rigid emitter body such that the elastomeric pressure compensating member is disposed within an opening defined by the rigid emitter body. In some forms, this method comprises molding the rigid emitter body to define a seat upon which the pressure compensating member is rested.

In other forms, methods of manufacturing poly-material emitters are disclosed comprising providing a polyethylene and an elastomeric material, molding the polyethylene into a rigid emitter body integrally defining an inlet, an outlet and a pressure reducing flow passage extending from the inlet, the rigid emitter body further defining a seat for a pressure compensating member, molding the elastomeric material into a pressure compensating member integrally defining: a flexible floor; side walls extending substantially about a perimeter of the flexible floor and including an ingress opening and an egress opening; and at least one tapering baffle that separates the flexible floor and pressure compensating member into an upstream portion and a downstream portion with both the upstream portion and downstream portion having respective volumes or cross-sectional areas and the volume or cross-sectional area of the upstream portion being larger than the volume or cross-sectional area of the downstream portion to assist the pressure compensating member in flushing grit therethrough or through the emitter. Similarly, methods of manufacturing irrigation drip line tubes with such poly-material emitters are also contemplated. In some forms, a method of manufacturing an irrigation drip line tube includes providing a polyethylene and an elastomeric material, molding the polyethylene into a plurality of rigid emitter bodies each integrally defining an inlet, an outlet, a pressure reducing flow passage extending from the inlet, and a seat or socket, molding the elastomeric material into a plurality of pressure compensating members seated in the seat or socket of the rigid emitter bodies, with each pressure compensating member integrally defining: a flexible floor; side walls extending substantially about a perimeter of the flexible floor and including an ingress opening and an egress opening; and at least one tapering baffle that separates the flexible floor and pressure compensating member into an upstream portion and a downstream portion with both the upstream portion and downstream portion having respective volumes or cross-sectional areas and the volume or cross-sectional area of the upstream portion being larger than the volume or cross-sectional area of the downstream portion to assist the pressure compensating member in flushing grit therethrough, and further extruding a drip line tube having an inner surface and an outer surface with the inner surface defining an inner circumference of the tube, and connecting the plurality of discrete elastomeric emitter bodies to only a portion of the inner circumference of the inner surface of the tube and at regular intervals therein.

Thus, it is apparent that there has been provided, in accordance with the invention, an elastomeric emitter and methods relating to same that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pressure compensating member for an emitter comprising:
  an elastomeric pressure compensating member integrally defining:
    a flexible floor;
    side walls extending substantially about a perimeter of the flexible floor and including an ingress opening and an egress opening, the flexible floor having a first side and a second side opposite of the first side; and
    two tapering baffles extending from the first side of the flexible floor, the two tapering baffles separating the flexible floor and pressure compensating member into an upstream portion extending from the two tapering baffles to the ingress opening and a downstream portion extending from the two tapering baffles to the egress opening, both the upstream portion and downstream portion having a respective volume or cross-sectional area, the volume or cross-sectional area of the upstream portion being larger than the volume or cross-sectional area of the downstream portion to assist the pressure compensating member in flushing grit downstream of the two tapering baffles, the baffles having a normal operation state where the baffles move depending on external pressure on the second side of the flexible floor to define a constriction and maintain a predetermined pressure range and having a grit operation state when grit at the two baffles impedes the normal operation state and the baffles move depending on a build-up of internal pressure on the first side of the flexible floor at the upstream portion due to the grit to decrease the constriction to flush the grit and return the emitter to the normal operation state;
  wherein the side walls include a first side wall and a second side wall opposite the first side wall, a first of the two tapering baffles extending from the first side wall and a second of the two tapering baffles extending from the second side wall, the two tapering baffles extending upstream and being predominately positioned in a downstream half of the volume or cross-sectional area of the pressure compensating member.

2. The pressure compensating member of claim 1 wherein the side walls include a third side wall and a fourth side wall positioned in a generally rectangular orientation with the first side wall and the second side wall, the third and fourth side walls positioned parallel to one another and having a generally flat upper surface, and the first and second side walls positioned parallel to one another and generally transverse the third and fourth side walls, with the first and second side walls having a curved upper surface with a first radius of curvature that corresponds to an interior surface of an irrigation drip tube.

3. The pressure compensating member of claim 2 wherein the flexible floor has a first side upon which the two tapering baffles are connected, and a second side located opposite the first side, and wherein the flexible floor is shaped so as to be concave on the second side and convex on the first side, the flexible floor have a second radius of curvature that corresponds in shape to the first radius of curvature of the upper surfaces of the third and fourth side walls.

4. The pressure compensating member of claim 3 wherein the first, second, third and fourth side walls extend above the first side of the flexible floor and terminate in the generally flat upper surfaces of the third and fourth side walls and the curved upper surfaces of the first and second side walls, and the first, second, third and fourth side walls extend below the second side of the flexible floor and terminate in generally flat and coplanar bottom surfaces.

5. The pressure compensating member of claim 1 wherein the elastomeric pressure compensating member further defines a protruding portion proximate at least one of the ingress opening and/or the egress opening.

6. The pressure compensating member of claim 1 wherein the elastomeric pressure compensating member defines a first protruding portion aligned with the ingress opening and a second protruding portion aligned with the egress opening and the first and second protruding portions extend out beyond a boundary defined by the side walls.

7. The pressure compensating member of claim 6 wherein second protruding portion extends out further from the boundary defined by the upstanding walls further than the first protruding portion.

8. The pressure compensating member of claim 3 wherein the two tapering baffles comprise a first tapering baffle extending from the first side wall and a second tapering baffle extending from the second side wall, with the first and second tapering baffles extending toward a center of the flexible floor and toward one another to define the upstream portion and the downstream portion of the pressure compensating member.

9. The pressure compensating member of claim 8 wherein one of the first and second tapering baffles is longer than the other of the first and second tapering baffles.

10. The pressure compensating member of claim 1 further comprising a rigid emitter body defining a seat within which the pressure compensating member is disposed to form a poly-material emitter.

11. A pressure compensating member for an emitter comprising:
an elastomeric pressure compensating member integrally defining:
a flexible floor;
side walls extending substantially about a perimeter of the flexible floor and including an ingress opening and an egress opening, the flexible floor having a first side and a second side opposite of the first side; and
two tapering baffles extending from the first side of the flexible floor, the two tapering baffles separating the flexible floor and pressure compensating member into an upstream portion extending from the two tapering baffles to the ingress opening and a downstream portion extending from the two tapering baffles to the egress opening, both the upstream portion and downstream portion having a respective volume or cross-sectional area, the volume or cross-sectional area of the upstream portion being larger than the volume or cross-sectional area of the downstream portion to assist the pressure compensating member in flushing grit downstream of the two tapering baffles, the baffles having a normal operation state where the baffles move depending on external pressure on the second side of the flexible floor to define a constriction and maintain a predetermined pressure range and having a grit operation state when grit at the two baffles impedes the normal operation state and the baffles move depending on a build-up of internal pressure on the first side of the flexible floor at the upstream portion due to the grit to decrease the constriction to flush the grit and return the emitter to the normal operation state;
wherein the two tapering baffles include a first tapering baffle and a second tapering baffle, the first tapering baffle includes a first upstream facing side that extends upstream from the first side wall at a first angle and the second tapering baffle includes a second upstream facing side that extends upstream from the second wall at a second angle.

12. The pressure compensating member of claim 11 wherein the first angle is less than the second angle.

13. The pressure compensating member of claim 12 wherein the first tapering baffle extends from the first side wall at a first location that is substantially opposite from a second location where the second tapering baffle extends from the second side wall.

14. The pressure compensating member of claim 1 wherein the ingress opening is located opposite the egress opening.

15. The pressure compensating member of claim 8 wherein the first tapering baffle includes a first terminal end and the second tapering baffle includes a second terminal end, and the first terminal end and the second terminal end align along a line bisecting the flexible floor.

16. The pressure compensating member of claim 8 wherein the first tapering baffle includes a first terminal end and the second tapering baffle includes a second terminal end, and the first terminal end being upstream of the second terminal end.

17. The pressure compensating member of claim 1 wherein the at least one of the two tapering baffle extends across the flexible floor from a location adjacent the egress opening.

18. The pressure compensating member of claim 1 wherein the two tapering baffles include a first tapering baffle and a second tapering baffle, the first tapering baffle extending across the flexible floor from a first location that is substantially adjacent the egress opening and the second baffle extending across the flexible floor from a second location that is substantially opposite from the first location.

19. The pressure compensating member of claim 1 wherein the two tapering baffles comprise a first tapering baffle extending from the first side wall with a first step and a second tapering baffle extending from the second side wall with a second step.

20. The pressure compensating member of claim 11 wherein the first angle and the second angle are different.

* * * * *